(12) United States Patent
Hibino

(10) Patent No.: US 12,724,248 B2
(45) Date of Patent: Sep. 1, 2026

(54) LARGE APERTURE RATIO TELEPHOTO ZOOM LENS

(71) Applicant: SIGMA CORPORATION, Kanagawa (JP)

(72) Inventor: Masakazu Hibino, Kanagawa (JP)

(73) Assignee: SIGMA CORPORATION, Kanagawa (JP)

( * ) Notice: Subject to any disclaimer, the term of this patent is extended or adjusted under 35 U.S.C. 154(b) by 197 days.

(21) Appl. No.: 18/817,844

(22) Filed: Aug. 28, 2024

(65) Prior Publication Data

US 2025/0093627 A1 Mar. 20, 2025

(30) Foreign Application Priority Data

Sep. 19, 2023 (JP) ................................ 2023-150744

(51) Int. Cl.

*G02B 13/02* (2006.01)
*G02B 13/18* (2006.01)
*G02B 15/14* (2006.01)
*G02B 27/00* (2006.01)

(52) U.S. Cl.

CPC ............ *G02B 13/02* (2013.01); *G02B 13/18* (2013.01); *G02B 15/1461* (2019.08); *G02B 27/0068* (2013.01)

(58) Field of Classification Search

CPC .... G02B 13/02; G02B 13/18; G02B 15/1461; G02B 27/0068; G02B 27/646

See application file for complete search history.

(56) References Cited

U.S. PATENT DOCUMENTS

2018/0180848 A1* 6/2018 Ito ........................ G02B 15/177
2019/0196143 A1* 6/2019 Okada .................... G02B 13/02
2020/0271908 A1* 8/2020 Tomioka .................. G02B 9/36
2023/0038734 A1* 2/2023 Ohtake .................. G02B 15/20

FOREIGN PATENT DOCUMENTS

JP 2019-191317 10/2019
JP 2021-76830 5/2021

* cited by examiner

*Primary Examiner* — Mariam Qureshi

(74) *Attorney, Agent, or Firm* — Greenblum & Bernstein, P.L.C.

(57) ABSTRACT

Disclosed is a large aperture ratio telephoto zoom lens with high optical performance, equipped with a vibration reduction system and a silent and speedy focusing mechanism and yet small and lightweight. The large aperture ratio telephoto zoom lens includes, sequentially from the object side to the image side: a first lens group G1 with positive refractive power, fixed relative to the image surface during zooming; a second lens group G2 with negative refractive power; a third lens group G3 with negative refractive power; a fourth lens group G4 with positive refractive power; an aperture diaphragm S; and a subsequent lens group GR composed of a plurality of lens groups. Distances between adjacent lens groups change during zooming from the wide-angle end to the telephoto end. The subsequent lens group GR includes a focusing lens group that moves during focusing from an infinite distance object to a close distance object.

13 Claims, 130 Drawing Sheets

LARGE APERTURE RATIO TELEPHOTO ZOOM LENS

FIELD OF THE INVENTION

The present invention relates to a large aperture ratio telephoto zoom lens with high optical performance, a variable-power imaging optical system suitable for use as an imaging optics in an imaging device such as a digital camera or a video camera, equipped with a vibration reduction system and a silent and speedy focusing mechanism and yet lightweight.

BACKGROUND ART

With an increase in the number and density of pixels in digital cameras in recent years, zoom lenses with high optical performance are in demand. For resolution to a high spatial frequency, it is especially desirable to reduce various aberrations. However, generally speaking, the larger the aperture ratio, the harder it is to reduce aberrations.

A larger aperture ratio means larger lens diameters, which makes it harder to reduce lens weight. The focusing lens group in particular in a large aperture ratio telephoto zoom lens tends to be heavy and requires a large actuator for silent, high-speed focusing. However, using a large actuator is incompatible with making the zoom lens more lightweight. Attempts have been made to make the focusing lens group smaller and lighter to avoid using a large actuator for silent, high-speed focusing (See, for example, Japanese Patent Application Publication No. 2021-076830).

Likewise, a larger aperture ratio means a heavier vibration reduction lens group, leading to the necessity to use a large actuator. Accordingly, attempts have been made to make the vibration reduction lens group smaller and lighter to avoid using a large actuator for achieving high responsiveness of the vibration reduction system (quick shift of the imaging position in response to a movement of the vibration reduction lens) (See, for example, Japanese Patent Application Publications No. 2019-191317 and No. 2021-076830).

The patent literatures mentioned above as examples of telephoto zoom lenses with a large aperture ratio (of about 3× zoom) are described below.

SUMMARY OF THE INVENTION

Japanese Patent Application Publication No. 2019-191317 discloses a zoom lens configured with five groups of lenses. Lenses LmB with a low ray height are used as a vibration reduction lens group so that the vibration reduction system is made smaller and lighter. However, the second group of lenses, which are large in diameter and heavy, is used as the focusing lens group. This causes problems such as louder noise during focusing, lowered speed of focusing, and an increased weight due to the use of a lens barrel with a larger diameter for accommodating the large actuator.

Japanese Patent Application Publication No. 2021-076830 discloses a zoom lens configured with seven groups of lenses. The fifth and sixth lens groups, each of which is configured with one or two small-diameter lenses, make up the focusing lens group. The lightweight focusing lens group enables silent, high-speed focusing without having to use a large actuator. On the other hand, the diameter of axial rays at the telephoto end is large, and there are as many as seven lenses, from the second lens group to the diaphragm, which makes it hard to further reduce the weight.

The present invention was made in view of these circumstances and it is an object of the invention to provide a large aperture ratio telephoto zoom lens with high optical performance, equipped with a vibration reduction system and a silent and speedy focusing mechanism and yet small and lightweight.

A large aperture ratio telephoto zoom lens including, sequentially from an object side to an image side: a first lens group G1 with positive refractive power, fixed relative to the image surface during zooming; a second lens group G2 with negative refractive power; a third lens group G3 with negative refractive power; a fourth lens group G4 with positive refractive power; an aperture diaphragm S; and a subsequent lens group GR composed of a plurality of lens groups, distances between adjacent lens groups changing during zooming from a wide-angle end to a telephoto end, the subsequent lens group GR including a focusing lens group that moves during focusing from an infinite distance object to a close distance object, the large aperture ratio telephoto zoom lens satisfying the following conditional expressions:

$$-1.18 < f2/fT < -0.37 \quad (1)$$

$$-0.94 < f3/fT < -0.35, \text{ where} \quad (2)$$

f2 represents a focal length of the second lens group G2, fT represents a focal length of the entire optical system at the telephoto end when focusing on infinity, and f3 represents a focal length of the third lens group G3.

A large aperture ratio telephoto zoom lens including, sequentially from an object side to an image side: a first lens group G1 with positive refractive power, fixed relative to an image surface during zooming; a second lens group G2 with negative refractive power; a third lens group G3 with negative refractive power; a fourth lens group G4 with positive refractive power; an aperture diaphragm S that is fixed relative to the image surface during zooming; a fifth lens group G5 with positive refractive power, fixed relative to the image surface during zooming; a sixth lens group G6 with negative refractive power; a seventh lens group G7 with positive refractive power; and an eighth lens group G8 with fixed negative refractive power relative to the image surface during zooming, distances between adjacent lens groups changing during zooming from a wide-angle end to a telephoto end, the large aperture ratio telephoto zoom lens including a focusing lens group that moves during focusing from an infinite distance object to a close distance object closer to the image side than the aperture diaphragm S, the large aperture ratio telephoto zoom lens satisfying the following conditional expressions:

$$-1.18 < f2/fT < -0.37 \quad (1)$$

$$-0.94 < f3/fT < -0.35, \text{ where} \quad (2)$$

f2 represents a focal length of the second lens group G2, fT represents a focal length of the entire optical system at the telephoto end when focusing on infinity, and f3 represents a focal length of the third lens group G3.

According to the present invention, a large aperture ratio telephoto zoom lens with high optical performance, equipped with a vibration reduction system and a silent and speedy focusing mechanism and yet small and lightweight, can be provided.

BRIEF DESCRIPTION OF THE DRAWINGS

FIG. 120 is a lateral aberration diagram at the wide-angle end when focusing on infinity in Example 8;

FIG. 121 is a lateral aberration diagram at the wide-angle end when focusing on infinity and compensating for a tilt of 0.4° in Example 8;

FIG. 122 is a lateral aberration diagram at the wide-angle end at a focusing distance of 1.0 m in Example 8;

FIG. 123 is a lateral aberration diagram at an intermediate focal length when focusing on infinity in Example 8;

FIG. 124 is a lateral aberration diagram at an intermediate focal length when focusing on infinity and compensating for a tilt of 0.4° in Example 8;

FIG. 125 is a lateral aberration diagram at an intermediate focal length at a focusing distance of 1.0 m in Example 8;

FIG. 126 is a lateral aberration diagram at the telephoto end when focusing on infinity in Example 8;

FIG. 127 is a lateral aberration diagram at the telephoto end when focusing on infinity and compensating for a tilt of 0.4° in Example 8;

FIG. 128 is a lateral aberration diagram at the telephoto end at a focusing distance of 1.0 m in Example 8;

FIG. 129 is a lens configuration diagram according to Example 9 of the present invention;

FIG. 130 is a longitudinal aberration diagram at the wide-angle end when focusing on infinity in Example 9;

FIG. 131 is a longitudinal aberration diagram at the wide-angle end at a focusing distance of 1.0 m in Example 9;

Figure 132:
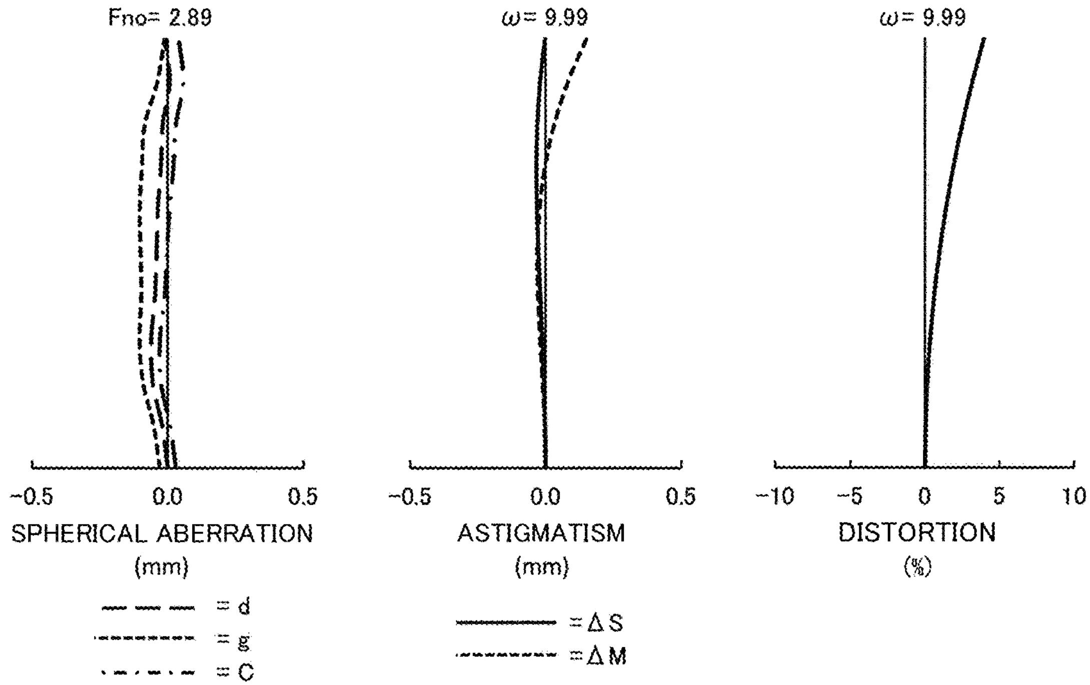
Figure 133:
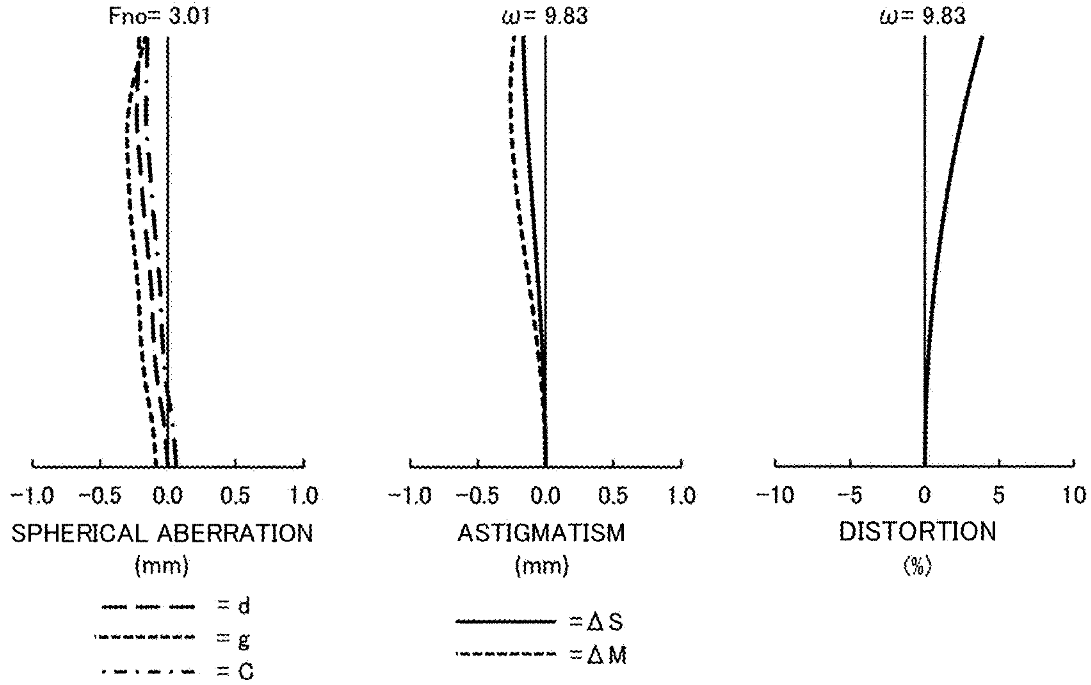
Figure 134:
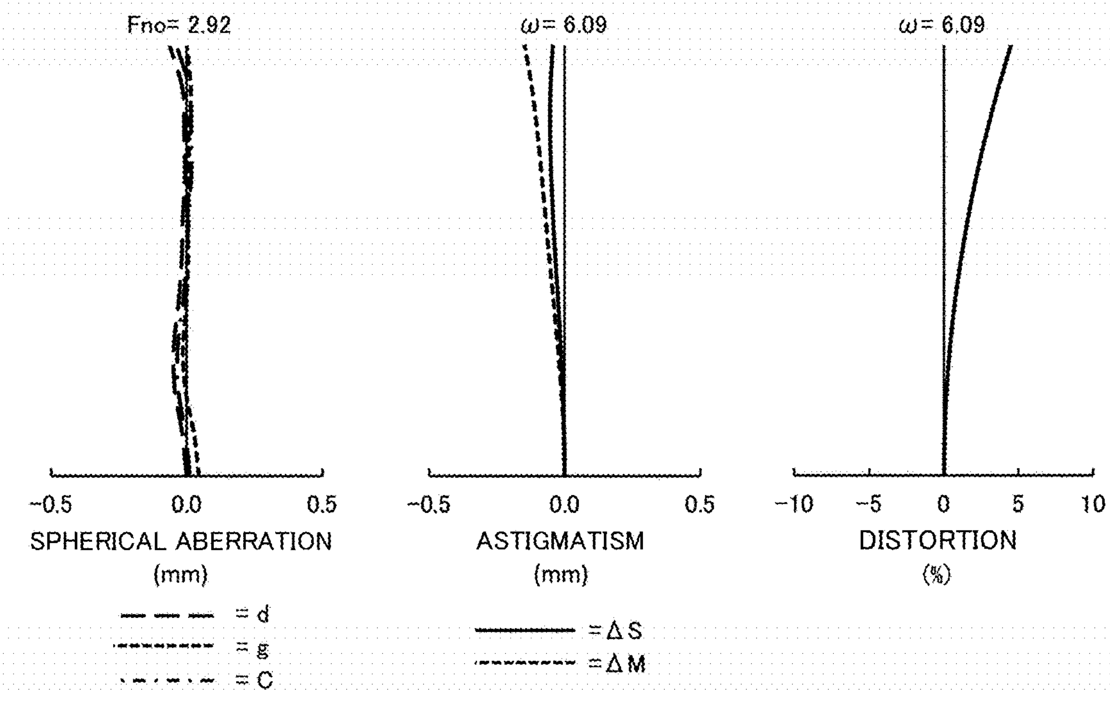
Figure 135:
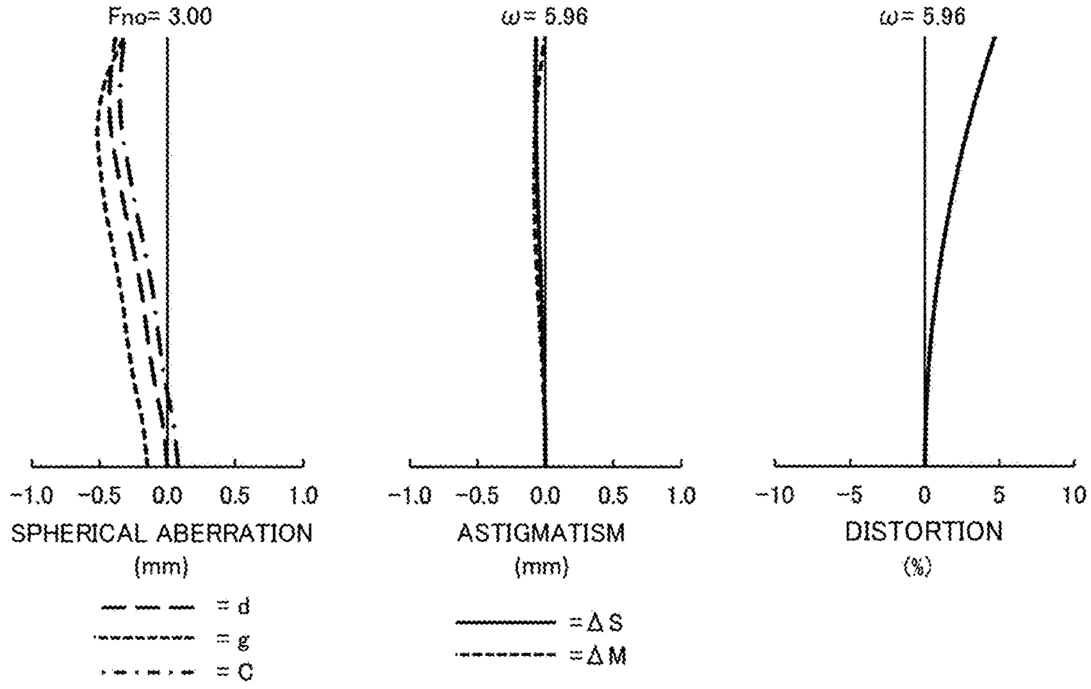
Figure 136:
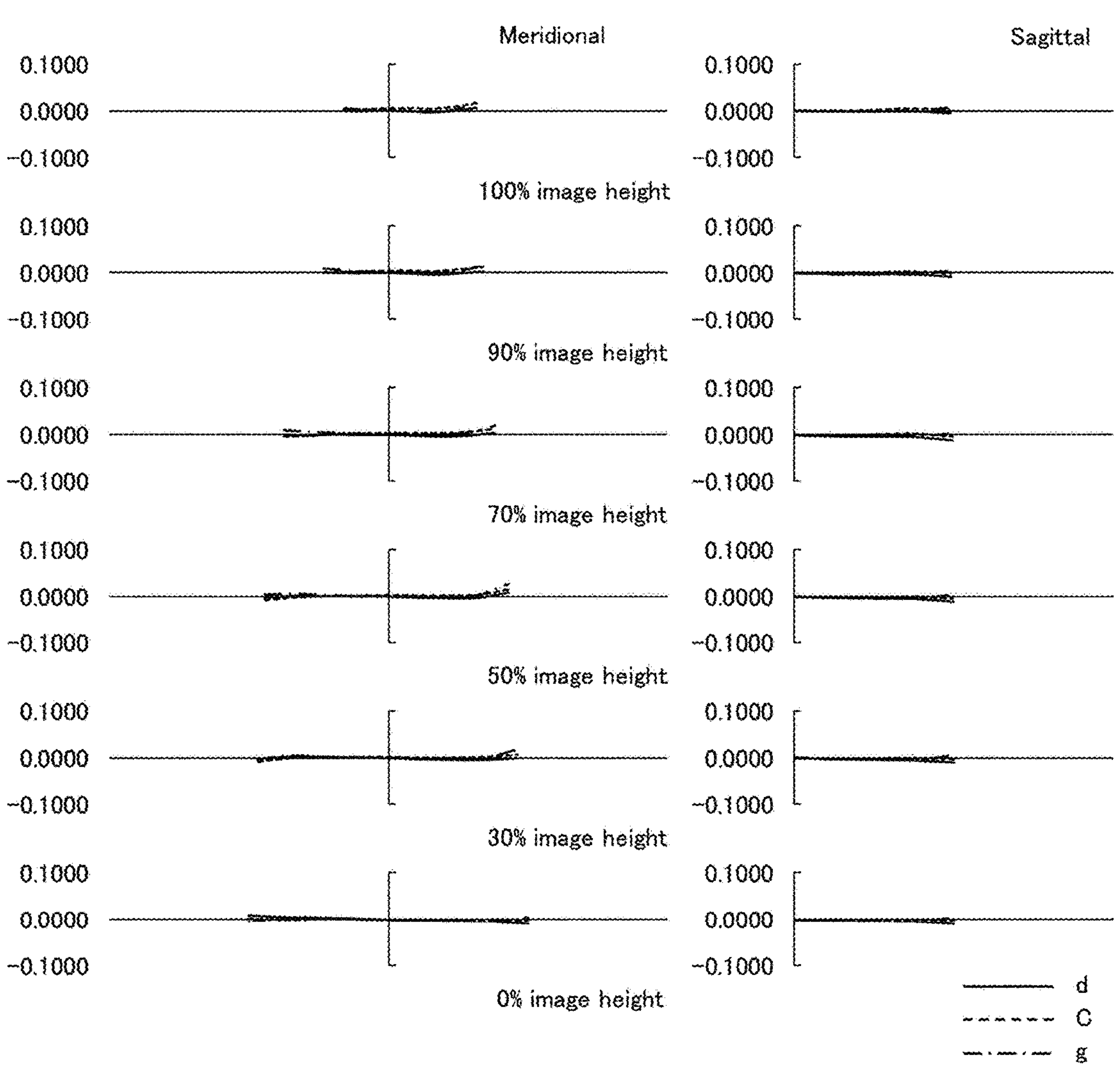
Figure 137:
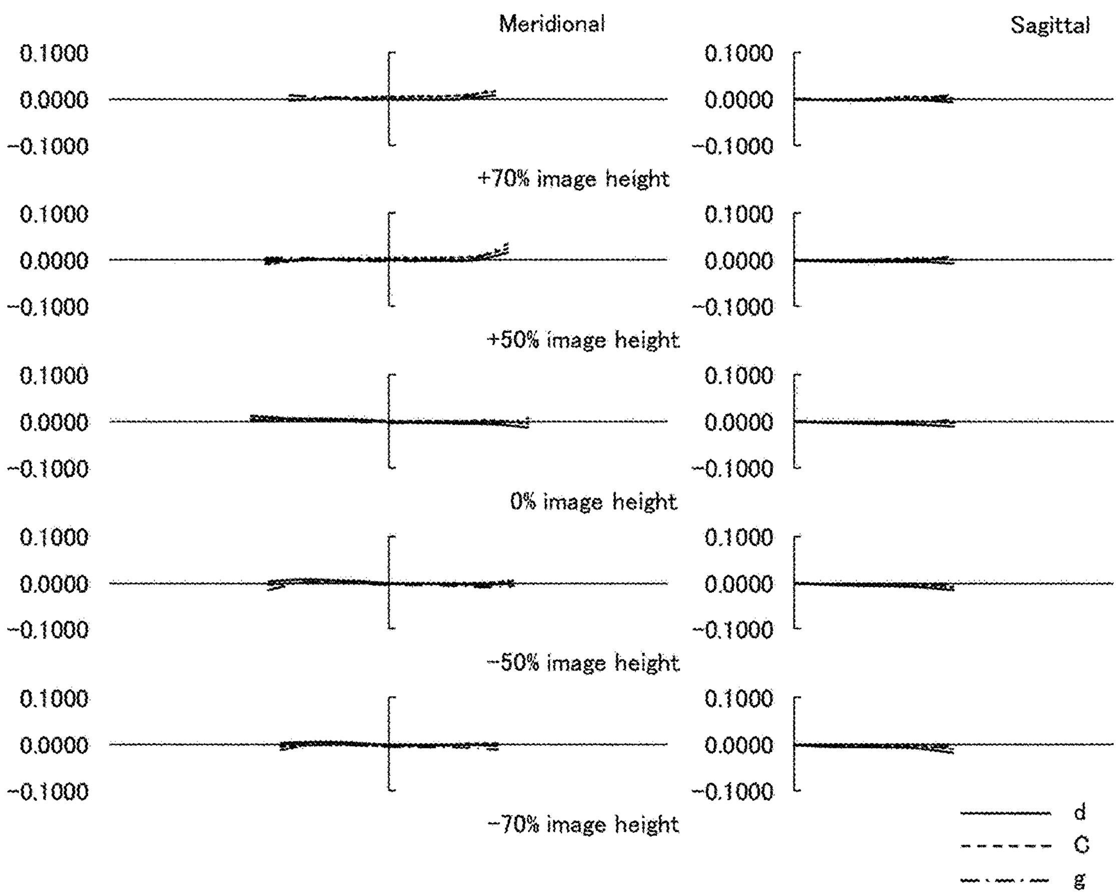
Figure 138:
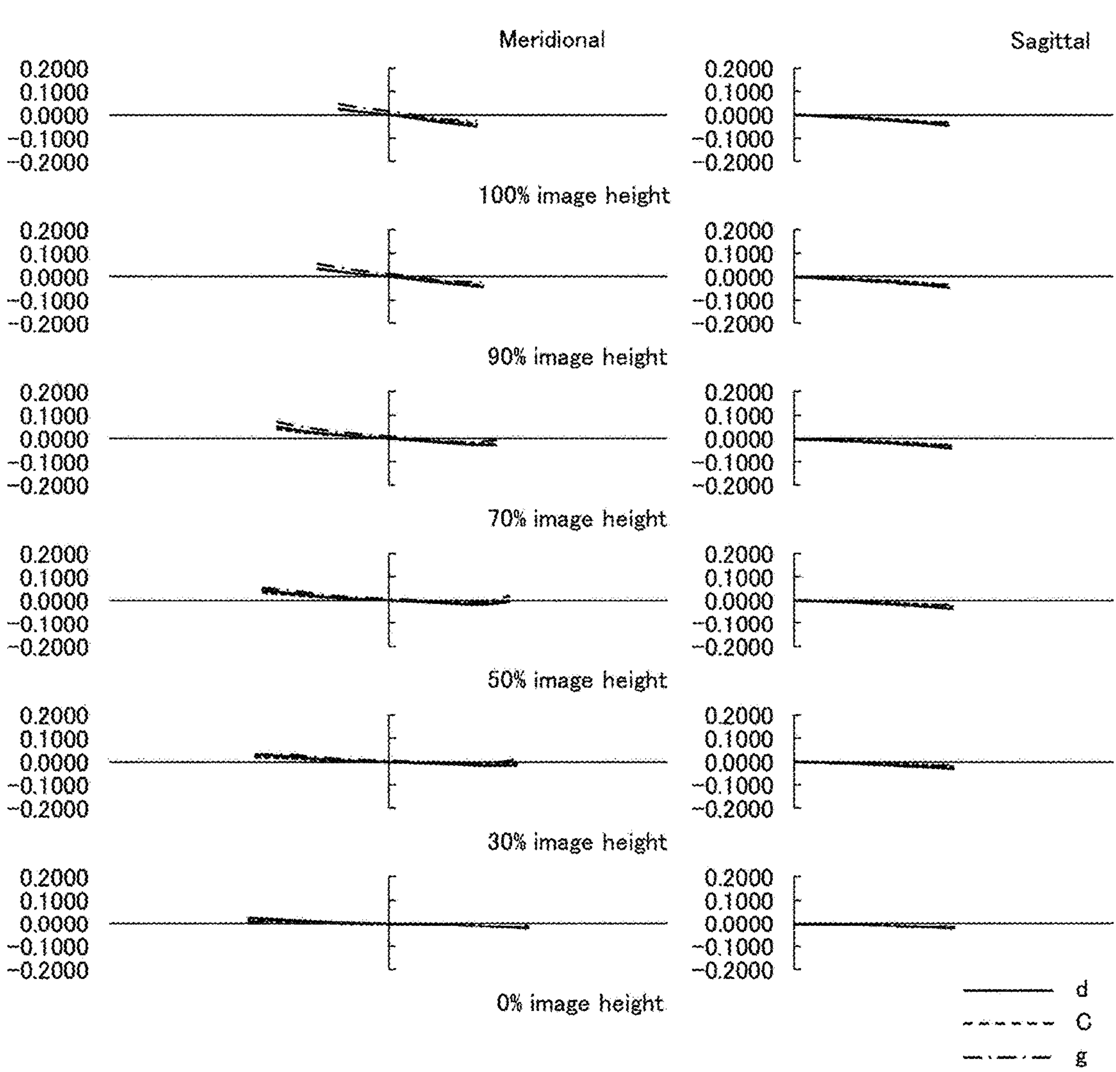
Figure 139:
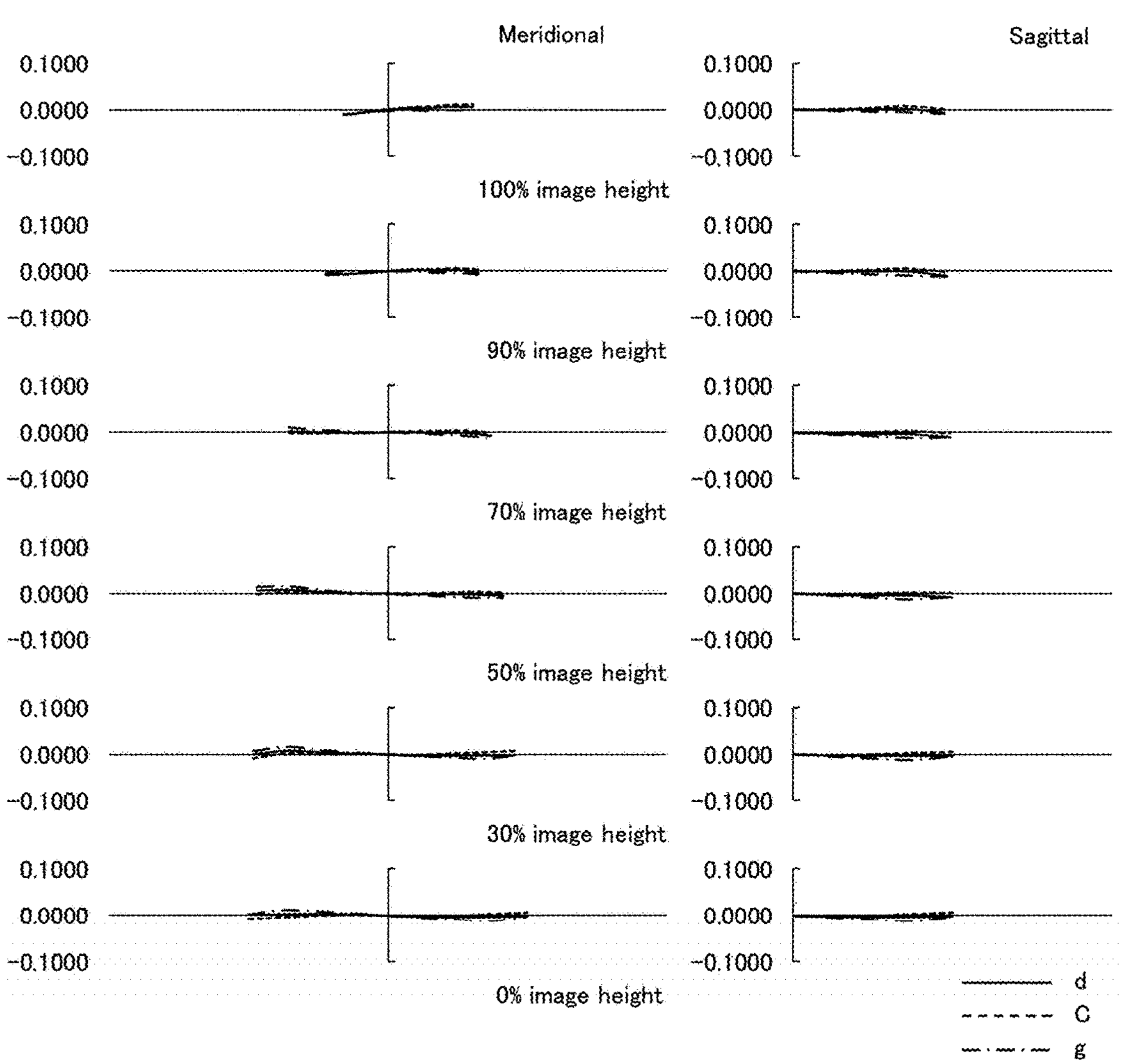
Figure 140:
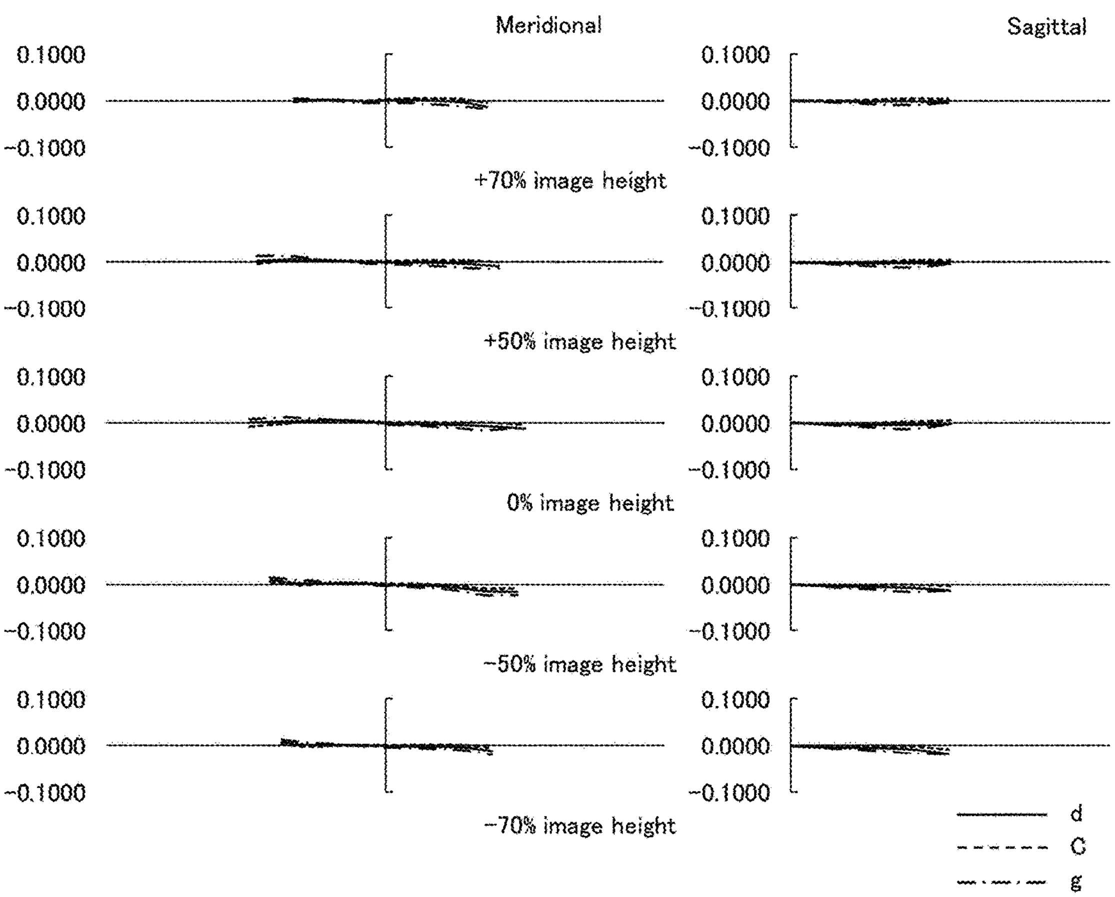
Figure 141:
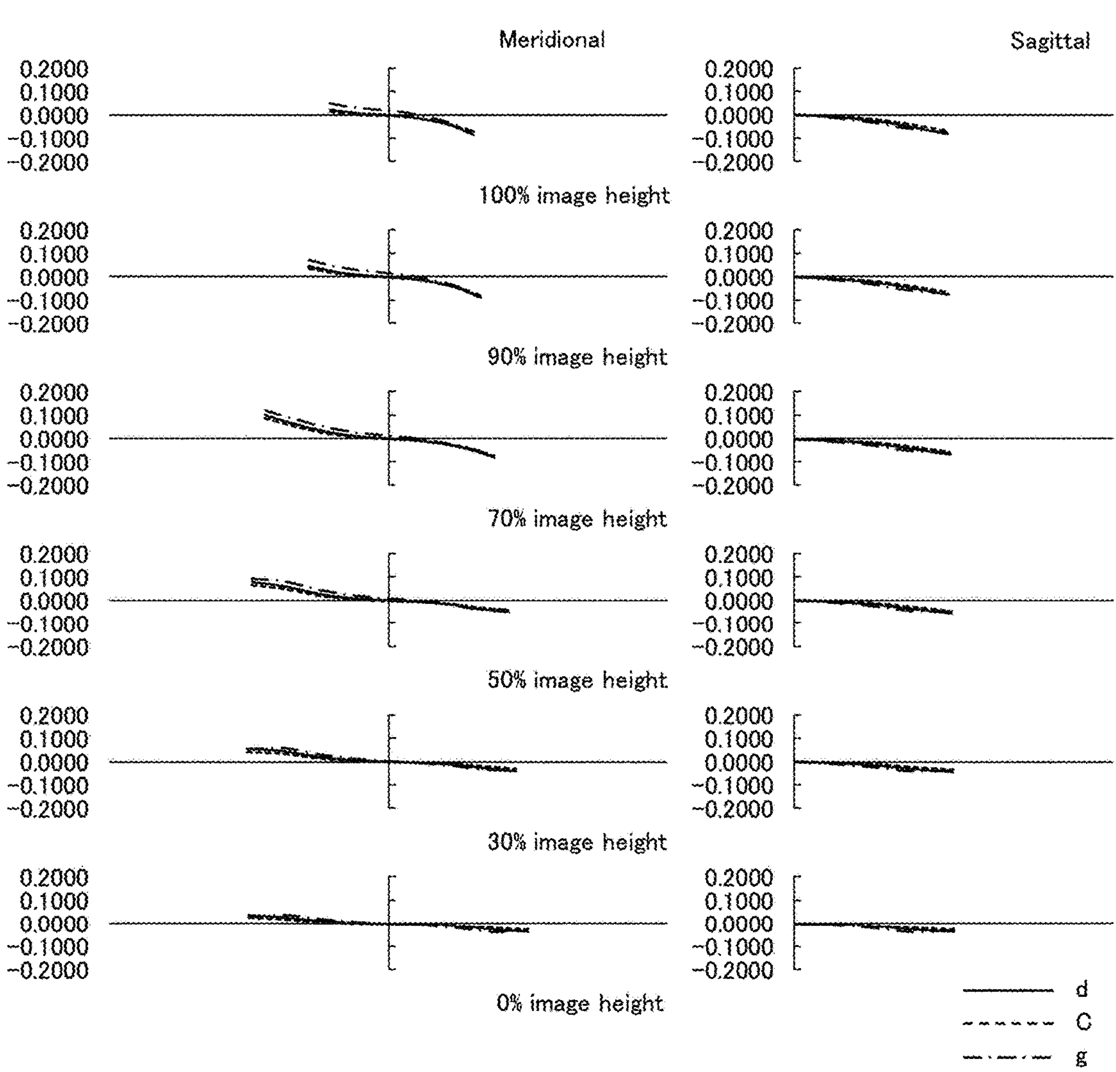
Figure 142:
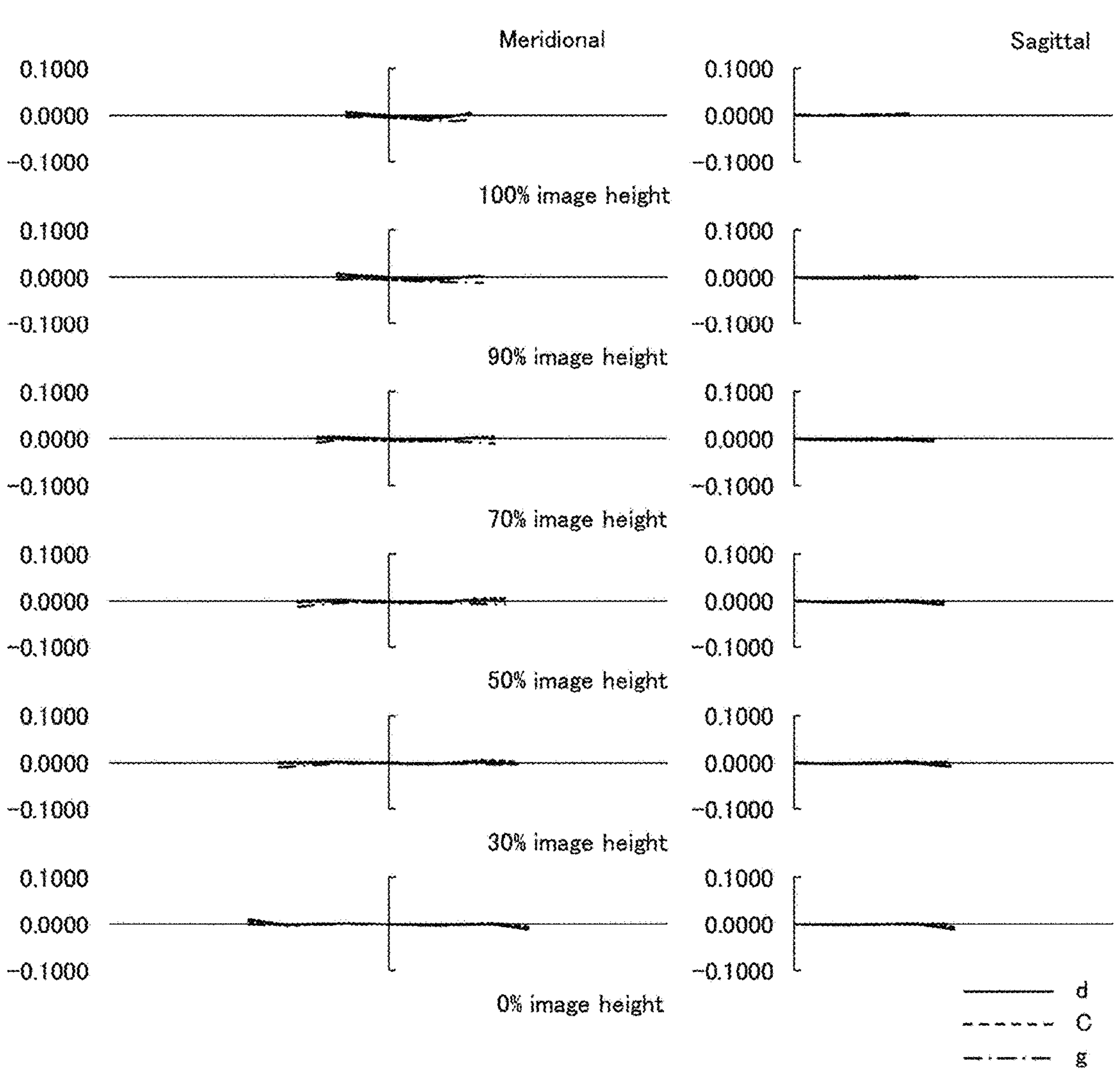
Figure 143:
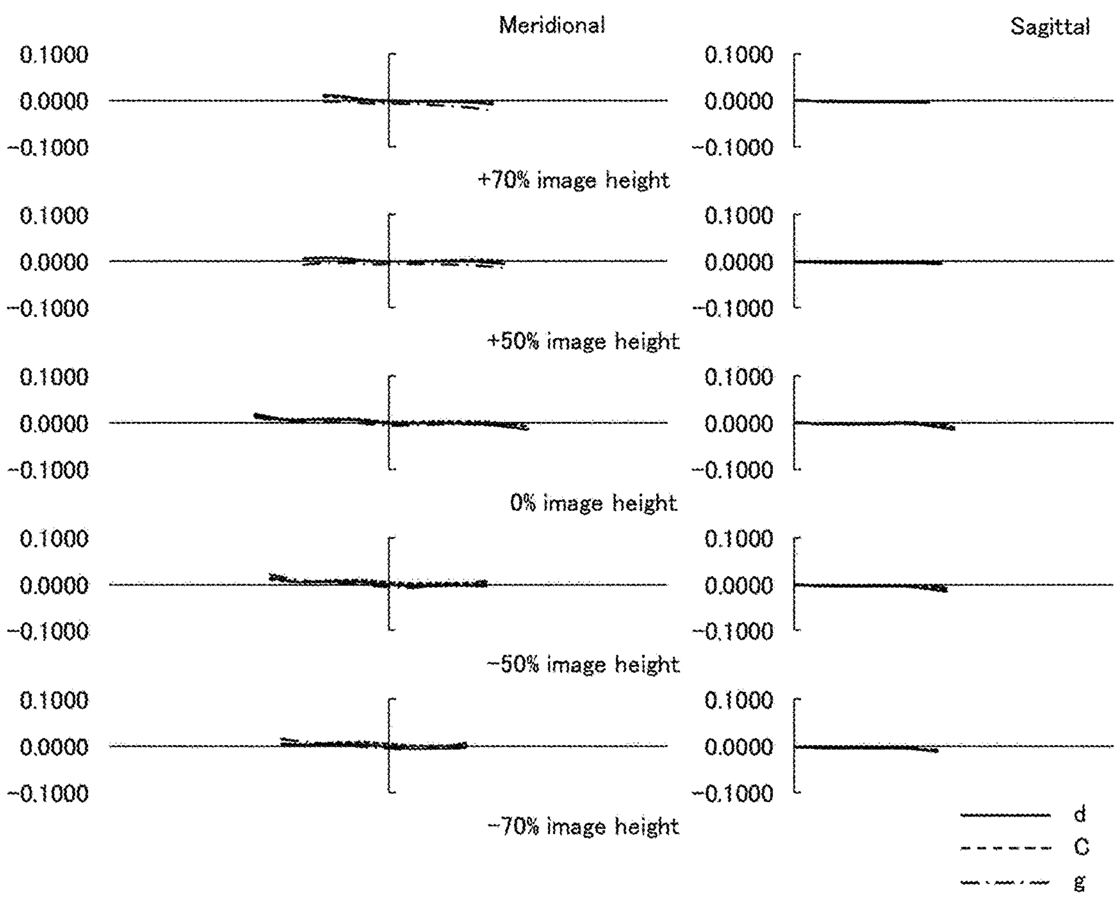
Figure 144:
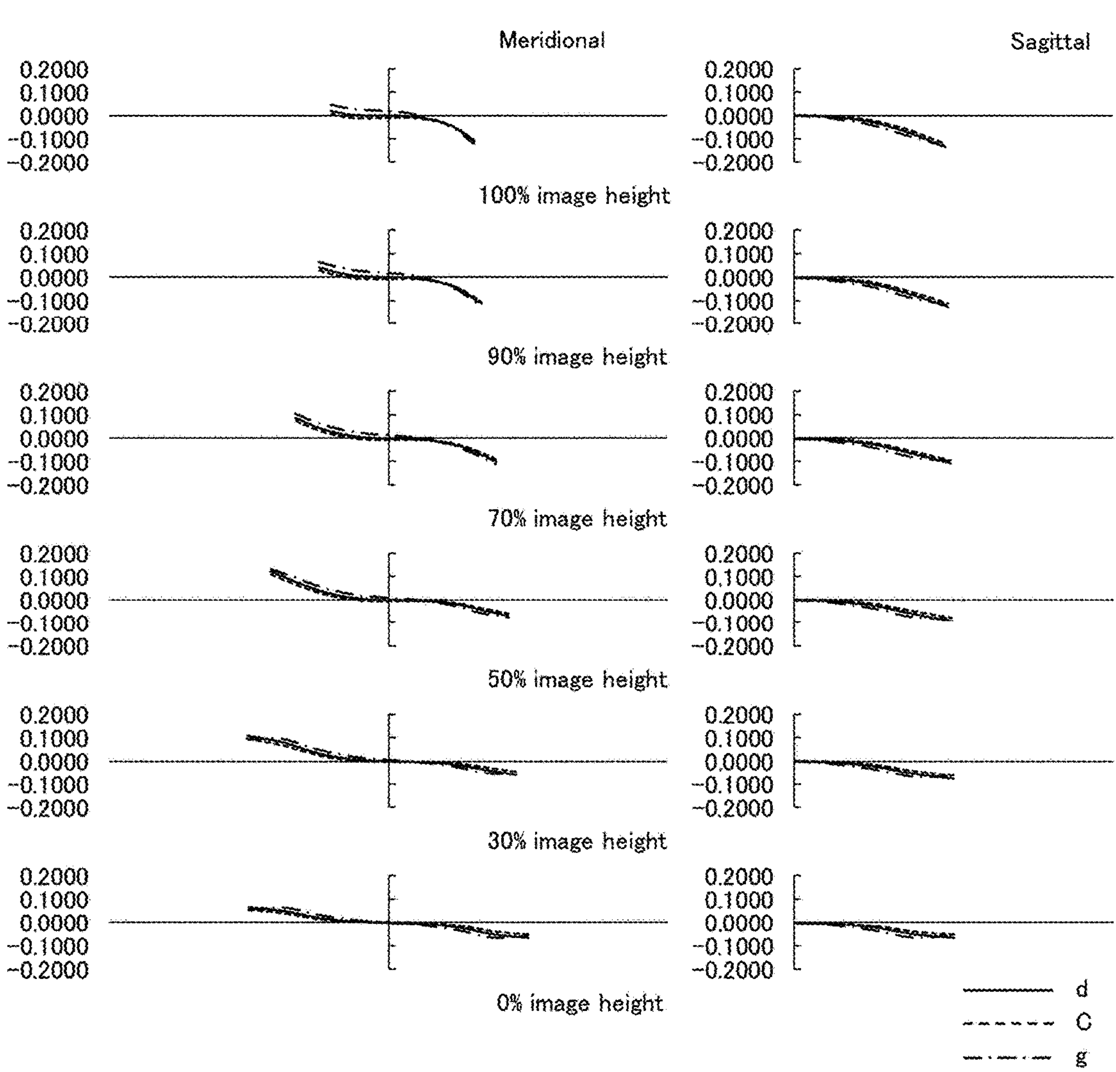
Figure 145:
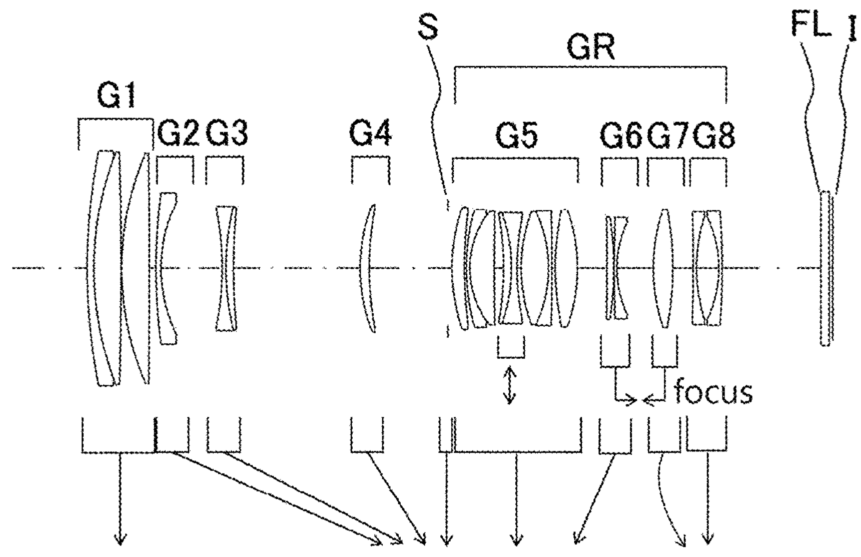
Figure 146:
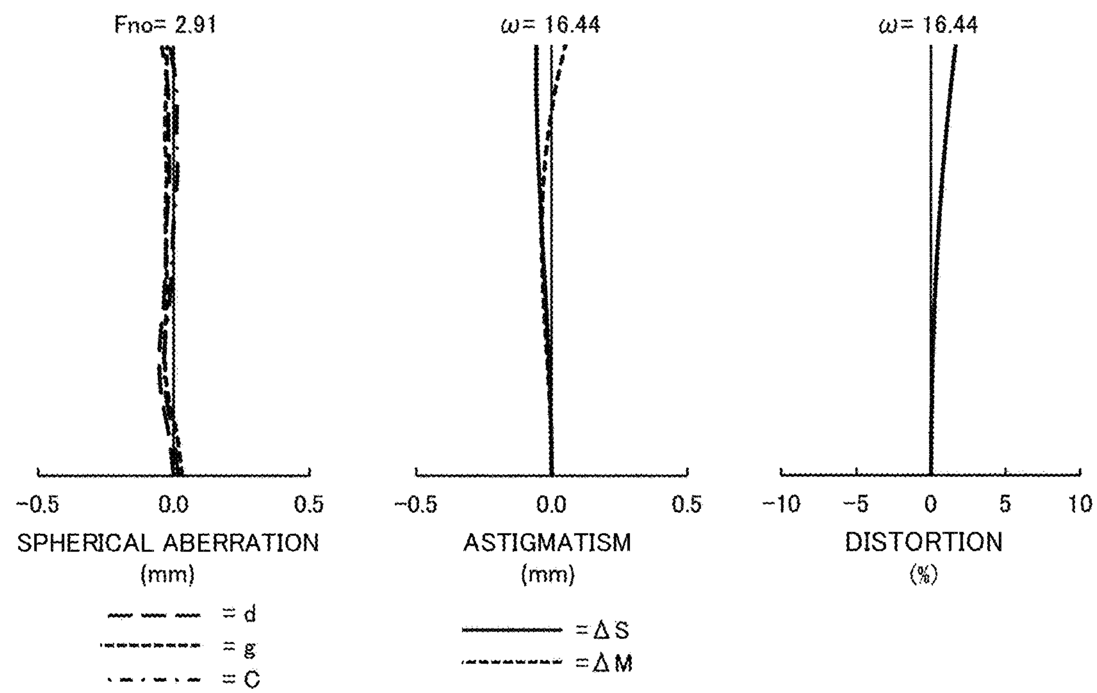
Figure 147:
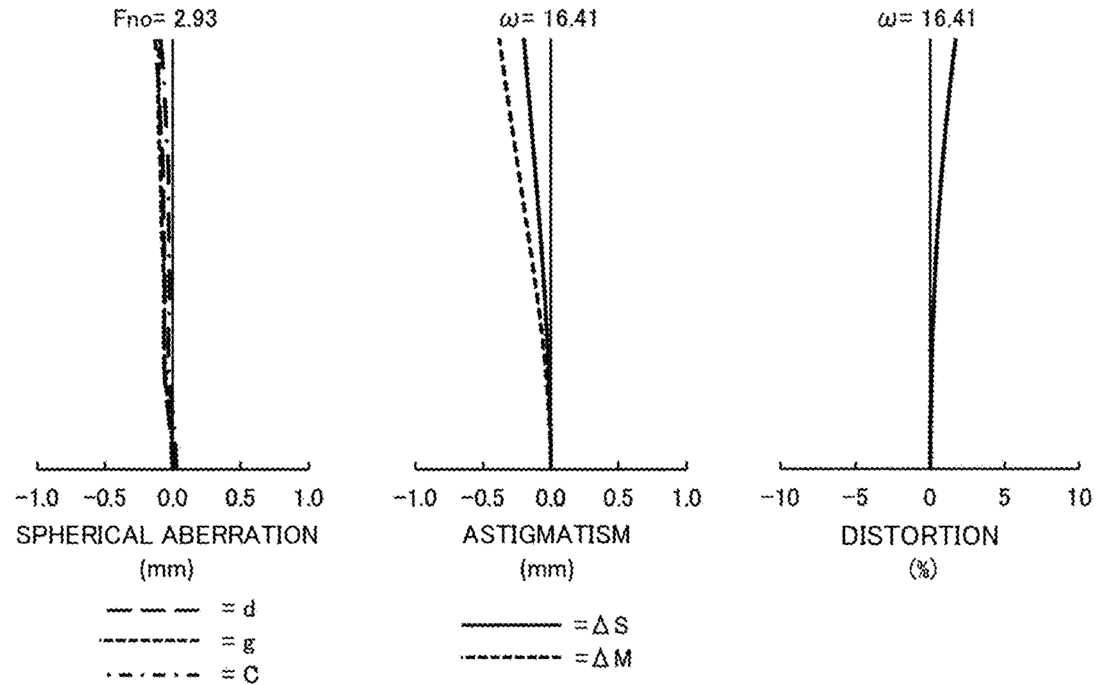
Figure 148:
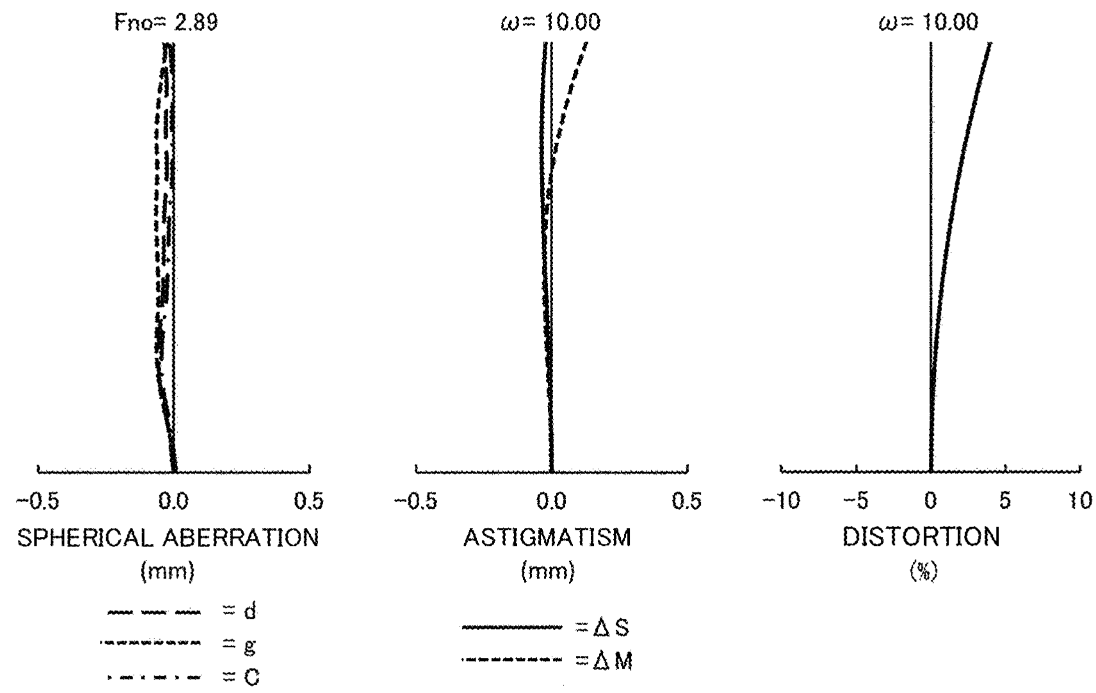
Figure 149:
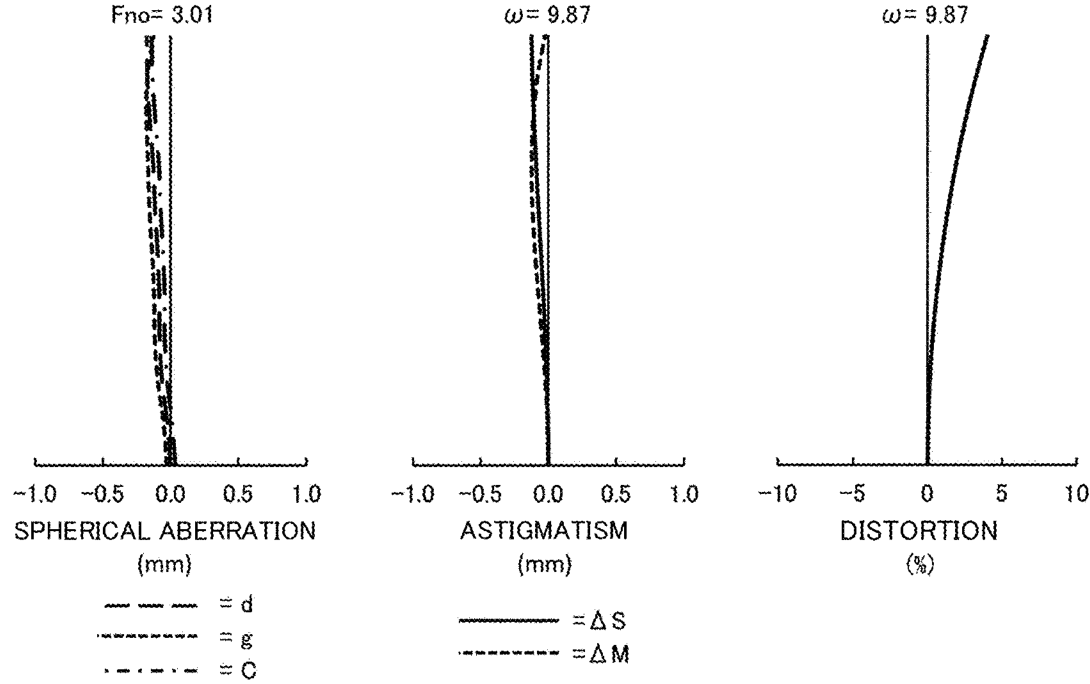
Figure 150:
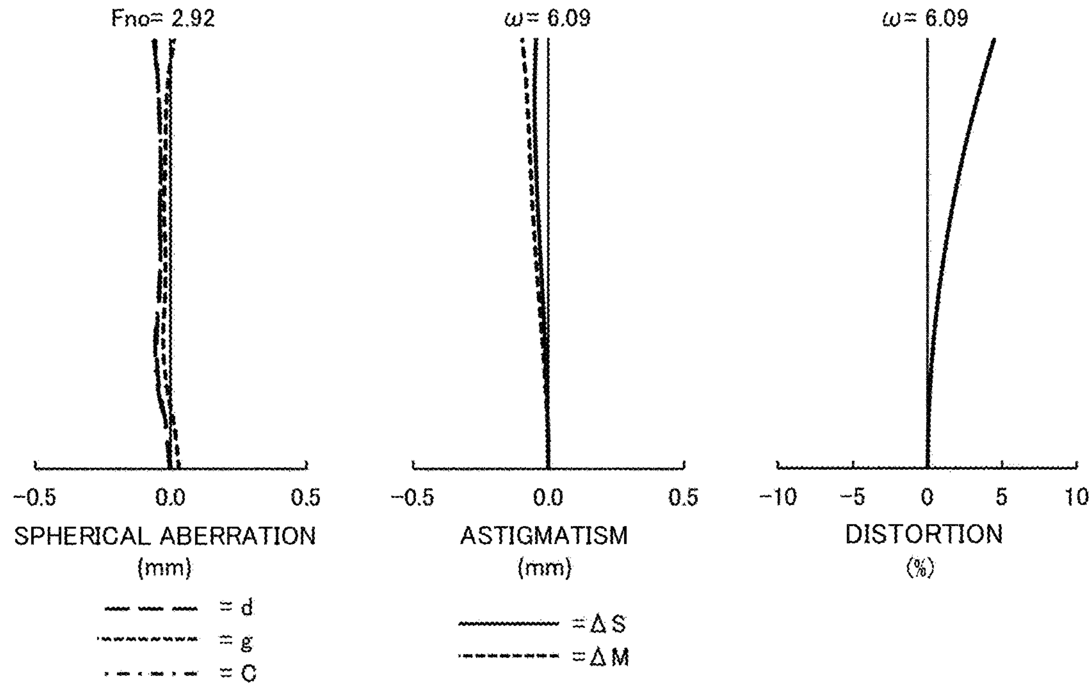
Figure 151:
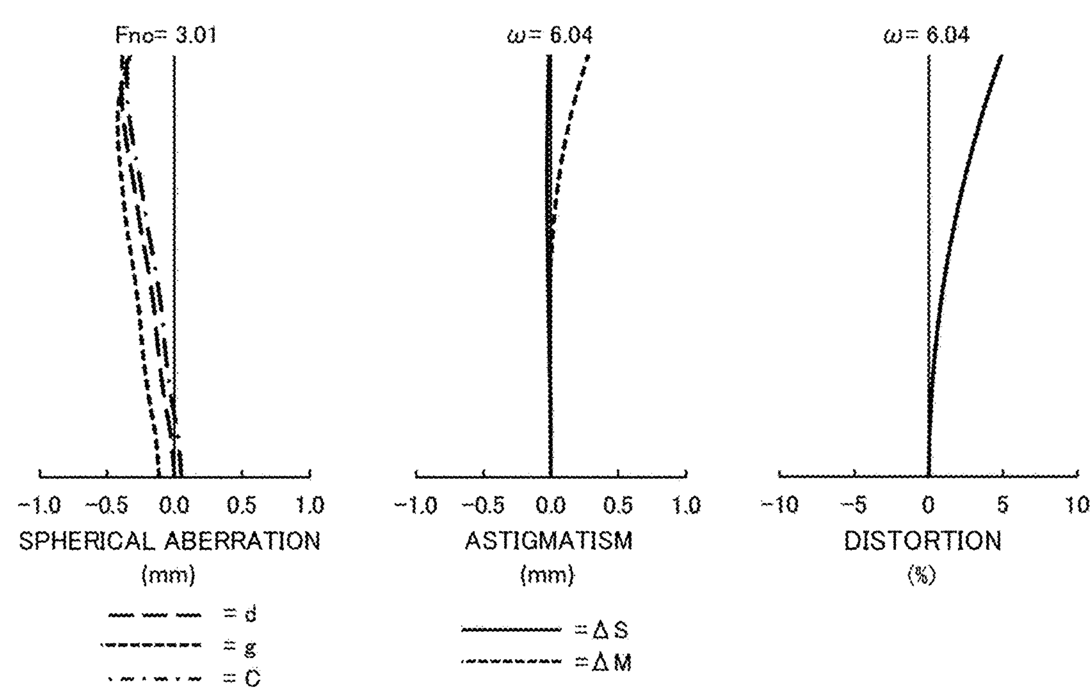
Figure 152:
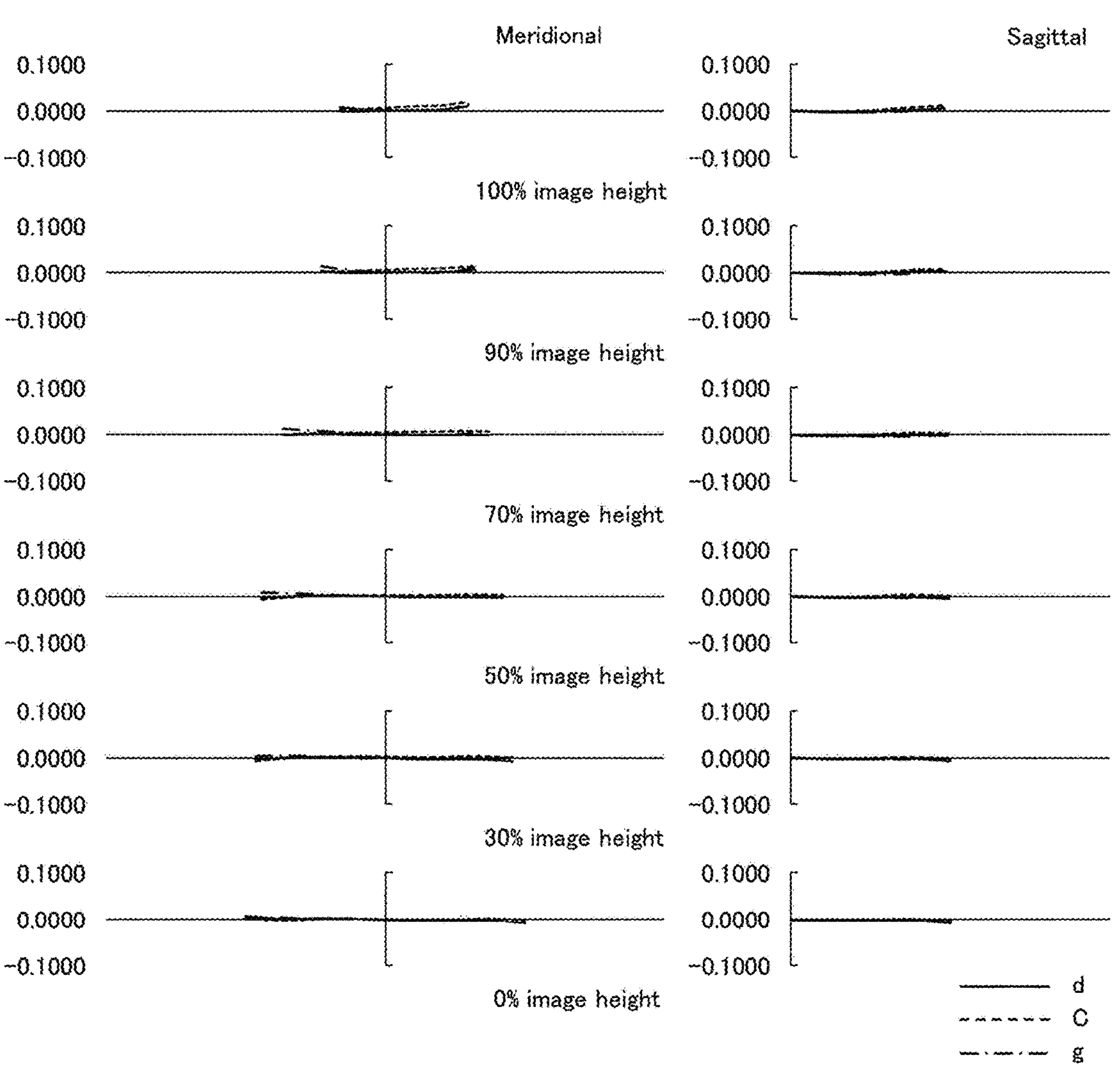
Figure 153:
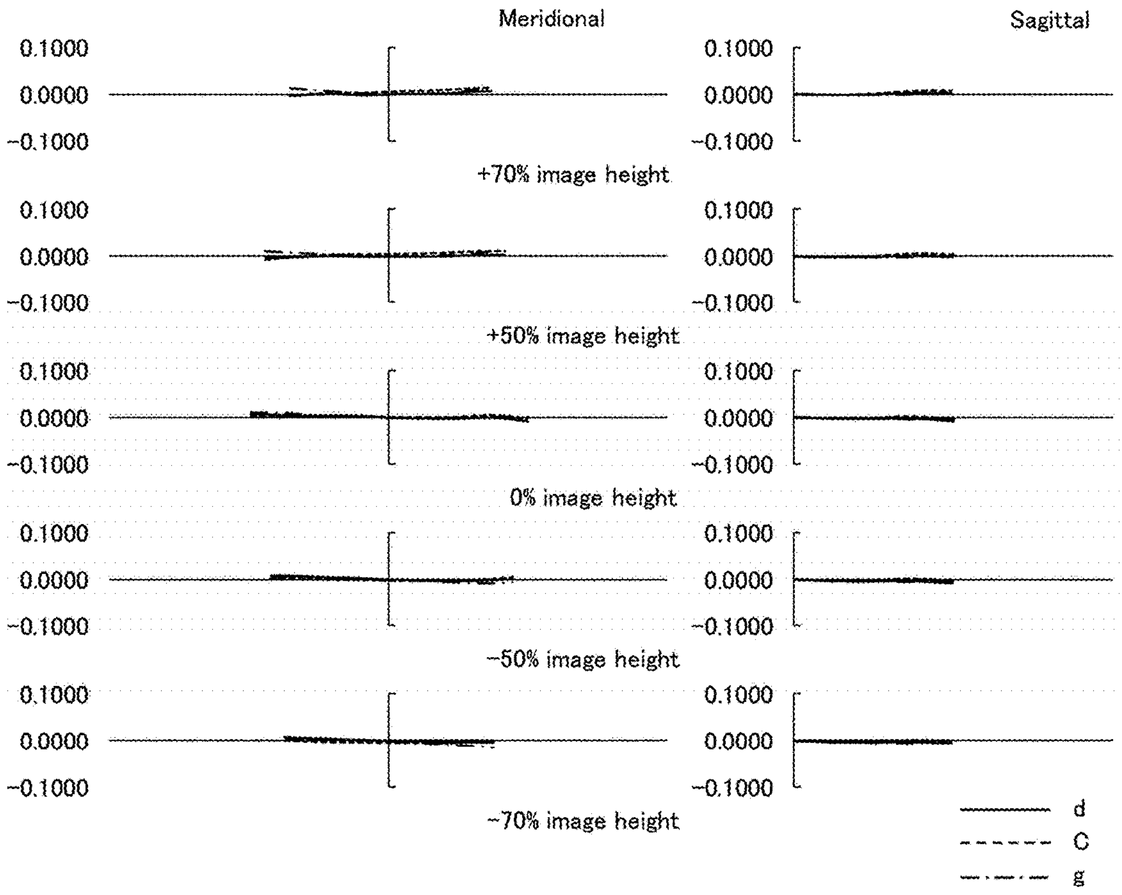
Figure 154:
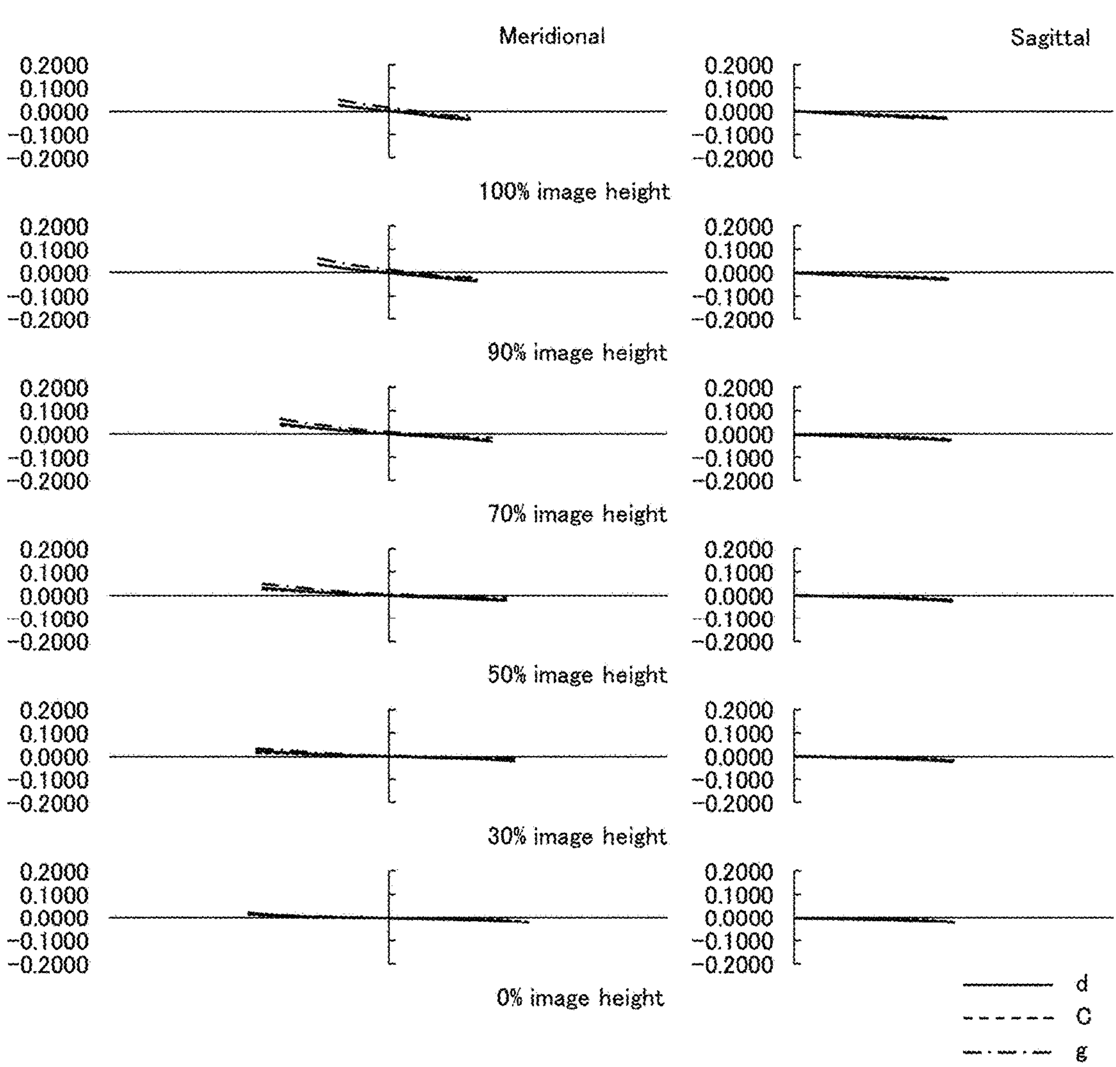
Figure 155:
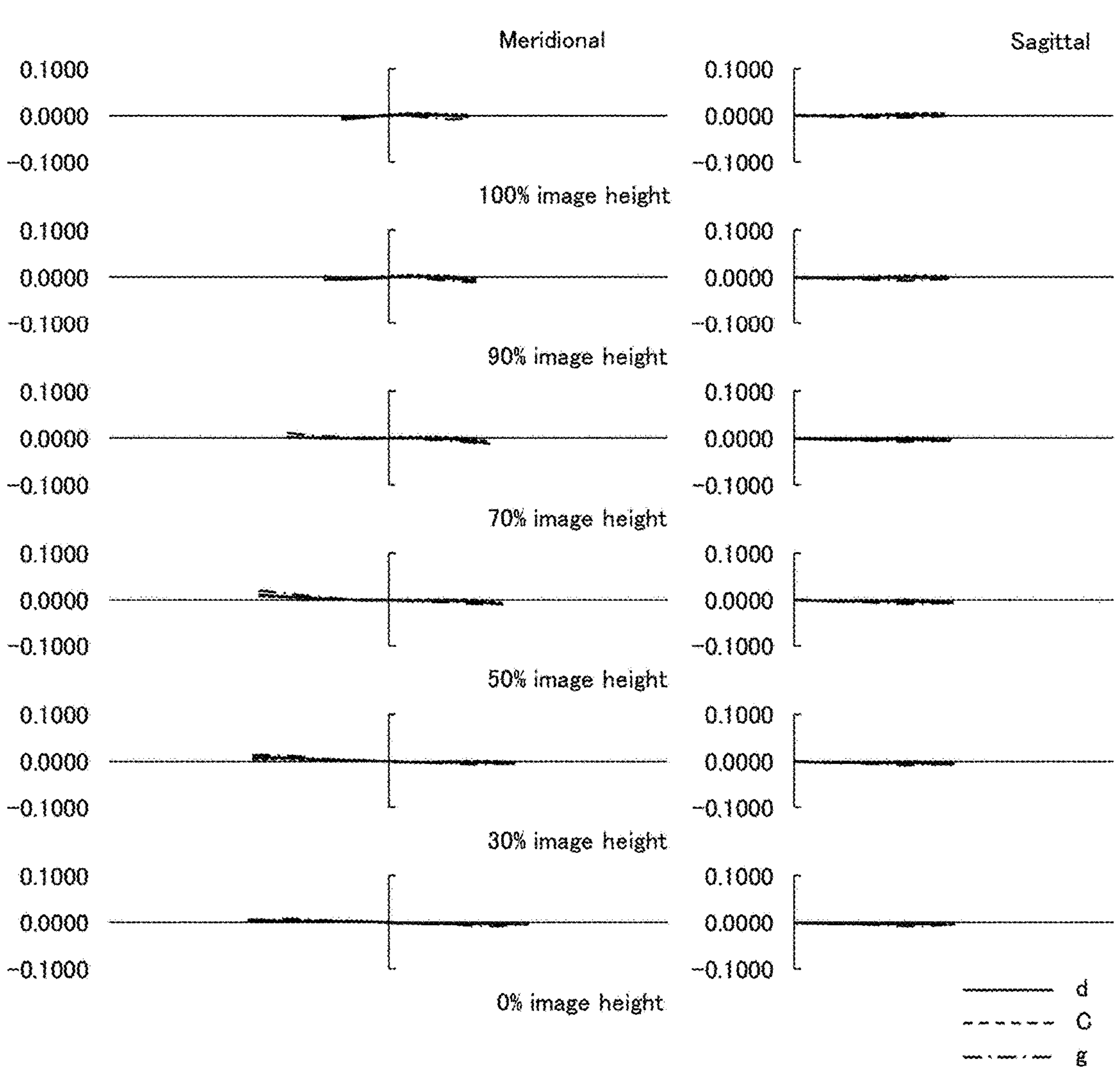
Figure 156:
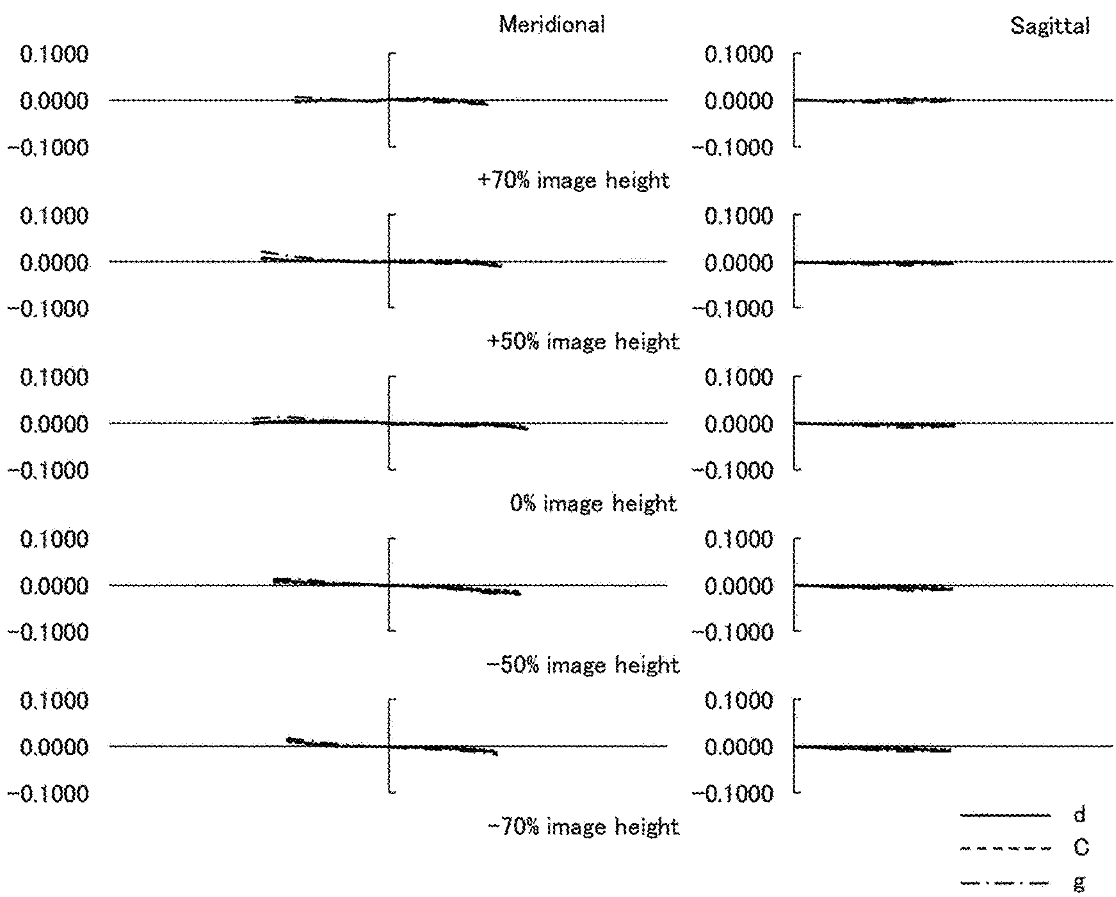
Figure 157:
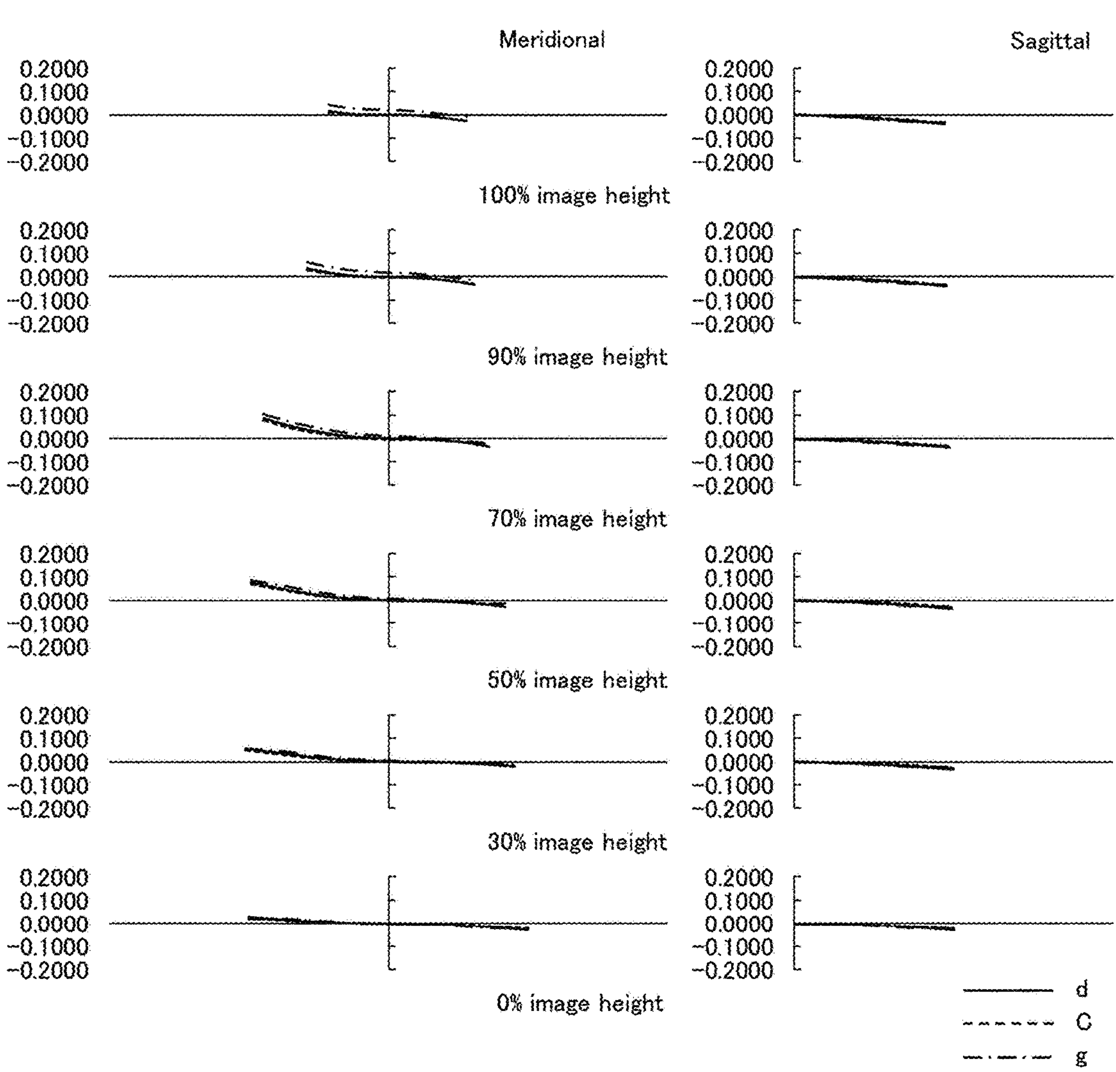
Figure 158:
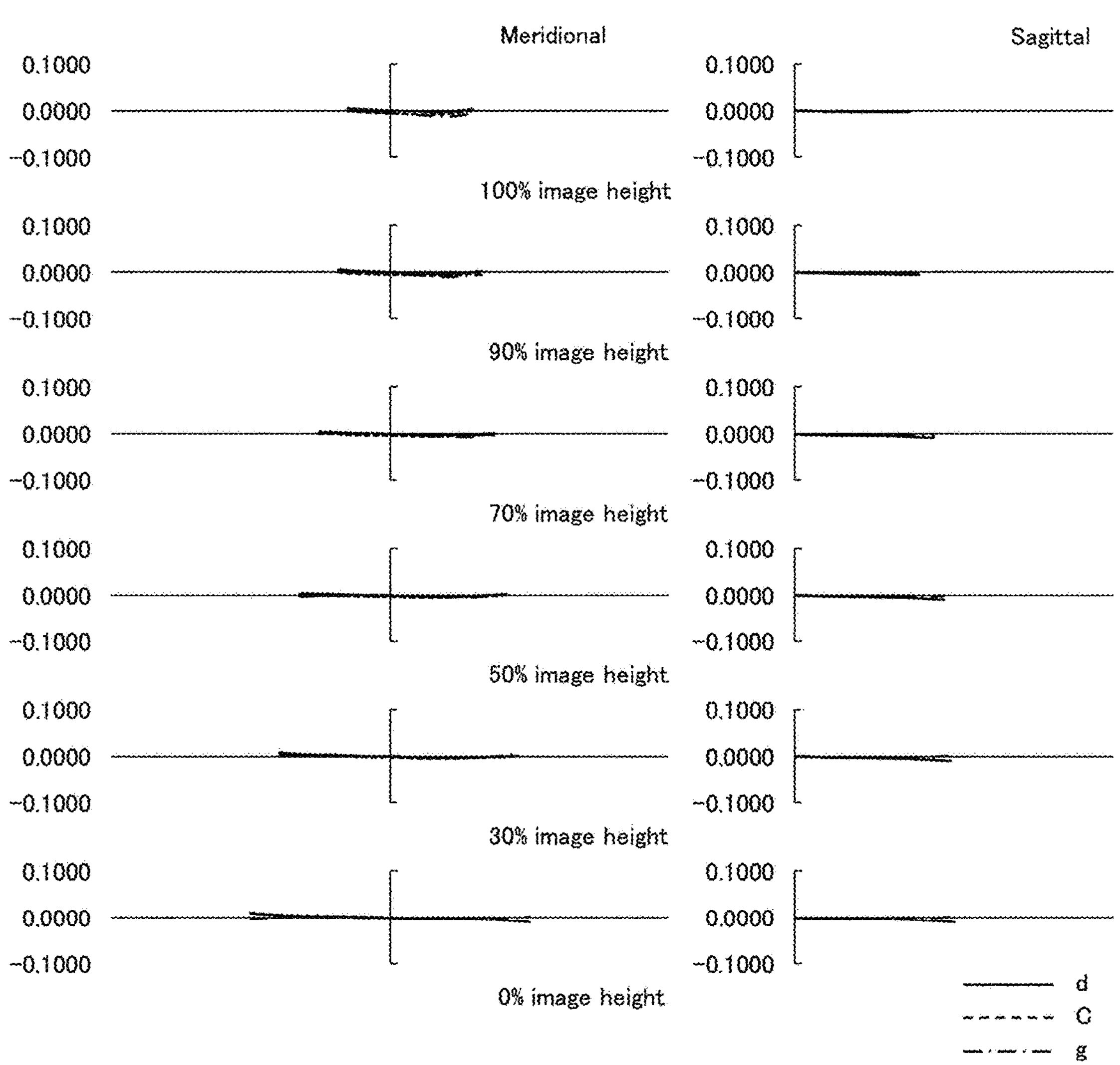
Figure 159:
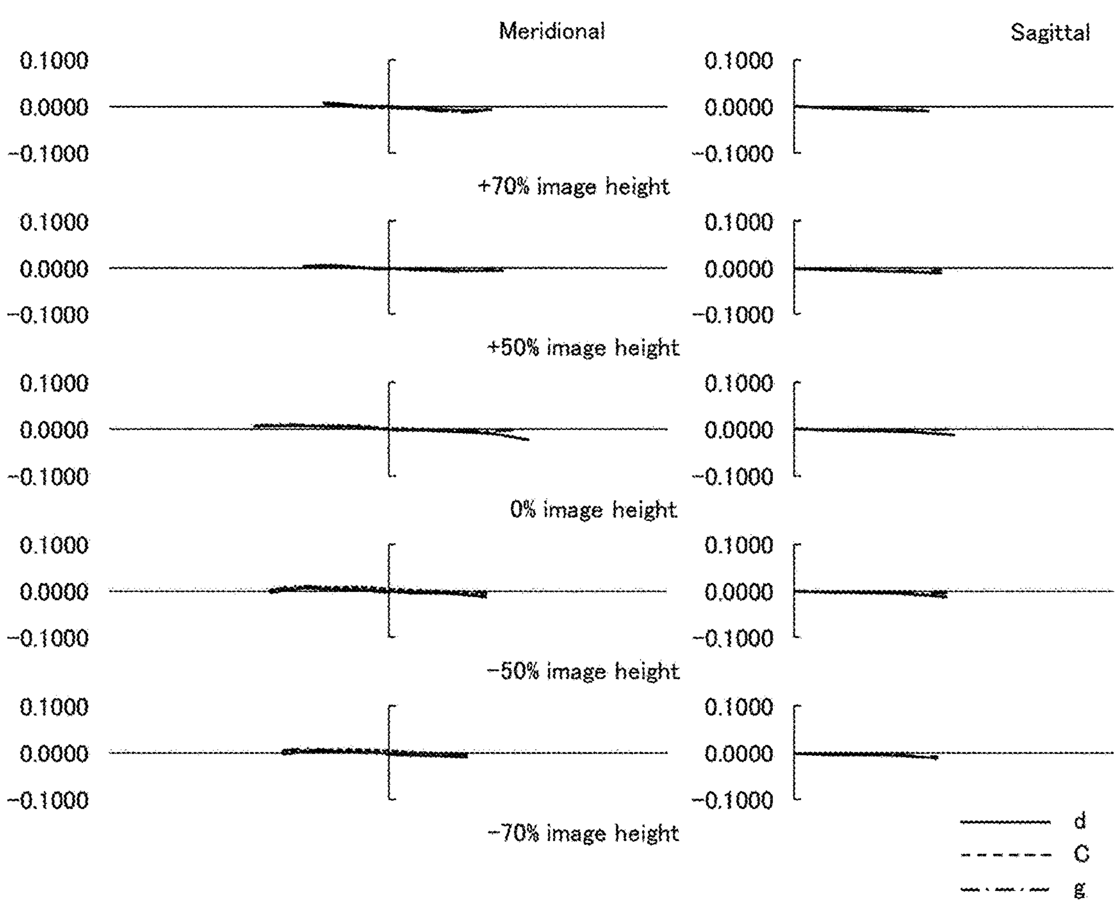
Figure 160:
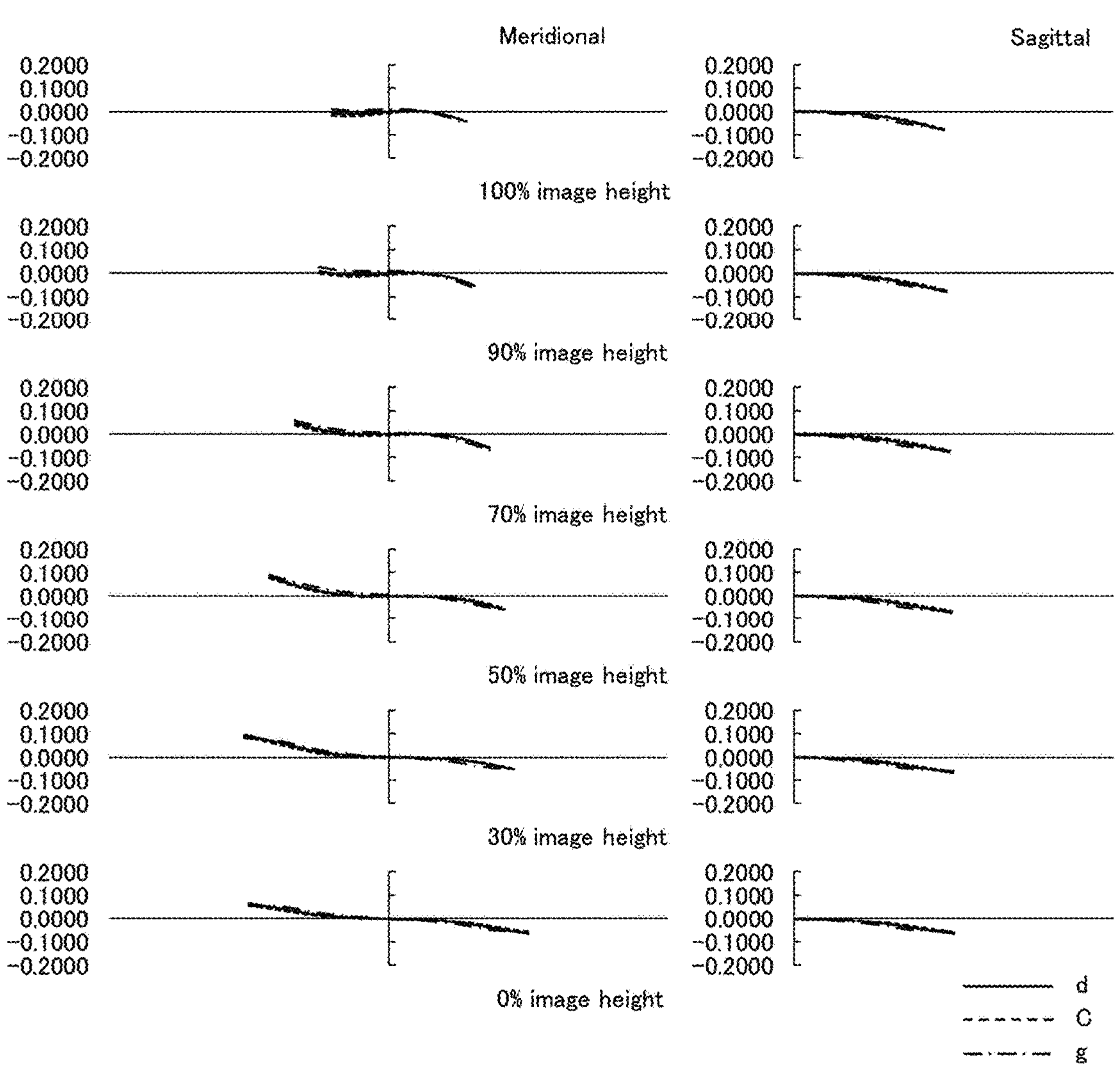

FIG. 132 is a longitudinal aberration diagram at an intermediate focal length when focusing on infinity in Example 9;

FIG. 133 is a longitudinal aberration diagram at an intermediate focal length at a focusing distance of 1.0 m in Example 9;

FIG. 134 is a longitudinal aberration diagram at the telephoto end when focusing on infinity in Example 9;

FIG. 135 is a longitudinal aberration diagram at the telephoto end at a focusing distance of 1.0 m in Example 9;

FIG. 136 is a lateral aberration diagram at the wide-angle end when focusing on infinity in Example 9;

FIG. 137 is a lateral aberration diagram at the wide-angle end when focusing on infinity and compensating for a tilt of 0.4° in Example 9;

FIG. 138 is a lateral aberration diagram at the wide-angle end at a focusing distance of 1.0 m in Example 9;

FIG. 139 is a lateral aberration diagram at an intermediate focal length when focusing on infinity in Example 9;

FIG. 140 is a lateral aberration diagram at an intermediate focal length when focusing on infinity and compensating for a tilt of 0.4° in Example 9;

FIG. 141 is a lateral aberration diagram at an intermediate focal length at a focusing distance of 1.0 m in Example 9;

FIG. 142 is a lateral aberration diagram at the telephoto end when focusing on infinity in Example 9;

FIG. 143 is a lateral aberration diagram at the telephoto end when focusing on infinity and compensating for a tilt of 0.4° in Example 9;

FIG. 144 is a lateral aberration diagram at the telephoto end at a focusing distance of 1.0 m in Example 9;

FIG. 145 is a lens configuration diagram according to Example 10 of the present invention;

FIG. 146 is a longitudinal aberration diagram at the wide-angle end when focusing on infinity in Example 10;

FIG. 147 is a longitudinal aberration diagram at the wide-angle end at a focusing distance of 1.0 m in Example 10;

FIG. 148 is a longitudinal aberration diagram at an intermediate focal length when focusing on infinity in Example 10;

FIG. 149 is a longitudinal aberration diagram at an intermediate focal length at a focusing distance of 1.0 m in Example 10;

FIG. 150 is a longitudinal aberration diagram at the telephoto end when focusing on infinity in Example 10;

FIG. 151 is a longitudinal aberration diagram at the telephoto end at a focusing distance of 1.0 m in Example 10;

FIG. 152 is a lateral aberration diagram at the wide-angle end when focusing on infinity in Example 10;

FIG. 153 is a lateral aberration diagram at the wide-angle end when focusing on infinity and compensating for a tilt of 0.4° in Example 10;

FIG. 154 is a lateral aberration diagram at the wide-angle end at a focusing distance of 1.0 m in Example 10;

FIG. 155 is a lateral aberration diagram at an intermediate focal length when focusing on infinity in Example 10;

FIG. 156 is a lateral aberration diagram at an intermediate focal length when focusing on infinity and compensating for a tilt of 0.4° in Example 10;

FIG. 157 is a lateral aberration diagram at an intermediate focal length at a focusing distance of 1.0 m in Example 10;

FIG. 158 is a lateral aberration diagram at the telephoto end when focusing on infinity in Example 10;

FIG. 159 is a lateral aberration diagram at the telephoto end when focusing on infinity and compensating for a tilt of 0.4° in Example 10; and FIG. 160 is a lateral aberration diagram at the telephoto end at a focusing distance of 1.0 m in Example 10.

DESCRIPTION OF EMBODIMENTS

Hereinafter, zoom lenses according to embodiments of the present invention are described. The following description illustrates some examples of the optical system according to the present invention. The present invention is not limited to these examples, to the extent that it does not depart from the scope of its subject matter. The object side and image side will be referred to as the front side and rear side, respectively.

In the following description of examples, Ng, Nf, Nd, and NC respectively represent the refractive indices of material to g line (wavelength: 435.8 nm), F line (486.1 nm), d line (587.6 nm), and C line (656.3 nm). The Abbe number νd, partial dispersion ratio PgF, and anomalous partial dispersion ΔPgF are respectively represented as follows:

$$\nu d=(Nd-1)/(NF-NC)$$

$$PgF=(Ng-NF)/(NF-NC)$$

$$\Delta PgF=PgF-0.64833+0.00180\times\nu d$$

Unless otherwise specified, lenses are herein counted as discrete lenses, i.e., each of the lenses configuring a cemented lens will be counted as a single lens. For example, a cemented lens composed of a convex lens and a concave lens will be counted as two lenses.

A first zoom lens according to the present invention includes, as can be seen from the lens configuration diagrams of FIG. 1, FIG. 17, FIG. 33, FIG. 49, FIG. 65, FIG. 81, FIG. 97, FIG. 113, FIG. 129, and FIG. 145, a first lens group G1 with positive refractive power, fixed relative to the image surface during zooming, a second lens group G2 with negative refractive power, a third lens group G3 with negative refractive power, a fourth lens group G4 with positive refractive power, an aperture diaphragm S, and a subsequent lens group GR composed of a plurality of lens groups, sequentially from the object side to the image side. Distances between adjacent lens groups change during zooming from the wide-angle end to the telephoto end. The subsequent lens group GR is configured to include a focusing lens group that moves during focusing from an infinite distance object to a close distance object.

The first lens group G1 of the large aperture ratio telephoto zoom lens is large in diameter and heavy. Making the first lens group G1 movable during zooming is not preferable, as it would cause an increase in the size and complexity of the variable-power mechanism and result in an increased size or weight of the lens barrel.

The second lens group G2 and the third lens group G3 move along different paths during zooming, which helps to reduce variations in aberrations during zooming, in particular variations in the field curvature.

The positive fourth lens group G4 serves to reduce the diameter of the axial rays entering the subsequent lens group GR by converging the rays that have been diverged by the negative second lens groups G2 and negative third lens groups G3. Since the focusing lens group is arranged inside the subsequent lens group GR, the fourth lens group G4 that converges the rays entering the subsequent lens group GR allows the outside diameter of the focusing lens group to be reduced.

The zoom lens according to the present invention is characterized in that it satisfies the following conditional expressions:

$$-1.18<f2/fT<-0.37 \quad (1)$$

$$-0.94<f3/fT<-0.35, \text{ where} \quad (2)$$

f2 represents the focal length of the second lens group G2,
fT represents the focal length of the entire optical system at the telephoto end when focusing on infinity, and
f3 represents the focal length of the third lens group G3.

The conditional expression (1) defines a preferable range of ratio between the focal length of the second lens group G2 and the focal length of the entire optical system at the telephoto end when focusing on infinity.

If the negative refractive power of the second lens group G2 is so high that exceeds the upper limit of the conditional expression (1), various aberrations including spherical aberration and field curvature that occur within the second lens group G2 will increase. This will make it difficult to achieve effective correction of aberrations across the entire zoom range. If the negative refractive power of the second lens group G2 is so low that falls below the lower limit of the conditional expression (1), the magnification ratio of the entire system will be reduced. To compensate for the lost zooming effect, the movement of the second lens group G2 will need to be increased.

To accommodate this increased movement and to secure the necessary space for zooming, the aperture diaphragm S and the subsequent lens group GR will need to be made thinner. This reduction in thickness will result in a lack of space for arranging the focusing lens actuator. In addition, if a vibration reduction lens group is to be arranged inside the subsequent lens group, there will not be sufficient space, either, for the vibration reduction lens actuator.

Preferably, with the lower limit or the upper limit of the conditional expression (1) being set to −1.08 or −0.41, respectively, the above-described effects can be achieved more reliably.

The conditional expression (2) defines a preferable range of ratio between the focal length of the third lens group G3 and the focal length of the entire optical system at the telephoto end when focusing on infinity.

If the negative refractive power of the third lens group G3 is so high that exceeds the upper limit of the conditional expression (2), various aberrations including spherical aberration and field curvature that occur within the third lens group G3 will increase. This will make it difficult to achieve effective correction of aberrations across the entire zoom range. If the negative refractive power of the third lens group G3 is so low that falls below the lower limit of the conditional expression (2), the magnification ratio of the entire system will be reduced. To compensate for the lost zooming effect, the movement of the third lens group G3 will need to be increased. To accommodate this increased movement and to secure the necessary space for zooming, the aperture diaphragm S and the subsequent lens group GR will need to be made thinner. This reduction in thickness will result in a lack of space for arranging the focusing lens actuator. In addition, if a vibration reduction lens group is to be arranged inside the subsequent lens group, there will not be sufficient space, either, for the vibration reduction lens actuator.

Preferably, with the lower limit or the upper limit of the conditional expression (2) being set to −0.86 or −0.41, respectively, the above-described effects can be achieved more reliably.

The zoom lens according to the present invention is configured to further include an aperture diaphragm S that is fixed relative to the image surface during zooming, a fifth lens group G5 with positive refractive power, fixed relative to the image surface during zooming, a sixth lens group G6 with negative refractive power, a seventh lens group G7 with positive refractive power, and an eighth lens group G8 with fixed negative refractive power relative to the image surface during zooming.

The sixth and seventh lens groups G6 and G7 are arranged midway in the axial rays being converged toward the image surface. Therefore, by changing the distance between the fifth lens group G5 and the sixth lens group G6, or between the seventh lens group G7 and the eighth lens group G8, the height of the F-number ray entering the sixth lens group G6 and seventh lens group G7 can be varied to alter the spherical aberration. Using this feature, spherical aberrations can be effectively corrected across the entire zoom range by setting an appropriate distance between the fifth lens group G5 and the sixth lens group G6, or between the seventh lens group G7 and the eighth lens group G8 during zooming.

An optical system in which the first lens group G1 is fixed during zooming, as in the present invention, has a refractive power arrangement that is asymmetrical relative to the aperture diaphragm S. On the wide-angle side, the lens has a retrofocus design in order to increase the total lens length relative to the focal length. On the other hand, on the telephoto side, the lens has a telephoto design in order to reduce the total lens length relative to the focal length. As a result, positive and negative lateral chromatic aberrations of C line occur on the wide-angle side and telephoto side, respectively. For this reason, the common approach to reduce lateral chromatic aberration over the entire spectrum is to correct the g line and C line. In such a case, if there is a large difference in the imaging magnification between the g and C lines and other wavelengths, red purple fringes appear on the edges of the object as secondary spectrum, which is not favorable. It is effective to use a glass material that has anomalous dispersion for the correction of secondary spectrum.

The zoom lens according to the present invention is characterized in that it satisfies the following conditional expressions:

$$67.00 < \nu n \tag{3}$$

$$0.018 < \Delta PgFn, \text{ where} \tag{4}$$

- $\nu n$ represents the mean value of the Abbe number of the negative lenses used in the second lens group G2 and third lens group G3, and
- $\Delta PgFn$ represents the mean value of anomalous dispersion of the negative lenses used in the second lens group G2 and third lens group G3.

The conditional expression (3) defines a preferable range of the mean value of the Abbe number of the negative lenses used in the second lens group G2 and third lens group G3.

If the mean value of the Abbe number of the negative lenses used in the second and third lens groups G2 and G3 falls below the lower limit of the conditional expression (3), the axial and lateral chromatic aberrations that occur within the second and third lens groups G2 and G3 will increase. This will make it difficult to achieve effective correction of axial and lateral chromatic aberrations across the entire zoom range.

Preferably, with the lower limit of the conditional expression (3) being set to 70.00, the above-described effect can be achieved more reliably.

The conditional expression (4) defines a preferable range of the mean value of anomalous dispersion of the negative lenses used in the second lens group G2 and third lens group G3.

If the mean value of anomalous dispersion of the negative lenses used in the second and third lens groups G2 and G3 falls below the lower limit of the conditional expression (4), it will be difficult to reduce the secondary spectrum of lateral chromatic aberration on the wide-angle side.

Preferably, with the lower limit of the conditional expression (4) being set to 0.021, the above-described effect can be achieved more reliably.

Further, the fifth lens group G5 of the zoom lens according to the present invention is configured to include a vibration reduction lens group with negative refractive power that moves substantially perpendicularly relative to the optical axis for image blur correction. Since the vibration reduction lens group is provided within the fifth lens group G5 that is fixed relative to the image surface during zooming, there is no need to provide a mechanism for moving the vibration reduction system during zooming, such as an actuator for driving the vibration reduction lens group perpendicularly to the optical axis. Thus an increase in the size and complexity can be avoided.

The zoom lens according to the present invention is characterized in that it satisfies the following conditional expression:

$$-2.70 < (1 - \beta osT) \times \beta RosT < -0.52, \text{ where} \tag{5}$$

- $\beta osT$ represents the lateral magnification of the vibration reduction lens group at the telephoto end when focusing on infinity, and
- $\beta RosT$ represents the lateral magnification of the lens systems located closer to the image side than the vibration reduction lens group at the telephoto end when focusing on infinity.

The conditional expression (5) defines a preferable range of vibration reduction coefficient of the vibration reduction lens group at the telephoto end when focusing on infinity.

If the vibration reduction coefficient of the vibration reduction lens group exceeds the upper limit of the conditional expression (5), the perpendicular movement of the vibration reduction lens group will become large in order to secure a necessary correction angle, which leads to a larger lens barrel and makes it difficult to reduce the size and weight. A vibration reduction lens group with a vibration reduction coefficient that falls below the lower limit of the conditional expression (5) will have higher negative refractive power, which means that the vibration reduction lens group will be heavier and require a larger and heavier actuator. This will make it more difficult to reduce variations of comatic aberration and astigmatism caused by eccentricity during vibration reduction.

Preferably, with the lower limit of the conditional expression (5) being set to −2.50, or with the upper limit being set to −0.59, the above-described effects can be achieved more reliably.

In the zoom lens according to the present invention, the vibration reduction lens group is configured with a single positive lens and a single negative lens sequentially from the object side to the image side. This allows the weight of the vibration reduction lens to be reduced while achieving removal of chromatic aberrations during vibration reduction. The reduced weight of the vibration reduction lens in turn allows for reduction of the size and weight of the vibration reduction lens actuator.

Furthermore, the zoom lens is configured such that the second lens group G2, the third lens group G3, and the fourth lens group G4 move toward the image side during zooming from the wide-angle end to the telephoto end.

A large aperture ratio telephoto zoom lens has a large entrance pupil diameter at the telephoto end, which makes it difficult to reduce the effective diameter of the lens groups on the object side. By making the second to fourth lens groups G2 to G4 move toward the image side during zooming from the wide-angle end to the telephoto end, the diameter of axial rays from the second to fourth lens groups G2 to G4 at the telephoto end can be reduced. This helps reduce the lens diameter and weight of the second to fourth lens groups G2 to G4.

The zoom lens according to the present invention is characterized in that it satisfies the following conditional expression:

$$-0.420 < \beta bW < 0.480, \text{ where} \quad (6)$$

βbW represents the combined magnification of the lens groups located closer to the image side than the aperture diaphragm S at the telephoto end when focusing on infinity.

The conditional expression (6) defines a preferable range of the combined magnification of the lens groups located closer to the image side than the aperture diaphragm S at the wide-angle end when focusing on infinity.

If the combined magnification of the lens groups located closer to the image side than the aperture diaphragm S at the wide-angle end when focusing on infinity exceeds the upper limit of the conditional expression (6), the diameter of axial rays to the fourth lens group G4 will increase, which will result in an increase in the effective diameter and weight of the fourth lens group G4. If the combined magnification of the lens groups located closer to the image side than the aperture diaphragm S at the wide-angle end when focusing on infinity falls below the lower limit of the conditional expression (6), the lens groups from the fifth G5 onward will need to have increased positive power, which leads to a weight increase. It will also make it difficult to correct spherical and comatic aberrations.

Preferably, with the lower limit of the conditional expression (6) being set to −0.380, or with the upper limit being set to 0.440, the above-described effects can be achieved more reliably.

When focusing from an infinite distance object to a close distance object, the sixth lens group G6 moves toward the image side, while the seventh lens group G7 moves toward the object side. This allows for reduction of variations of spherical aberrations and field curvature during focusing.

The zoom lens according to the present invention is characterized in that it satisfies the following conditional expression:

$$-2.40 < ff/fr < -0.64, \text{ where} \quad (7)$$

ff represents the focal length of the sixth lens group G6, and fr represents the focal length of the seventh lens group G7.

The conditional expression (7) defines a preferable range of ratio between the focal length of the sixth lens group G6 and the focal length of the seventh lens group G7.

If the ratio between the focal length of the sixth lens group G6 and the focal length of the seventh lens group G7 exceeds the upper limit of the conditional expression (7), the sixth lens group G6 will have increased negative refractive power, and the angle between off-axis rays exiting the sixth lens group G6 and the optical axis will increase. This in turn will increase the lens diameter of the seventh and eighth lens groups G7 and G8. The seventh lens group G7 will become heavier, and so will the focusing lens actuator. An increased diameter of the eighth lens group G8 will lead to a lack of space for arranging parts around the lens mount. Or, the seventh lens group G7 will have lower positive refractive power. This will increase the diameter of axial rays to the fifth lens group G5, which leads to an increase in the weight of the vibration reduction lens group and the vibration reduction lens actuator. If the ratio between the focal length of the sixth lens group G6 and the focal length of the seventh lens group G7 falls below the lower limit of the conditional expression (7), the sixth lens group G6 will have reduced negative refractive power. This will increase the movement of the sixth lens group G6 during focusing, which leads to an increase in the weight of the focusing lens actuator. Or, the seventh lens group G7 will have higher positive refractive power. This will increase aberrations that occur within the seventh lens group G7 such as spherical aberration and field curvature, making it difficult to achieve effective correction of various aberrations across the entire zoom range and focusing range.

Preferably, with the lower limit of the conditional expression (7) being set to −2.20, or with the upper limit being set to −0.72, the above-described effect can be achieved more reliably.

The sixth lens group G6 includes a single positive lens and a single negative lens sequentially from the object side to the image side, and the seventh lens group G7 includes a single positive lens. The sixth lens group G6 can contribute both in removing chromatic aberrations and in reducing the weight of the focusing lens group. The sixth lens group G6 increases the angle between off-axis rays and the optical axis and causes an increase in the effective diameter of the seventh lens group G7. The seventh lens group G7, being a single positive lens, can contribute to reduction of the weight of the focusing lens group. The reduced weight of the focusing lens group in turn allows for reduction of the size and weight of the focusing lens actuator.

Further, the zoom lens according to the present invention is characterized in that it satisfies the following conditional expression:

$$0.63 < f1/fT < 1.07, \text{ where} \quad (8)$$

f1 represents the focal length of the first lens group G1, and fT represents the focal length of the entire optical system at the telephoto end when focusing on infinity.

The conditional expression (8) defines a preferable range of ratio between the focal length of the first lens group G1 and the focal length of the entire optical system at the telephoto end when focusing on infinity.

If the ratio between the focal length of the first lens group G1 and the focal length of the entire optical system at the telephoto end when focusing on infinity exceeds the upper limit of the conditional expression (8), the diameter of axial rays to the lens groups that are located closer to the image side than the first lens group G1 will increase, resulting in an increase in the diameters of the lens groups from the second lens group G2 onward, and in the entire lens weight. If the ratio between the focal length of the first lens group G1 and the focal length of the entire optical system at the telephoto end when focusing on infinity falls below the lower limit of the conditional expression (8), it will be difficult to reduce the comatic aberration on the telephoto end.

Preferably, with the lower limit of the conditional expression (8) being set to 0.75, or with the upper limit being set to 0.98, the above-described effects can be achieved more reliably.

Next, the lens configurations in some Examples of the large aperture ratio telephoto zoom lenses according to the present invention are described. In the following, the lens configurations will be described sequentially from the object side to the image side.

In Surface Data, surface numbers represent the numbers of lens surfaces or the aperture diaphragm counted from the object side, r represents the curvature radius of each surface, d represents the distance of each surface, nd represents the refractive index relative to the d line (wavelength: 587.56 nm), νd represents the Abbe number relative to the d line, and PgF represents the partial dispersion ratio expressed by the equation PgF=(Ng−NF)/(NF−NC).

The asterisk symbol (*) added to a surface number indicates that the lens has an aspherical surface. BF represents a back focus. The object surface distance refers to the distance from the object to the first surface of a lens.

The parenthesized word "diaphragm" added to a surface number indicates that the aperture diaphragm is located at that position. The infinity symbol ∞ is used to represent a flat surface or the aperture diaphragm.

Aspherical Surface Data shows various coefficients that define the spherical shapes of the lens surfaces marked with the asterisk in Surface Data. The following equation expresses the coordinates of the aspherical surfaces, which define the shapes of the aspherical surfaces, where y represents the perpendicular displacement from the optical axis, z represents the axial displacement (sag) from the intersection of an aspherical surface and the optical axis, r represents the curvature radius of a reference spherical surface, K represents the conic constant, and A4, A6, A8, A10, A12, A14, A16, A18, and A20 respectively represent the fourth, sixth, eighth, tenth, twelfth, fourteenth, sixteenth, eighteenth, and twentieth-order aspherical surface coefficients.

$$z = \frac{(1/r)y^2}{1+\sqrt{1-(1+K)(y/r)^2}} + A3y^3 + A4y^4 + A5y^5 + A6y^6 + A7y^7 + A8y^8 + A9y^9 + A10y^{10} + A11y^{11} + A12y^{12} + A13y^{13} + A14y^{14} + A15y^{15} + A16y^{16} + A17y^{17} + A18y^{18} + A19y^{19} + A20y^{20}$$

Various Data shows zoom ratios and parameters such as focal lengths at respective focal length positions.

Variable Distance Data shows the variable distance and BF values at each focal length position or at each focusing distance. The upper array shows the values at infinity, and the lower array shows the values at close distance.

Lens Group Data shows the numbers of surfaces closest to the object of respective lens groups, and the combined focal lengths of respective lens groups.

Unless otherwise specified, millimeter (mm) is used as the unit of length of the focal length f, curvature radius r, lens surface distance d, and other measurements in all of the following specifications. This does not mean that the parameters are limited to these values, since a proportionally scaled optical system can exhibit equivalent optical performance.

In the lens configuration diagram of each Example, arrows indicate the paths of lens groups during zooming from the wide-angle end to the telephoto end, I represents the image surface, FL represents an optical filter, and the one-dot chain line that passes through the center represents the optical axis.

Reference letters d, g, and C in the aberration configurations of Examples respectively represent the d line, g line, and C line. Reference symbols ΔS and ΔM respectively represent the sagittal image surface and meridional image surface.

Example 1

Figure 1:
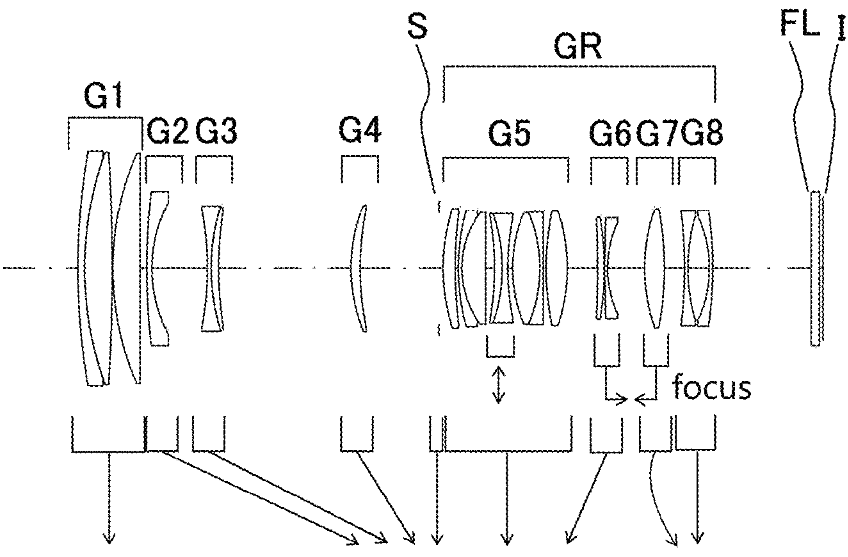
FIG. 1 is a lens configuration diagram according to Example 1 of the present invention.
Figure 2:
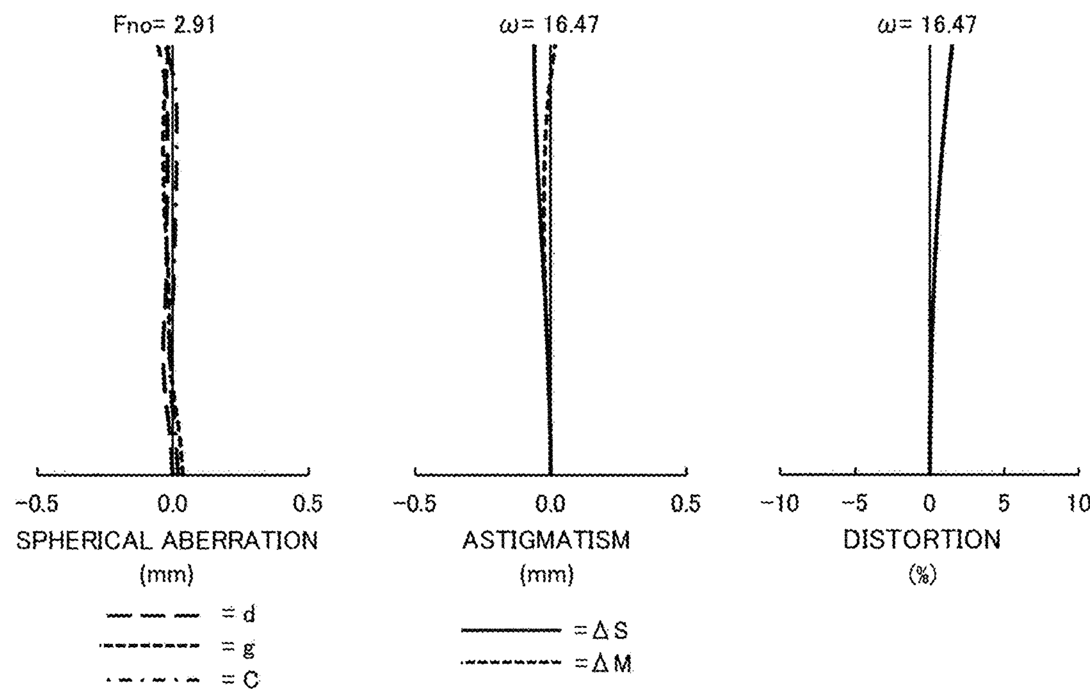
FIG. 2 is a longitudinal aberration diagram at the wide-angle end when focusing on infinity in Example 1.
Figure 3:
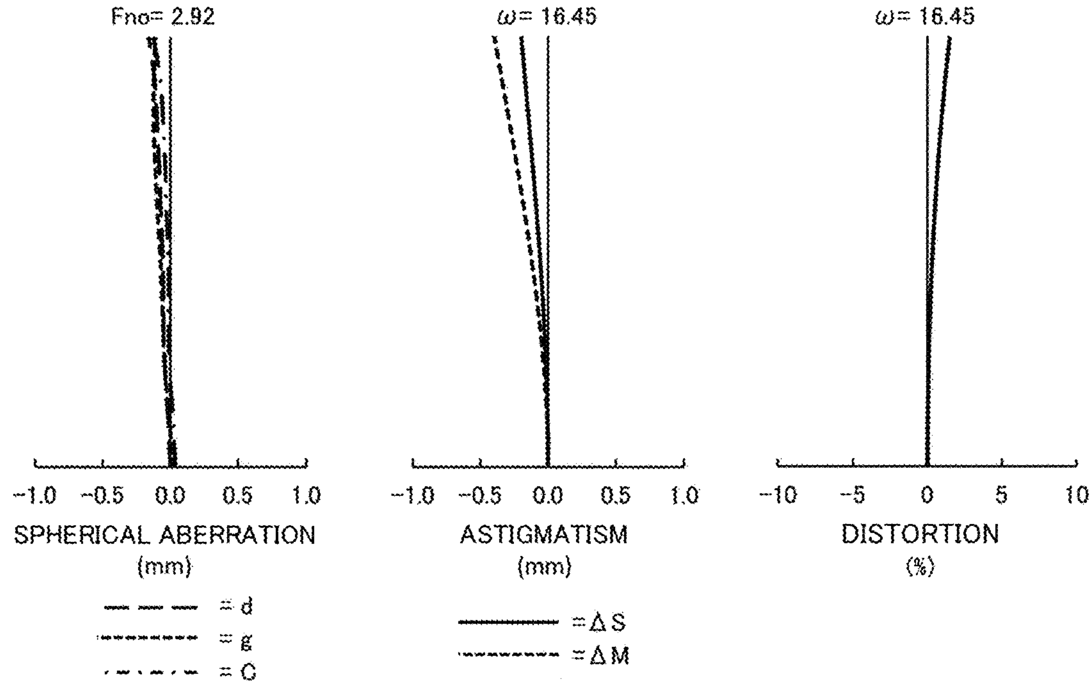
FIG. 3 is a longitudinal aberration diagram at the wide-angle end at a focusing distance of 1.0 m in Example 1.
Figure 4:
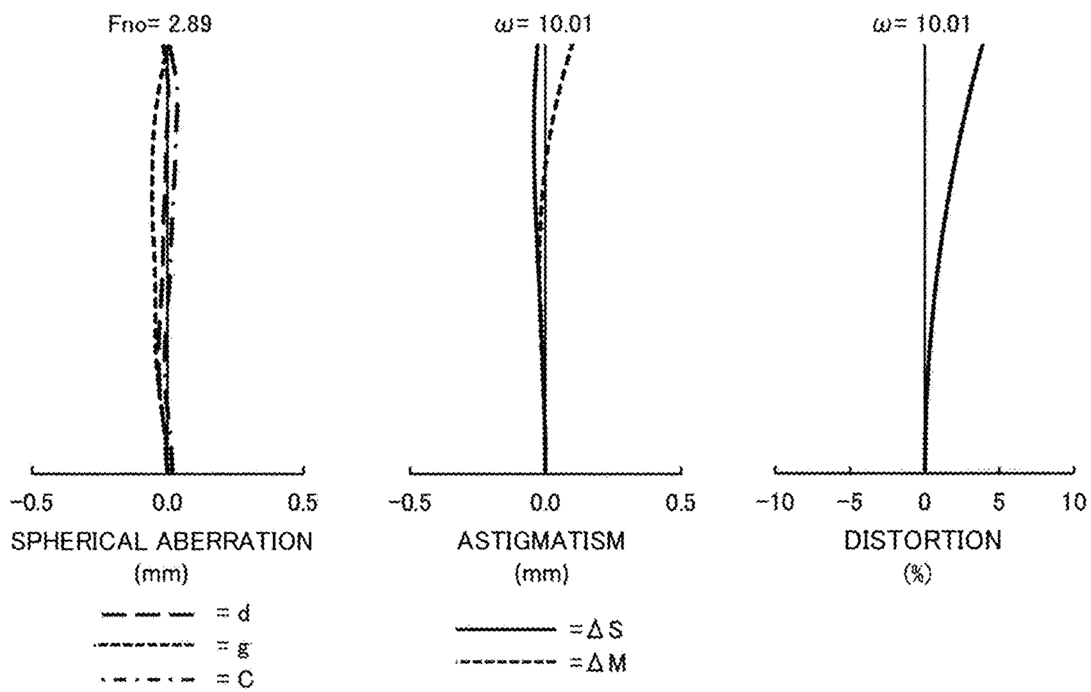
FIG. 4 is a longitudinal aberration diagram at an intermediate focal length when focusing on infinity in Example 1.
Figure 5:
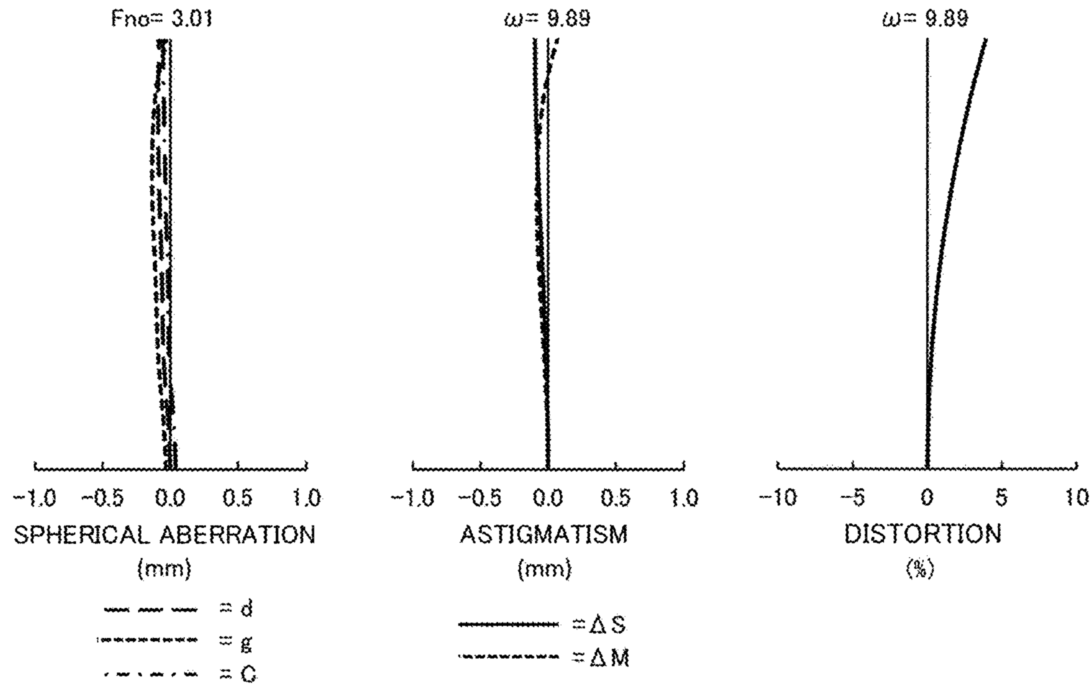
FIG. 5 is a longitudinal aberration diagram at an intermediate focal length at a focusing distance of 1.0 m in Example 1.
Figure 6:
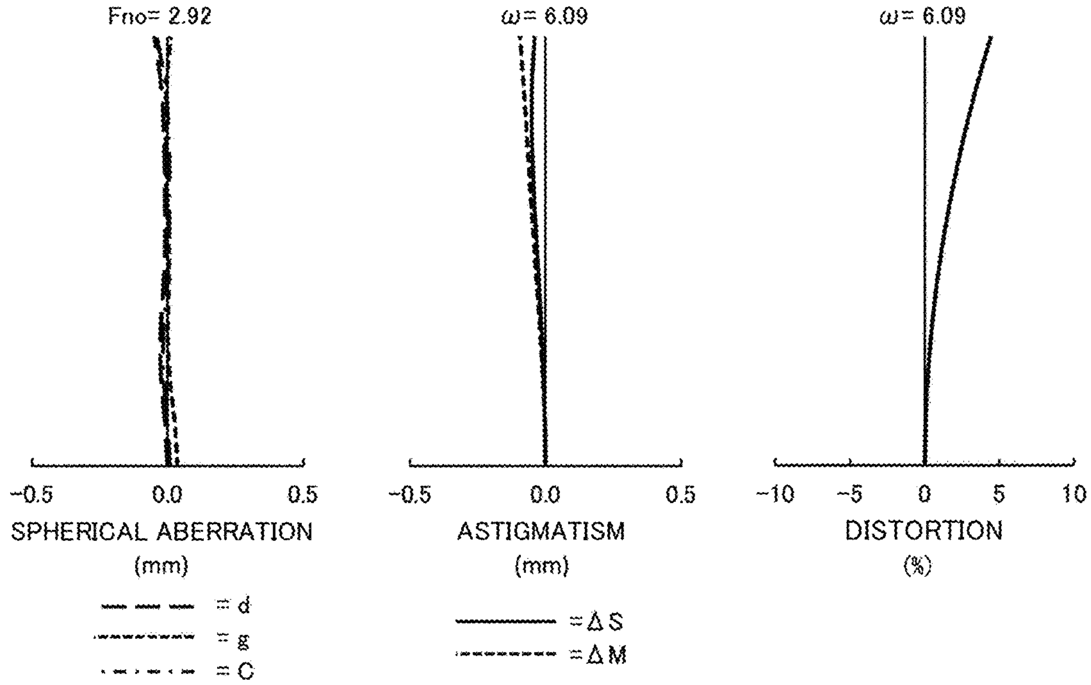
FIG. 6 is a longitudinal aberration diagram at the telephoto end when focusing on infinity in Example 1.
Figure 7:
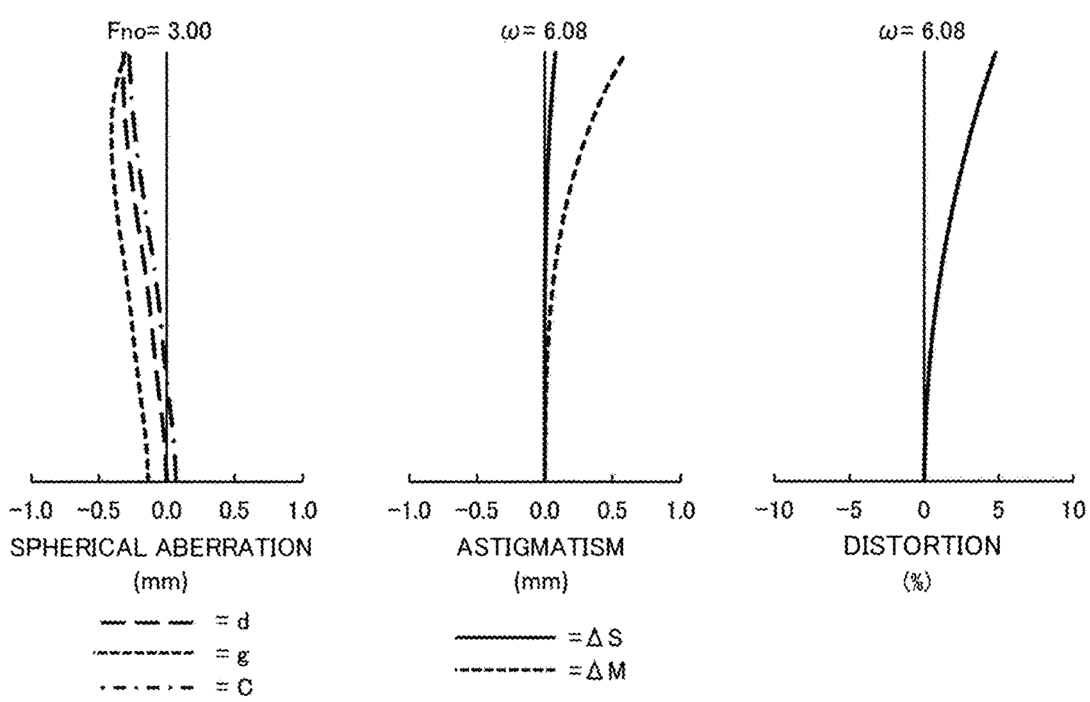
FIG. 7 is a longitudinal aberration diagram at the telephoto end at a focusing distance of 1.0 m in Example 1.
Figure 8:
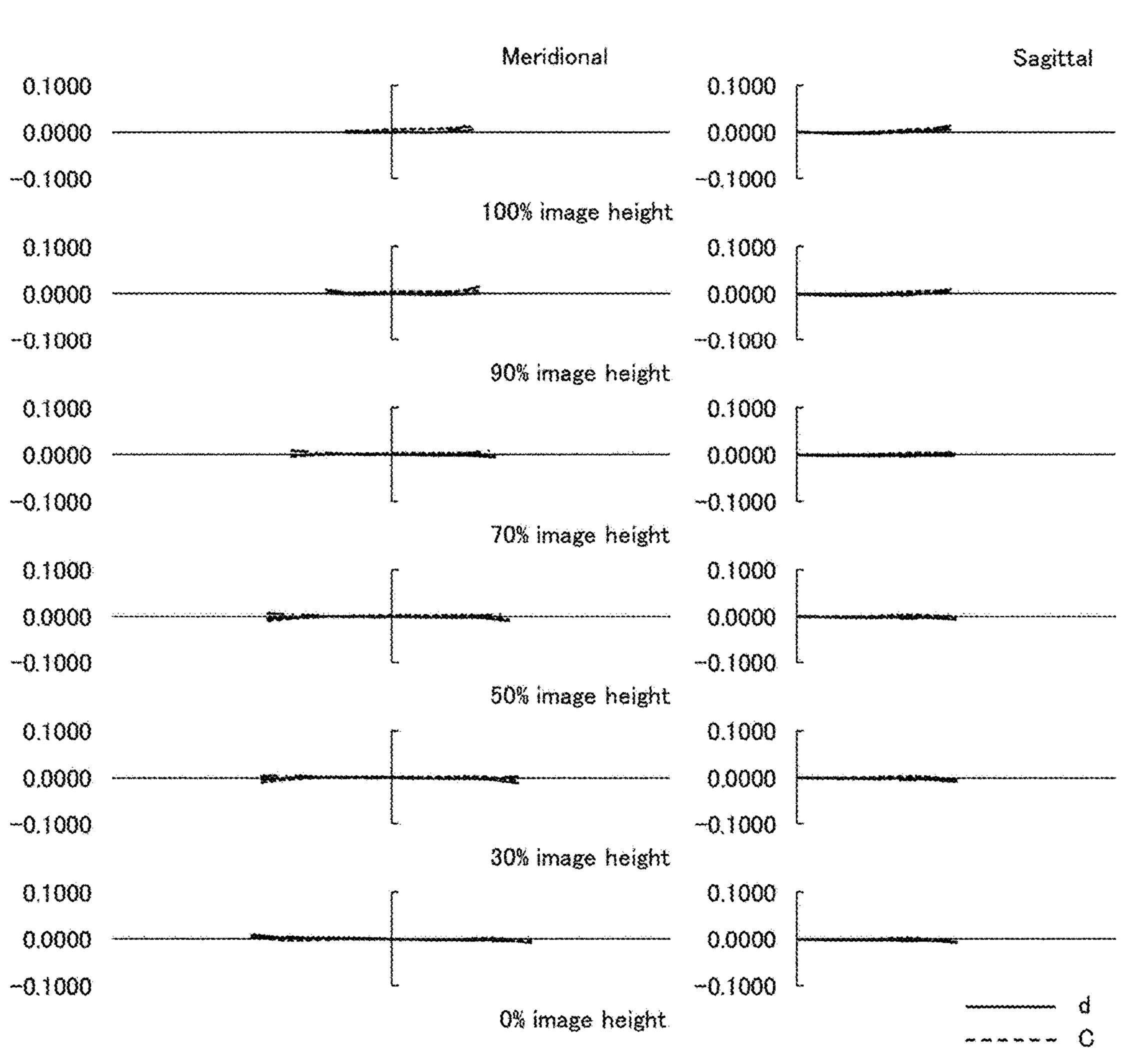
FIG. 8 is a lateral aberration diagram at the wide-angle end when focusing on infinity in Example 1.
Figure 9:
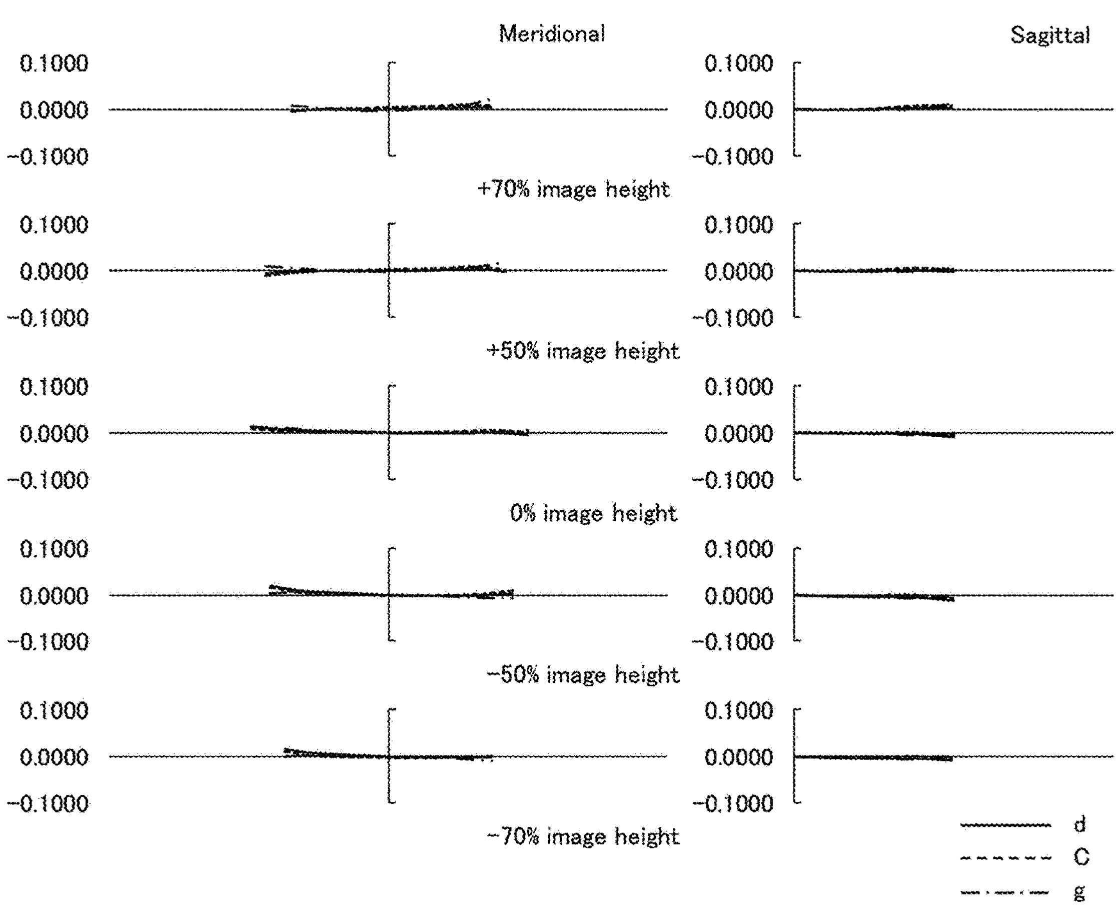
FIG. 9 is a lateral aberration diagram at the wide-angle end when focusing on infinity and compensating for a tilt of 0.4° in Example 1.
Figure 10:
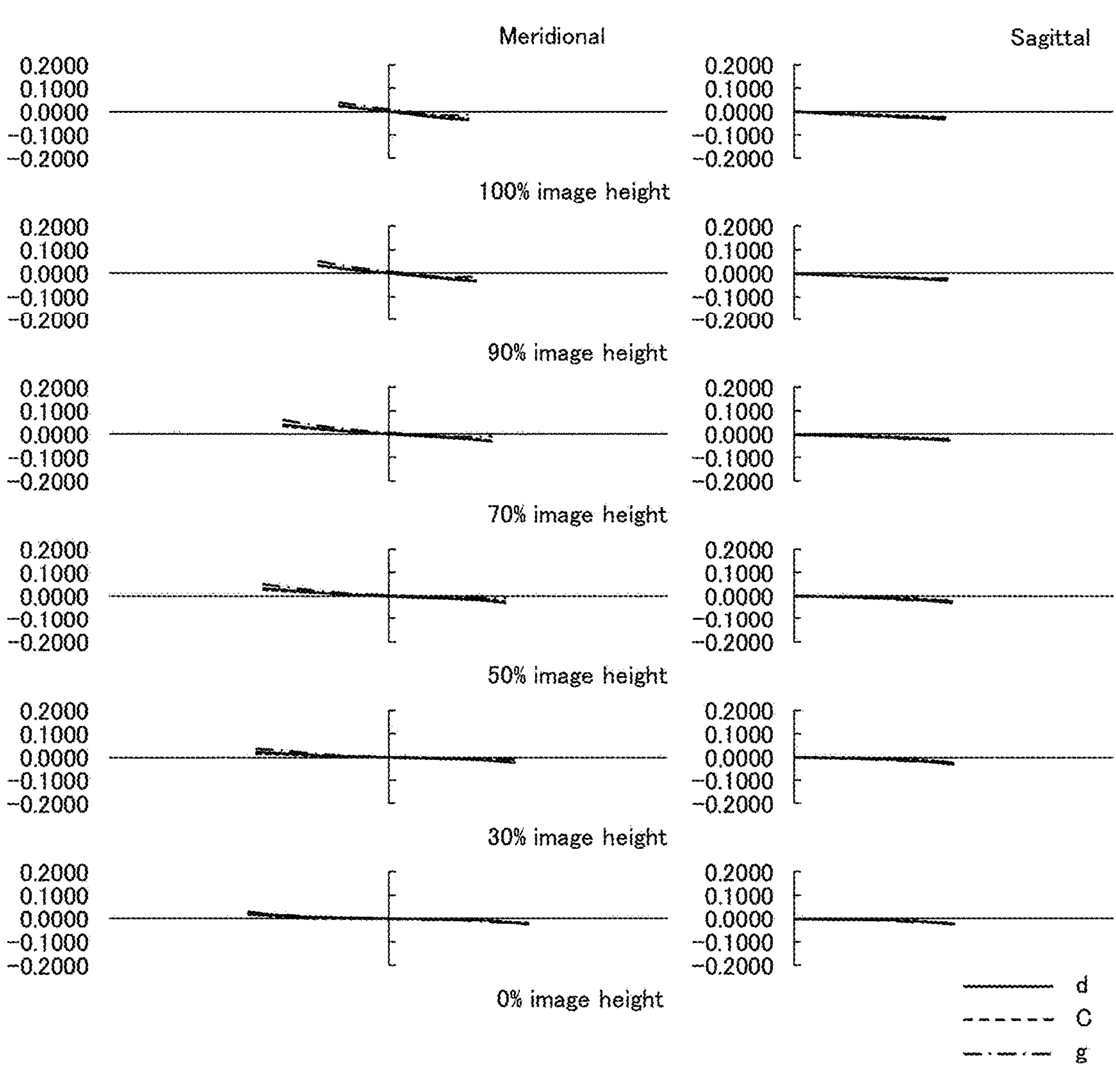
FIG. 10 is a lateral aberration diagram at the wide-angle end at a focusing distance of 1.0 m in Example 1.
Figure 11:
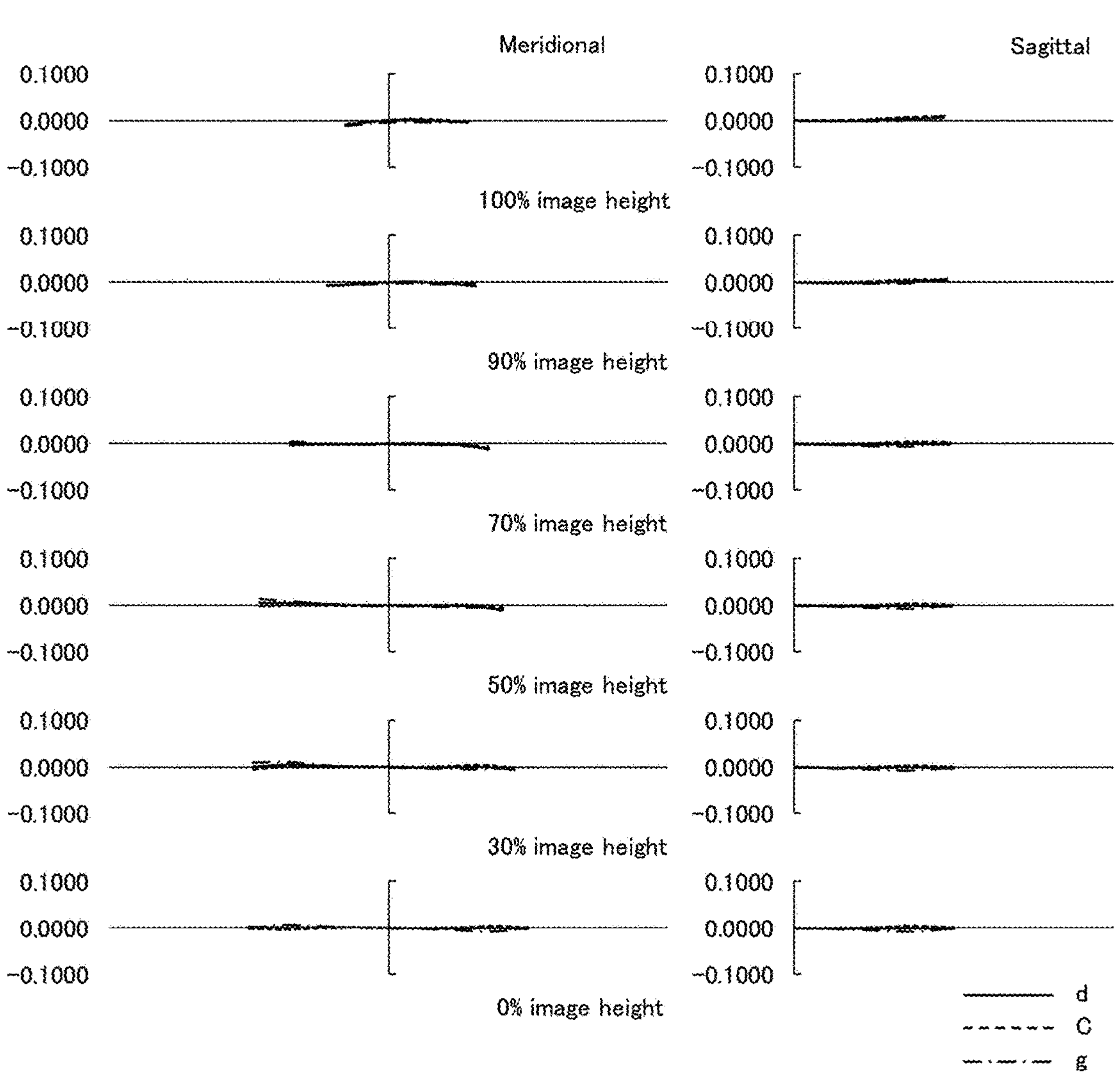
FIG. 11 is a lateral aberration diagram at an intermediate focal length when focusing on infinity in Example 1.
Figure 12:
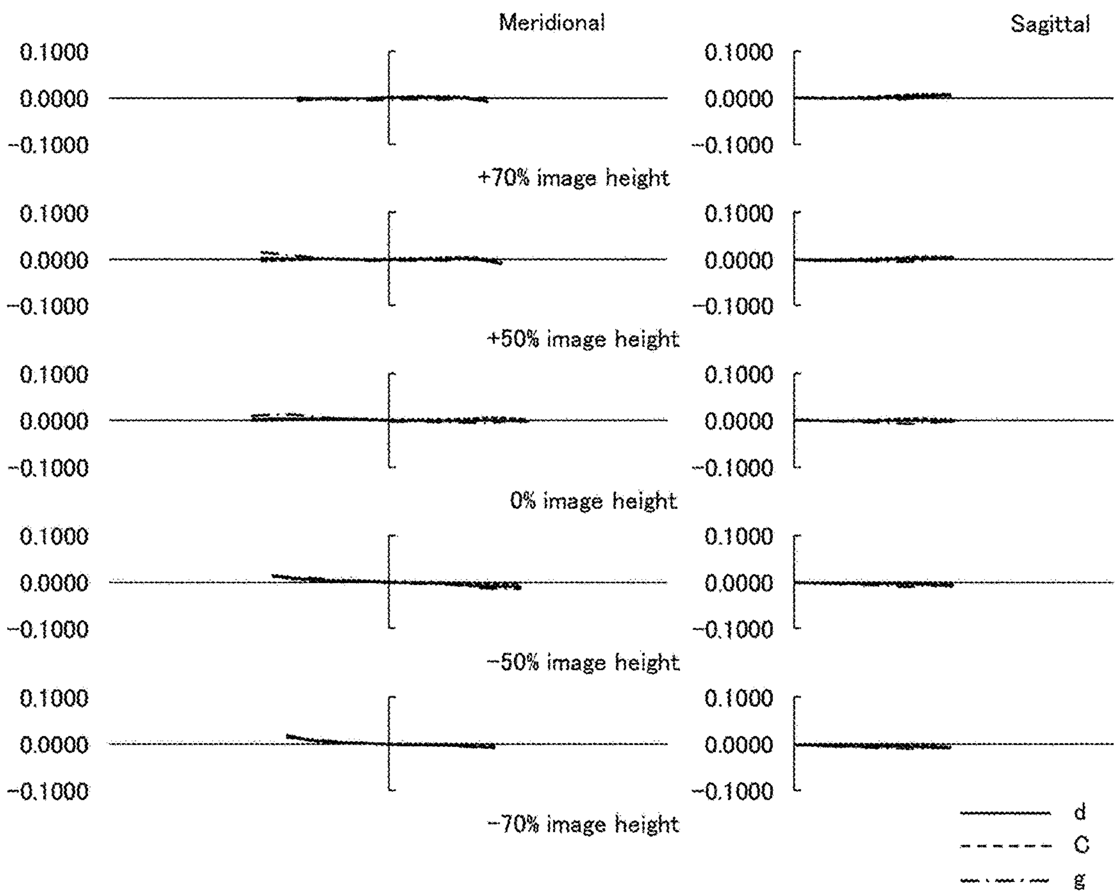
FIG. 12 is a lateral aberration diagram at an intermediate focal length when focusing on infinity and compensating for a tilt of 0.4° in Example 1.
Figure 13:
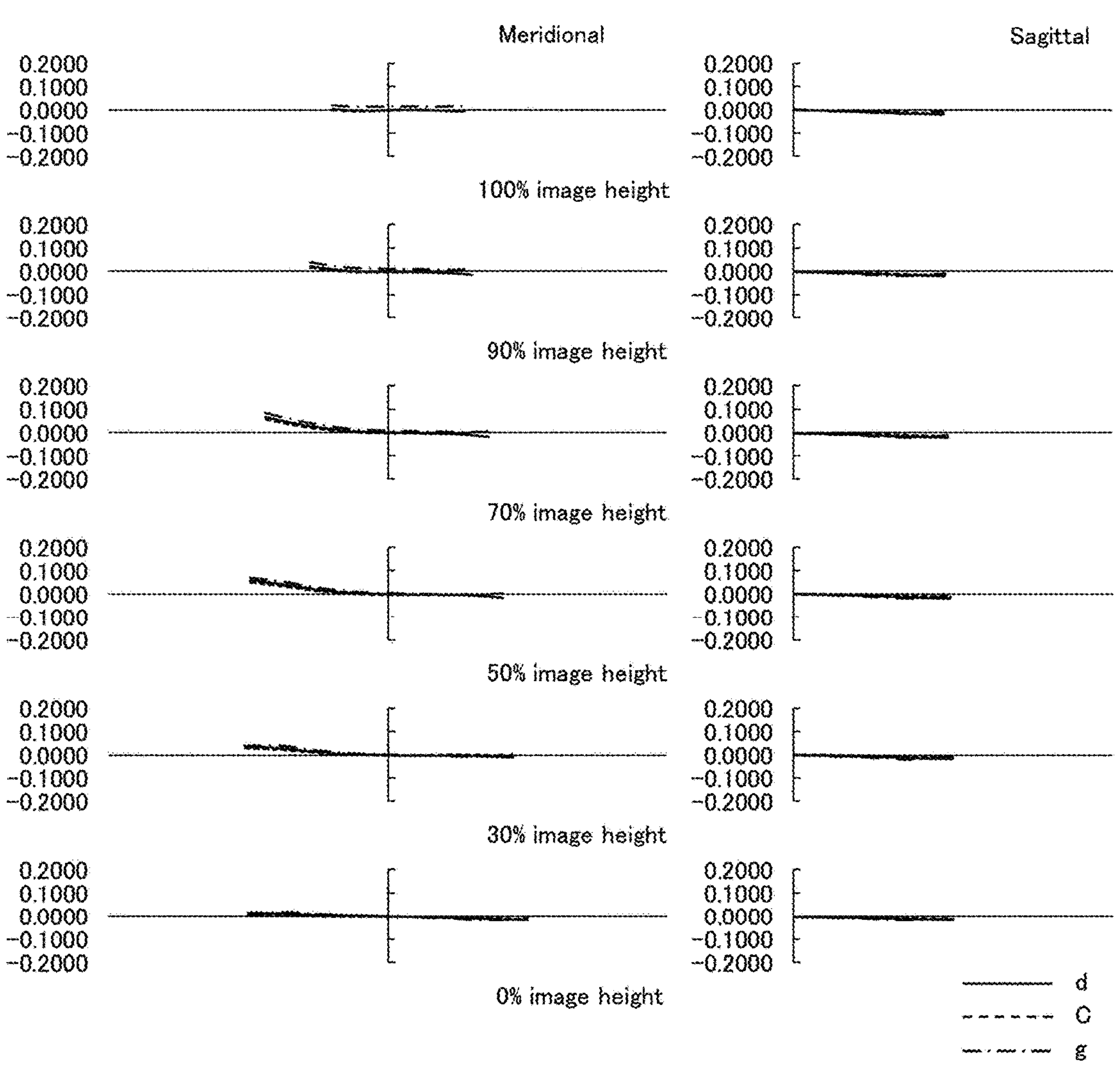
FIG. 13 is a lateral aberration diagram at an intermediate focal length at a focusing distance of 1.0 m in Example 1.
Figure 14:
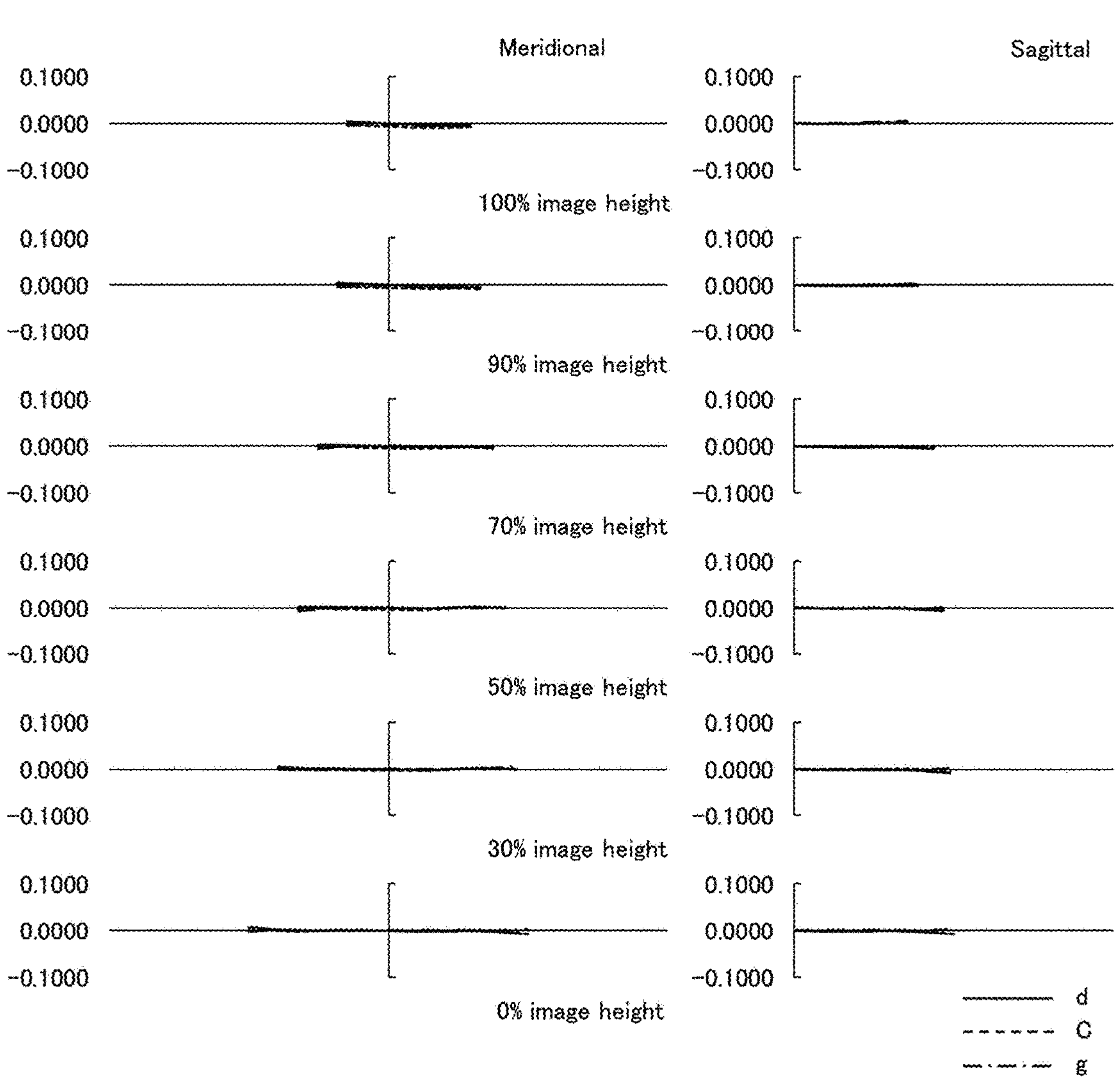
FIG. 14 is a lateral aberration diagram at the telephoto end when focusing on infinity in Example 1.
Figure 15:
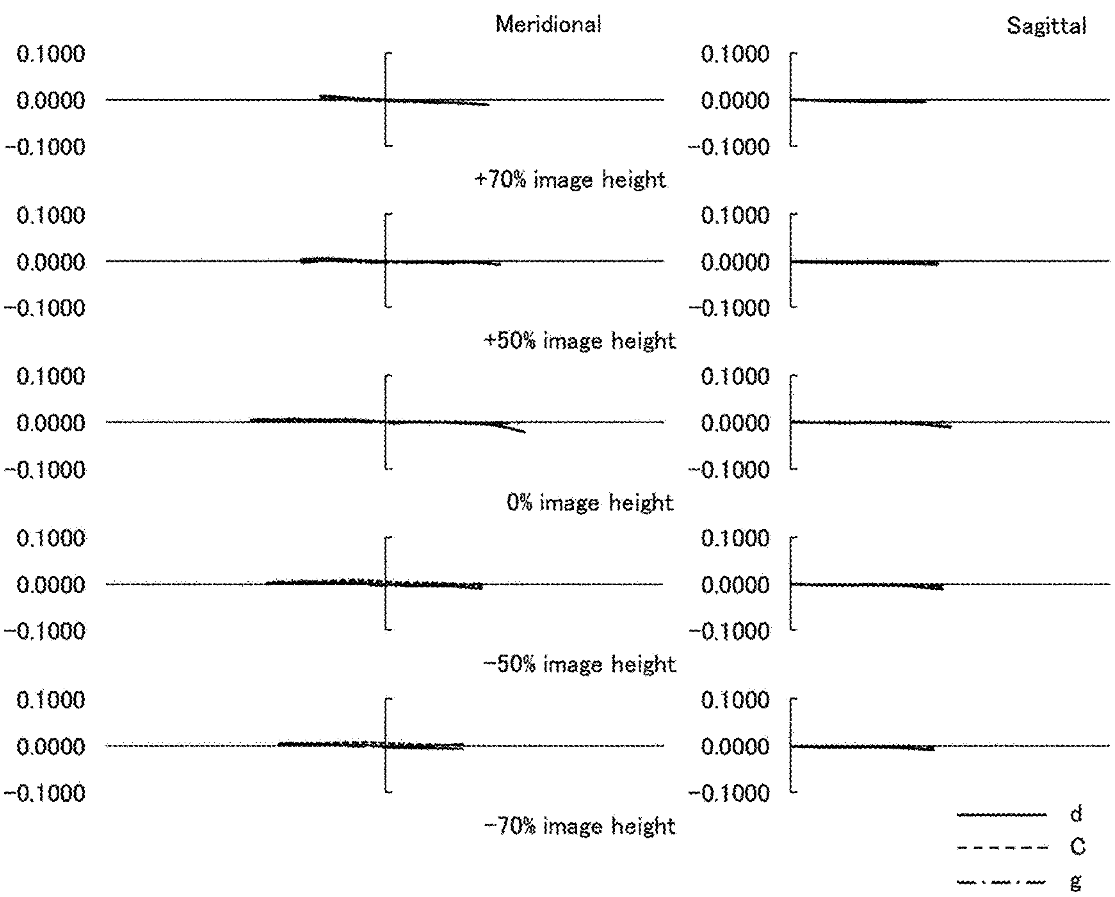
FIG. 15 is a lateral aberration diagram at the telephoto end when focusing on infinity and compensating for a tilt of 0.4° in Example 1.
Figure 16:
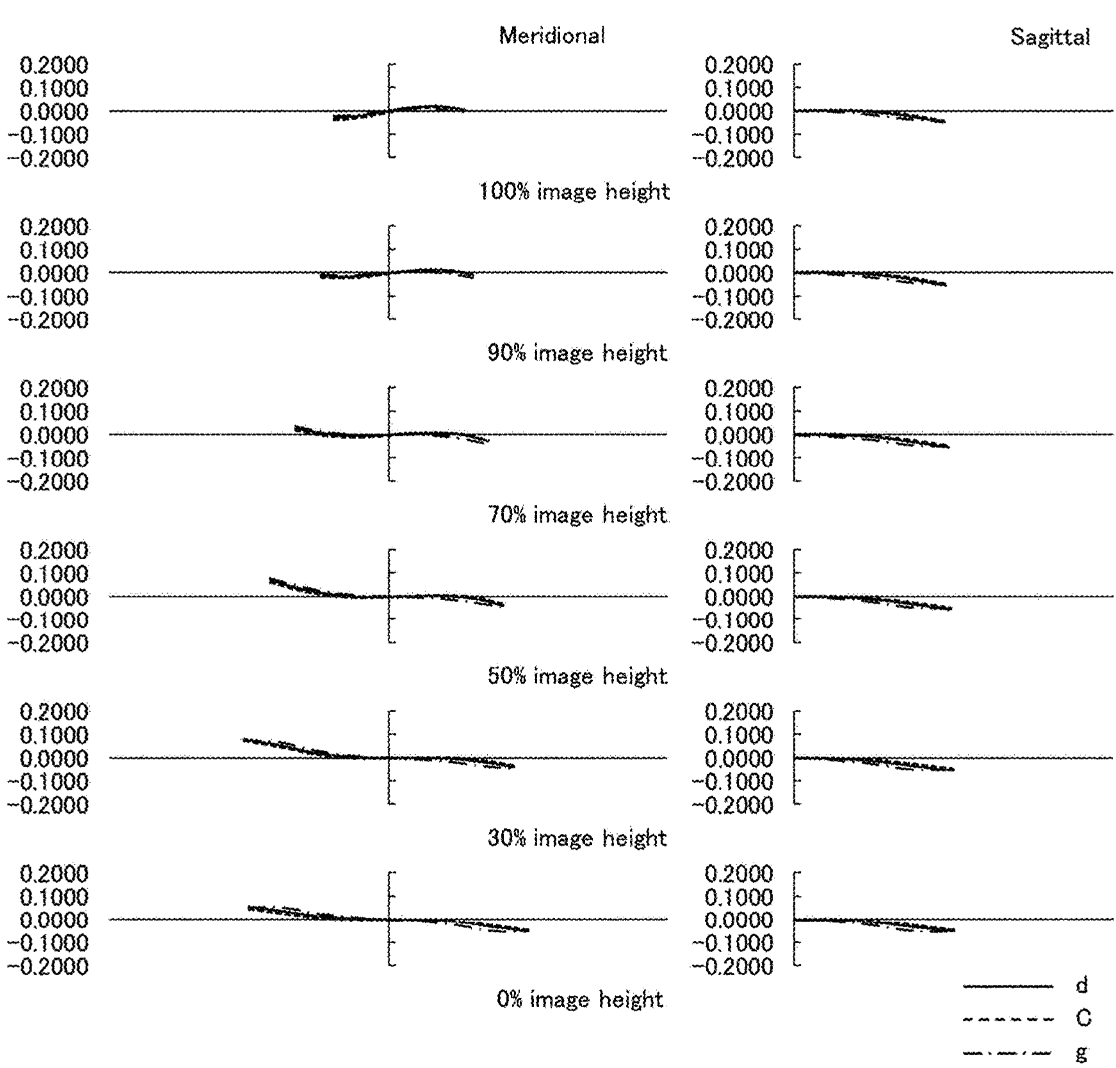
FIG. 16 is a lateral aberration diagram at the telephoto end at a focusing distance of 1.0 m in Example 1.

FIG. 1 is a lens configuration diagram of a large aperture ratio telephoto zoom lens according to Example 1 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a biconvex lens. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a convex meniscus lens having the convex surface on the object side, a cemented lens composed of a convex meniscus lens having the convex surface on the image side and a biconcave lens, a cemented lens composed of a biconvex lens and a biconcave lens, and a biconvex lens. The sixth lens group G6 is configured with a convex meniscus lens having the convex surface on the image side, and a concave meniscus lens having the convex surface on the object side. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 1 are shown below.

Numerical Data in Example 1

Unit: mm

Surface Data

| Surface Number | r | d | nd | vd | PgF |
|---|---|---|---|---|---|
| Object Surface | ∞ | (d0) | | | |
| 1 | 204.5881 | 2.0000 | 1.78590 | 43.94 | 0.5612 |
| 2 | 100.7496 | 8.2048 | 1.43700 | 95.10 | 0.5336 |
| 3 | −580.7362 | 0.1870 | | | |
| 4 | 85.9171 | 8.1450 | 1.43700 | 95.10 | 0.5336 |
| 5 | −41123.6542 | (d5) | | | |
| 6 | 200.2421 | 1.5000 | 1.43700 | 95.10 | 0.5336 |
| 7 | 41.4556 | (d7) | | | |
| 8 | −90.8162 | 1.1000 | 1.55032 | 75.50 | 0.5401 |
| 9 | 61.0863 | 2.2411 | 1.85883 | 30.00 | 0.5979 |
| 10 | 111.1309 | (d10) | | | |
| 11 | 49.2382 | 2.7307 | 1.87070 | 40.73 | 0.5682 |
| 12 | 87.0547 | (d12) | | | |
| 13 (diaphragm) | ∞ | 1.2010 | | | |
| 14* | 54.8111 | 3.6155 | 1.80610 | 40.73 | 0.5694 |
| 15 | 133.7051 | 0.9441 | | | |
| 16 | 64.7697 | 1.0500 | 1.80610 | 33.27 | 0.5884 |
| 17 | 27.8690 | 7.1018 | 1.43700 | 95.10 | 0.5336 |
| 18 | 123138.0915 | 2.6175 | | | |
| 19 | −86.3491 | 2.2798 | 1.80809 | 22.76 | 0.6307 |
| 20 | −49.4003 | 1.6900 | 1.69350 | 53.20 | 0.5467 |
| 21* | 72.9054 | 1.4361 | | | |
| 22 | 43.1721 | 8.0877 | 1.43700 | 95.10 | 0.5336 |
| 23 | −42.3401 | 1.0500 | 1.85451 | 25.15 | 0.6103 |
| 24 | −5373.3673 | 0.8069 | | | |
| 25* | 71.0779 | 6.3510 | 1.76450 | 49.09 | 0.5528 |
| 26* | −51.6774 | (d26) | | | |
| 27 | −361.8675 | 2.0048 | 1.86966 | 20.02 | 0.6435 |
| 28 | −88.3811 | 0.1500 | | | |
| 29 | 425.0090 | 0.8000 | 1.75500 | 52.32 | 0.5473 |
| 30 | 31.9317 | (d30) | | | |
| 31 | 52.9222 | 5.8799 | 1.65100 | 56.24 | 0.5420 |
| 32 | −93.4360 | (d32) | | | |
| 33 | −135.9088 | 1.0000 | 1.43700 | 95.10 | 0.5336 |
| 34 | 55.0218 | 6.3943 | | | |
| 35 | −36.6140 | 1.0000 | 1.49700 | 81.61 | 0.5389 |
| 36 | −116.6815 | 29.3510 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 5.73849 | −0.04777 |
| A4 | −1.70699E−06 | −2.05493E−06 | −6.68946E−06 | 5.98132E−07 |
| A6 | −9.83571E−10 | 1.55966E−08 | 6.52223E−09 | 3.49487E−09 |
| A8 | −1.48085E−12 | −2.58234E−10 | −4.77660E−11 | −2.96468E−11 |
| A10 | 2.58015E−16 | 2.85196E−12 | 1.22707E−13 | 7.59590E−14 |
| A12 | 0.00000E+00 | −2.04687E−14 | −1.23679E−16 | −6.84430E−17 |
| A14 | 0.00000E+00 | 9.26512E−17 | 0.00000E+00 | 0.00000E+00 |
| A16 | 0.00000E+00 | −2.51983E−19 | 0.00000E+00 | 0.00000E+00 |
| A18 | 0.00000E+00 | 3.72342E−22 | 0.00000E+00 | 0.00000E+00 |
| A20 | 0.00000E+00 | −2.27627E−25 | 0.00000E+00 | 0.00000E+00 |

Various Data

| Zoom Ratio | 2.69 | | |
|---|---|---|---|
| | Wide Angle | Mid Range | Telephoto |
| Focal Length | 72.10 | 118.00 | 194.00 |
| F Number | 2.91 | 2.89 | 2.92 |
| Total Angle of View 2ω | 32.93 | 20.01 | 12.18 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 36.6277 | 68.5506 |
| d7 | 16.5679 | 12.1976 | 8.0959 |
| d10 | 39.4276 | 16.4079 | 1.0000 |
| d12 | 23.4999 | 16.2637 | 3.8477 |
| d26 | 9.0036 | 7.6236 | 3.0000 |
| d30 | 11.0632 | 11.0431 | 20.0809 |
| d32 | 6.0146 | 7.4133 | 3.0011 |
| BF | 1.0000 | 1.0003 | 1.0000 |
| d0 | 778.0034 | 778.0028 | 778.0037 |
| d5 | 2.0000 | 36.6277 | 68.5506 |
| d7 | 16.5679 | 12.1976 | 8.0959 |
| d10 | 39.4276 | 16.4079 | 1.0000 |
| d12 | 23.4999 | 16.2637 | 3.8477 |
| d26 | 10.3220 | 11.1975 | 10.8357 |
| d30 | 8.5288 | 4.6959 | 4.8235 |
| d32 | 7.2305 | 10.1870 | 10.4232 |
| BF | 0.9999 | 1.0000 | 0.9996 |

| Lens Group Data | | |
|---|---|---|
| Lens Group | Starting Surface | Focal Length |
| G1 | 1 | 161.21 |
| G2 | 6 | −119.98 |
| G3 | 8 | −114.18 |
| G4 | 11 | 125.95 |
| G5 | 13 | 60.26 |
| G6 | 27 | −69.74 |
| G7 | 31 | 52.73 |
| G8 | 33 | −47.39 |

Example 2

Figure 17:
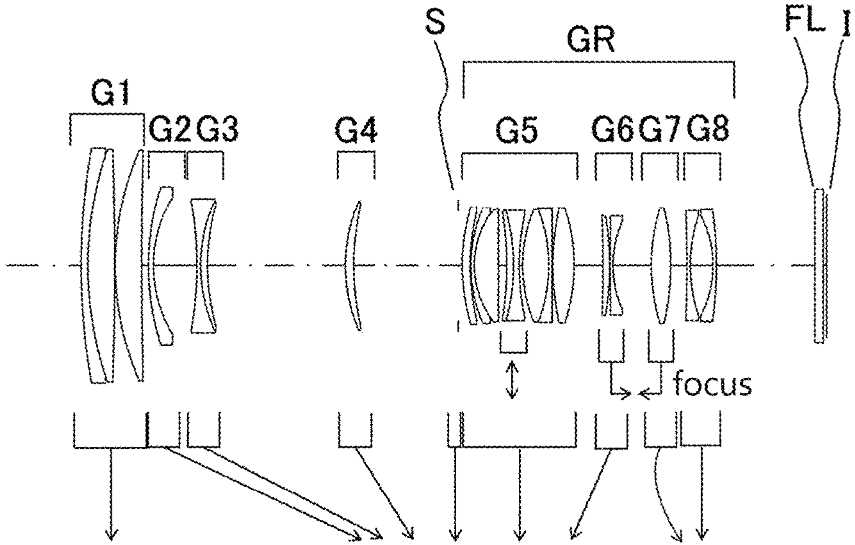
FIG. 17 is a lens configuration diagram according to Example 2 of the present invention.
Figure 18:
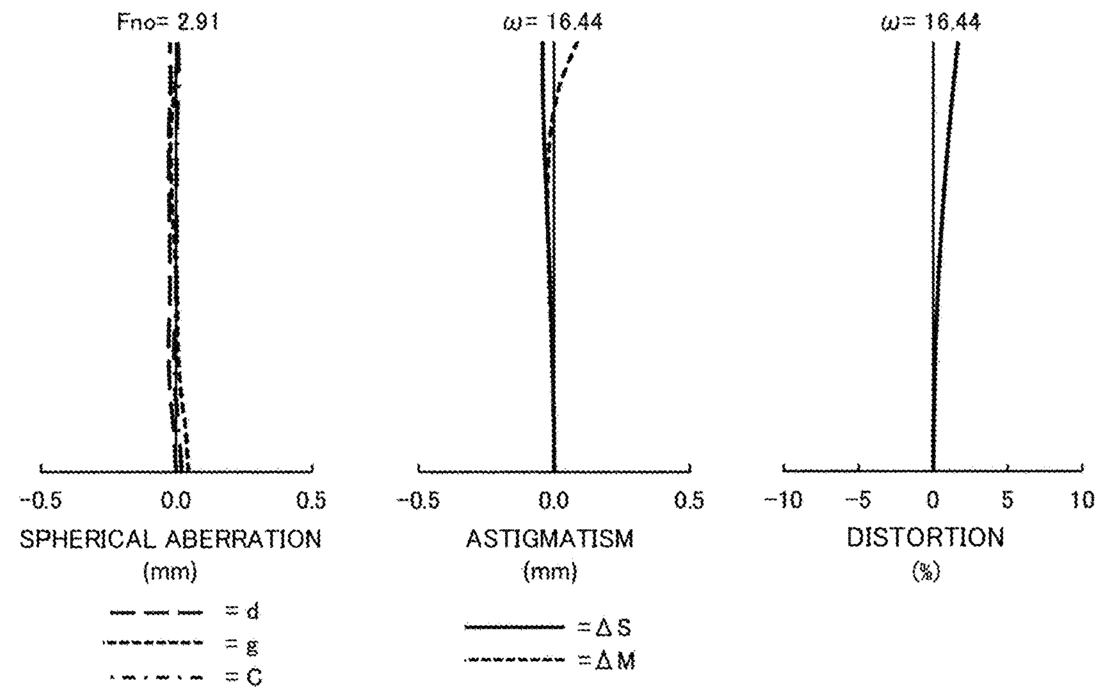
FIG. 18 is a longitudinal aberration diagram at the wide-angle end when focusing on infinity in Example 2.
Figure 19:
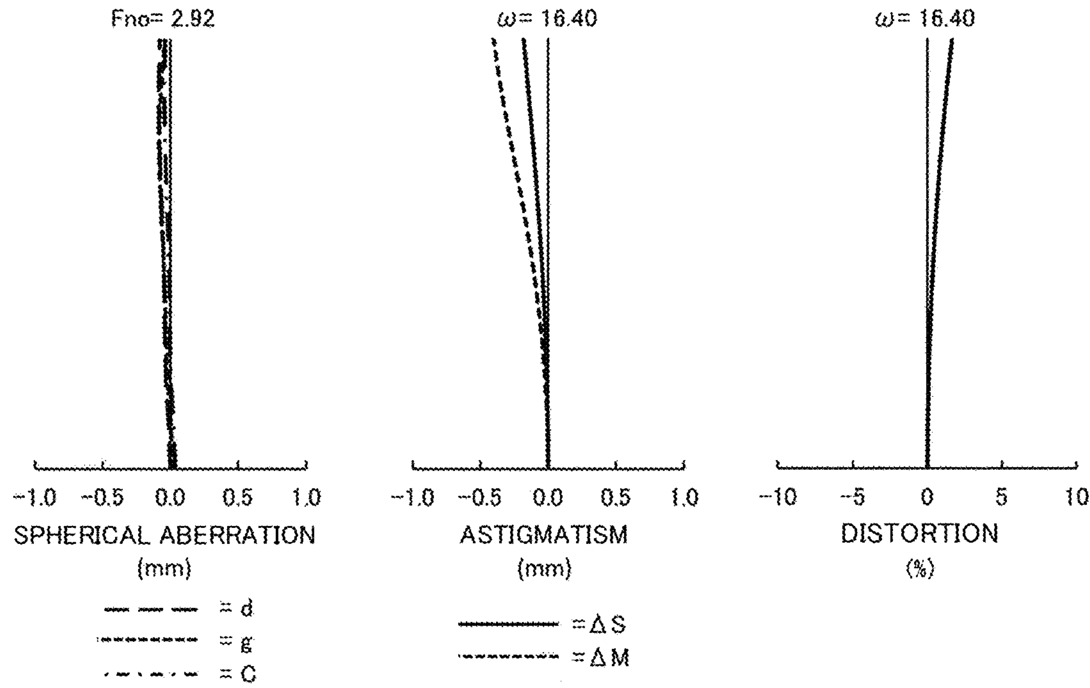
FIG. 19 is a longitudinal aberration diagram at the wide-angle end at a focusing distance of 1.0 m in Example 2.
Figure 20:
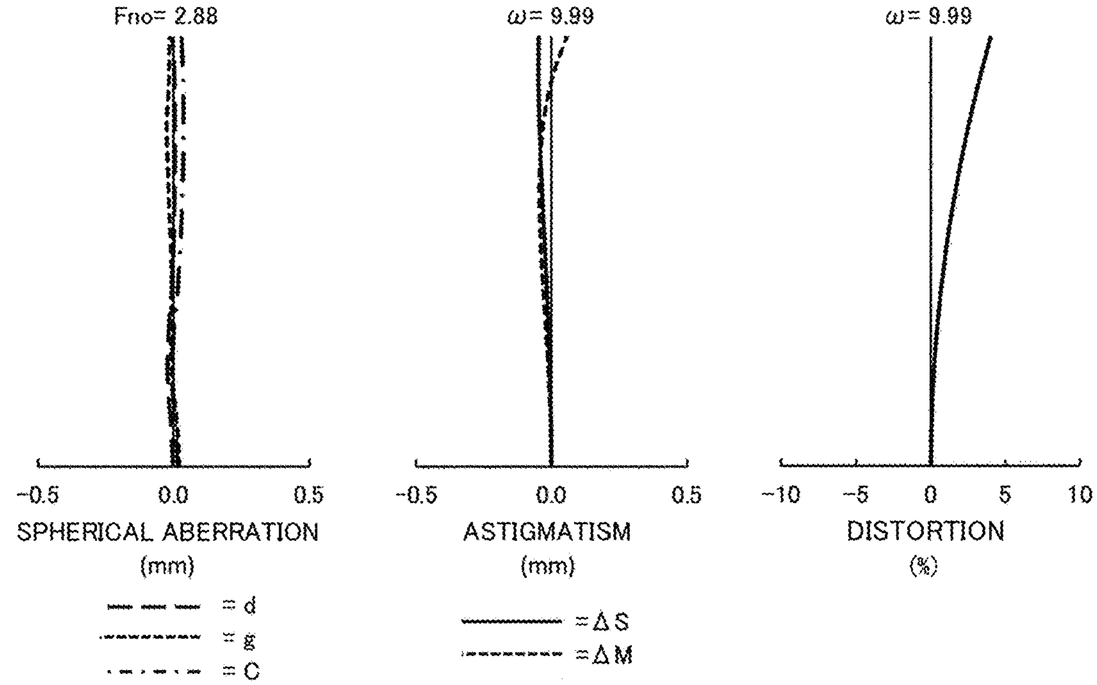
FIG. 20 is a longitudinal aberration diagram at an intermediate focal length when focusing on infinity in Example 2.
Figure 21:
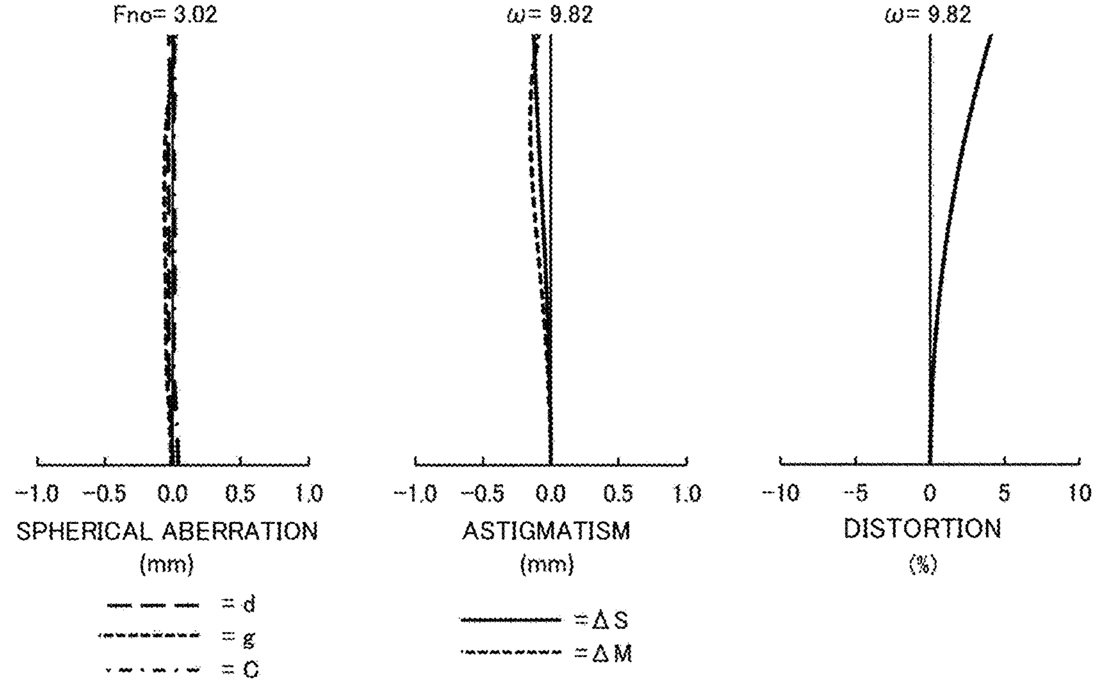
FIG. 21 is a longitudinal aberration diagram at an intermediate focal length at a focusing distance of 1.0 m in Example 2.
Figure 22:
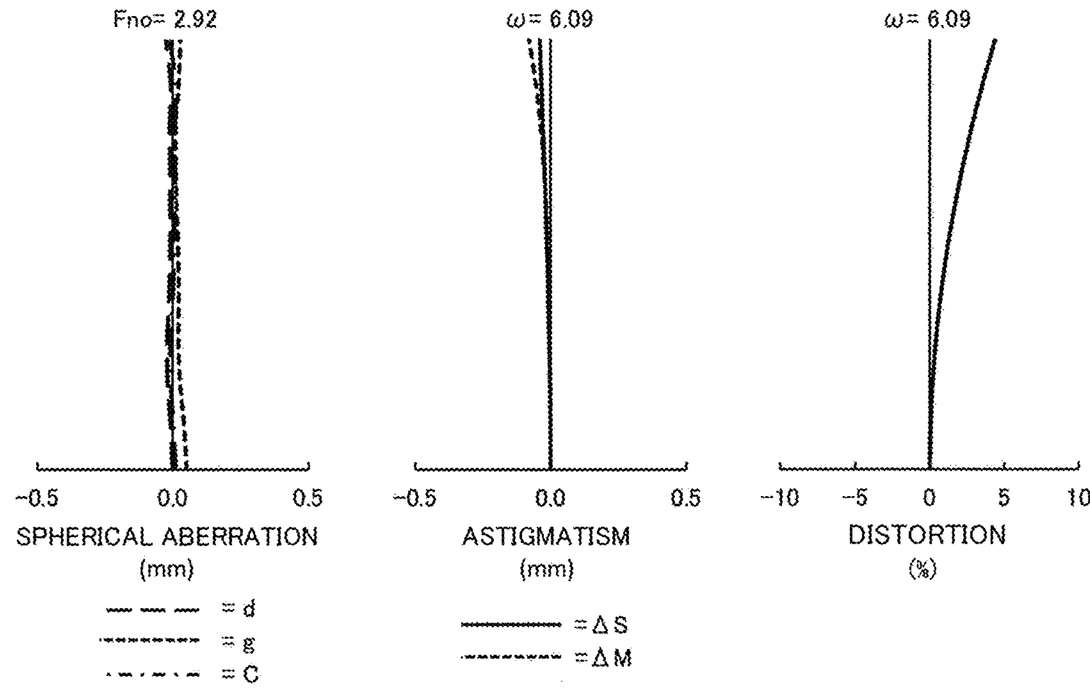
FIG. 22 is a longitudinal aberration diagram at the telephoto end when focusing on infinity in Example 2.
Figure 23:
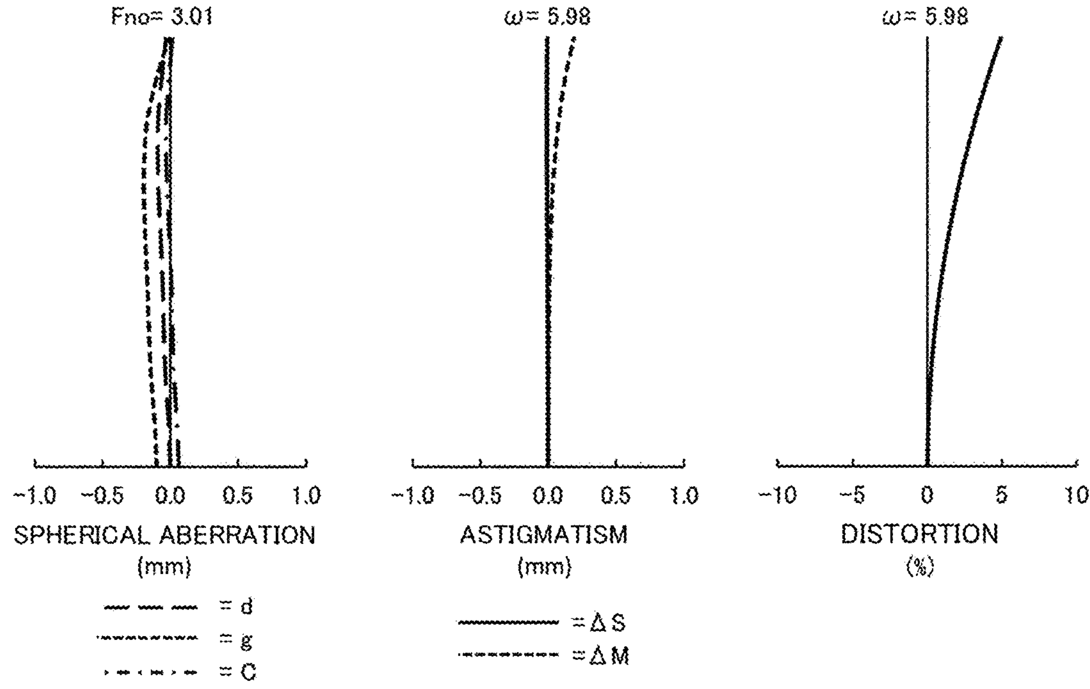
FIG. 23 is a longitudinal aberration diagram at the telephoto end at a focusing distance of 1.0 m in Example 2.
Figure 24:
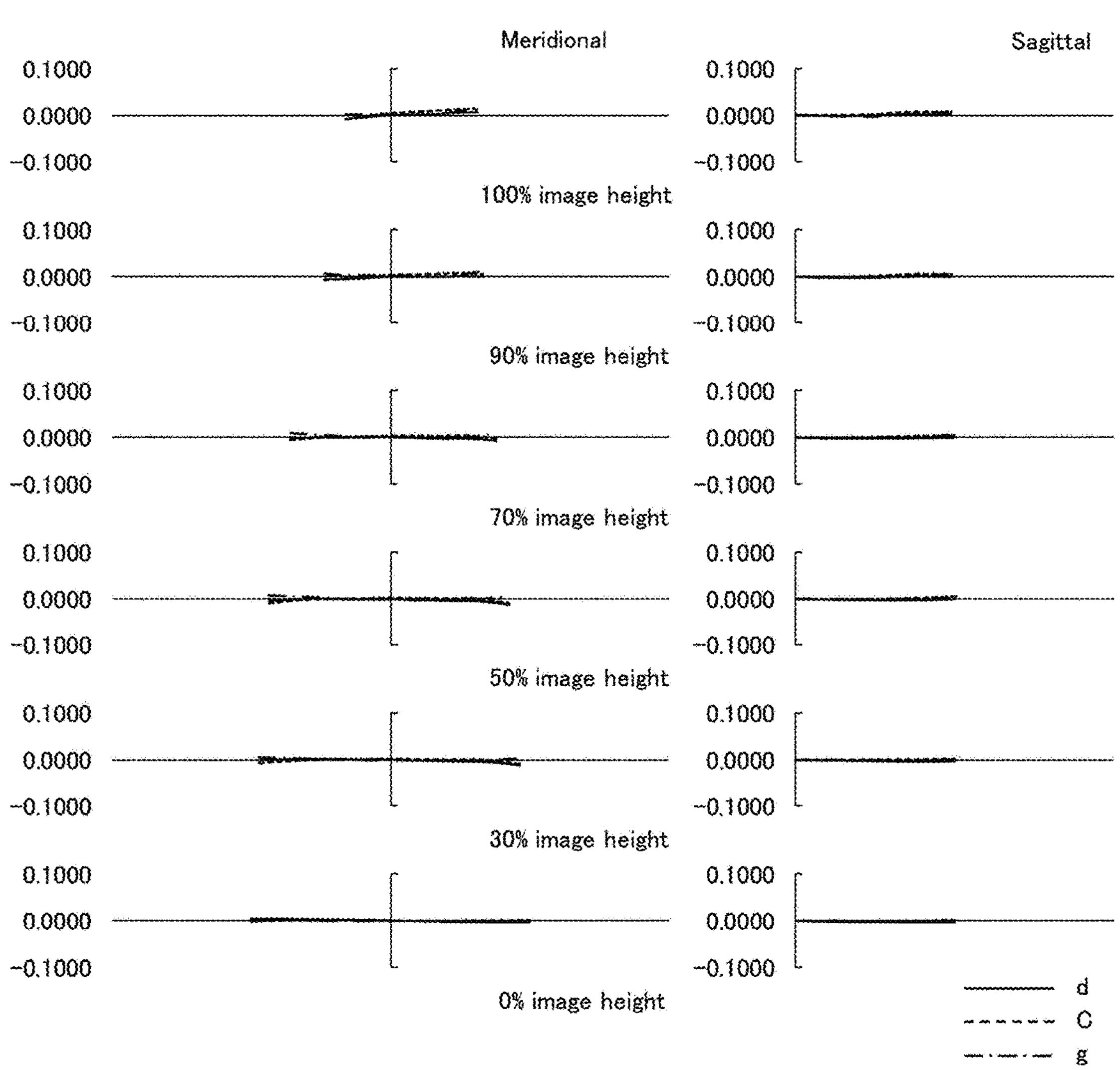
FIG. 24 is a lateral aberration diagram at the wide-angle end when focusing on infinity in Example 2.
Figure 25:
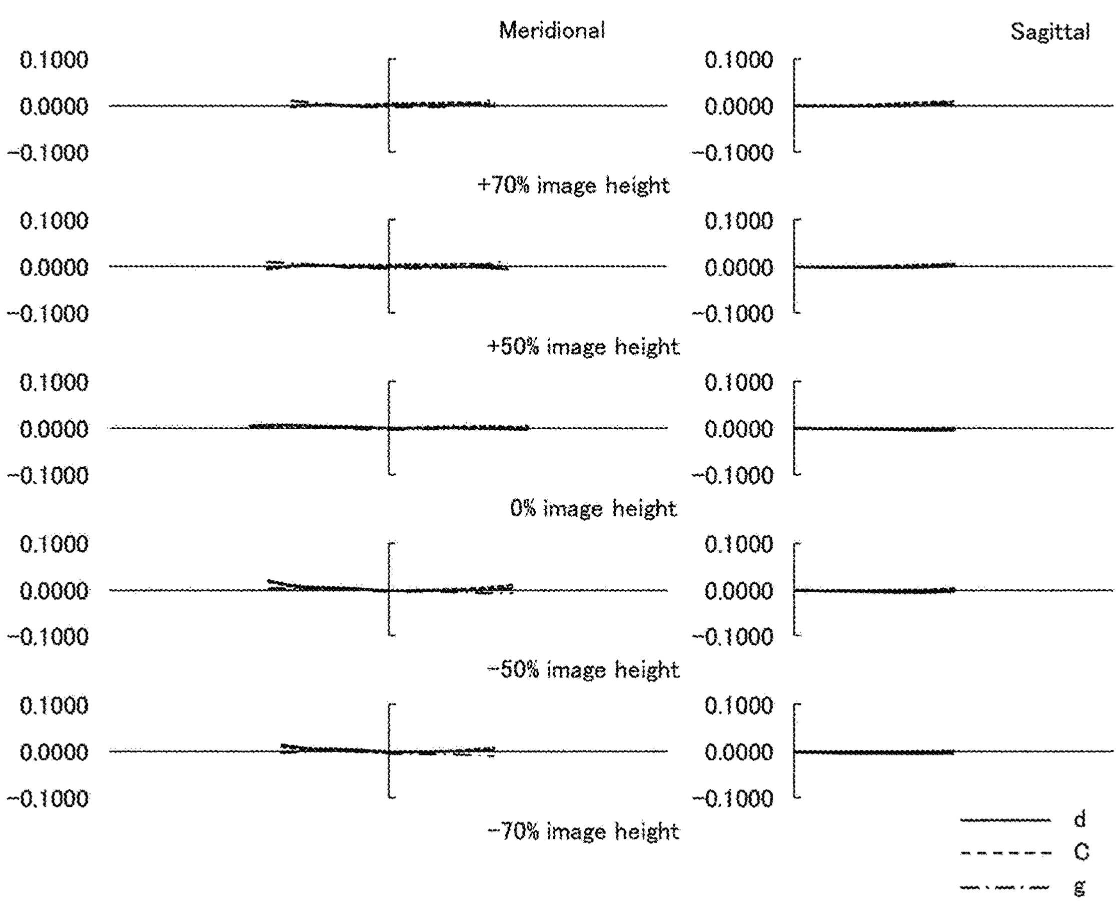
FIG. 25 is a lateral aberration diagram at the wide-angle end when focusing on infinity and compensating for a tilt of 0.4° in Example 2.
Figure 26:
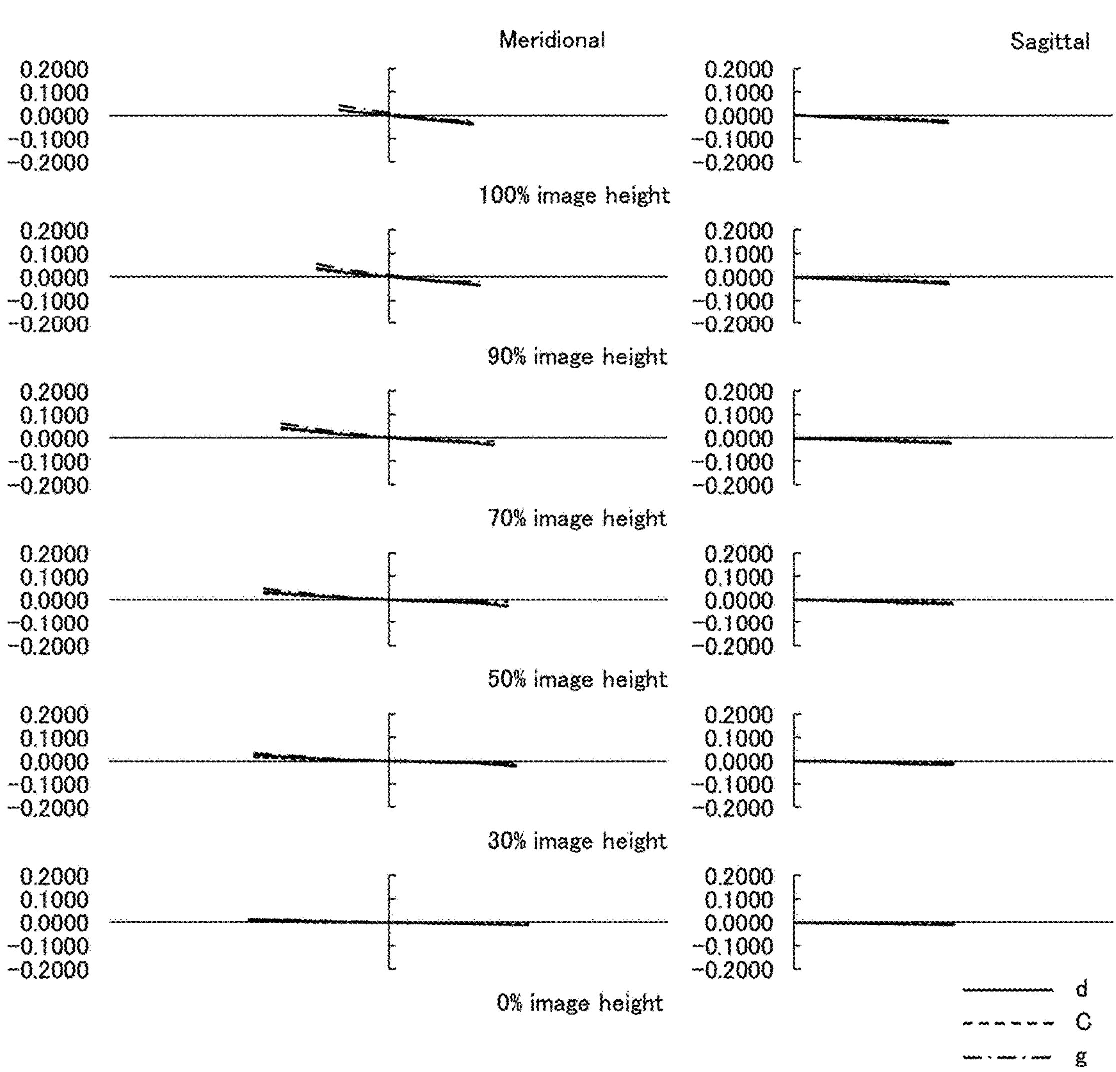
FIG. 26 is a lateral aberration diagram at the wide-angle end at a focusing distance of 1.0 m in Example 2.
Figure 27:
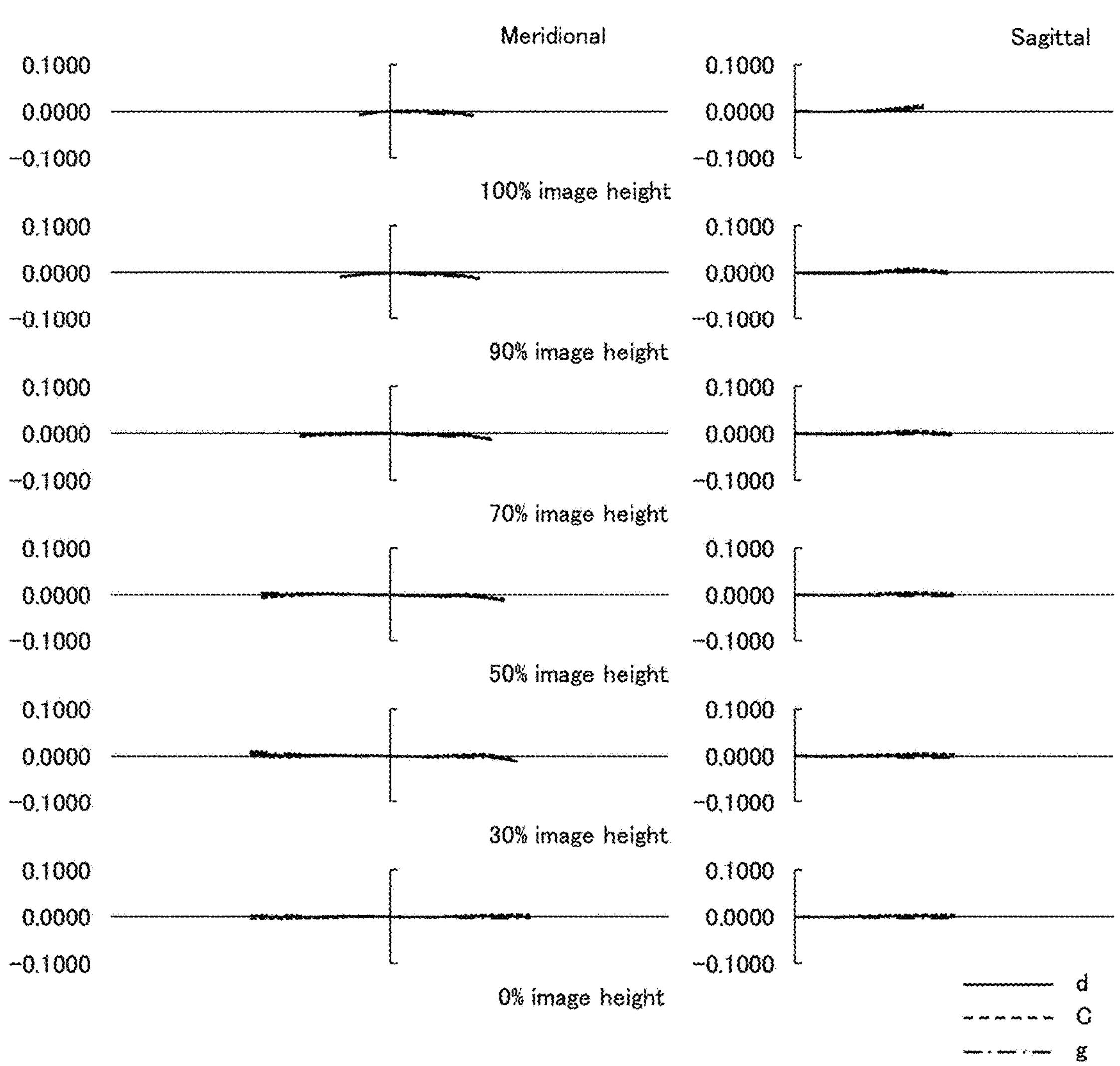
FIG. 27 is a lateral aberration diagram at an intermediate focal length when focusing on infinity in Example 2.
Figure 28:
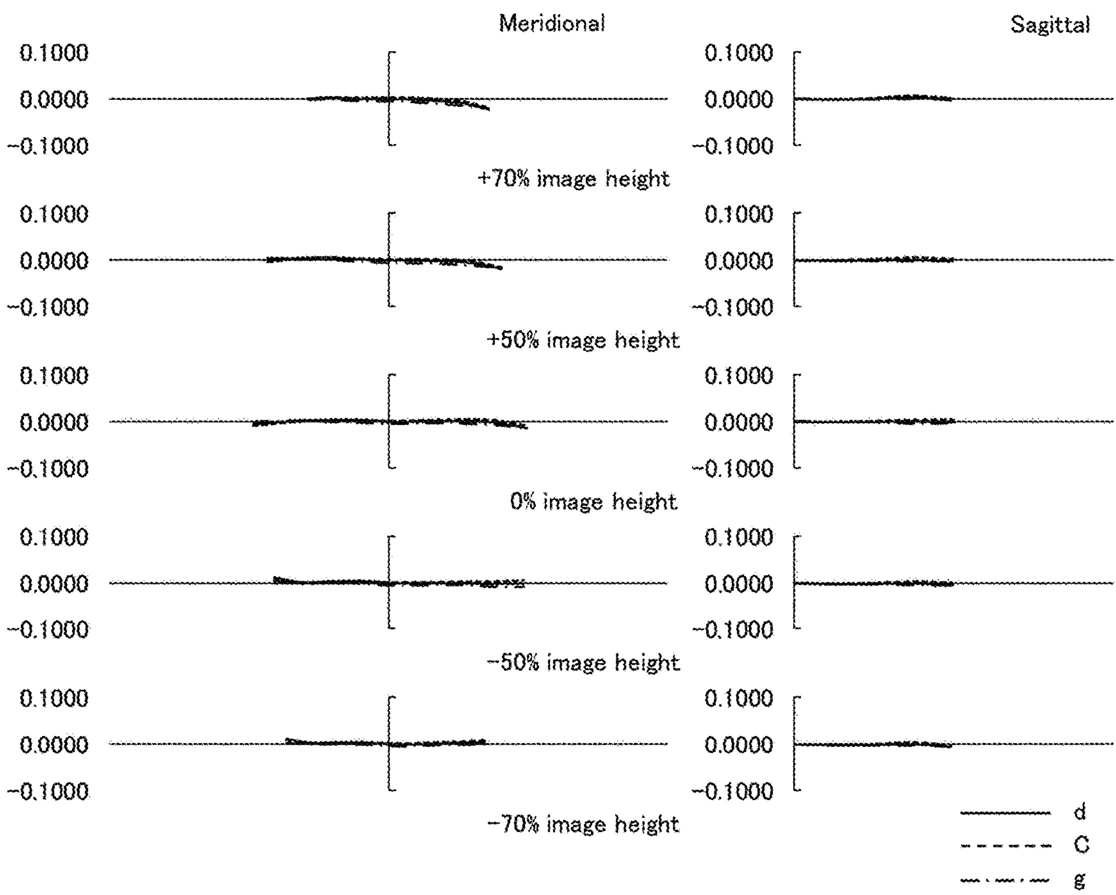
FIG. 28 is a lateral aberration diagram at an intermediate focal length when focusing on infinity and compensating for a tilt of 0.4° in Example 2.
Figure 29:
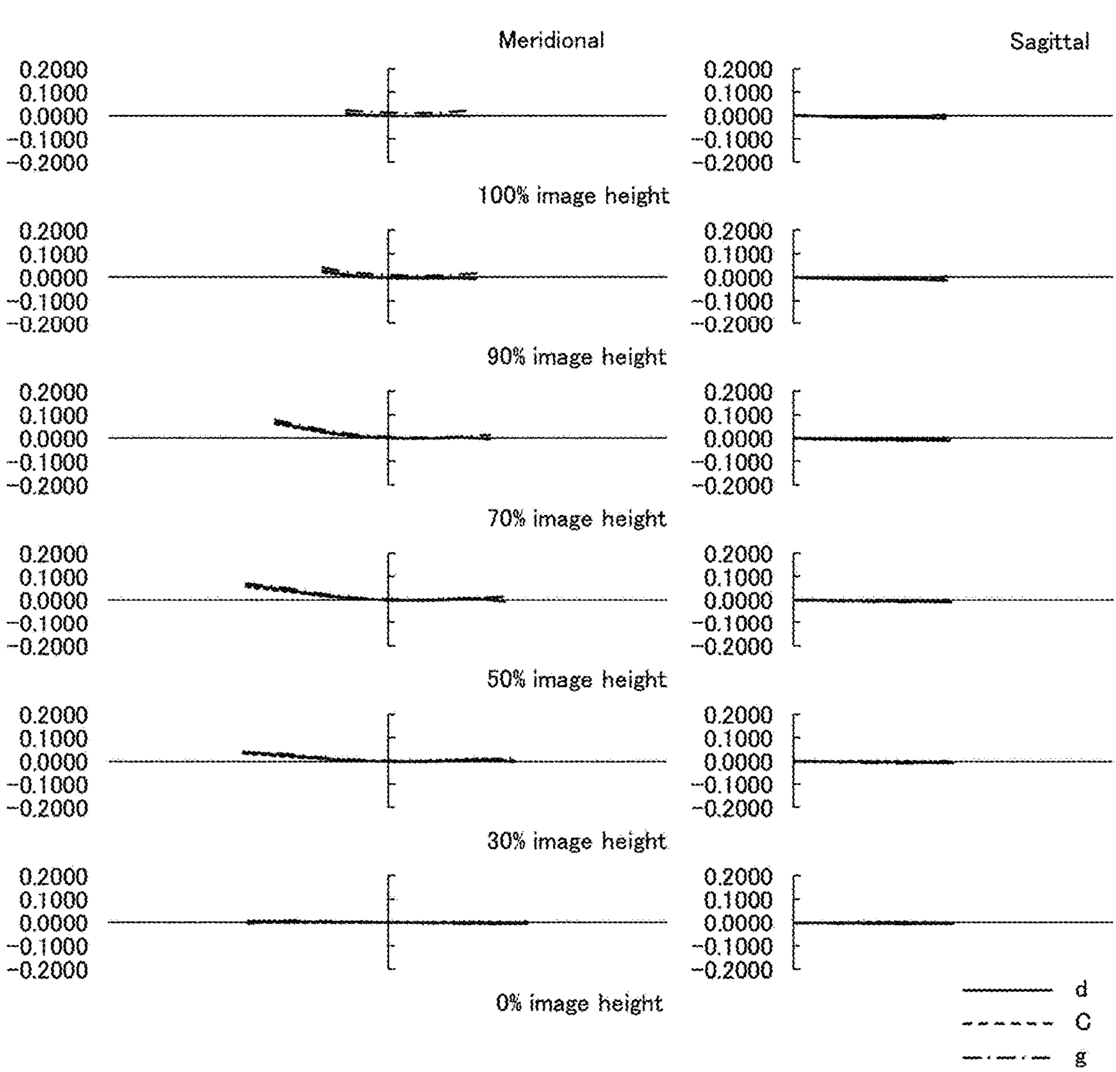
FIG. 29 is a lateral aberration diagram at an intermediate focal length at a focusing distance of 1.0 m in Example 2.
Figure 30:
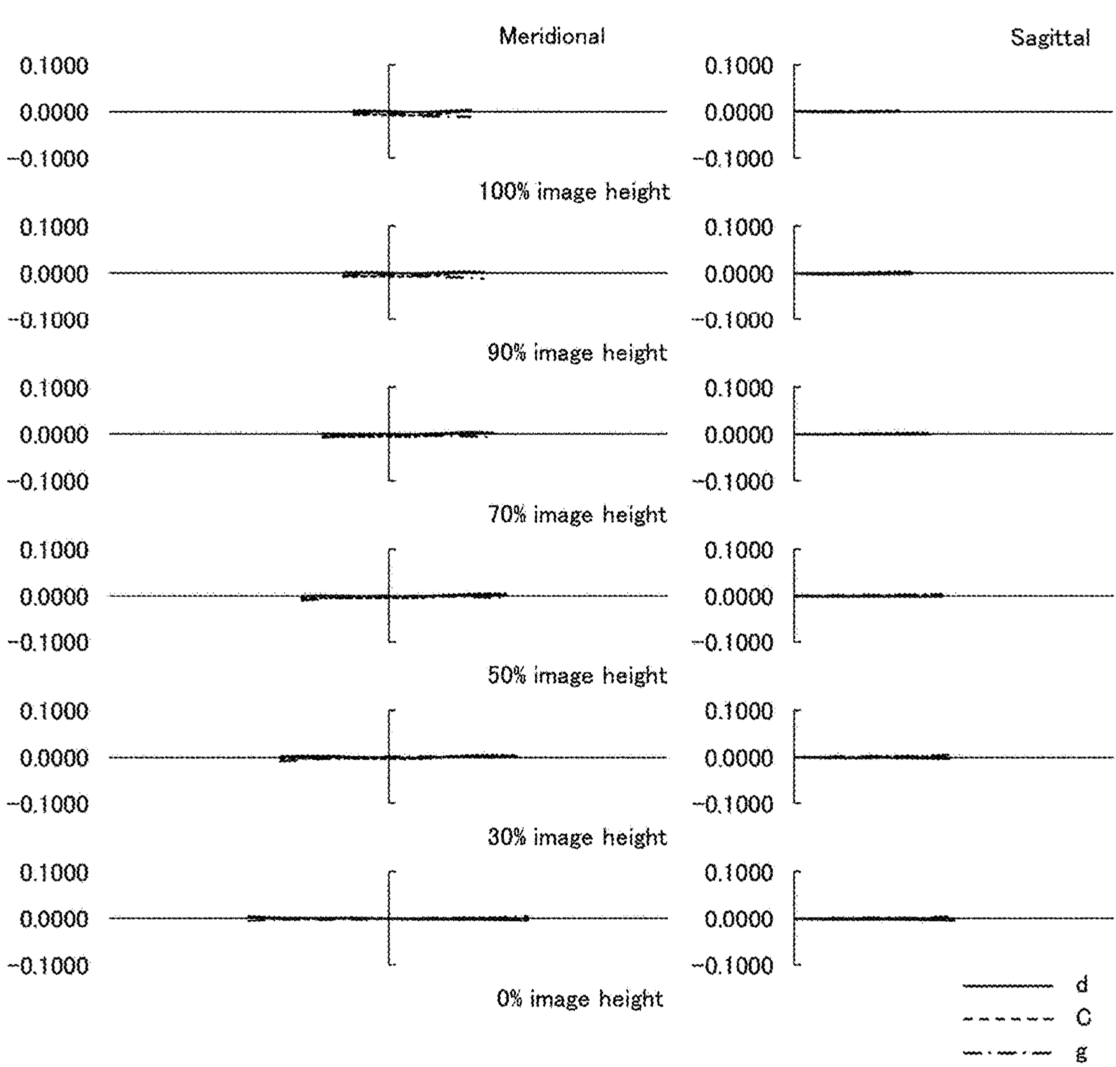
FIG. 30 is a lateral aberration diagram at the telephoto end when focusing on infinity in Example 2.
Figure 31:
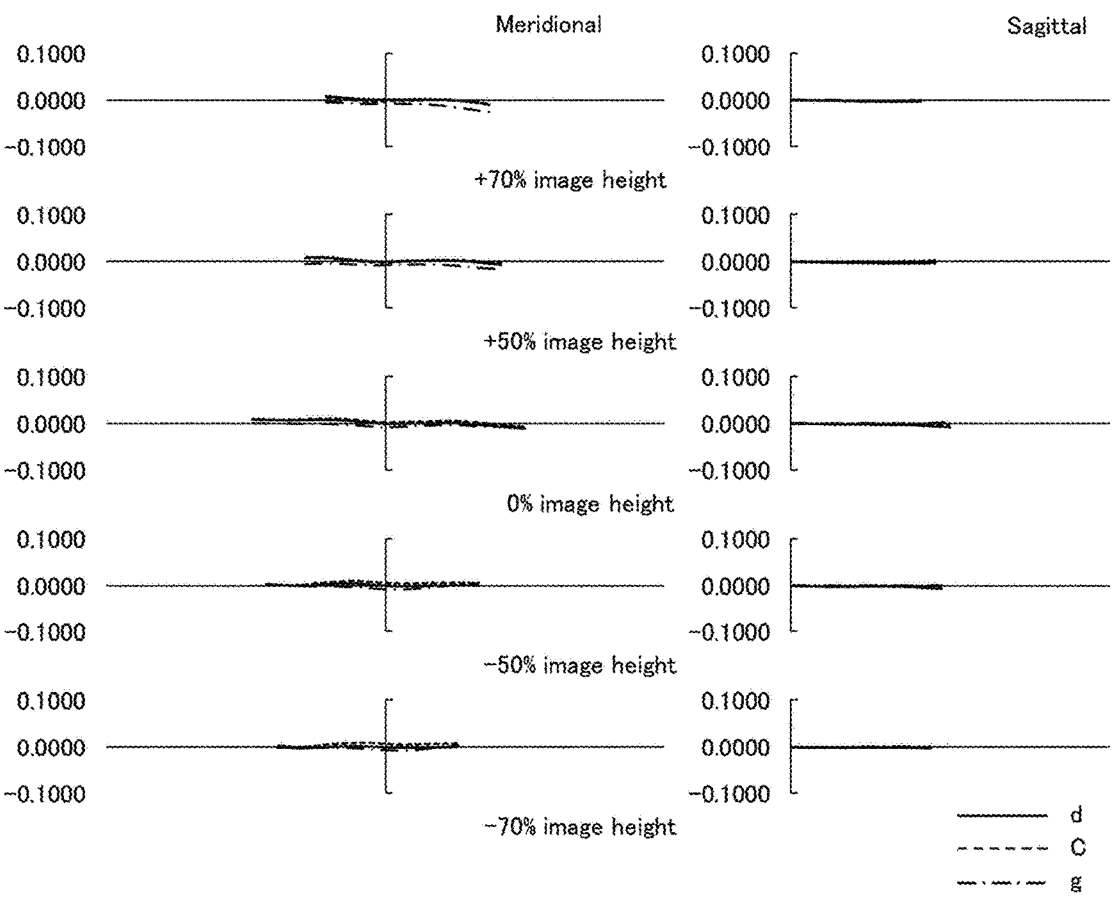
FIG. 31 is a lateral aberration diagram at the telephoto end when focusing on infinity and compensating for a tilt of 0.4° in Example 2.
Figure 32:
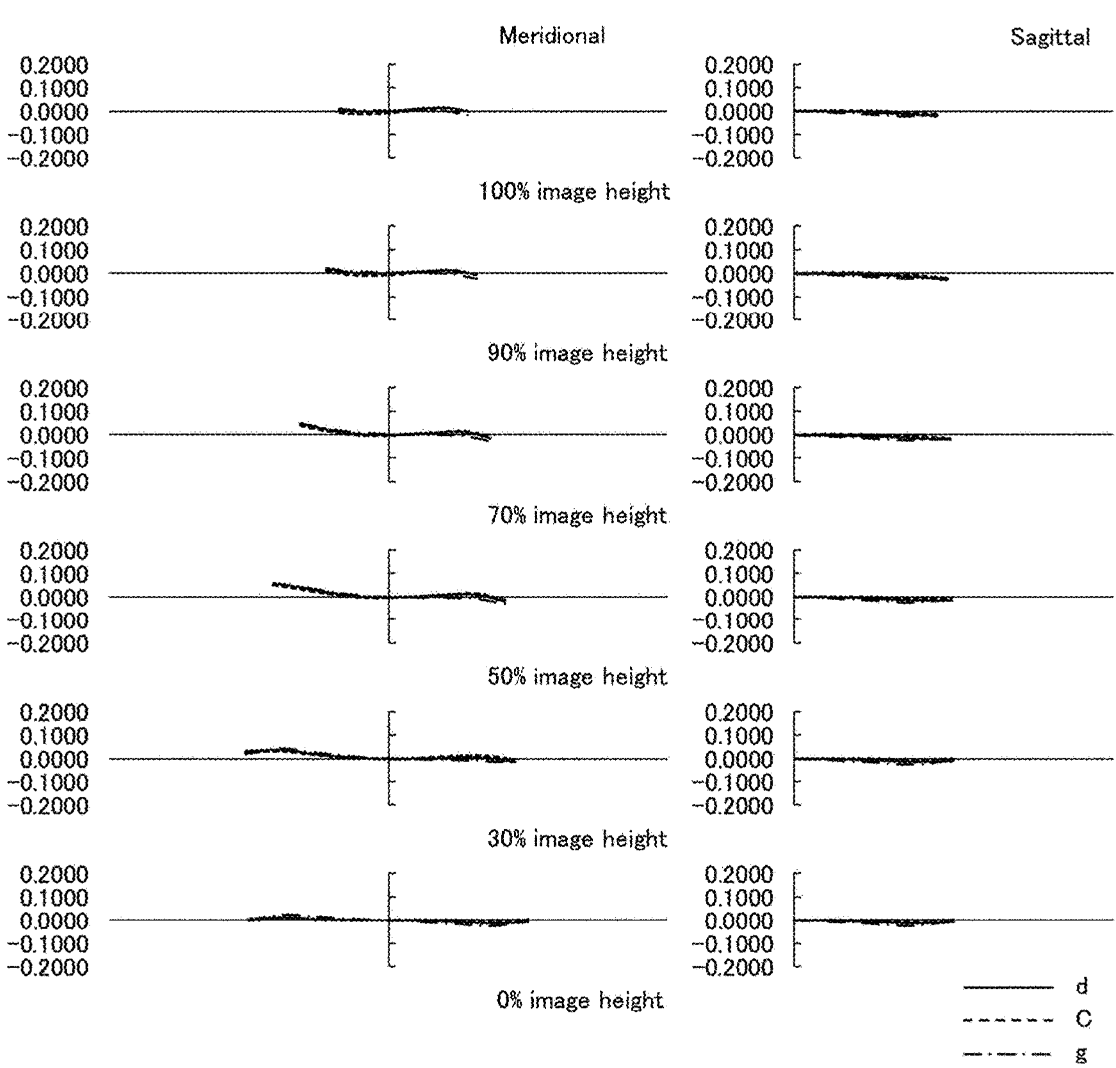
FIG. 32 is a lateral aberration diagram at the telephoto end at a focusing distance of 1.0 m in Example 2.

FIG. 17 is a lens configuration diagram of a large aperture ratio telephoto zoom lens according to Example 2 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a convex meniscus lens having the convex surface on the object side. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a biconvex lens, a cemented lens composed of a convex meniscus lens having the convex surface on the image side and a biconcave lens, a cemented lens composed of a biconvex lens and a concave meniscus lens having the convex surface on the image side, and a biconvex lens. The sixth lens group G6 is configured with a convex meniscus lens having the convex surface on the image side, and a concave meniscus lens having the convex surface on the object side. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 2 are shown below.

Numerical Data in Example 2

Unit: mm

Surface Data

| Surface Number | r | d | nd | νd | PgF |
|---|---|---|---|---|---|
| Object Surface | ∞ | (d0) | | | |
| 1 | 201.8060 | 2.0000 | 1.78590 | 43.94 | 0.5612 |
| 2 | 105.8912 | 7.9804 | 1.43700 | 95.10 | 0.5336 |
| 3 | −1011.6555 | 0.1500 | | | |
| 4 | 85.6799 | 7.8992 | 1.43700 | 95.10 | 0.5336 |
| 5 | 1429.1643 | (d5) | | | |
| 6 | 76.2392 | 1.5000 | 1.43700 | 95.10 | 0.5336 |
| 7 | 39.5071 | (d7) | | | |
| 8 | −106.8615 | 1.1000 | 1.55032 | 75.50 | 0.5401 |
| 9 | 46.3999 | 2.0369 | 1.85883 | 30.00 | 0.5979 |
| 10 | 64.7231 | (d10) | | | |
| 11 | 47.2558 | 2.4919 | 1.87070 | 40.73 | 0.5682 |
| 12 | 79.3262 | (d12) | | | |
| 13 (diaphragm) | ∞ | 1.2000 | | | |
| 14* | 56.7887 | 2.3947 | 1.80610 | 40.73 | 0.5694 |
| 15 | 69.4898 | 0.1500 | | | |
| 16 | 42.6395 | 1.0500 | 1.80610 | 33.27 | 0.5884 |
| 17 | 27.2874 | 7.2299 | 1.43700 | 95.10 | 0.5336 |
| 18 | −2147.7312 | 2.4306 | | | |
| 19 | −96.8389 | 2.0192 | 1.80809 | 22.76 | 0.6307 |
| 20 | −58.8663 | 1.6900 | 1.69350 | 53.20 | 0.5467 |
| 21* | 68.4326 | 1.0000 | | | |
| 22 | 43.5305 | 7.7797 | 1.43700 | 95.10 | 0.5336 |
| 23 | −46.1550 | 1.0500 | 1.85451 | 25.15 | 0.6103 |
| 24 | −1917.4093 | 0.1500 | | | |
| 25* | 66.4693 | 6.3689 | 1.76450 | 49.09 | 0.5528 |
| 26* | −52.4075 | (d26) | | | |
| 27 | −338.8610 | 1.9804 | 1.86966 | 20.02 | 0.6435 |
| 28 | −86.9582 | 0.1500 | | | |
| 29 | 1077.5821 | 0.8000 | 1.75500 | 52.32 | 0.5473 |
| 30 | 32.0123 | (d30) | | | |
| 31 | 58.1923 | 5.7890 | 1.65100 | 56.24 | 0.5420 |
| 32 | −72.1469 | (d32) | | | |
| 33 | −407.3581 | 1.0000 | 1.43700 | 95.10 | 0.5336 |
| 34 | 46.2549 | 6.7685 | | | |
| 35 | −31.6244 | 1.0000 | 1.49700 | 81.61 | 0.5389 |
| 36 | −120.0951 | 29.3500 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 4.96457 | 0.16956 |
| A4 | −1.92978E−06 | −2.30167E−06 | −7.33469E−06 | 9.33560E−07 |
| A6 | −1.13041E−09 | 1.60528E−08 | 3.73637E−09 | 3.87233E−11 |
| A8 | −4.14285E−12 | −2.79593E−10 | −2.02728E−11 | −5.76068E−12 |
| A10 | 2.70122E−15 | 3.56333E−12 | 3.96198E−14 | 1.59399E−14 |
| A12 | 0.00000E+00 | −2.99479E−14 | −3.21454E−17 | −1.13648E−17 |
| A14 | 0.00000E+00 | 1.59267E−16 | 0.00000E+00 | 0.00000E+00 |
| A16 | 0.00000E+00 | −5.13117E−19 | 0.00000E+00 | 0.00000E+00 |
| A18 | 0.00000E+00 | 9.08562E−22 | 0.00000E+00 | 0.00000E+00 |
| A20 | 0.00000E+00 | −6.73031E−25 | 0.00000E+00 | 0.00000E+00 |

Various Data

| Zoom Ratio | 2.69 | | |
|---|---|---|---|
| | Wide Angle | Mid Range | Telephoto |
| Focal Length | 72.10 | 118.00 | 194.00 |
| F Number | 2.91 | 2.88 | 2.92 |
| Total Angle of View 2ω | 32.88 | 19.99 | 12.19 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 37.2532 | 74.4490 |
| d7 | 12.9395 | 13.3049 | 7.0327 |
| d10 | 41.0706 | 14.4825 | 1.7781 |
| d12 | 31.1131 | 22.0825 | 3.8635 |
| d26 | 8.6126 | 7.3749 | 3.0000 |
| d30 | 11.4375 | 10.2207 | 18.8143 |
| d32 | 4.8173 | 7.2720 | 3.0531 |
| BF | 1.0000 | 1.0000 | 1.0001 |
| d0 | 777.9999 | 777.9999 | 777.9999 |
| d5 | 2.0000 | 37.2532 | 74.4490 |
| d7 | 12.9395 | 13.3049 | 7.0327 |
| d10 | 41.0706 | 14.4825 | 1.7781 |
| d12 | 31.1131 | 22.0825 | 3.8635 |
| d26 | 9.9108 | 10.8385 | 10.9847 |
| d30 | 9.1040 | 4.3824 | 4.6119 |
| d32 | 5.8529 | 9.6469 | 9.2710 |
| BF | 0.9999 | 0.9999 | 0.9999 |

| Lens Group Data | | |
|---|---|---|
| Lens Group | Starting Surface | Focal Length |
| G1 | 1 | 172.14 |
| G2 | 6 | −190.00 |
| G3 | 8 | −84.94 |
| G4 | 11 | 129.56 |
| G5 | 13 | 55.25 |
| G6 | 27 | −65.06 |
| G7 | 31 | 50.36 |
| G8 | 33 | −43.74 |

Example 3

Figure 33:
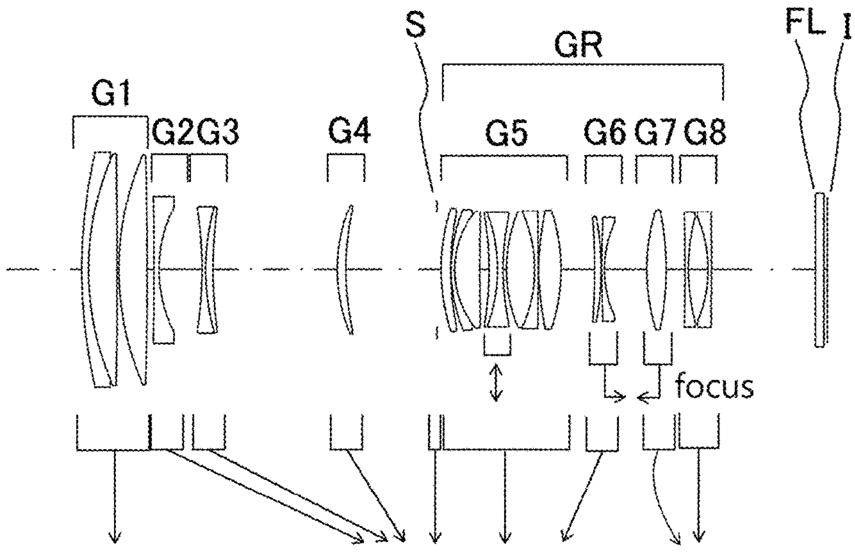
FIG. 33 is a lens configuration diagram according to Example 3 of the present invention.
Figure 34:
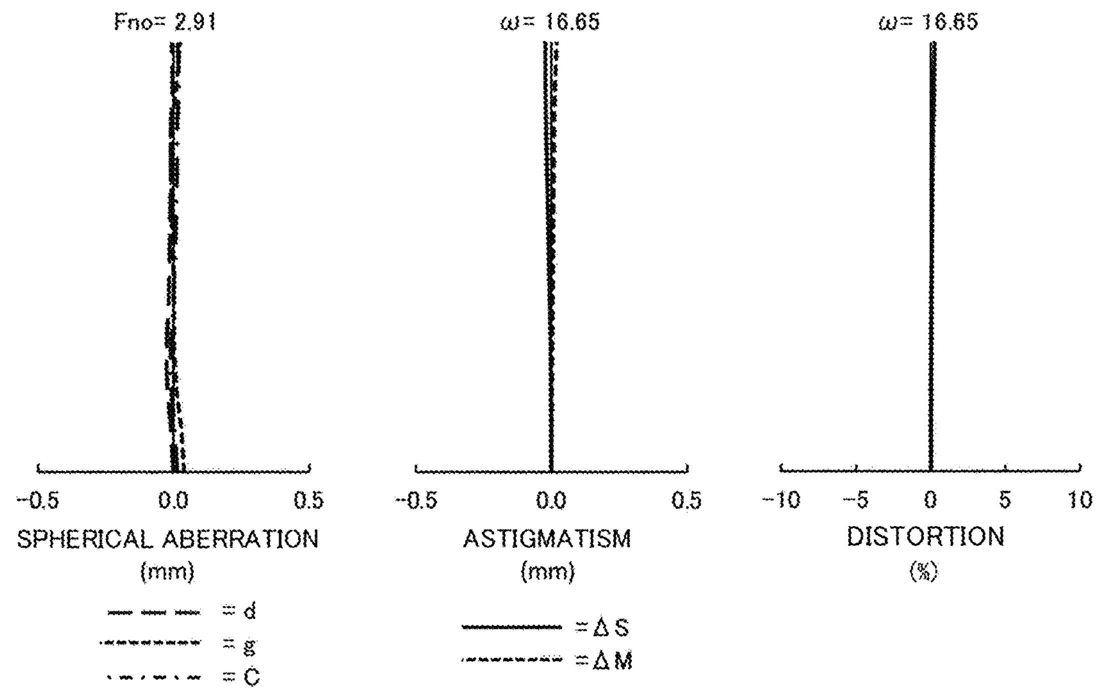
FIG. 34 is a longitudinal aberration diagram at the wide-angle end when focusing on infinity in Example 3.
Figure 35:
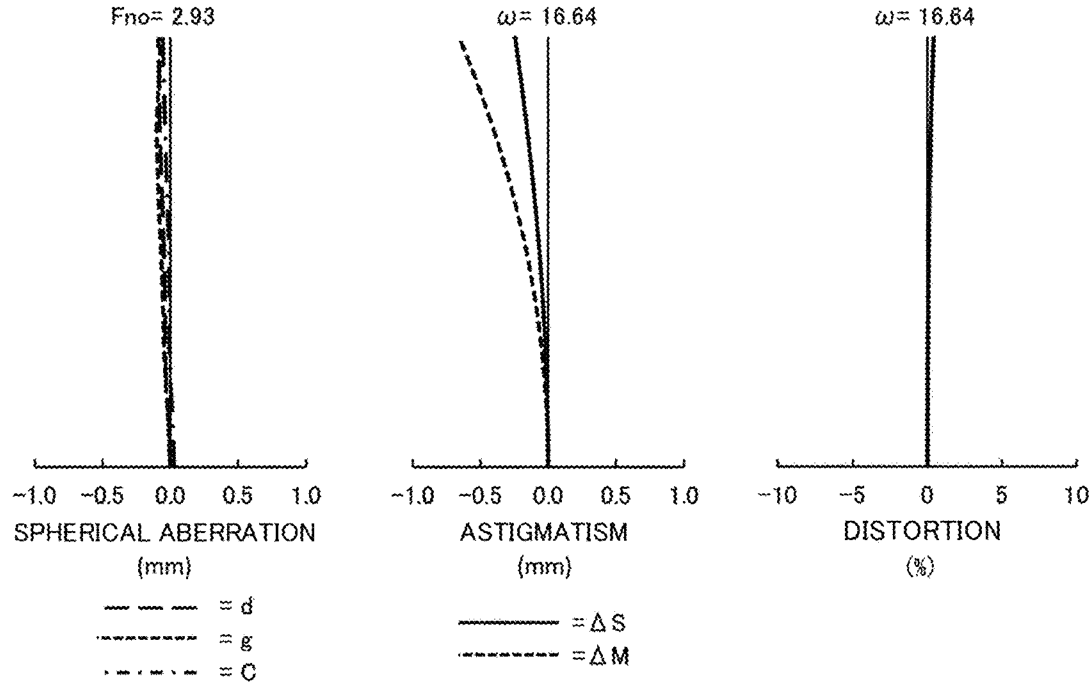
FIG. 35 is a longitudinal aberration diagram at the wide-angle end at a focusing distance of 1.0 m in Example 3.
Figure 36:
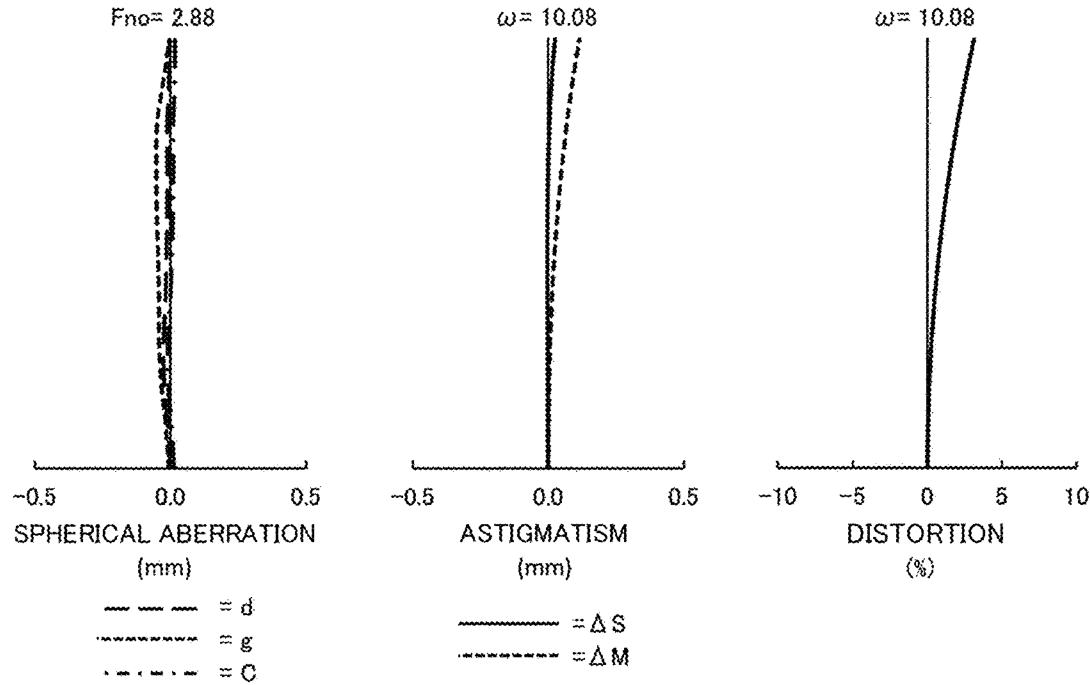
FIG. 36 is a longitudinal aberration diagram at an intermediate focal length when focusing on infinity in Example 3.
Figure 37:
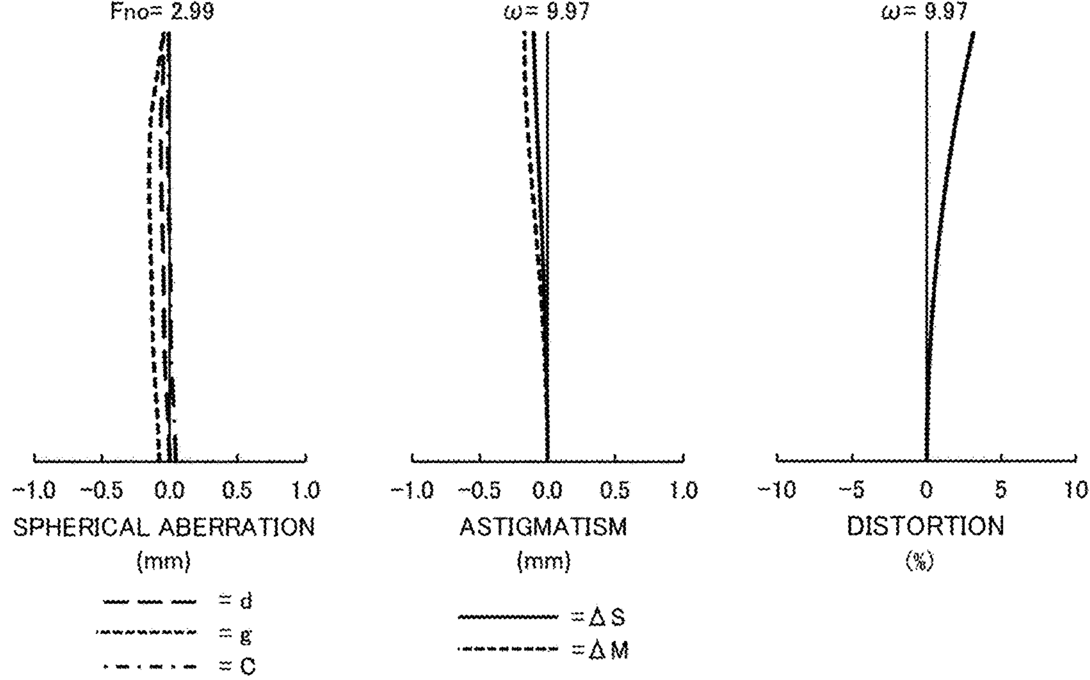
FIG. 37 is a longitudinal aberration diagram at an intermediate focal length at a focusing distance of 1.0 m in Example 3.
Figure 38:
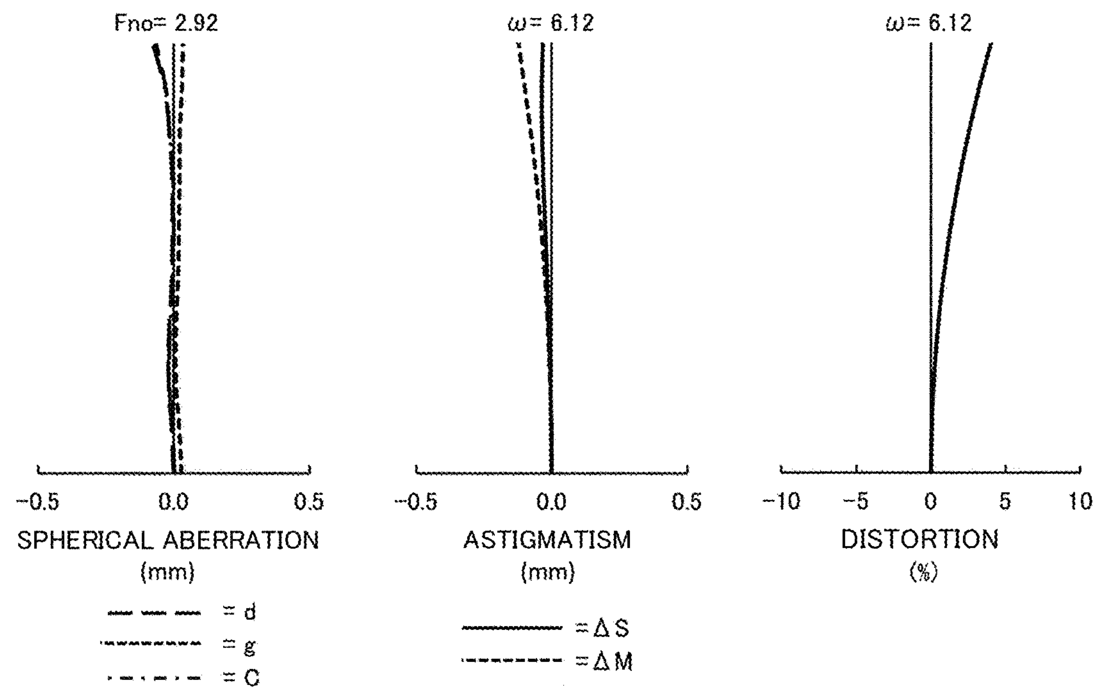
FIG. 38 is a longitudinal aberration diagram at the telephoto end when focusing on infinity in Example 3.
Figure 39:
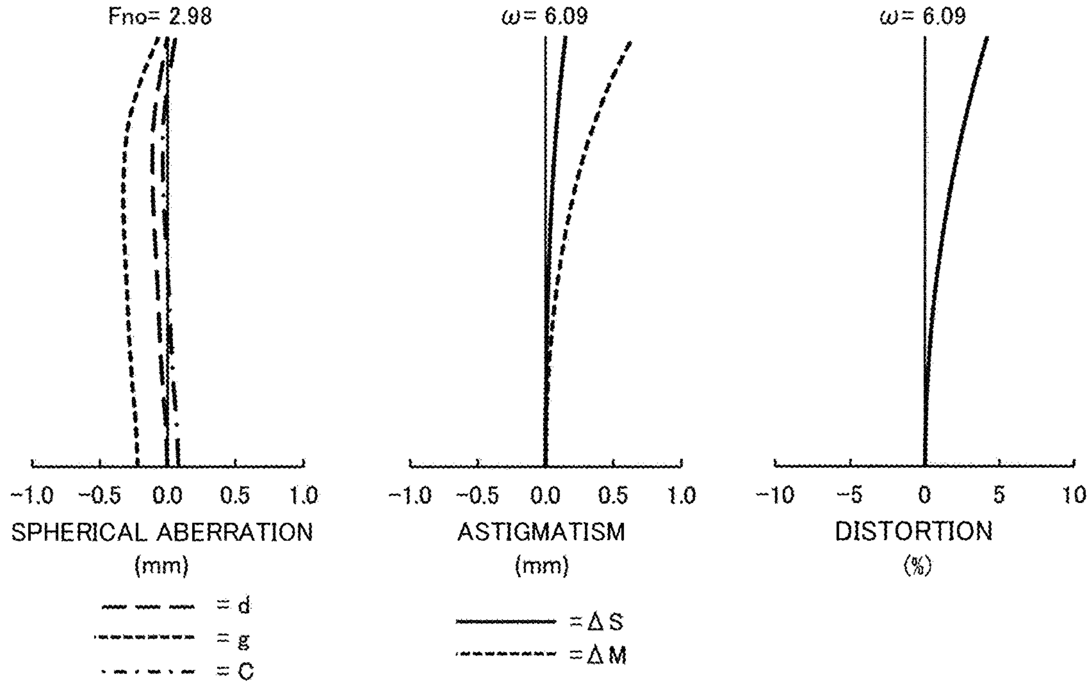
FIG. 39 is a longitudinal aberration diagram at the telephoto end at a focusing distance of 1.0 m in Example 3.
Figure 40:
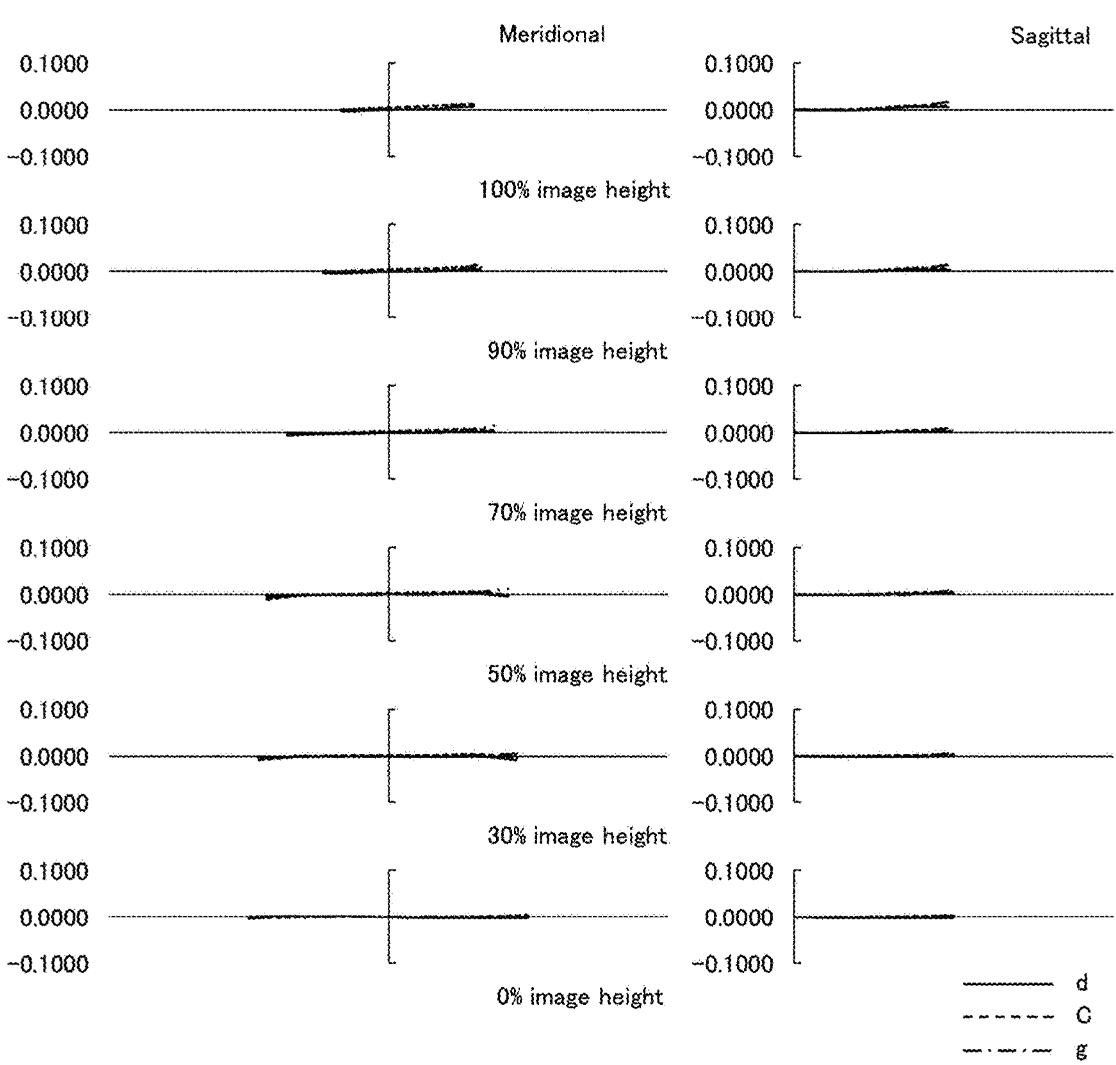
FIG. 40 is a lateral aberration diagram at the wide-angle end when focusing on infinity in Example 3.
Figure 41:
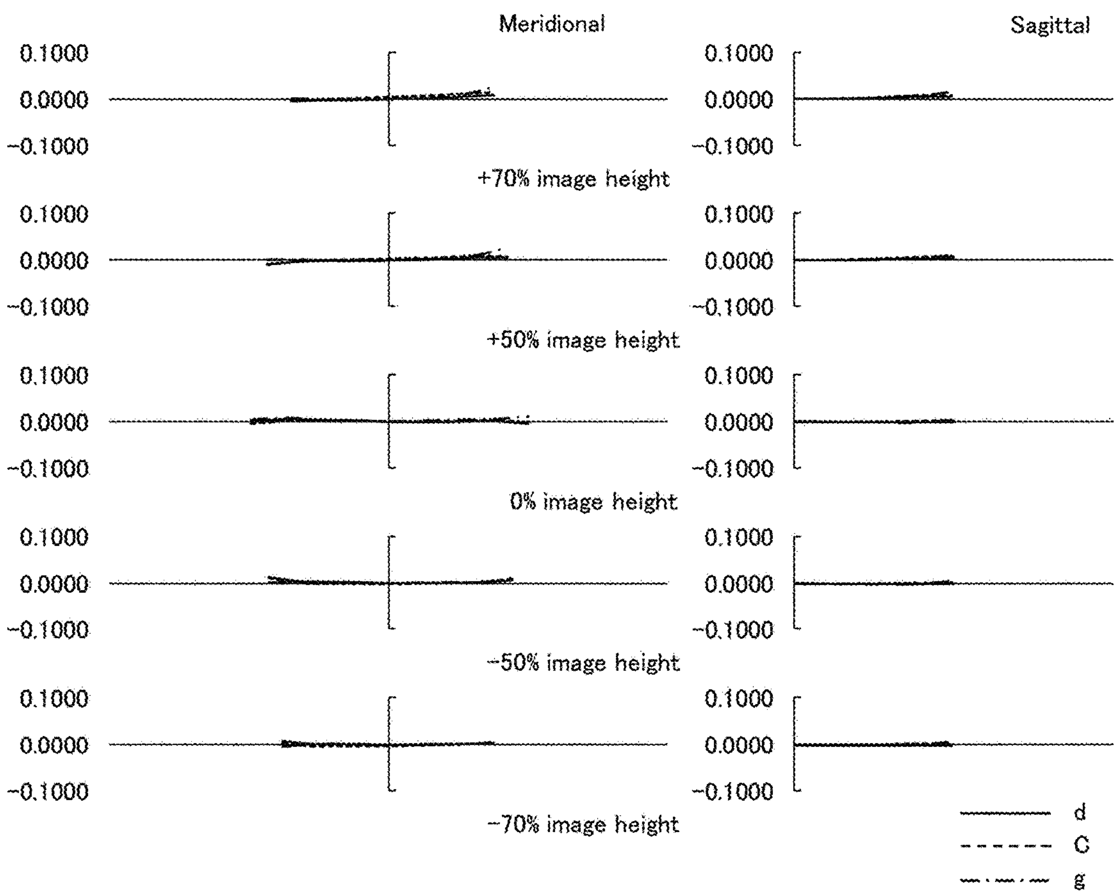
FIG. 41 is a lateral aberration diagram at the wide-angle end when focusing on infinity and compensating for a tilt of 0.4° in Example 3.
Figure 42:
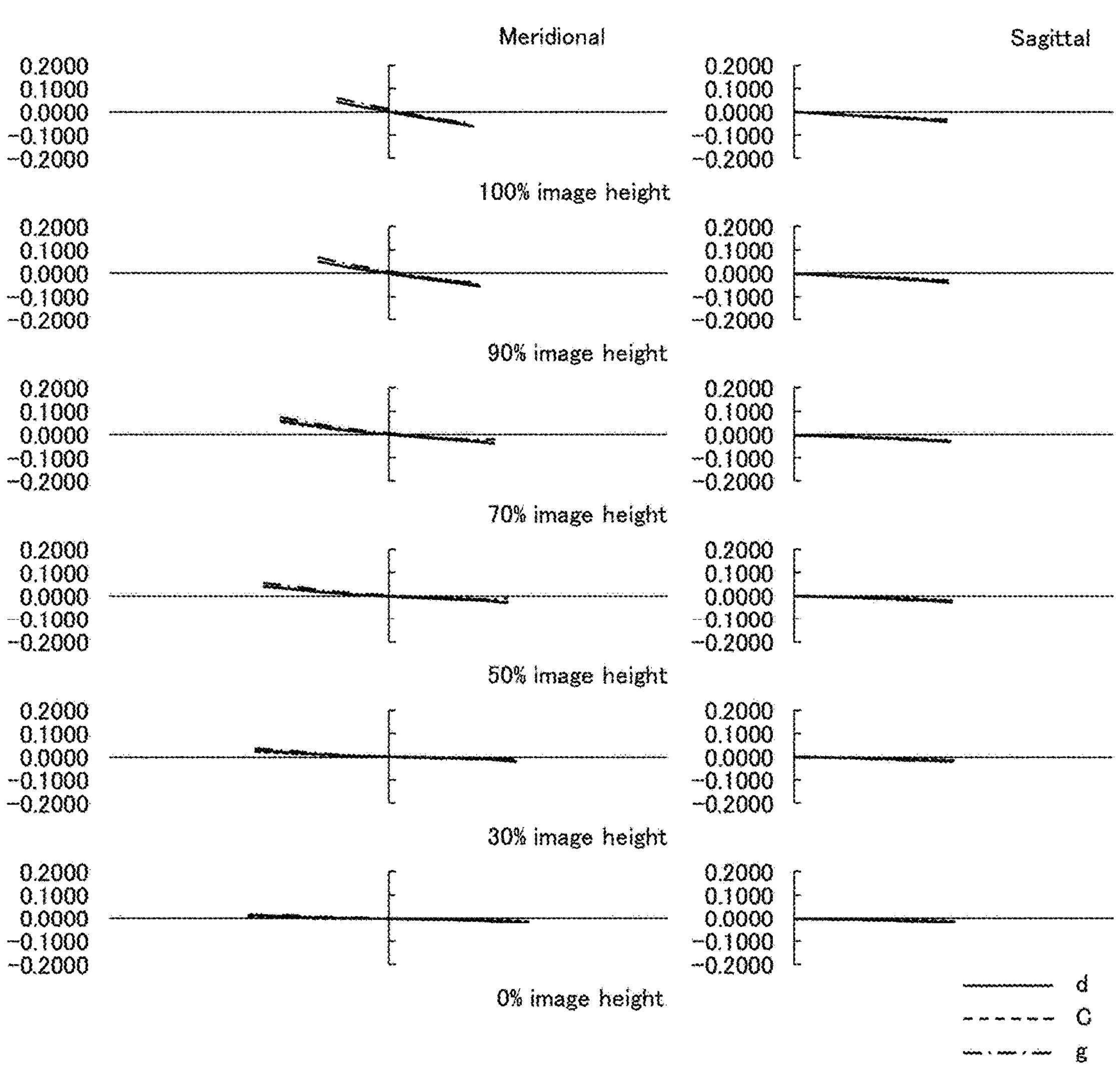
FIG. 42 is a lateral aberration diagram at the wide-angle end at a focusing distance of 1.0 m in Example 3.
Figure 43:
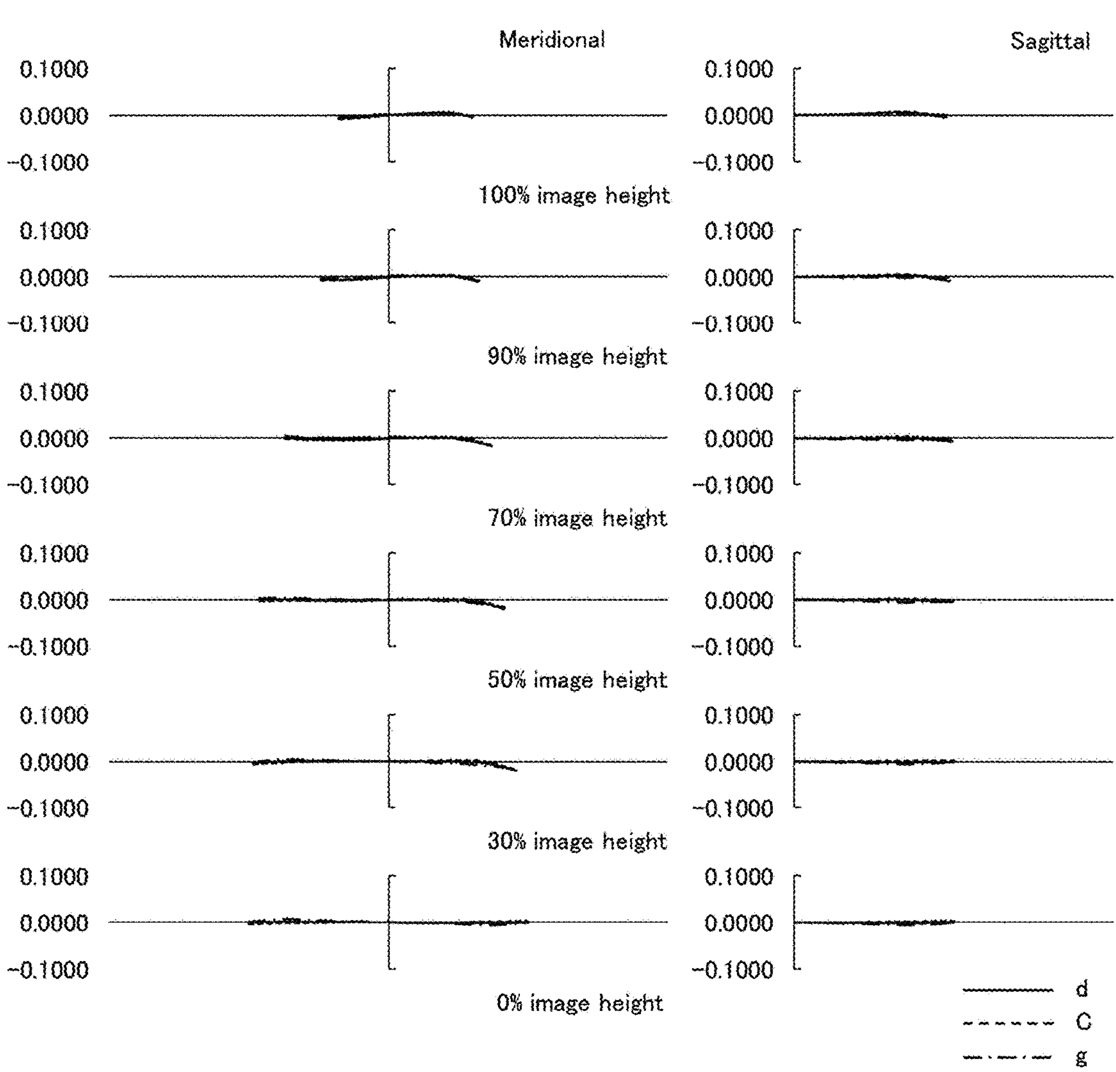
FIG. 43 is a lateral aberration diagram at an intermediate focal length when focusing on infinity in Example 3.
Figure 44:
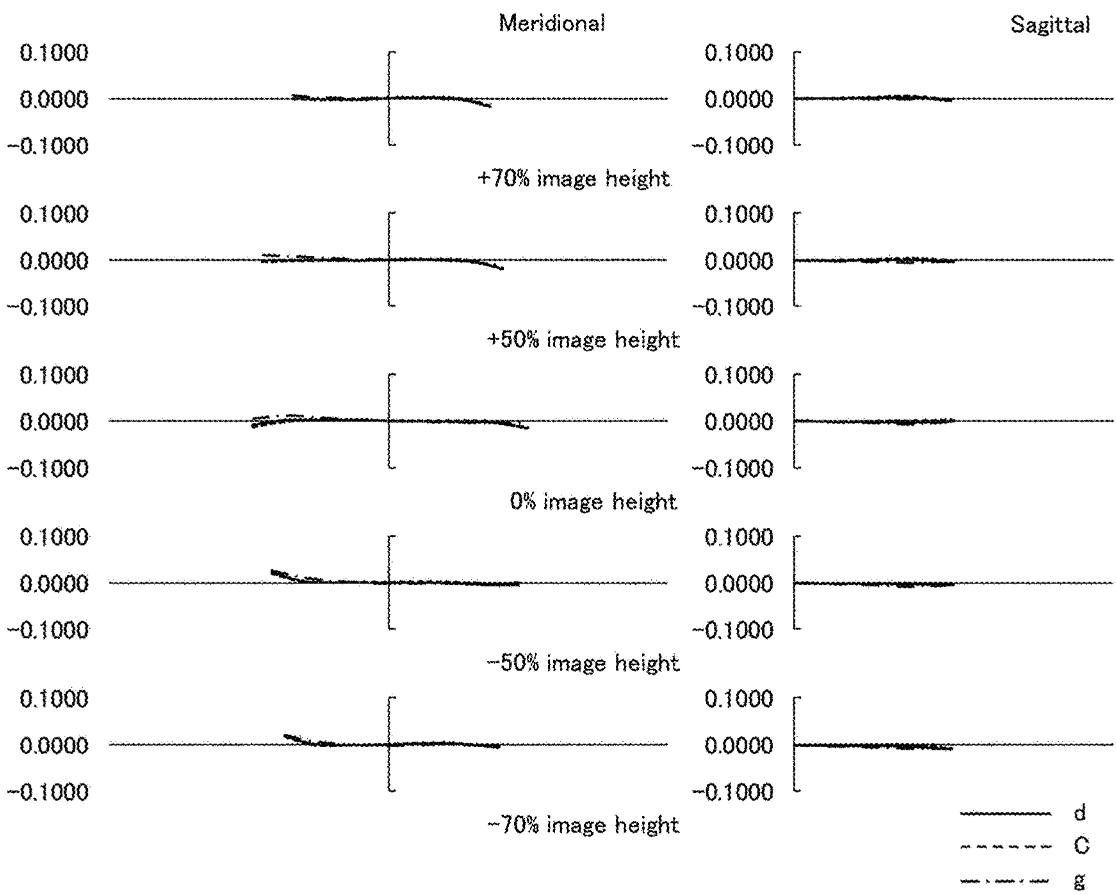
FIG. 44 is a lateral aberration diagram at an intermediate focal length when focusing on infinity and compensating for a tilt of 0.4° in Example 3.
Figure 45:
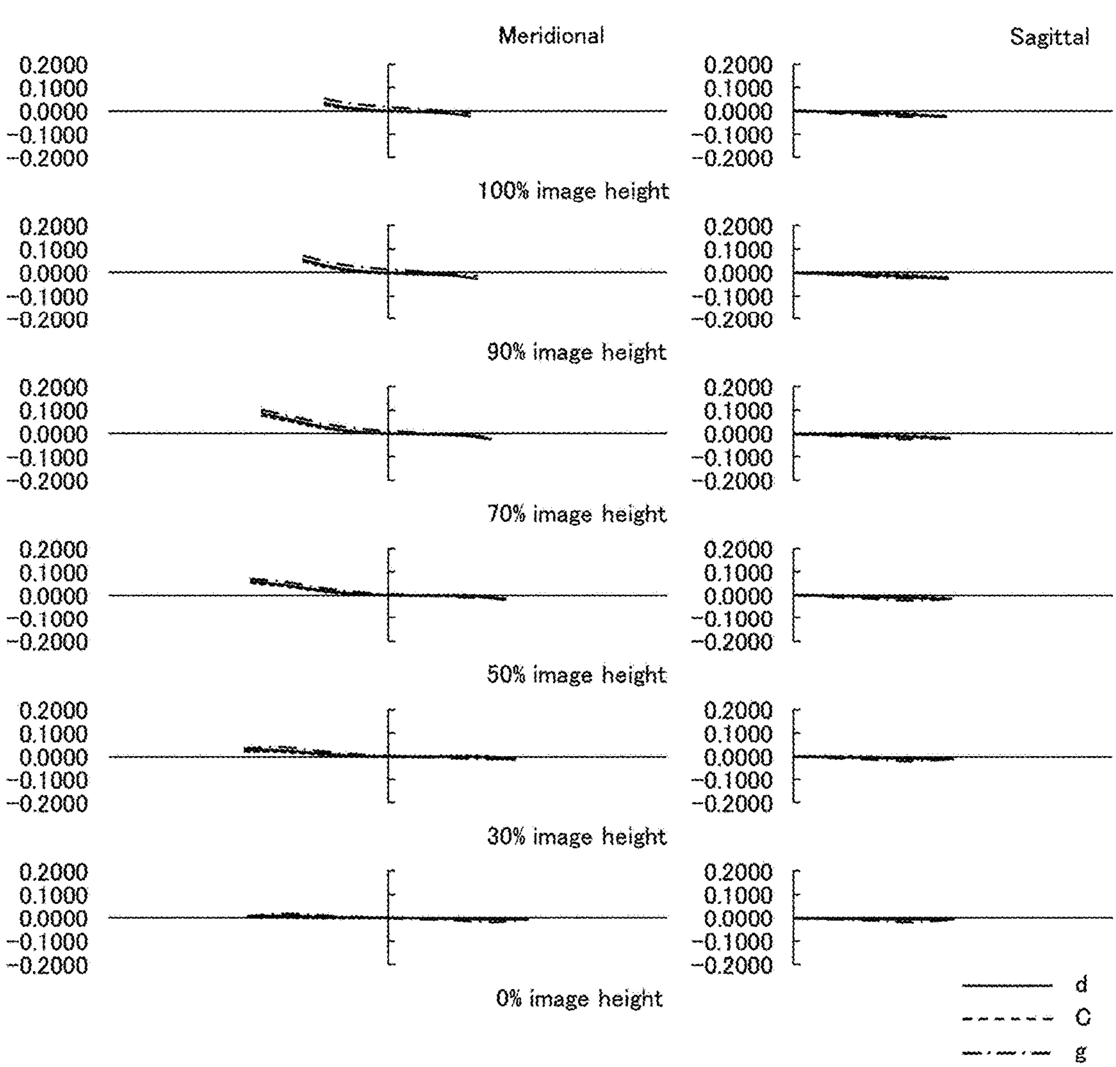
FIG. 45 is a lateral aberration diagram at an intermediate focal length at a focusing distance of 1.0 m in Example 3.
Figure 46:
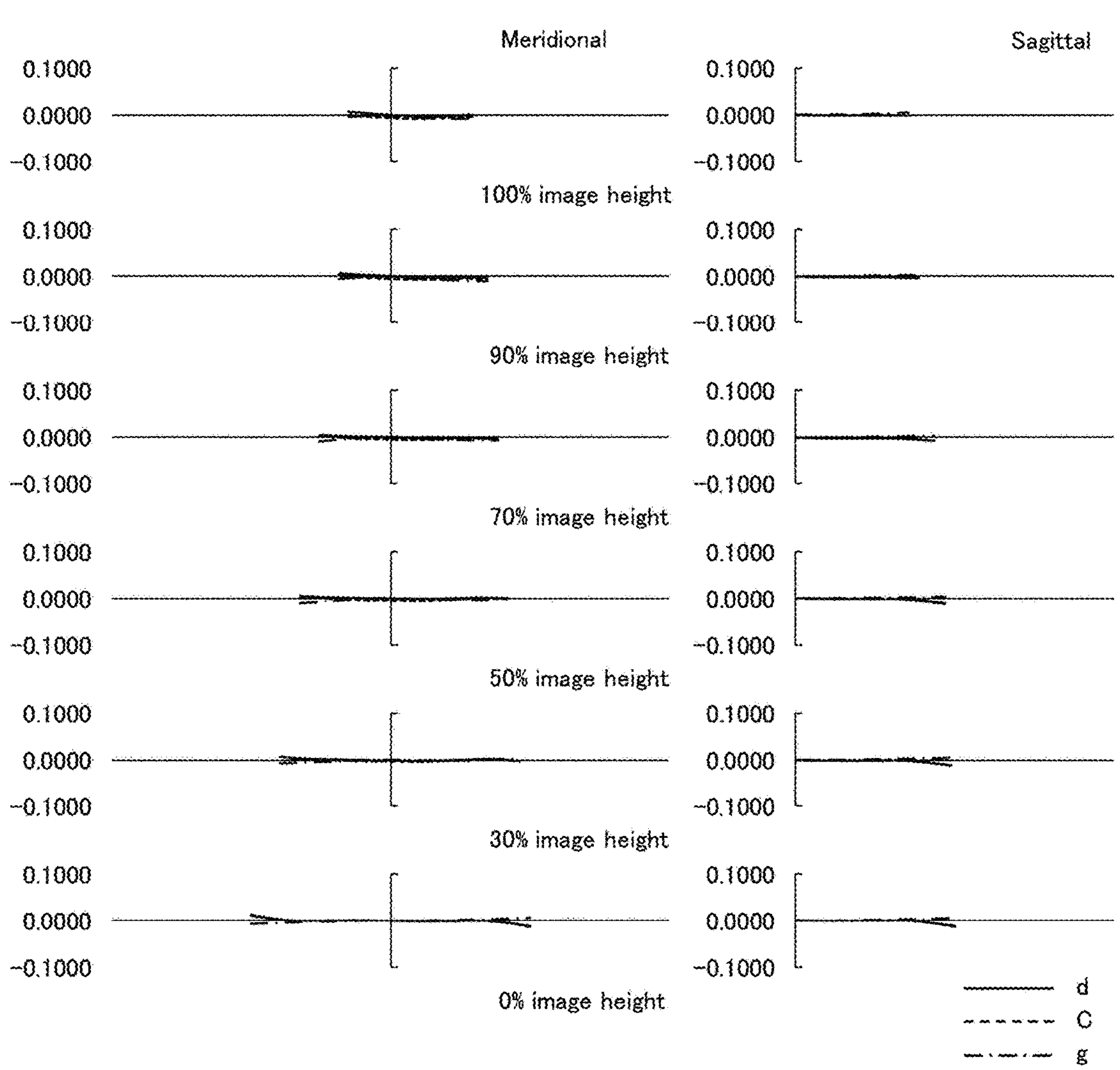
FIG. 46 is a lateral aberration diagram at the telephoto end when focusing on infinity in Example 3.
Figure 47:
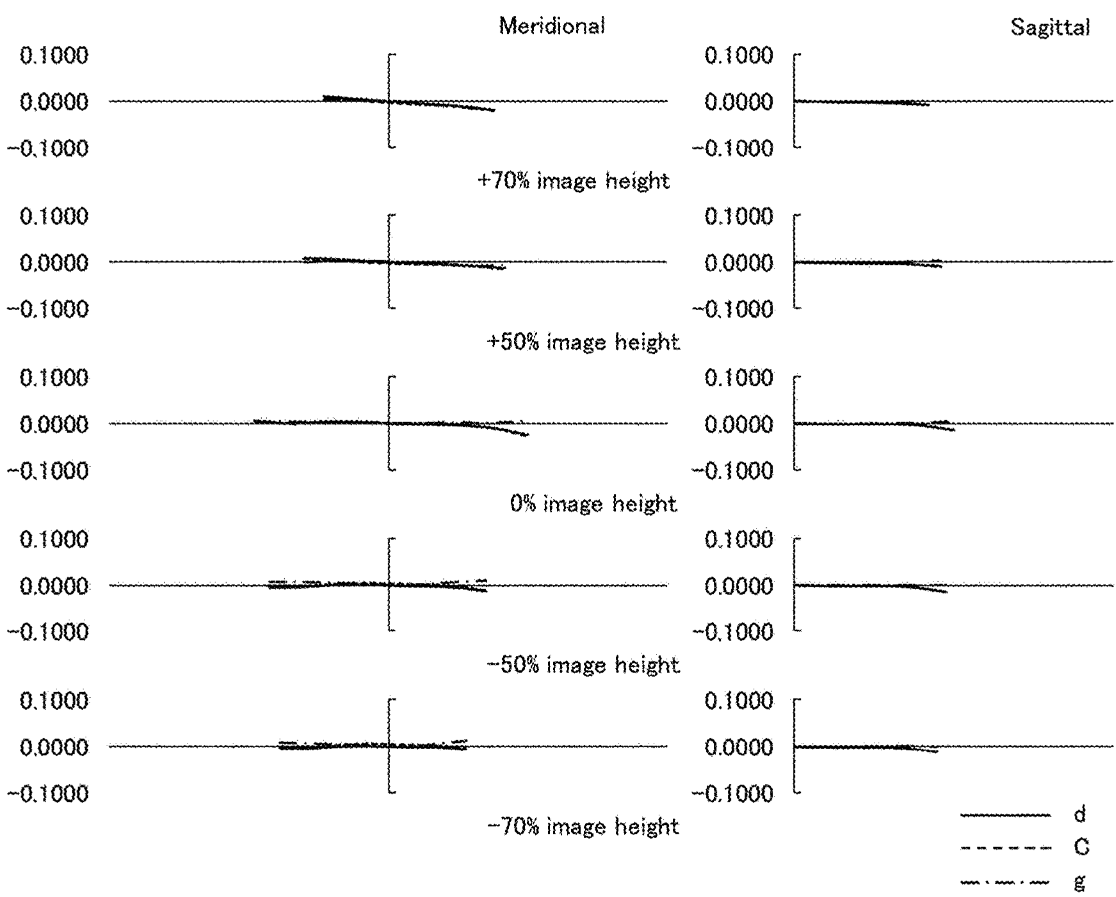
FIG. 47 is a lateral aberration diagram at the telephoto end when focusing on infinity and compensating for a tilt of 0.4° in Example 3.
Figure 48:
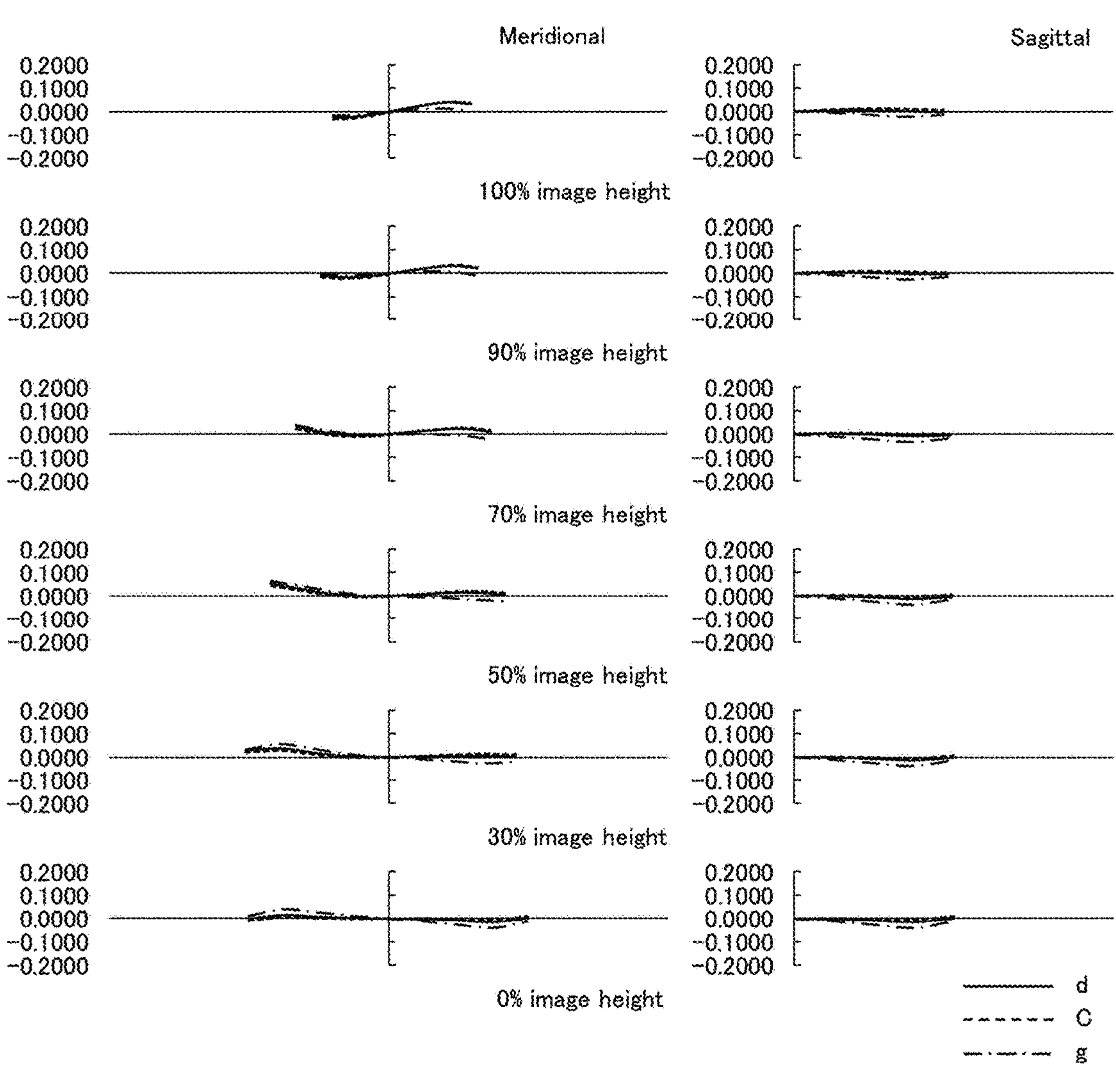
FIG. 48 is a lateral aberration diagram at the telephoto end at a focusing distance of 1.0 m in Example 3.

FIG. 33 is a lens configuration diagram of a large aperture ratio telephoto zoom lens according to Example 3 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a biconvex lens. The second lens group G2 is configured with a biconcave lens. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a convex meniscus lens having the convex surface on the object side, a cemented lens composed of a convex meniscus lens having the convex surface on the image side and a biconcave lens, a cemented lens composed of a biconvex lens and a concave meniscus lens having the convex surface on the image side, and a biconvex lens. The sixth lens group G6 is configured with a convex meniscus lens having the convex surface on the image side, and a concave meniscus lens having the convex surface on the object side. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 3 are shown below.

Numerical Data in Example 3

Unit: mm

Surface Data

| Surface Number | r | d | nd | vd | PgF |
|---|---|---|---|---|---|
| Object Surface | ∞ | (d0) | | | |
| 1 | 156.9796 | 2.0000 | 1.78590 | 43.94 | 0.5612 |
| 2 | 85.3845 | 8.5276 | 1.43700 | 95.10 | 0.5336 |
| 3 | −1980.1722 | 0.5095 | | | |
| 4 | 85.7751 | 8.4437 | 1.43700 | 95.10 | 0.5336 |
| 5 | −1258.1178 | (d5) | | | |
| 6 | −1191.1375 | 1.5000 | 1.43700 | 95.10 | 0.5336 |
| 7 | 40.6886 | (d7) | | | |
| 8 | −118.7428 | 1.1000 | 1.55032 | 75.50 | 0.5401 |
| 9 | 69.3889 | 2.1902 | 1.85883 | 30.00 | 0.5979 |
| 10 | 133.3243 | (d10) | | | |
| 11 | 49.0749 | 2.5818 | 1.87070 | 40.73 | 0.5682 |
| 12 | 81.7816 | (d12) | | | |
| 13 (diaphragm) | ∞ | 1.2000 | | | |
| 14* | 56.8046 | 2.8362 | 1.80610 | 40.73 | 0.5694 |
| 15 | 82.8021 | 0.1540 | | | |
| 16 | 46.6954 | 1.0500 | 1.80610 | 33.27 | 0.5884 |
| 17 | 27.3397 | 7.4980 | 1.43700 | 95.10 | 0.5336 |
| 18 | 1144.4831 | 2.7367 | | | |
| 19 | −93.1595 | 2.4912 | 1.80809 | 22.76 | 0.6307 |
| 20 | −48.1836 | 1.6900 | 1.69350 | 53.20 | 0.5467 |
| 21* | 72.2489 | 1.0000 | | | |
| 22 | 45.2319 | 8.4013 | 1.43700 | 95.10 | 0.5336 |
| 23 | −41.2777 | 1.0500 | 1.85451 | 25.15 | 0.6103 |
| 24 | 874.9949 | 0.1500 | | | |
| 25* | 68.0171 | 6.6299 | 1.76450 | 49.09 | 0.5528 |
| 26* | −54.1161 | (d26) | | | |
| 27 | −205.2127 | 1.9496 | 1.86966 | 20.02 | 0.6435 |
| 28 | −81.2197 | 0.1500 | | | |
| 29 | 310.4728 | 0.8000 | 1.75500 | 52.32 | 0.5473 |
| 30 | 33.1845 | (d30) | | | |
| 31 | 58.9542 | 5.7683 | 1.65100 | 56.24 | 0.5420 |
| 32 | −86.6040 | (d32) | | | |
| 33 | −524.3273 | 1.0000 | 1.43700 | 95.10 | 0.5336 |
| 34 | 61.7221 | 5.8558 | | | |
| 35 | −38.9454 | 1.0000 | 1.49700 | 81.61 | 0.5389 |
| 36 | −1506.4535 | 31.0090 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 5.29793 | −0.19961 |
| A4 | 1.18037E−06 | −1.62326E−06 | −6.23463E−06 | 1.15317E−06 |
| A6 | −7.10847E−10 | 1.01656E−08 | 6.78903E−10 | −7.66124E−10 |
| A8 | −1.22717E−12 | −1.87899E−10 | −1.35929E−11 | −8.16576E−12 |
| A10 | 3.16722E−16 | 2.27920E−12 | 4.18912E−14 | 3.85801E−14 |
| A12 | 0.00000E+00 | −1.74565E−14 | −8.84319E−17 | −8.42177E−17 |
| A14 | 0.00000E+00 | 8.30578E−17 | 0.00000E+00 | 0.00000E+00 |
| A16 | 0.00000E+00 | −2.35888E−19 | 0.00000E+00 | 0.00000E+00 |
| A18 | 0.00000E+00 | 3.60812E−22 | 0.00000E+00 | 0.00000E+00 |
| A20 | 0.00000E+00 | −2.22973E−25 | 0.00000E+00 | 0.00000E+00 |

Various Data

| Zoom Ratio | | 2.69 | |
|---|---|---|---|
| | Wide Angle | Mid Range | Telephoto |
| Focal Length | 72.10 | 118.00 | 193.99 |
| F Number | 2.91 | 2.88 | 2.92 |
| Total Angle of View 2ω | 33.31 | 20.15 | 12.23 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 35.4154 | 64.6108 |
| d7 | 12.8043 | 7.2535 | 7.0717 |
| d10 | 36.9836 | 16.7586 | 1.0000 |
| d12 | 27.1547 | 19.5150 | 6.2600 |
| d26 | 10.0273 | 7.9500 | 3.0000 |
| d30 | 12.6091 | 13.2276 | 22.2846 |
| d32 | 5.6482 | 7.1072 | 3.0000 |
| BF | 1.0000 | 0.9997 | 1.0001 |
| d0 | 777.9999 | 777.9992 | 777.9992 |
| d5 | 2.0000 | 35.4154 | 64.6108 |
| d7 | 12.8043 | 7.2535 | 7.0717 |
| d10 | 36.9836 | 16.7586 | 1.0000 |
| d12 | 27.1547 | 19.5150 | 6.2600 |
| d26 | 1.2818 | 11.3344 | 10.5321 |
| d30 | 10.0749 | 6.9231 | 7.1010 |
| d32 | 6.9282 | 10.0282 | 10.6524 |
| BF | 0.9998 | 0.9996 | 1.0000 |

| Lens Group Data | | |
|---|---|---|
| Lens Group | Starting Surface | Focal Length |
| G1 | 1 | 153.22 |
| G2 | 6 | −90.00 |
| G3 | 8 | −150.65 |
| G4 | 11 | 135.94 |
| G5 | 13 | 59.28 |
| G6 | 27 | −72.57 |
| G7 | 31 | 54.74 |
| G8 | 33 | −47.78 |

Example 4

Figure 49:
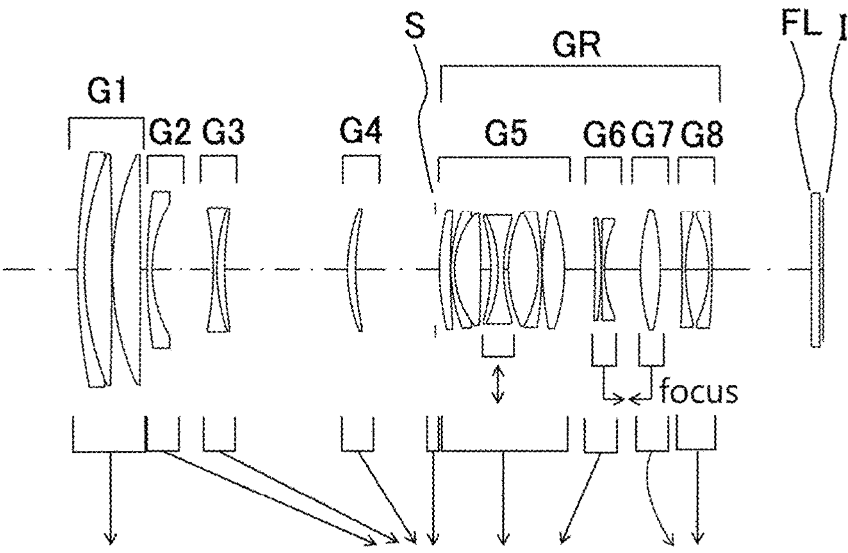
FIG. 49 is a lens configuration diagram according to Example 4 of the present invention.
Figure 50:
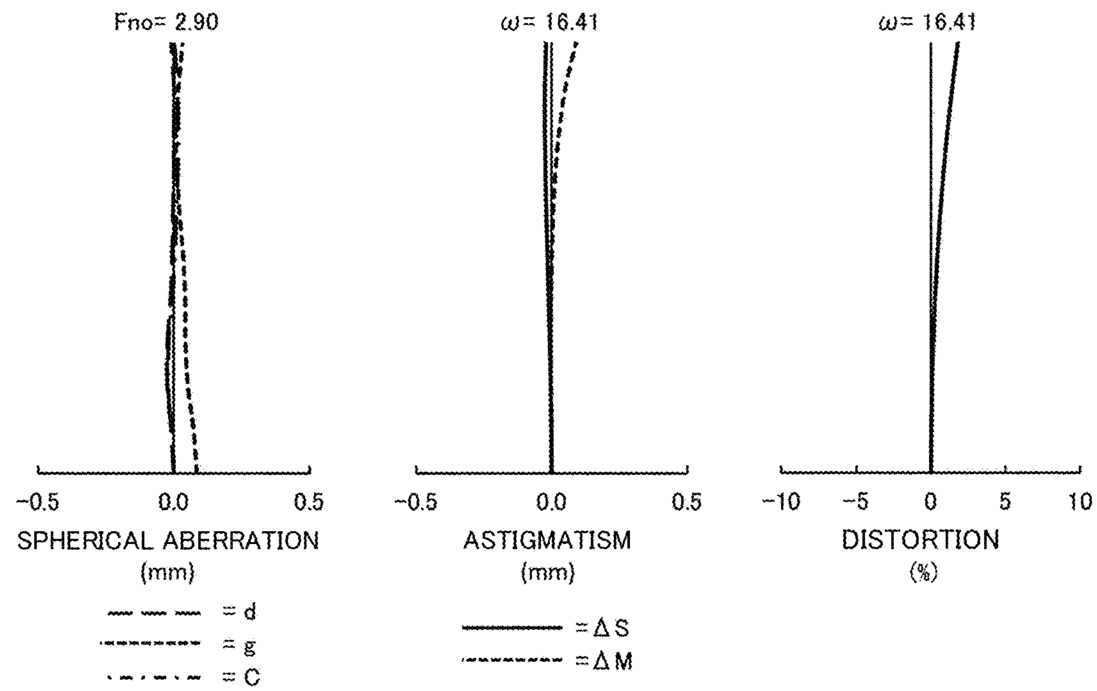
FIG. 50 is a longitudinal aberration diagram at the wide-angle end when focusing on infinity in Example 4.
Figure 51:
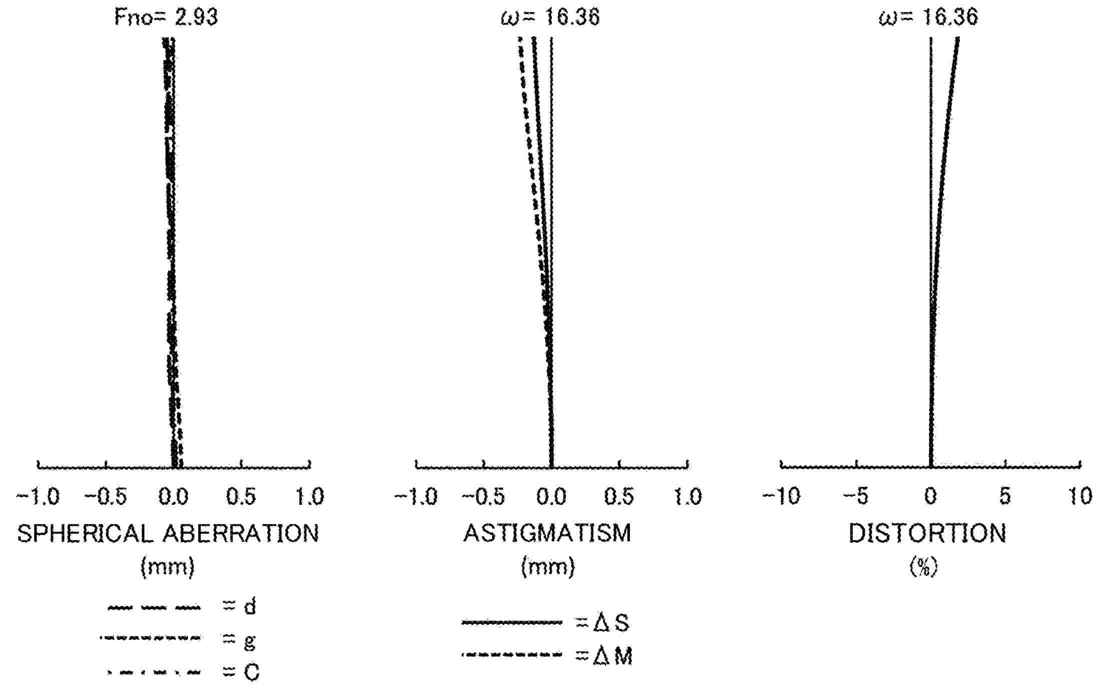
FIG. 51 is a longitudinal aberration diagram at the wide-angle end at a focusing distance of 1.0 m in Example 4.
Figure 52:
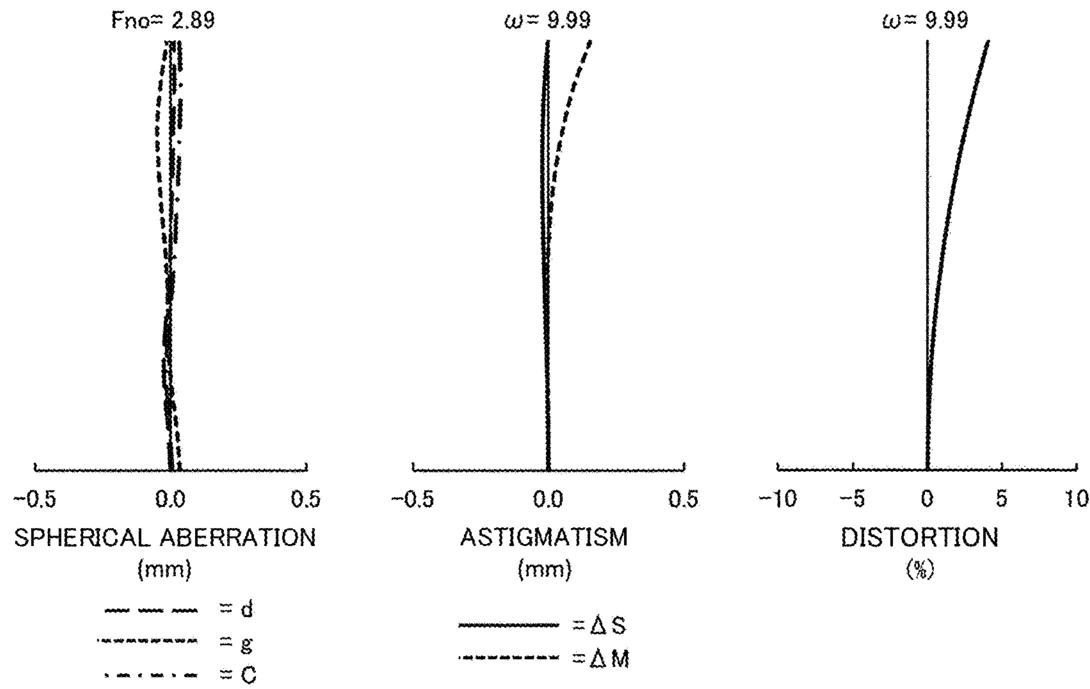
FIG. 52 is a longitudinal aberration diagram at an intermediate focal length when focusing on infinity in Example 4.
Figure 53:
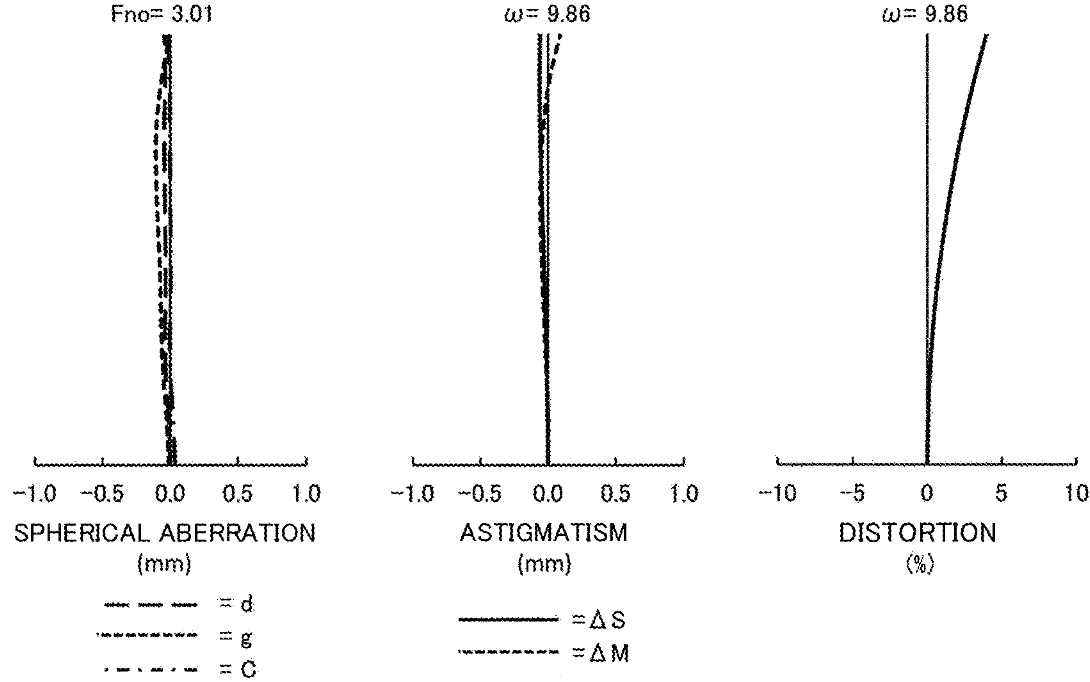
FIG. 53 is a longitudinal aberration diagram at an intermediate focal length at a focusing distance of 1.0 m in Example 4.
Figure 54:
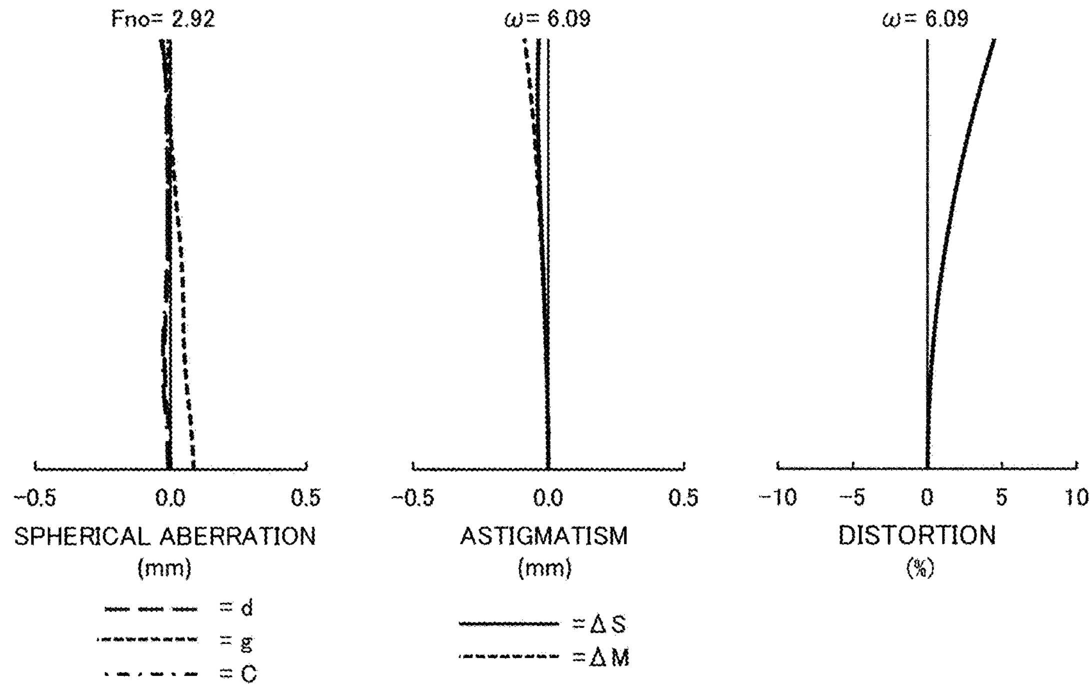
FIG. 54 is a longitudinal aberration diagram at the telephoto end when focusing on infinity in Example 4.
Figure 55:
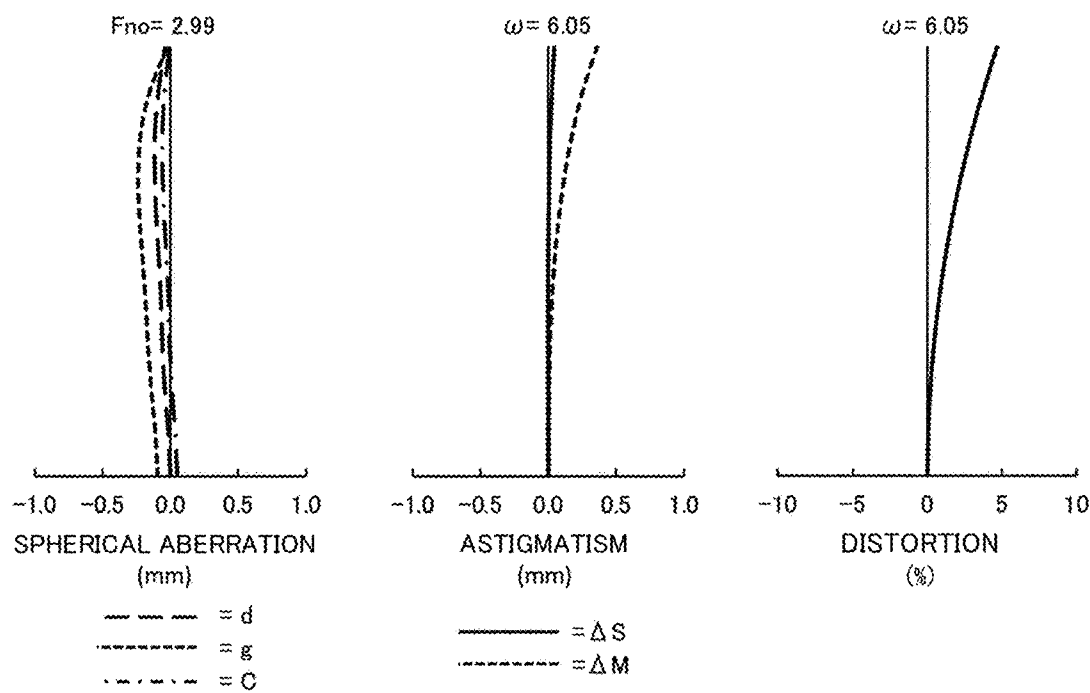
FIG. 55 is a longitudinal aberration diagram at the telephoto end at a focusing distance of 1.0 m in Example 4.
Figure 56:
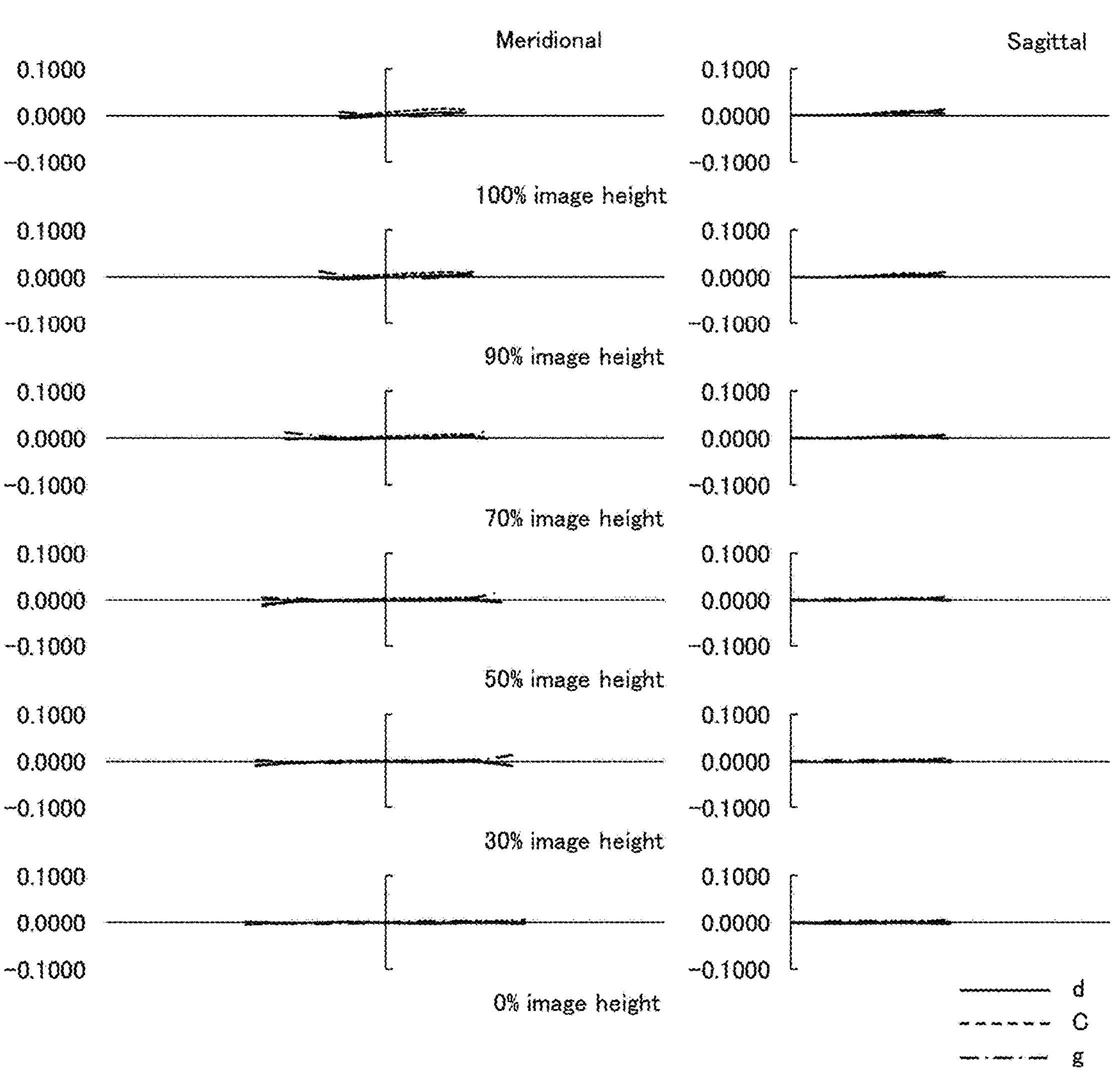
FIG. 56 is a lateral aberration diagram at the wide-angle end when focusing on infinity in Example 4.
Figure 57:
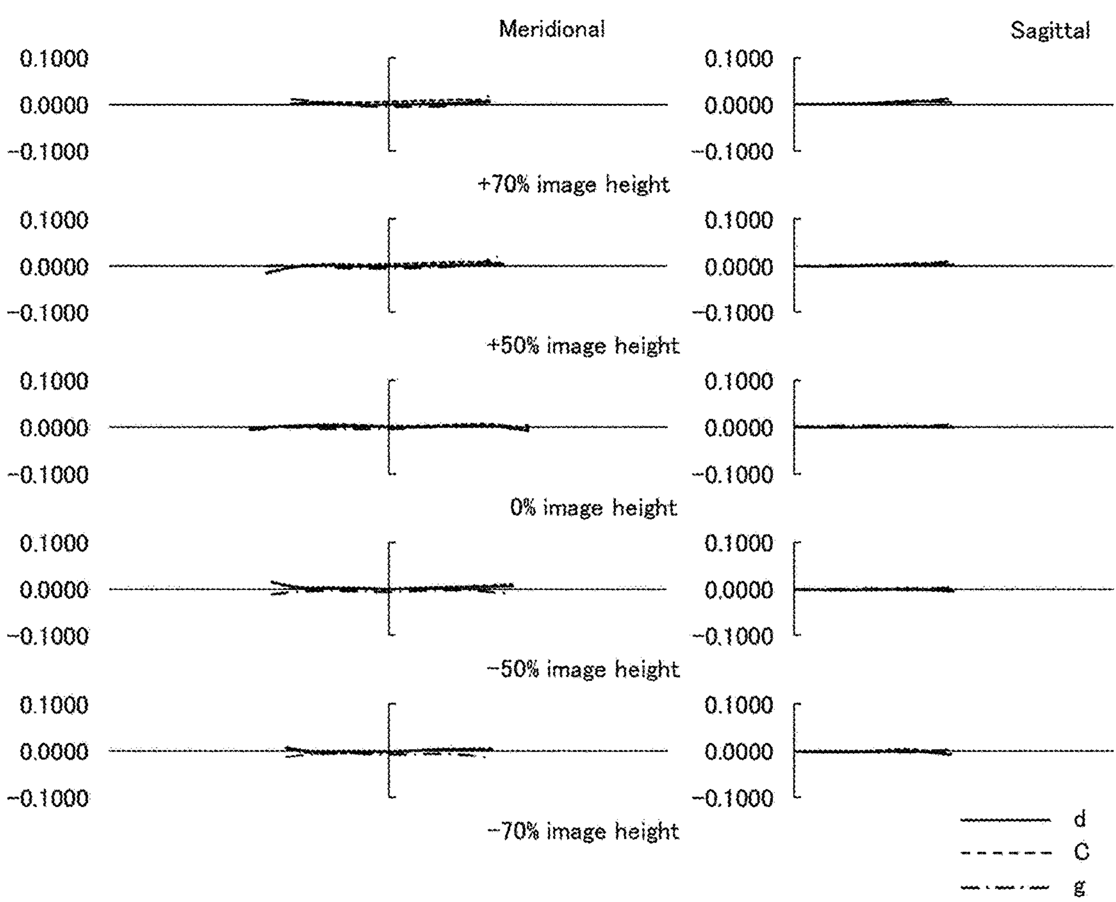
FIG. 57 is a lateral aberration diagram at the wide-angle end when focusing on infinity and compensating for a tilt of 0.4° in Example 4.
Figure 58:
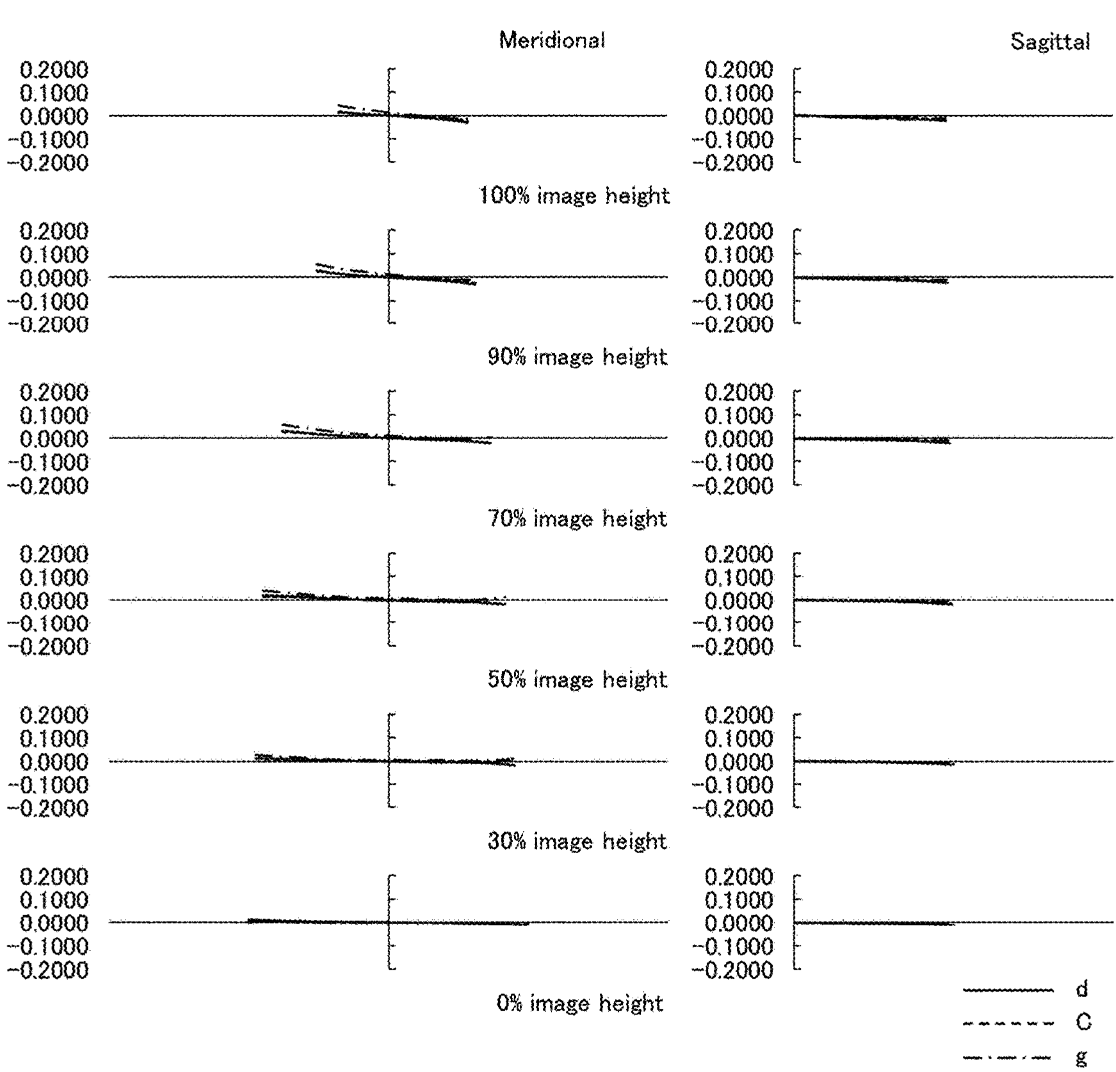
FIG. 58 is a lateral aberration diagram at the wide-angle end at a focusing distance of 1.0 m in Example 4.
Figure 59:
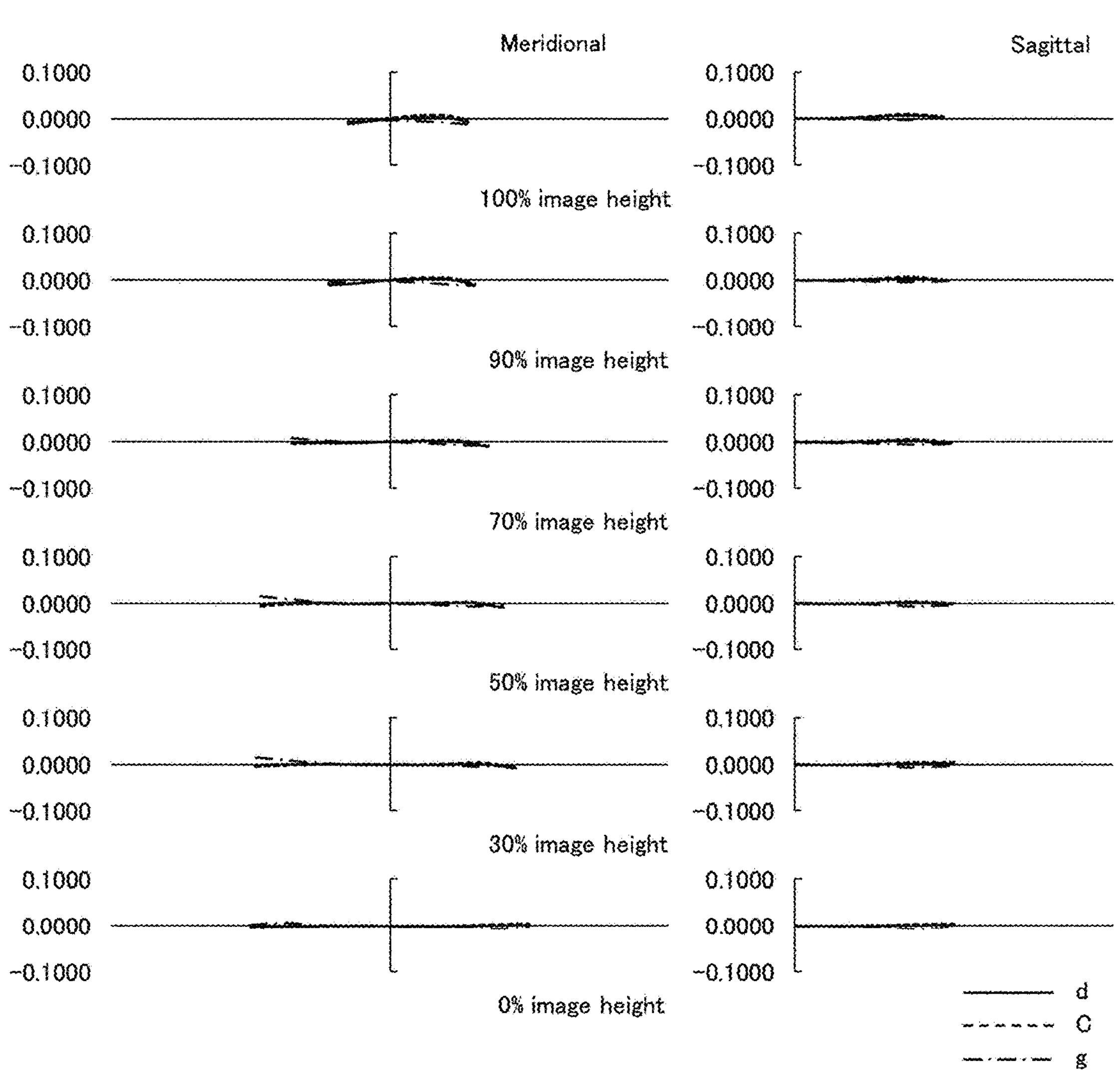
FIG. 59 is a lateral aberration diagram at an intermediate focal length when focusing on infinity in Example 4.
Figure 60:
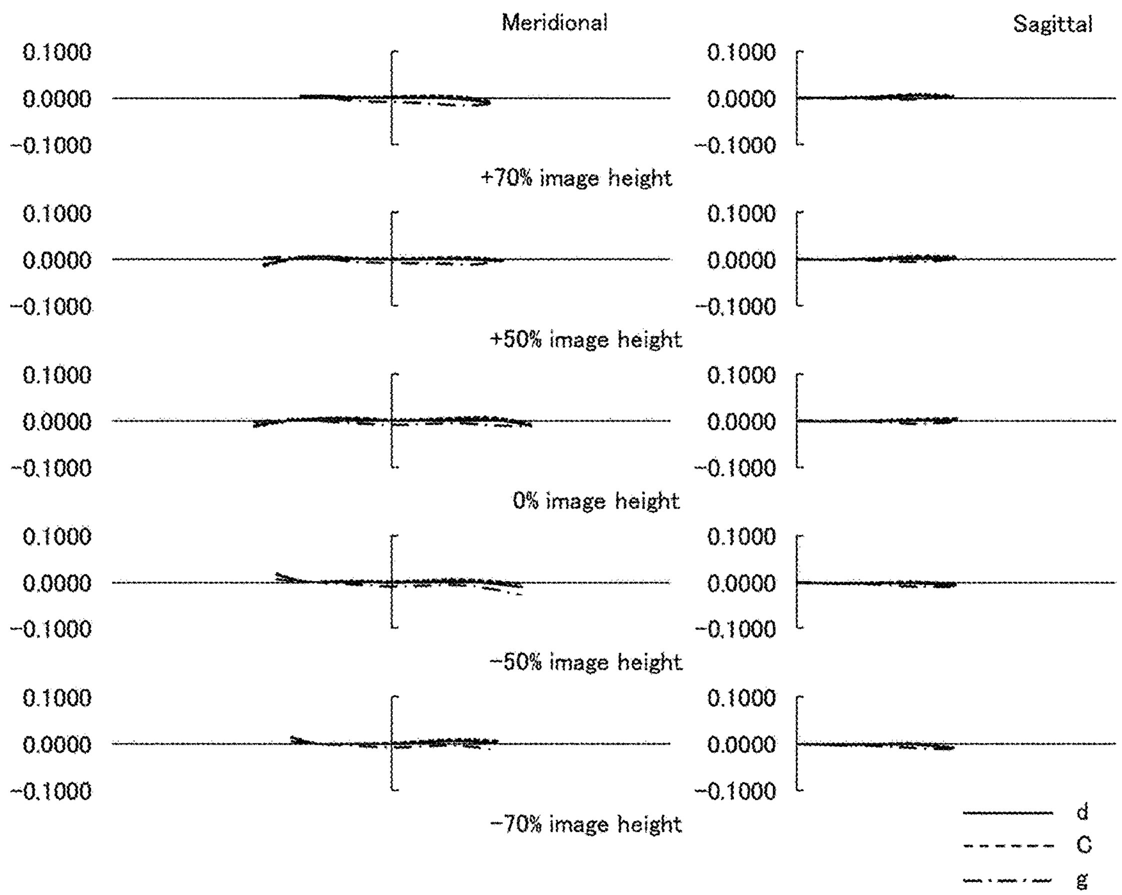
FIG. 60 is a lateral aberration diagram at an intermediate focal length when focusing on infinity and compensating for a tilt of 0.4° in Example 4.
Figure 61:
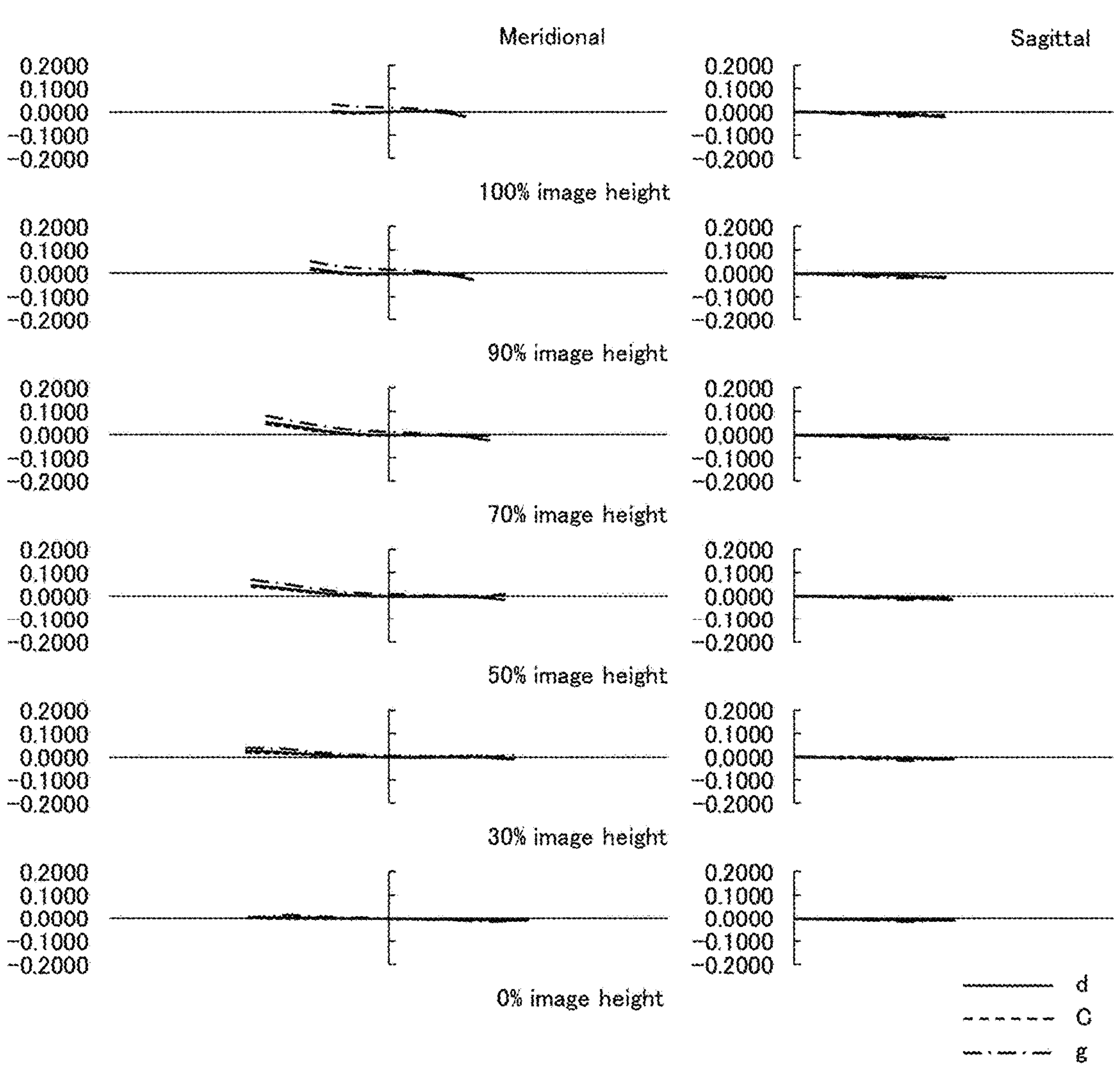
FIG. 61 is a lateral aberration diagram at an intermediate focal length at a focusing distance of 1.0 m in Example 4.
Figure 62:
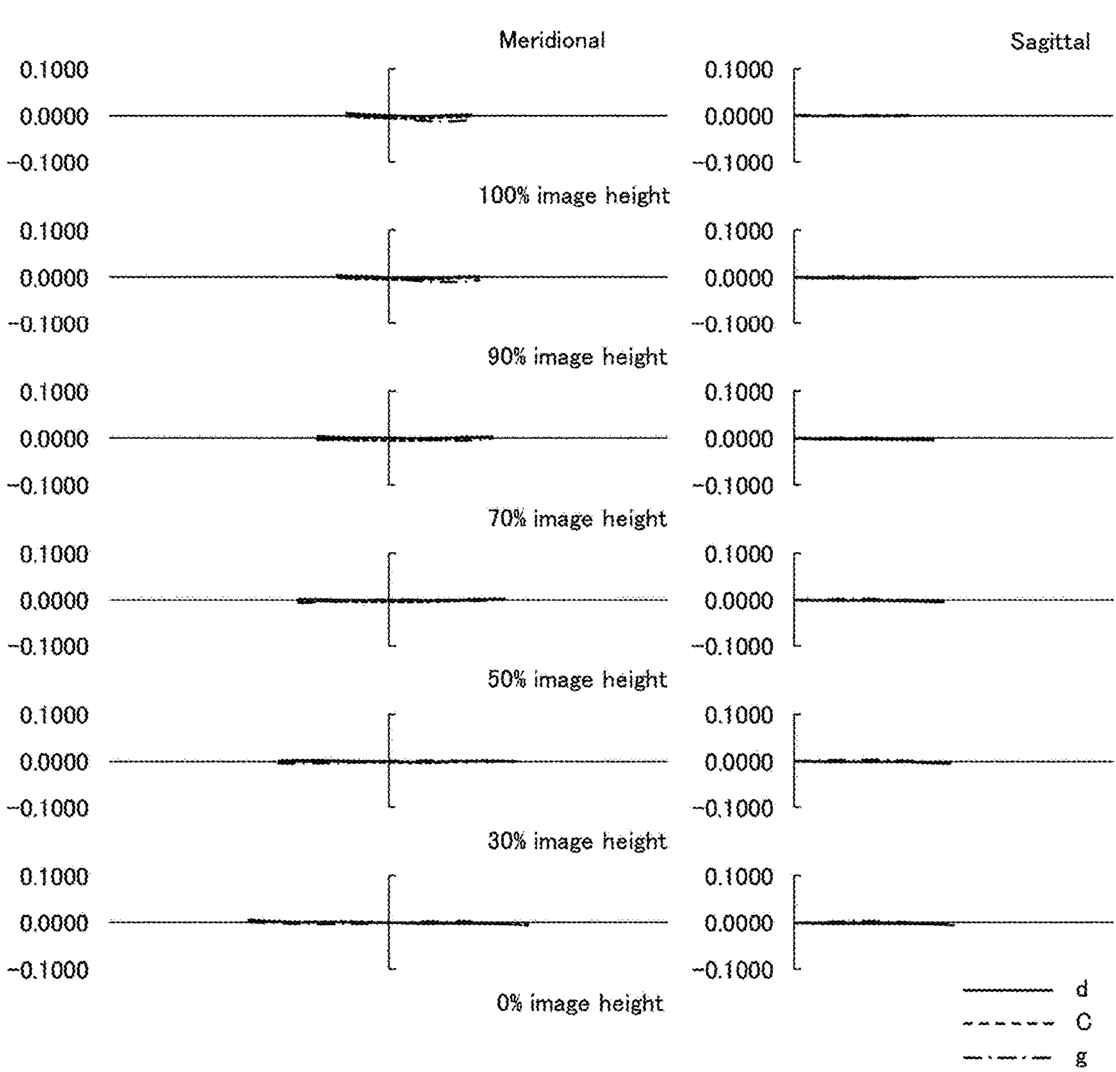
FIG. 62 is a lateral aberration diagram at the telephoto end when focusing on infinity in Example 4.
Figure 63:
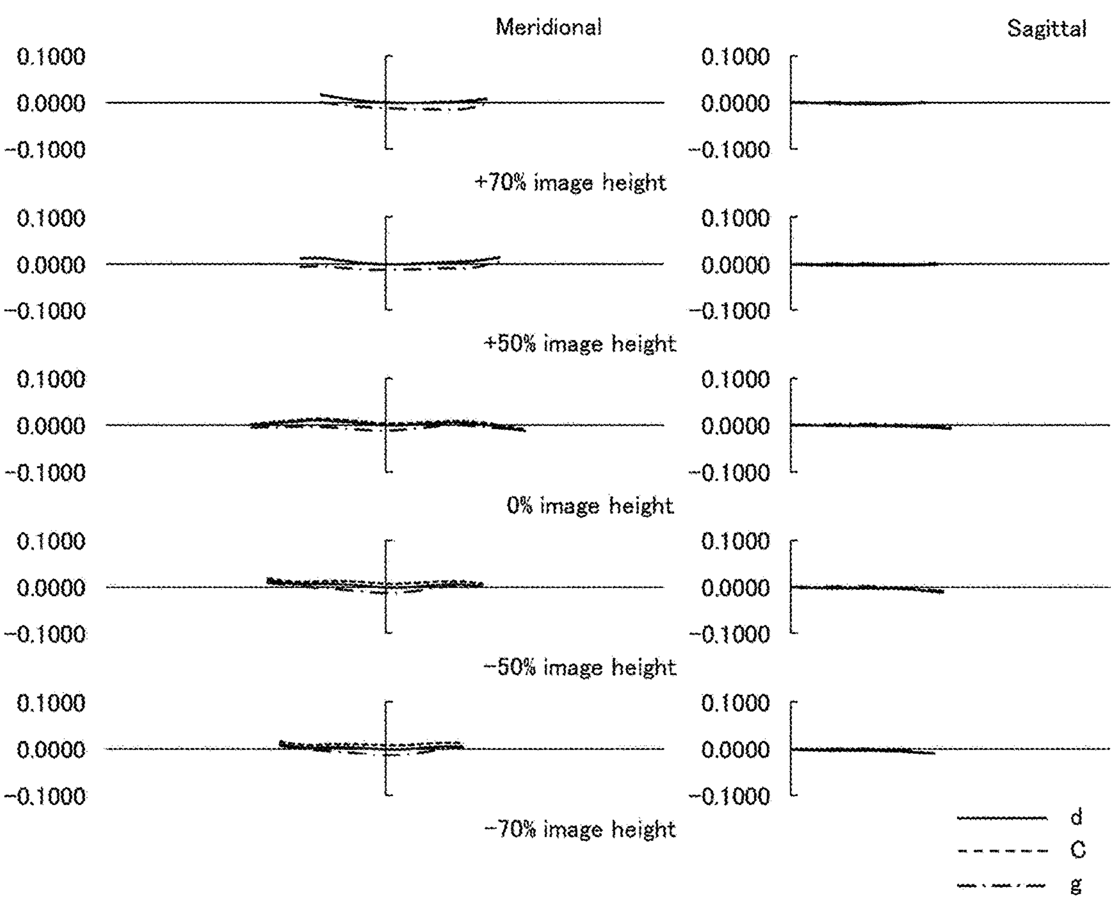
FIG. 63 is a lateral aberration diagram at the telephoto end when focusing on infinity and compensating for a tilt of 0.4° in Example 4.
Figure 64:
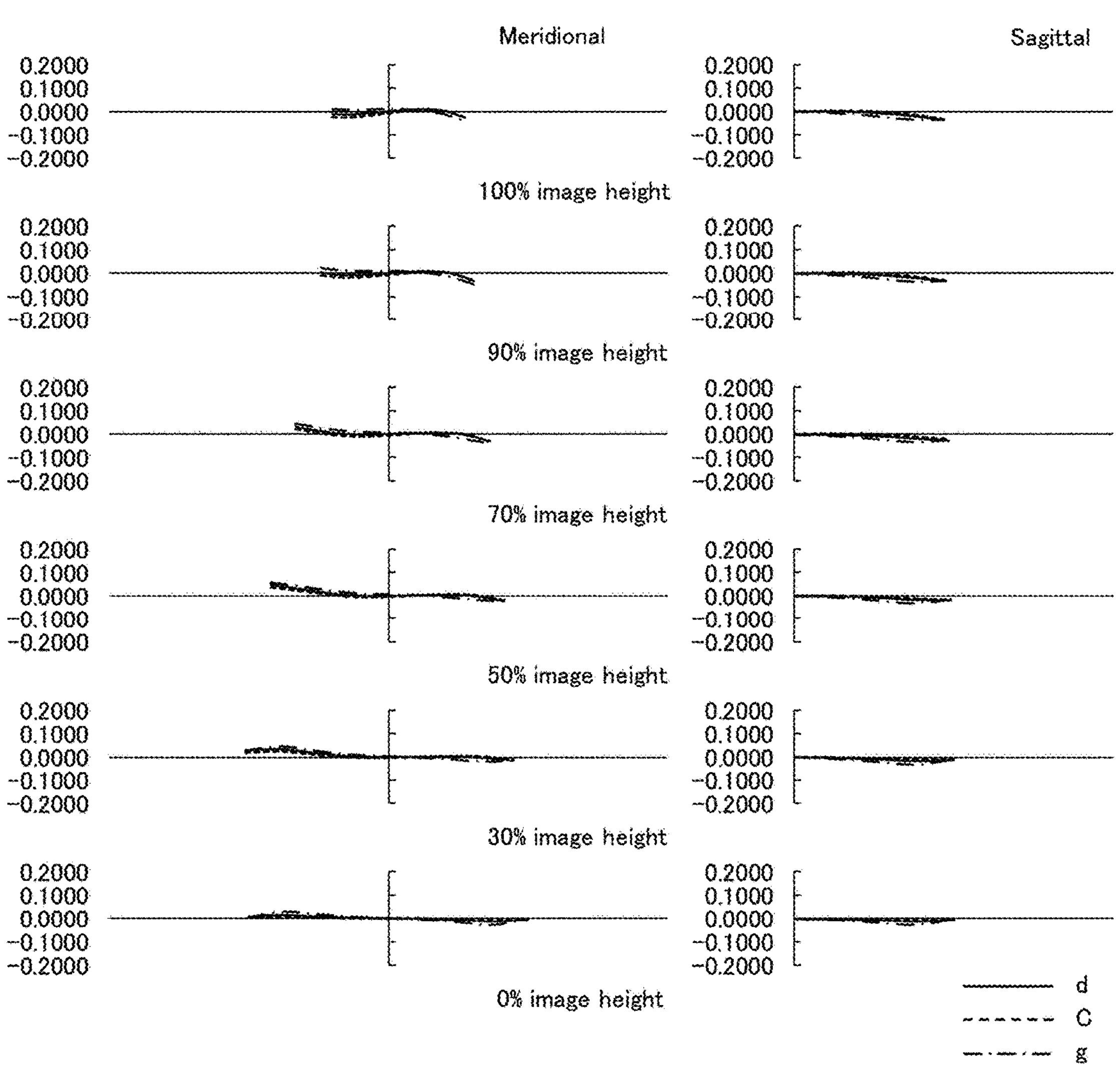
FIG. 64 is a lateral aberration diagram at the telephoto end at a focusing distance of 1.0 m in Example 4.

FIG. 49 is a lens configuration diagram of a large aperture ratio telephoto zoom lens according to Example 4 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a biconvex lens. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a biconvex lens, a cemented lens composed of a convex meniscus lens having the convex surface on the image side and a biconcave lens, a cemented lens composed of a biconvex lens and a concave meniscus lens having the convex surface on the image side, and a biconvex lens. The sixth lens group G6 is configured with a convex meniscus lens having the convex surface on the image side, and a concave meniscus lens having the convex surface on the object side. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 4 are shown below.

Numerical Data in Example 4

Unit: mm

Surface Data

| Surface Number | r | d | nd | vd | PgF |
|---|---|---|---|---|---|
| Object Surface | ∞ | (d0) | | | |
| 1 | 176.7108 | 2.0000 | 1.78590 | 43.94 | 0.5612 |
| 2 | 92.0437 | 8.1663 | 1.43700 | 95.10 | 0.5336 |
| 3 | −1384.7643 | 0.1500 | | | |
| 4 | 84.4431 | 8.3627 | 1.43700 | 95.10 | 0.5336 |
| 5 | −2965.5996 | (d5) | | | |
| 6 | 157.7959 | 1.5000 | 1.43700 | 95.10 | 0.5336 |
| 7 | 40.3470 | (d7) | | | |
| 8 | −89.6742 | 1.1000 | 1.55032 | 75.50 | 0.5401 |
| 9 | 56.1810 | 2.3442 | 1.85883 | 30.00 | 0.5979 |
| 10 | 104.3669 | (d10) | | | |
| 11 | 48.9642 | 2.4338 | 1.87070 | 40.73 | 0.5682 |
| 12 | 78.6153 | (d12) | | | |
| 13 (diaphragm) | ∞ | 1.2000 | | | |
| 14* | 68.7094 | 3.2761 | 1.80610 | 40.73 | 0.5694 |
| 15 | 206.7225 | 0.1500 | | | |
| 16 | 45.5558 | 1.0500 | 1.80610 | 33.27 | 0.5884 |
| 17 | 25.9058 | 7.8272 | 1.43700 | 95.10 | 0.5336 |
| 18 | −286.2087 | 2.9591 | | | |
| 19 | −54.3991 | 2.1796 | 1.80809 | 22.76 | 0.6307 |
| 20 | −37.9133 | 1.6900 | 1.69350 | 53.20 | 0.5467 |
| 21* | 42.1485 | 1.3854 | | | |
| 22 | 39.6221 | 8.9207 | 1.43700 | 95.10 | 0.5336 |
| 23 | −34.3801 | 1.0500 | 1.85451 | 25.15 | 0.6103 |
| 24 | −102.4022 | 0.1500 | | | |
| 25* | 67.9430 | 6.6060 | 1.76450 | 49.09 | 0.5528 |
| 26 | −50.3572 | (d26) | | | |
| 27 | −327.4415 | 1.8198 | 1.86966 | 20.02 | 0.6435 |
| 28 | −104.6612 | 0.2052 | | | |
| 29 | 723.2376 | 0.8000 | 1.75500 | 52.32 | 0.5473 |
| 30 | 33.3637 | (d30) | | | |
| 31 | 62.1256 | 5.9267 | 1.65100 | 56.24 | 0.5420 |
| 32 | 76.1214 | (d32) | | | |
| 33 | −335.5838 | 1.0000 | 1.43700 | 95.10 | 0.5336 |
| 34 | 57.1674 | 6.8975 | | | |
| 35 | −35.7010 | 1.0000 | 1.49700 | 81.61 | 0.5389 |
| 36 | −175.2937 | 29.5754 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 4.22311 | 0.22042 |
| A4 | −2.00163E−06 | −7.28324E−06 | −6.70029E−06 | 1.96942E−06 |
| A6 | 7.15624E−10 | 2.24102E−08 | 3.82942E−09 | 9.38305E−10 |
| A8 | −3.07423E−12 | −3.38708E−10 | −2.78774E−11 | −1.66936E−11 |
| A10 | 3.36034E−15 | 4.18460E−12 | 7.67070E−14 | 6.34454E−14 |
| A12 | 0.00000E+00 | −3.43014E−14 | −1.73039E−16 | −1.61588E−16 |
| A14 | 0.00000E+00 | 1.77429E−16 | 0.00000E+00 | 0.00000E+00 |
| A16 | 0.00000E+00 | −5.54891E−19 | 0.00000E+00 | 0.00000E+00 |
| A18 | 0.00000E+00 | 9.49364E−22 | 0.00000E+00 | 0.00000E+00 |
| A20 | 0.00000E+00 | −6.70626E−25 | 0.00000E+00 | 0.00000E+00 |

Various Data

| Zoom Ratio | 2.69 | | |
|---|---|---|---|
| | Wide Angle | Mid Range | Telephoto |
| Focal Length | 72.10 | 118.00 | 194.00 |
| F Number | 2.90 | 2.89 | 2.92 |
| Total Angle of View 2ω | 32.83 | 19.98 | 12.18 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 35.7305 | 68.1651 |
| d7 | 18.1838 | 13.9806 | 7.3142 |
| d10 | 36.5385 | 14.5563 | 1.0195 |
| d12 | 23.7476 | 16.2027 | 3.9711 |
| d26 | 9.0818 | 7.9500 | 3.0000 |
| d30 | 10.6904 | 10.9187 | 20.3045 |
| d32 | 6.5322 | 7.4356 | 3.0000 |
| BF | 1.0000 | 1.0000 | 1.0001 |
| d0 | 777.9999 | 777.9998 | 777.9999 |
| d5 | 2.0000 | 35.7305 | 68.1651 |
| d7 | 18.1838 | 13.9806 | 7.3142 |
| d10 | 6.5385 | 14.5563 | 1.0195 |
| d12 | 23.7476 | 16.2027 | 3.9711 |
| d26 | 10.6674 | 12.1218 | 12.5766 |
| d30 | 8.2817 | 4.8602 | 5.6732 |
| d32 | 7.3556 | 9.3225 | 8.0549 |
| BF | 0.9999 | 1.0000 | 0.9999 |

| Lens Group Data | | |
|---|---|---|
| Lens Group | Starting Surface | Focal Length |
| G1 | 1 | 159.80 |
| G2 | 6 | −124.53 |
| G3 | 8 | −112.45 |
| G4 | 11 | 143.61 |
| G5 | 13 | 54.84 |
| G6 | 27 | −63.00 |
| G7 | 31 | 53.45 |
| G8 | 33 | −48.34 |

Example 5

Figure 65:
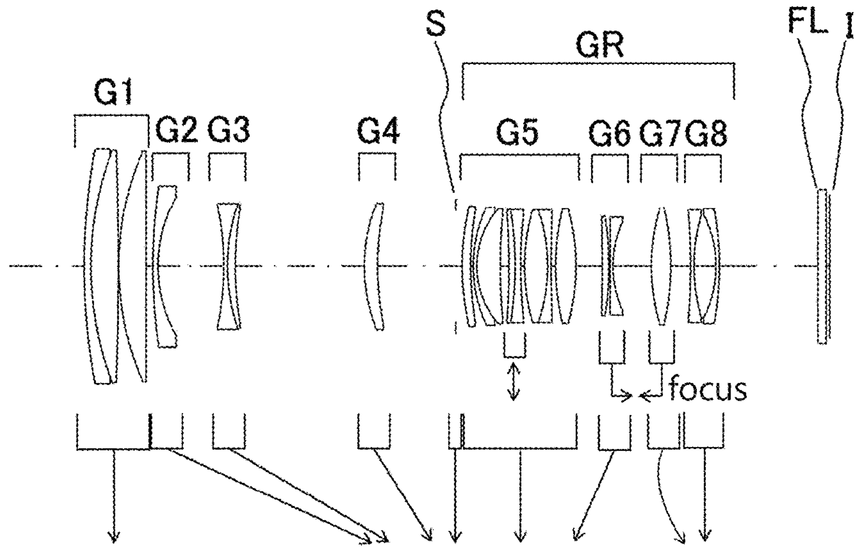
FIG. 65 is a lens configuration diagram according to Example 5 of the present invention.
Figure 66:
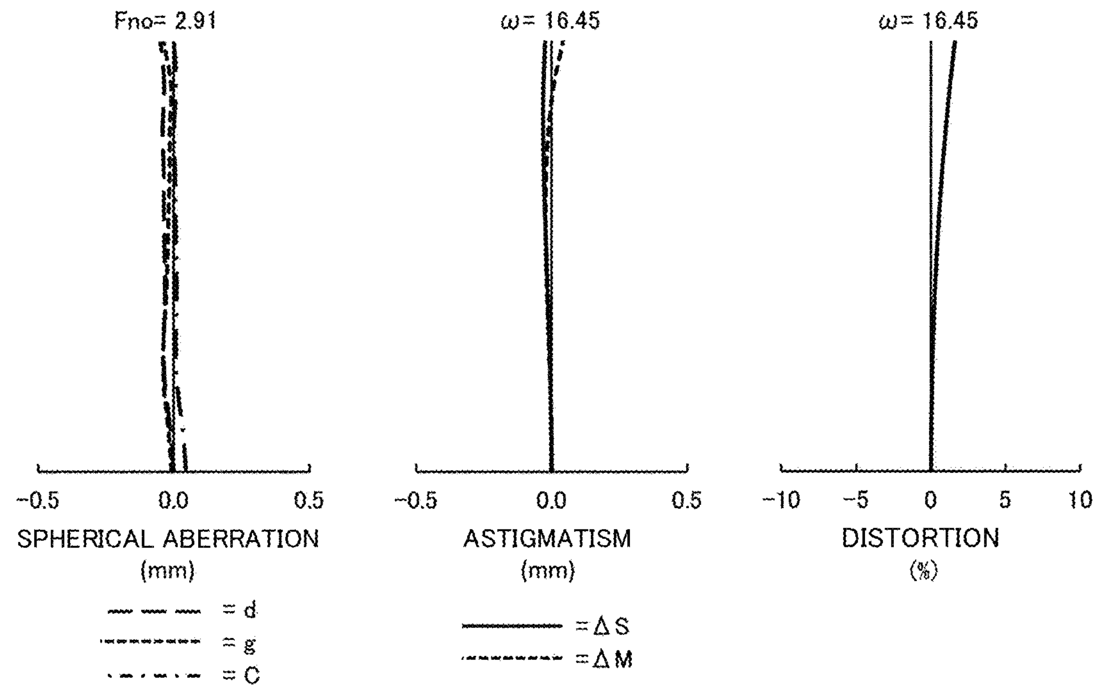
FIG. 66 is a longitudinal aberration diagram at the wide-angle end when focusing on infinity in Example 5.
Figure 67:
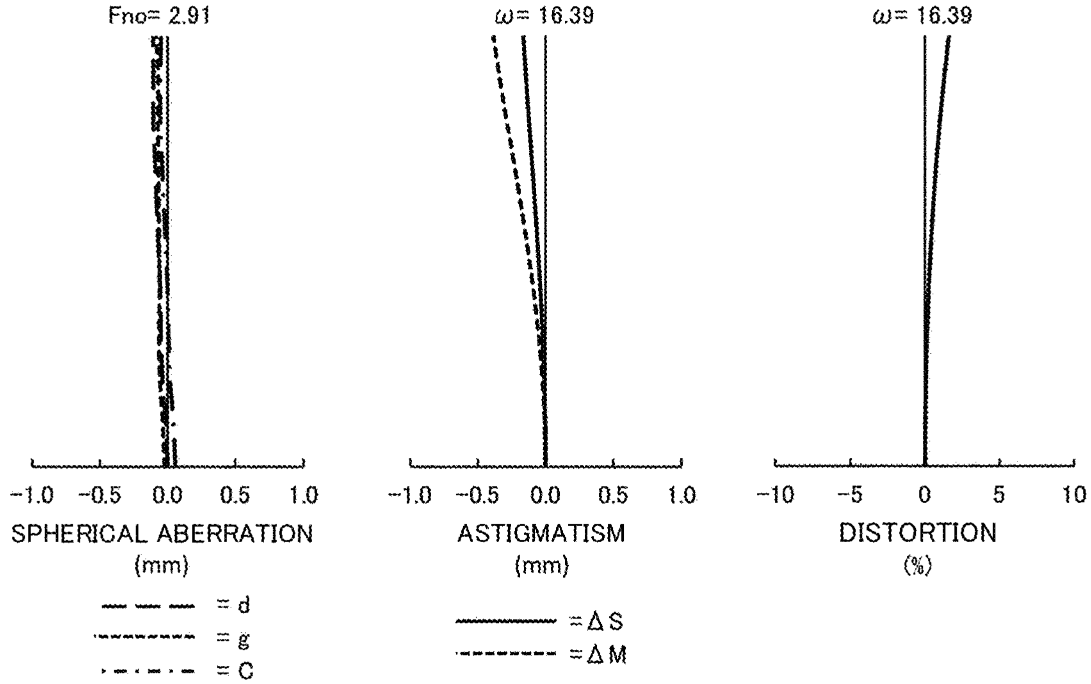
FIG. 67 is a longitudinal aberration diagram at the wide-angle end at a focusing distance of 1.0 m in Example 5.
Figure 68:
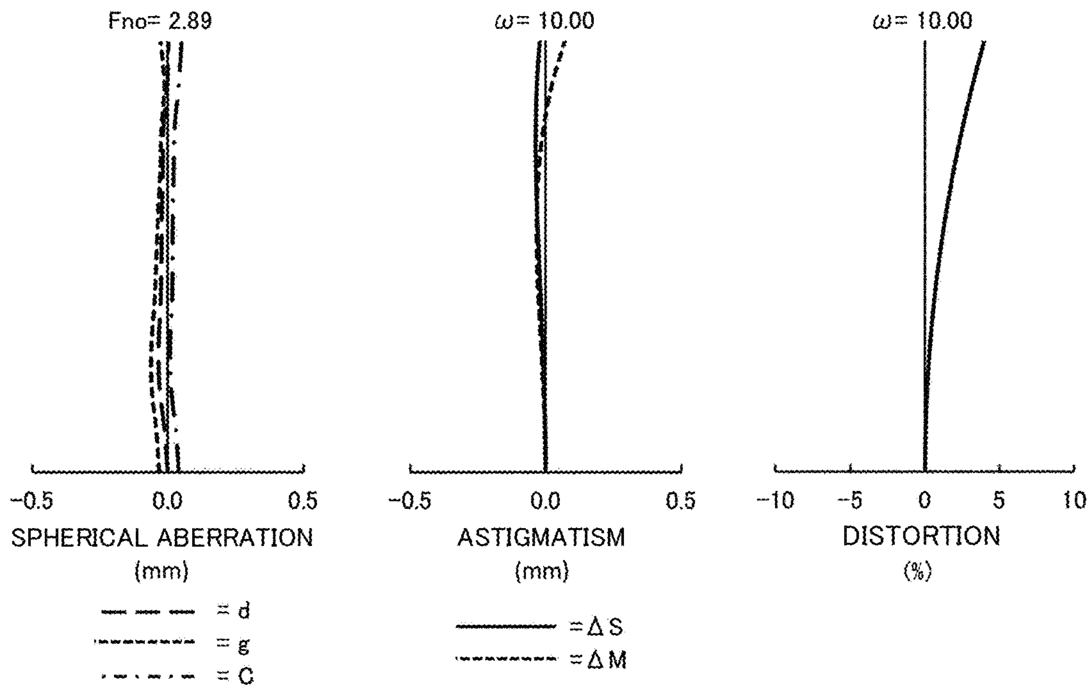
FIG. 68 is a longitudinal aberration diagram at an intermediate focal length when focusing on infinity in Example 5.
Figure 69:
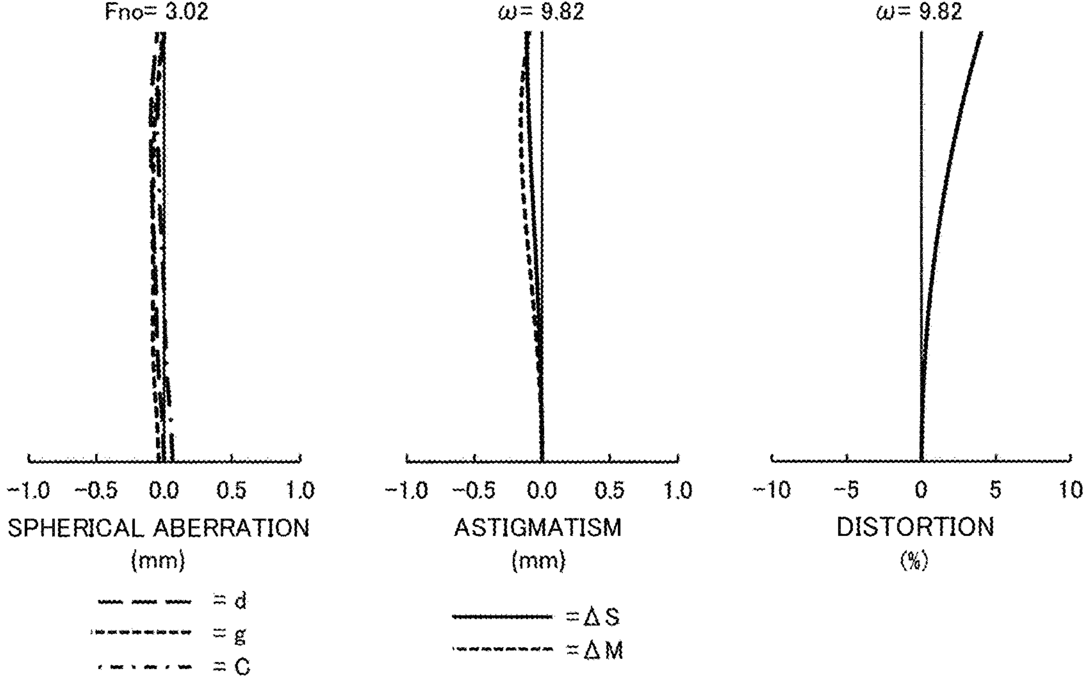
FIG. 69 is a longitudinal aberration diagram at an intermediate focal length at a focusing distance of 1.0 m in Example 5.
Figure 70:
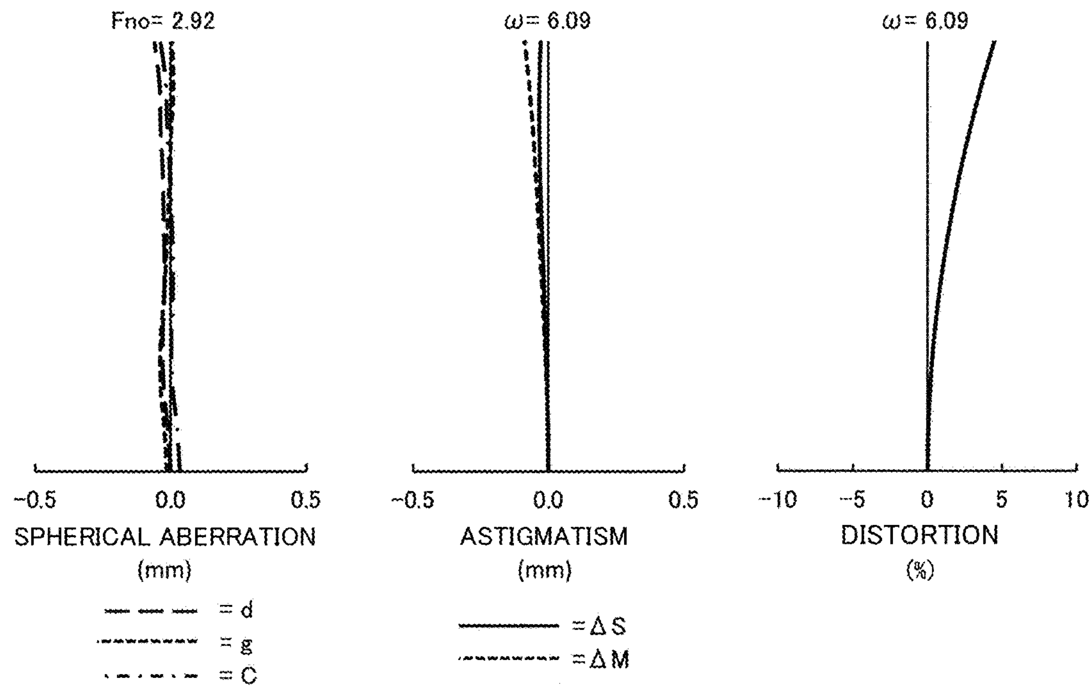
FIG. 70 is a longitudinal aberration diagram at the telephoto end when focusing on infinity in Example 5.
Figure 71:
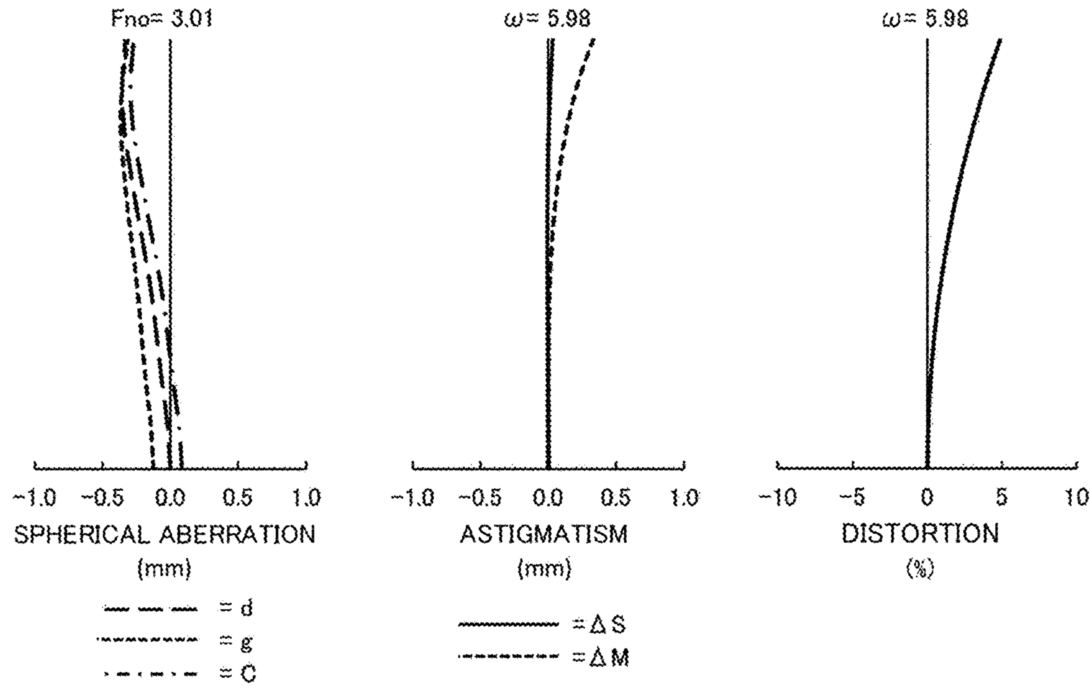
FIG. 71 is a longitudinal aberration diagram at the telephoto end at a focusing distance of 1.0 m in Example 5.
Figure 72:
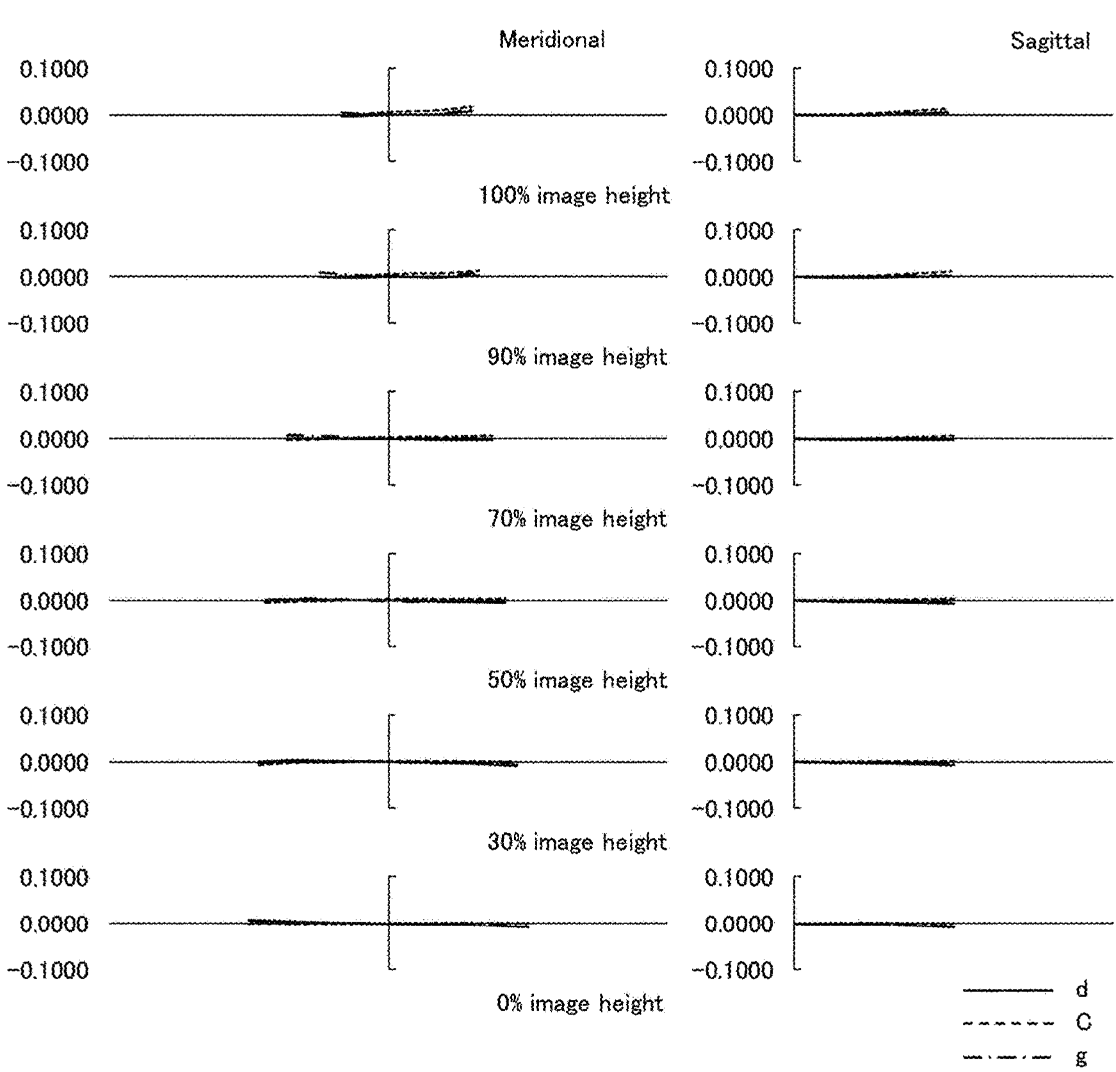
FIG. 72 is a lateral aberration diagram at the wide-angle end when focusing on infinity in Example 5.
Figure 73:
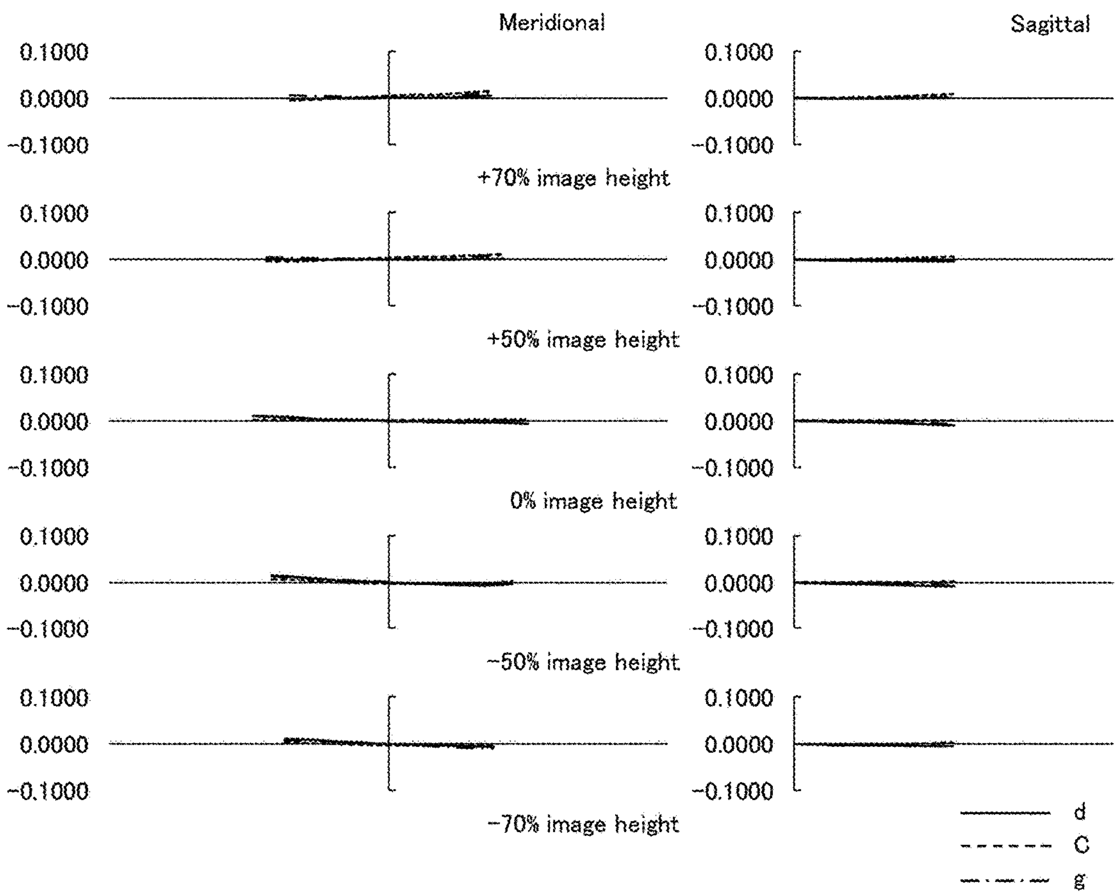
FIG. 73 is a lateral aberration diagram at the wide-angle end when focusing on infinity and compensating for a tilt of 0.4° in Example 5.
Figure 74:
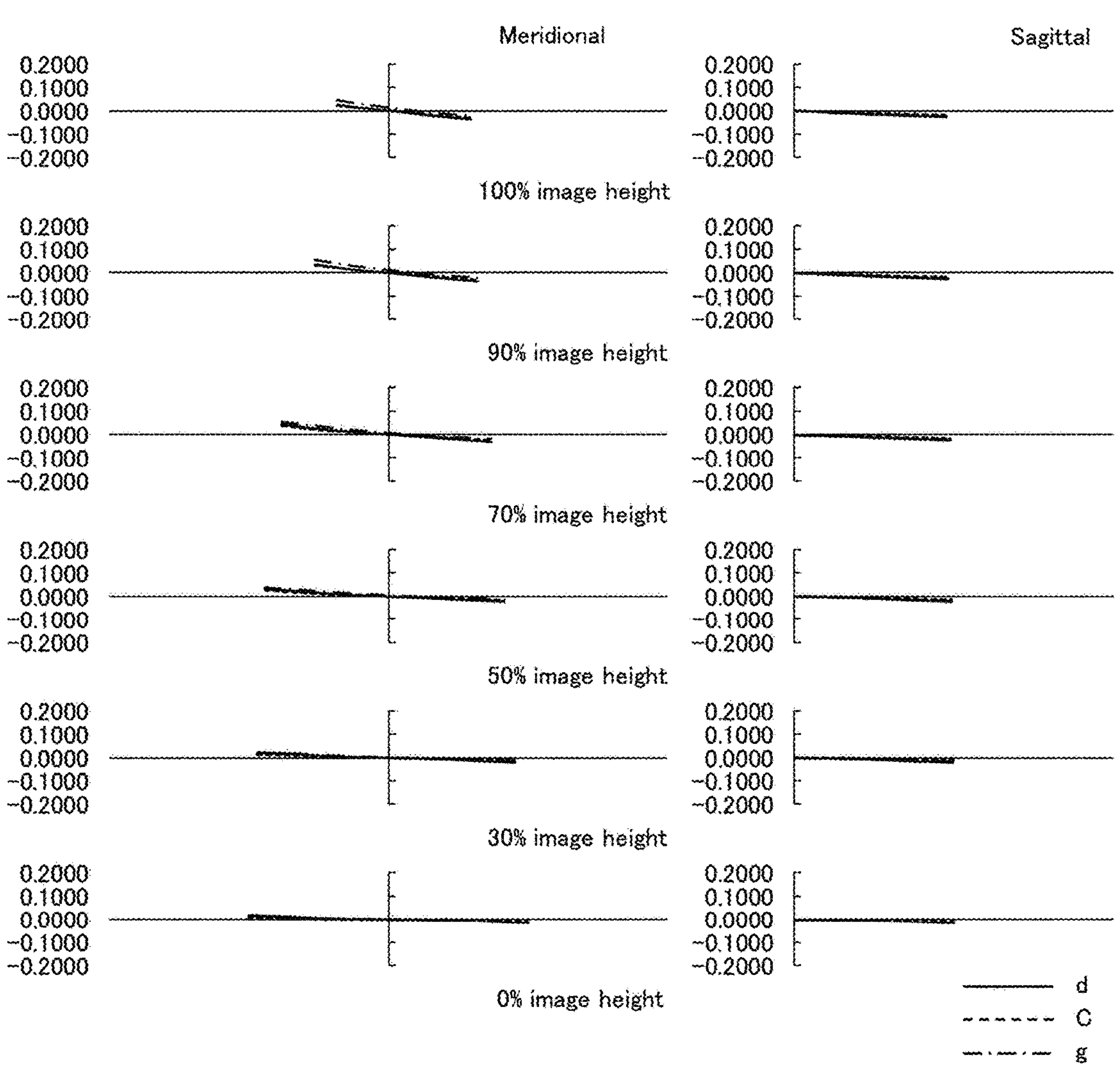
FIG. 74 is a lateral aberration diagram at the wide-angle end at a focusing distance of 1.0 m in Example 5.
Figure 75:
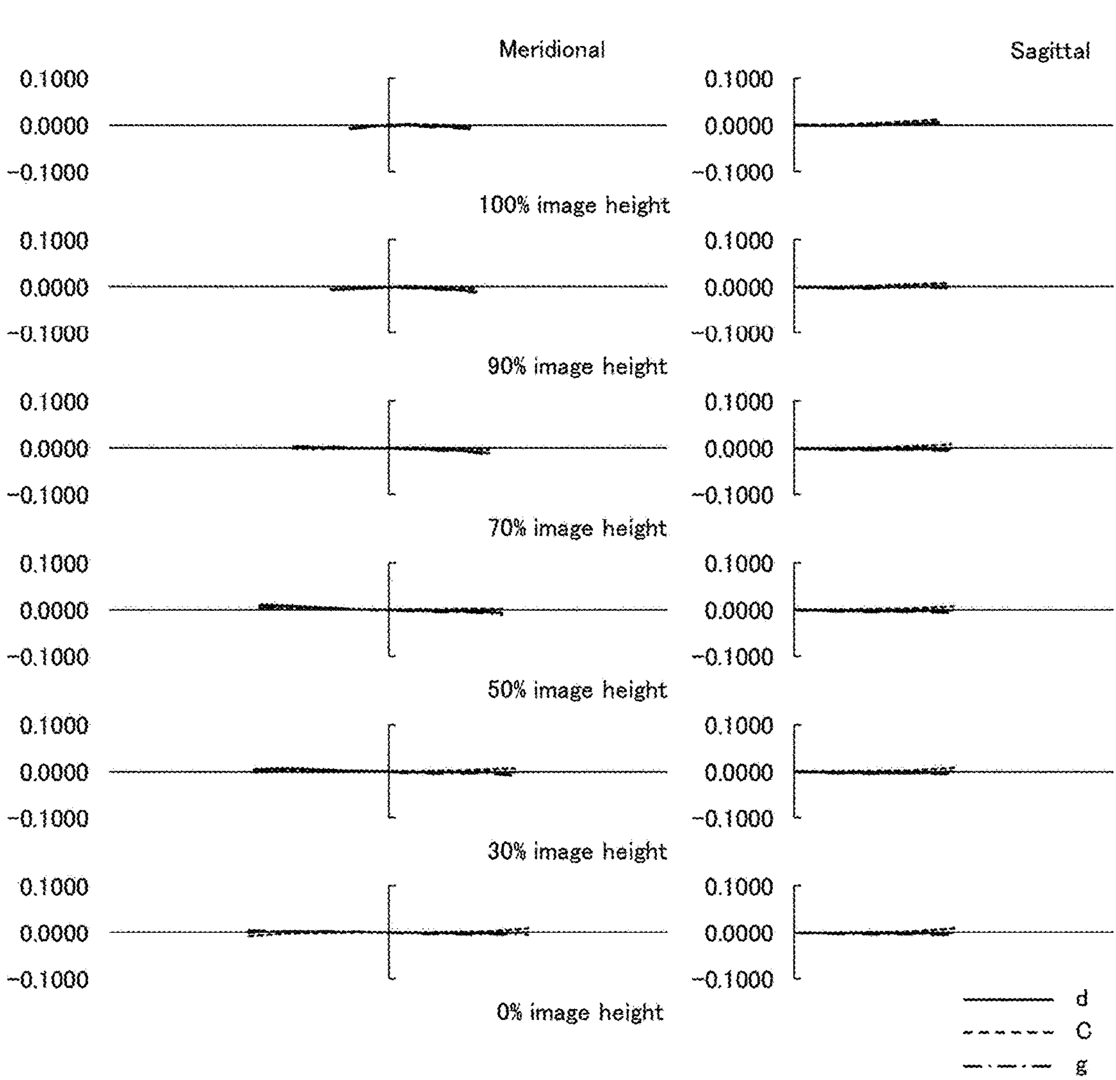
FIG. 75 is a lateral aberration diagram at an intermediate focal length when focusing on infinity in Example 5.
Figure 76:
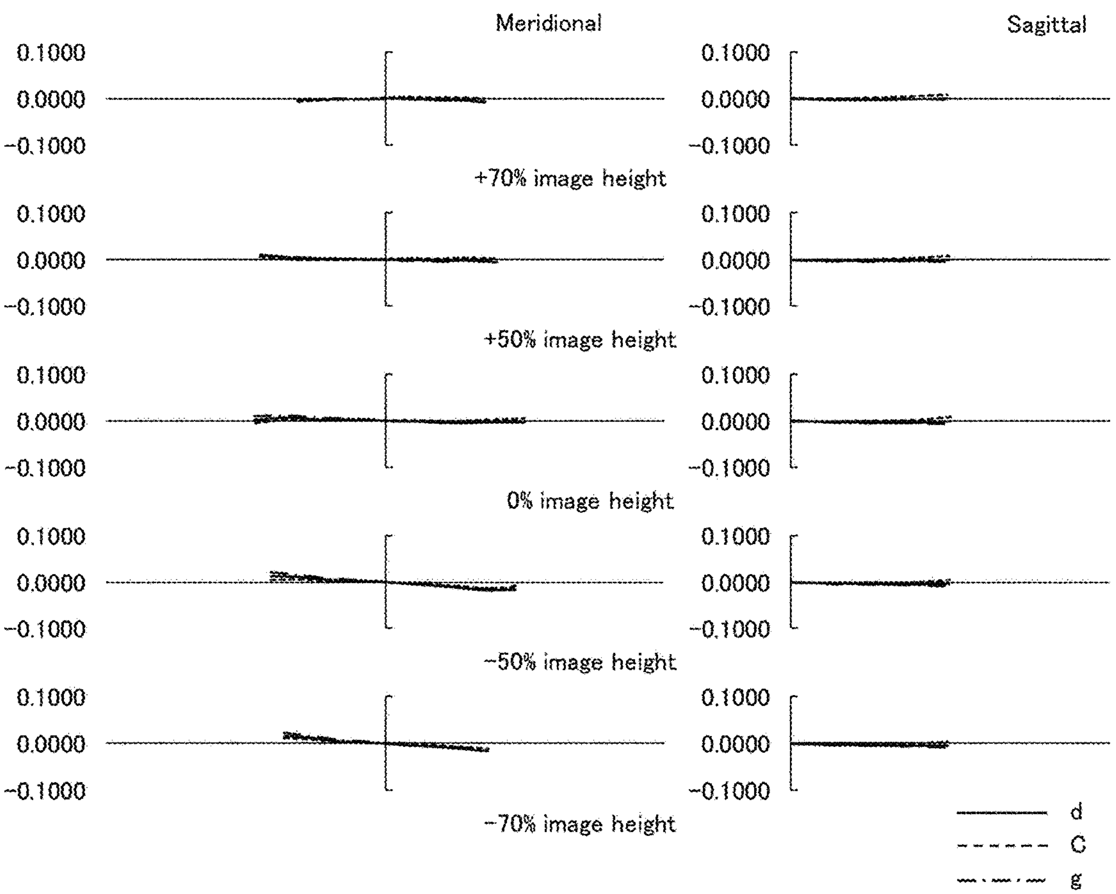
FIG. 76 is a lateral aberration diagram at an intermediate focal length when focusing on infinity and compensating for a tilt of 0.4° in Example 5.
Figure 77:
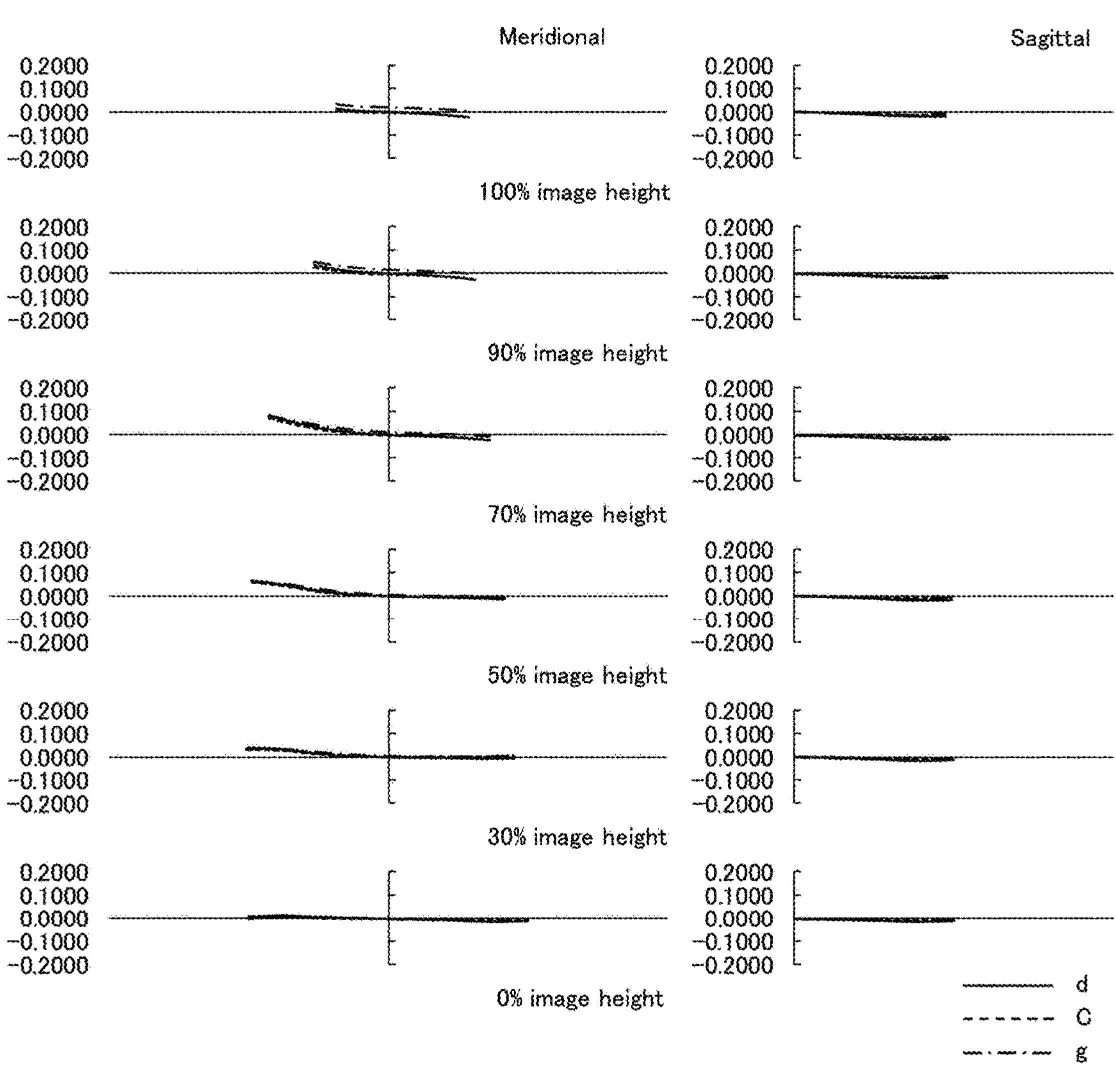
FIG. 77 is a lateral aberration diagram at an intermediate focal length at a focusing distance of 1.0 m in Example 5.
Figure 78:
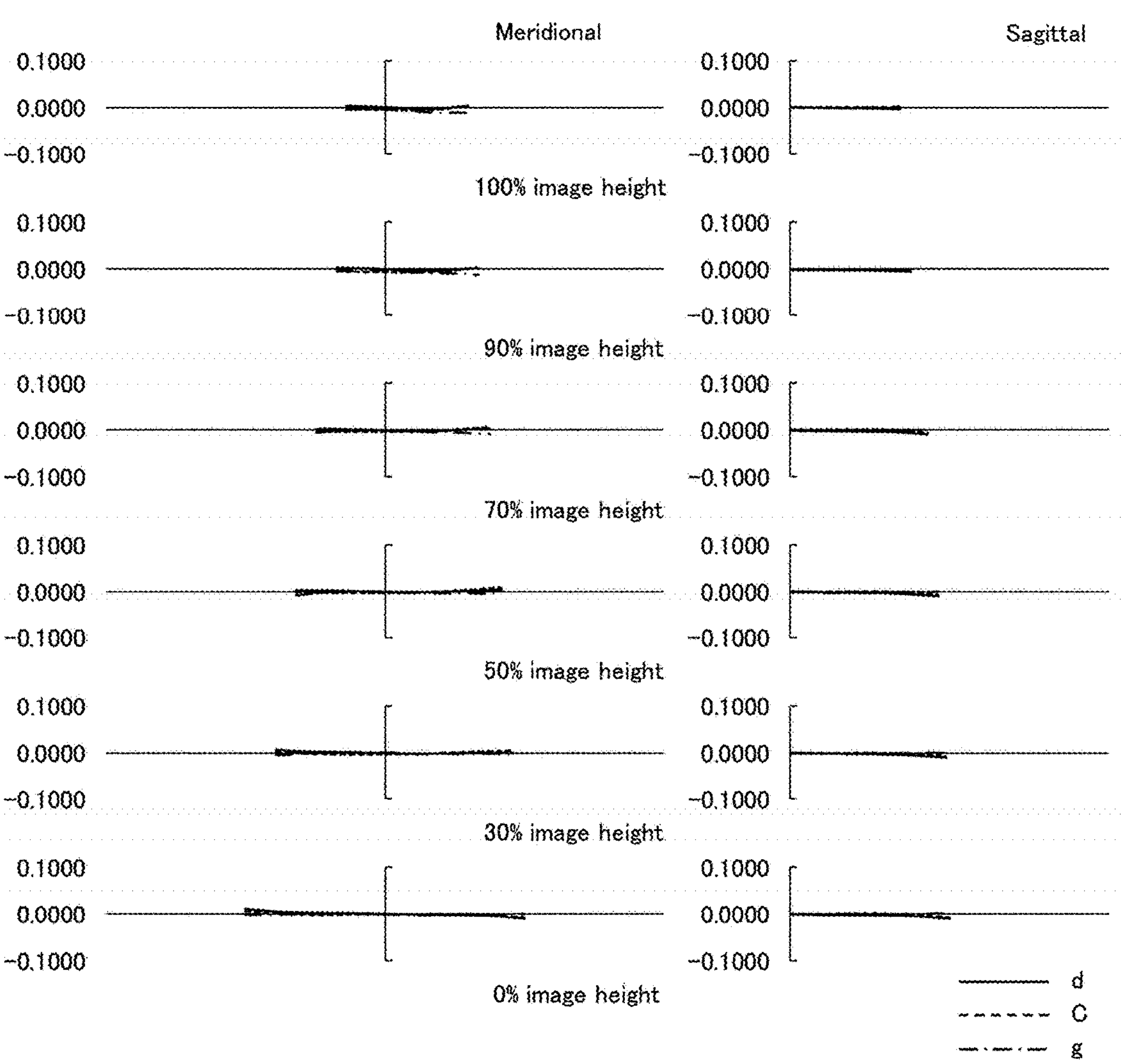
FIG. 78 is a lateral aberration diagram at the telephoto end when focusing on infinity in Example 5.
Figure 79:
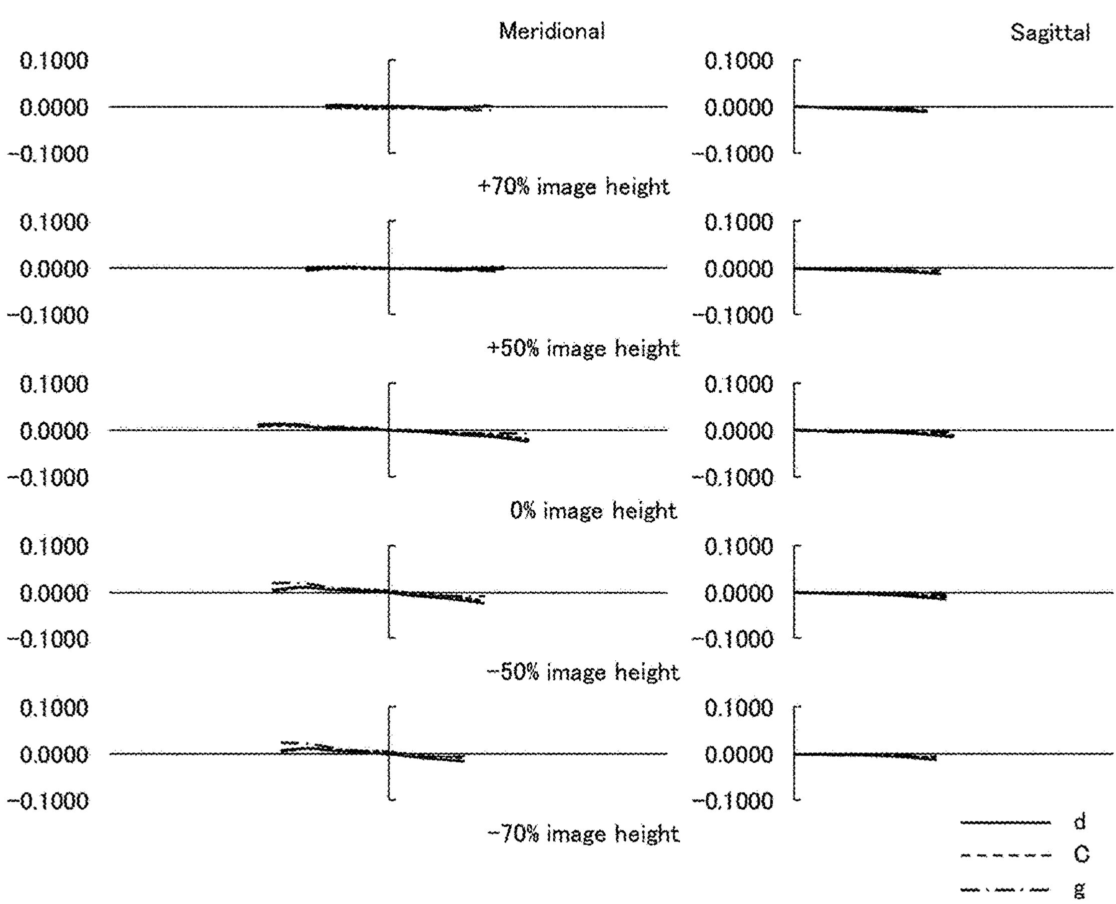
FIG. 79 is a lateral aberration diagram at the telephoto end when focusing on infinity and compensating for a tilt of 0.4° in Example 5.
Figure 80:
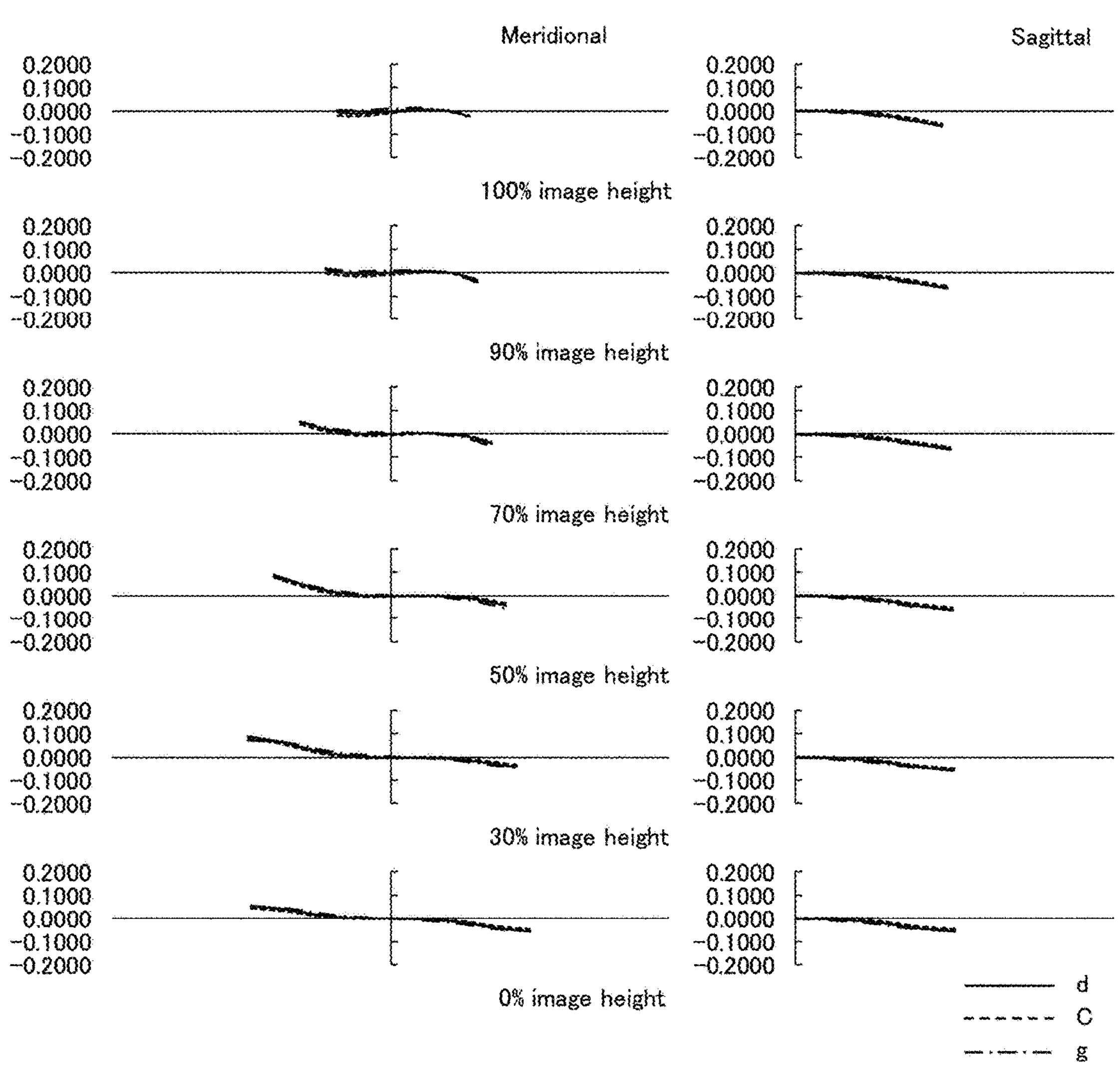
FIG. 80 is a lateral aberration diagram at the telephoto end at a focusing distance of 1.0 m in Example 5.

FIG. 65 is a lens configuration diagram of a large aperture ratio telephoto zoom lens according to Example 5 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a biconvex lens. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a convex meniscus lens having the convex surface on the object side, a cemented lens composed of a convex meniscus lens having the convex surface on the image side and a biconcave lens, a cemented lens composed of a biconvex lens and a biconcave lens, and a biconvex lens. The sixth lens group G6 is configured with a convex meniscus lens having the convex surface on the image side, and a biconcave lens. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 5 are shown below.

Numerical Data in Example 5

| Unit: mm Surface Data | | | | | |
|---|---|---|---|---|---|
| Surface Number | r | d | nd | vd | PgF |
| Object Surface | ∞ | (d0) | | | |
| 1 | 190.8040 | 2.0000 | 1.78590 | 43.94 | 0.5612 |
| 2 | 97.2122 | 8.1396 | 1.43700 | 95.10 | 0.5336 |
| 3 | −1079.8231 | 0.1500 | | | |
| 4 | 85.8259 | 8.1873 | 1.43700 | 95.10 | 0.5336 |
| 5 | −8809.4993 | (d5) | | | |
| 6 | 166.2847 | 1.5000 | 1.43700 | 95.10 | 0.5336 |
| 7 | 41.7443 | (d7) | | | |
| 8 | −86.1104 | 1.1000 | 1.55032 | 75.50 | 0.5401 |
| 9 | 56.7870 | 2.3270 | 1.85883 | 30.00 | 0.5979 |
| 10 | 103.0047 | (d10) | | | |
| 11 | 49.7437 | 3.9567 | 1.87070 | 40.73 | 0.5682 |
| 12 | 86.7801 | (d12) | | | |
| 13 (diaphragm) | ∞ | 1.8739 | | | |
| 14* | 71.7890 | 2.5342 | 1.80610 | 40.73 | 0.5694 |
| 15 | 98.1241 | 0.7796 | | | |
| 16 | 41.0065 | 1.0500 | 1.80610 | 33.27 | 0.5884 |
| 17 | 25.8495 | 7.0193 | 1.43700 | 95.10 | 0.5336 |
| 18 | 173.2152 | 2.5644 | | | |
| 19 | −209.9109 | 1.8163 | 1.80809 | 22.76 | 0.6307 |
| 20 | −105.1120 | 1.6900 | 1.69350 | 53.20 | 0.5467 |
| 21* | 138.5998 | 1.1314 | | | |
| 22 | 59.1552 | 6.8824 | 1.43700 | 95.10 | 0.5336 |
| 23 | −50.3974 | 1.0500 | 1.85451 | 25.15 | 0.6103 |
| 24 | 436.7775 | 1.3079 | | | |
| 25* | 66.5236 | 6.0903 | 1.76450 | 49.09 | 0.5528 |
| 26* | −60.3904 | (d26) | | | |
| 27 | −484.4267 | 2.0133 | 1.86966 | 20.02 | 0.6435 |
| 28 | −89.5546 | 0.3641 | | | |
| 29 | 995.0740 | 0.8000 | 1.75500 | 52.32 | 0.5473 |
| 30 | 31.7523 | (d30) | | | |
| 31 | 59.8770 | 5.7824 | 1.65100 | 56.24 | 0.5420 |
| 32 | −74.1938 | (d32) | | | |
| 33 | −178.6202 | 1.0000 | 1.43700 | 95.10 | 0.5336 |
| 34 | 54.4280 | 6.5626 | | | |
| 35 | −33.2850 | 1.0000 | 1.49700 | 81.61 | 0.5389 |
| 36 | −91.3846 | 29.3509 | | | |
| 37 | ∞ | 2.5000 | 1.51680 | 64.20 | 0.5343 |
| 38 | ∞ | (BF) | | | |
| Image Surface | ∞ | | | | |

| Aspherical Surface Data | | | | |
|---|---|---|---|---|
| | Surface 14 | Surface 21 | Surface 25 | Surface 26 |
| K | 0.00000 | 0.00000 | 6.51579 | 0.68830 |
| A4 | −1.62591E−06 | −7.75096E−07 | −5.17975E−06 | 1.36145E−06 |
| A6 | −1.11376E−09 | 1.52019E−08 | 4.56978E−09 | 3.57072E−09 |
| A8 | −7.98113E−13 | −3.03658E−10 | −5.63651E−11 | −3.72868E−11 |
| A10 | 4.94213E−17 | 3.83180E−12 | 1.83409E−13 | 1.32411E−13 |
| A12 | 0.00000E+00 | −3.10779E−14 | −2.73803E−16 | −1.94856E−16 |
| A14 | 0.00000E+00 | 1.59487E−16 | 0.00000E+00 | 0.00000E+00 |
| A16 | 0.00000E+00 | −4.96723E−19 | 0.00000E+00 | 0.00000E+00 |
| A18 | 0.00000E+00 | 8.52414E−22 | 0.00000E+00 | 0.00000E+00 |
| A20 | 0.00000E+00 | −6.15509E−25 | 0.00000E+00 | 0.00000E+00 |

| Various Data | | | |
|---|---|---|---|
| Zoom Ratio | | 2.69 | |
| | Wide Angle | Mid Range | Telephoto |
| Focal Length | 72.10 | 117.99 | 194.00 |
| F Number | 2.91 | 2.89 | 2.92 |
| Total Angle 2ω of View | 32.89 | 20.00 | 12.18 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 36.5183 | 70.3704 |
| d7 | 19.5993 | 15.1464 | 7.3965 |
| d10 | 38.4117 | 15.0888 | 1.0320 |
| d12 | 23.3003 | 16.5584 | 4.5122 |
| d26 | 7.8143 | 7.1199 | 3.0000 |
| d30 | 11.4414 | 10.6248 | 19.1652 |
| d32 | 5.9090 | 7.4192 | 3.0000 |
| BF | 1.0000 | 1.0001 | 0.9998 |
| d0 | 778.0004 | 777.9998 | 778.0002 |
| d5 | 2.0000 | 36.5183 | 70.3704 |
| d7 | 19.5993 | 15.1464 | 7.3965 |
| d10 | 38.4117 | 15.0888 | 1.0320 |
| d12 | 23.3003 | 16.5584 | 4.5122 |
| d26 | 9.1260 | 10.6039 | 10.8371 |
| d30 | 9.0827 | 4.7031 | 4.7018 |
| d32 | 6.9562 | 9.8579 | 9.6268 |
| BF | 0.9998 | 0.9999 | 0.9995 |

| Lens Group Data | | |
|---|---|---|
| Lens Group | Starting Surface | Focal Length |
| G1 | 1 | 165.36 |
| G2 | 6 | −128.01 |
| G3 | 8 | −107.31 |
| G4 | 11 | 127.52 |
| G5 | 13 | 55.81 |
| G6 | 27 | −60.60 |
| G7 | 31 | 51.78 |
| G8 | 33 | −48.65 |

Example 6

Figure 81:
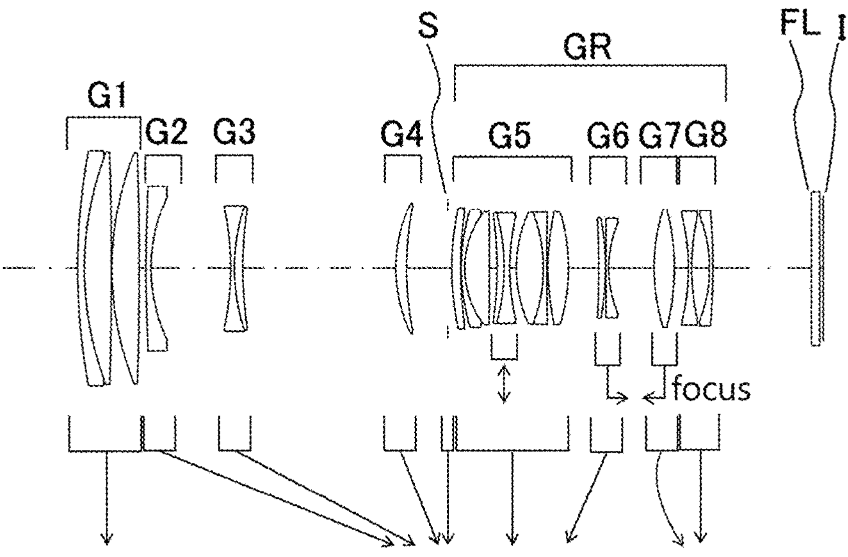
FIG. 81 is a lens configuration diagram according to Example 6 of the present invention.
Figure 82:
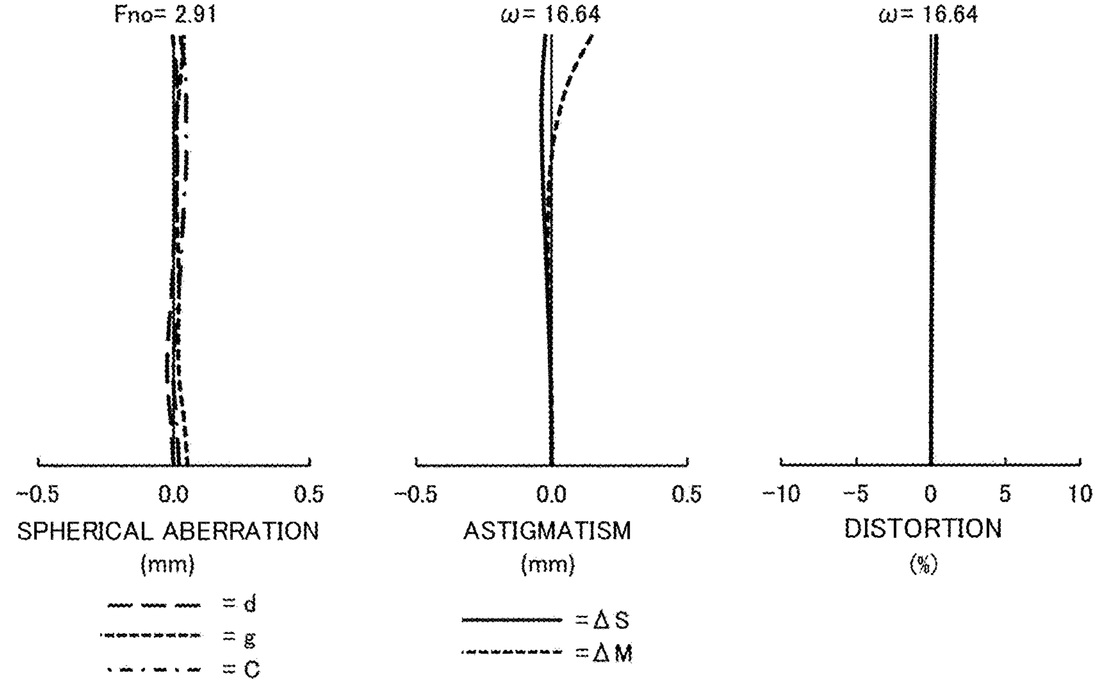
FIG. 82 is a longitudinal aberration diagram at the wide-angle end when focusing on infinity in Example 6.
Figure 83:
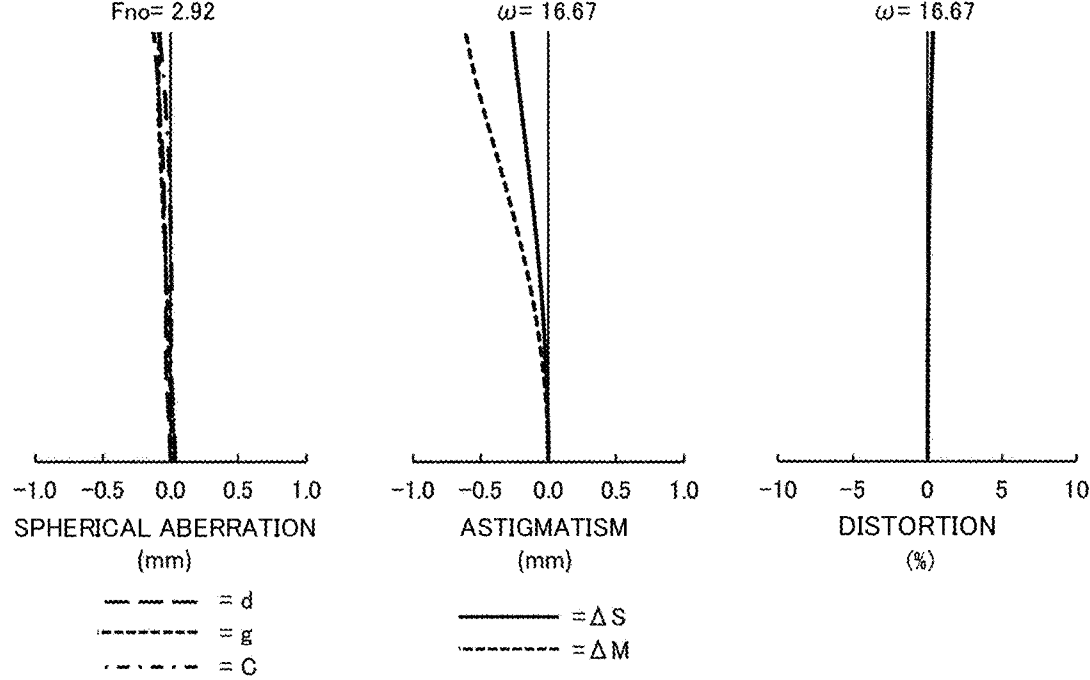
FIG. 83 is a longitudinal aberration diagram at the wide-angle end at a focusing distance of 1.0 m in Example 6.
Figure 84:
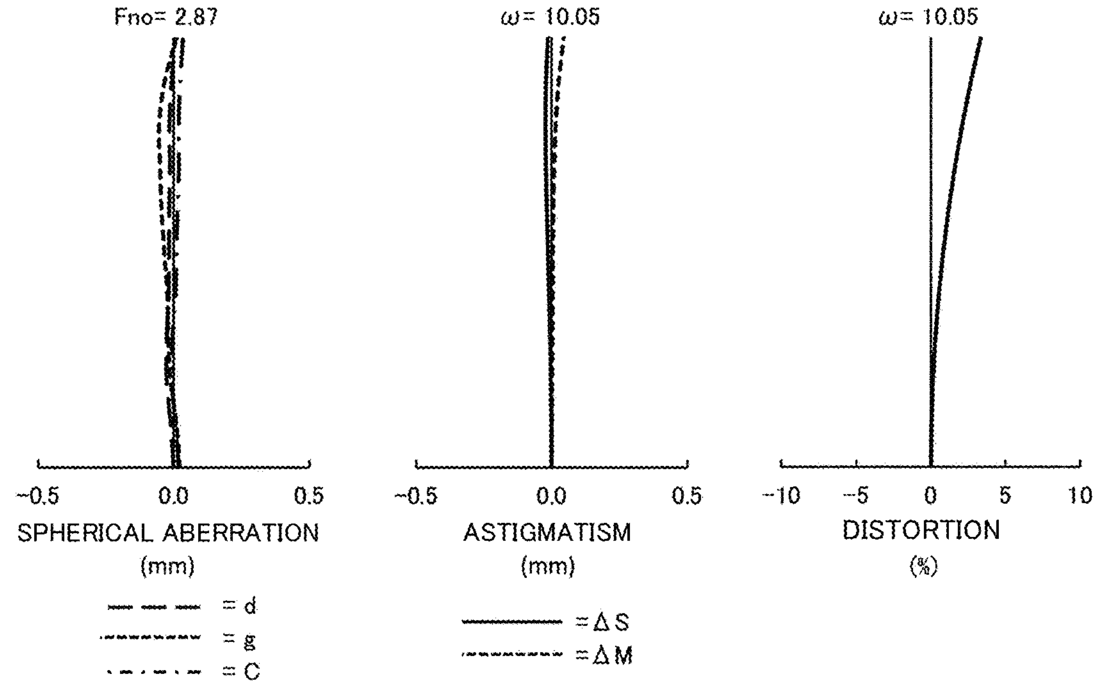
FIG. 84 is a longitudinal aberration diagram at an intermediate focal length when focusing on infinity in Example 6.
Figure 85:
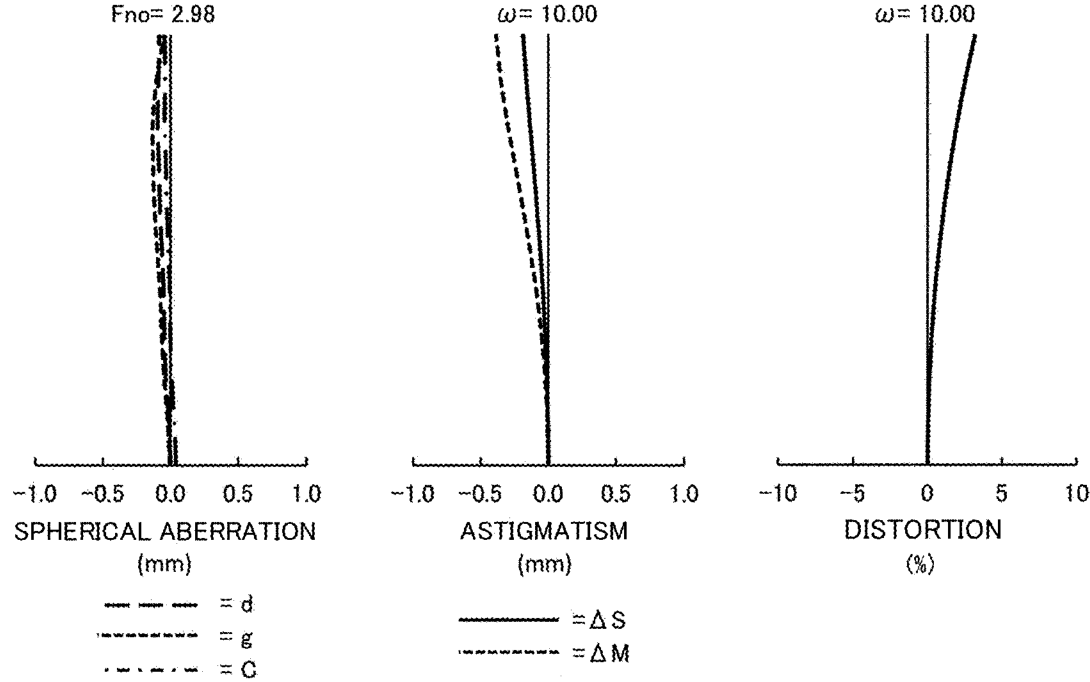
FIG. 85 is a longitudinal aberration diagram at an intermediate focal length at a focusing distance of 1.0 m in Example 6.
Figure 86:
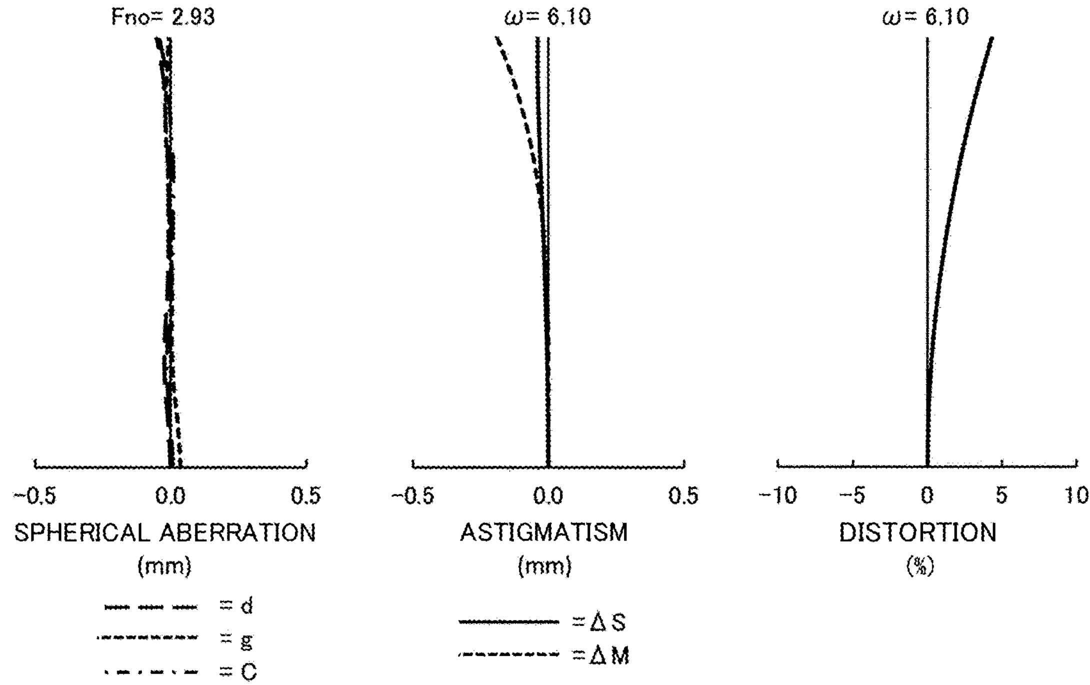
FIG. 86 is a longitudinal aberration diagram at the telephoto end when focusing on infinity in Example 6.
Figure 87:
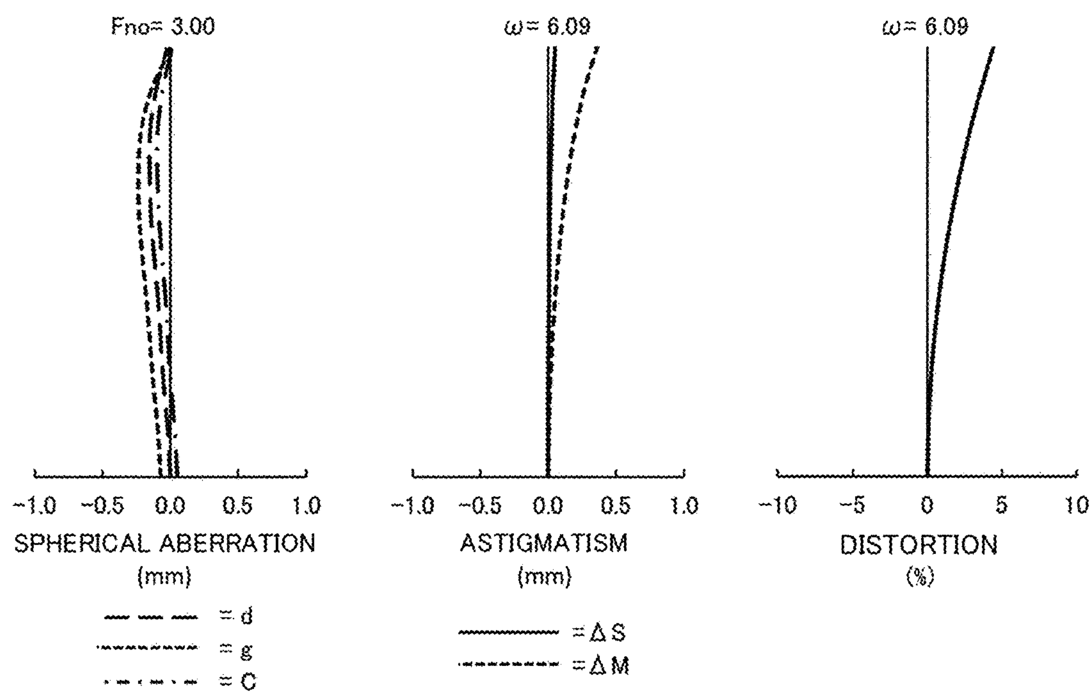
FIG. 87 is a longitudinal aberration diagram at the telephoto end at a focusing distance of 1.0 m in Example 6.
Figure 88:
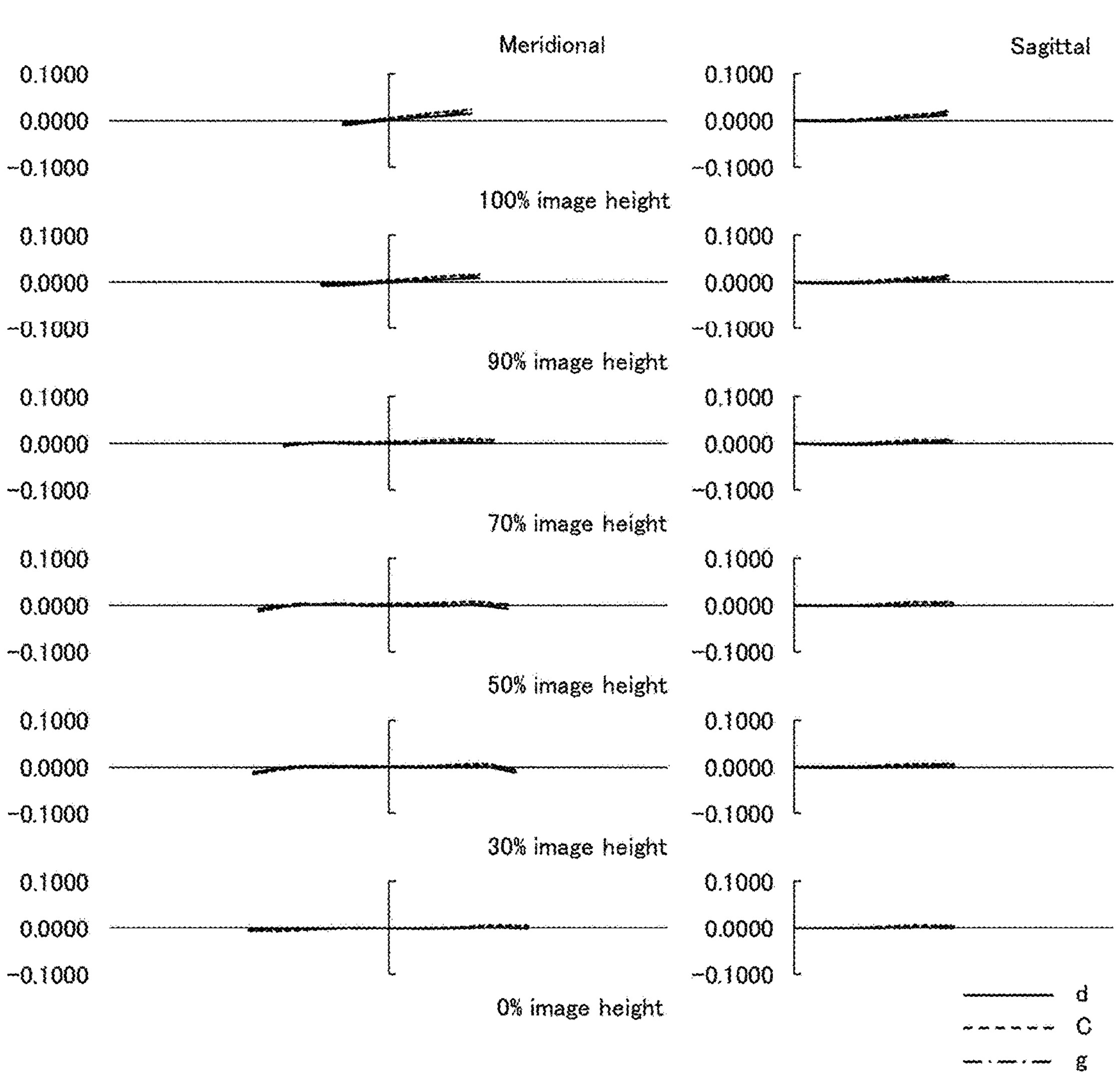
FIG. 88 is a lateral aberration diagram at the wide-angle end when focusing on infinity in Example 6.
Figure 89:
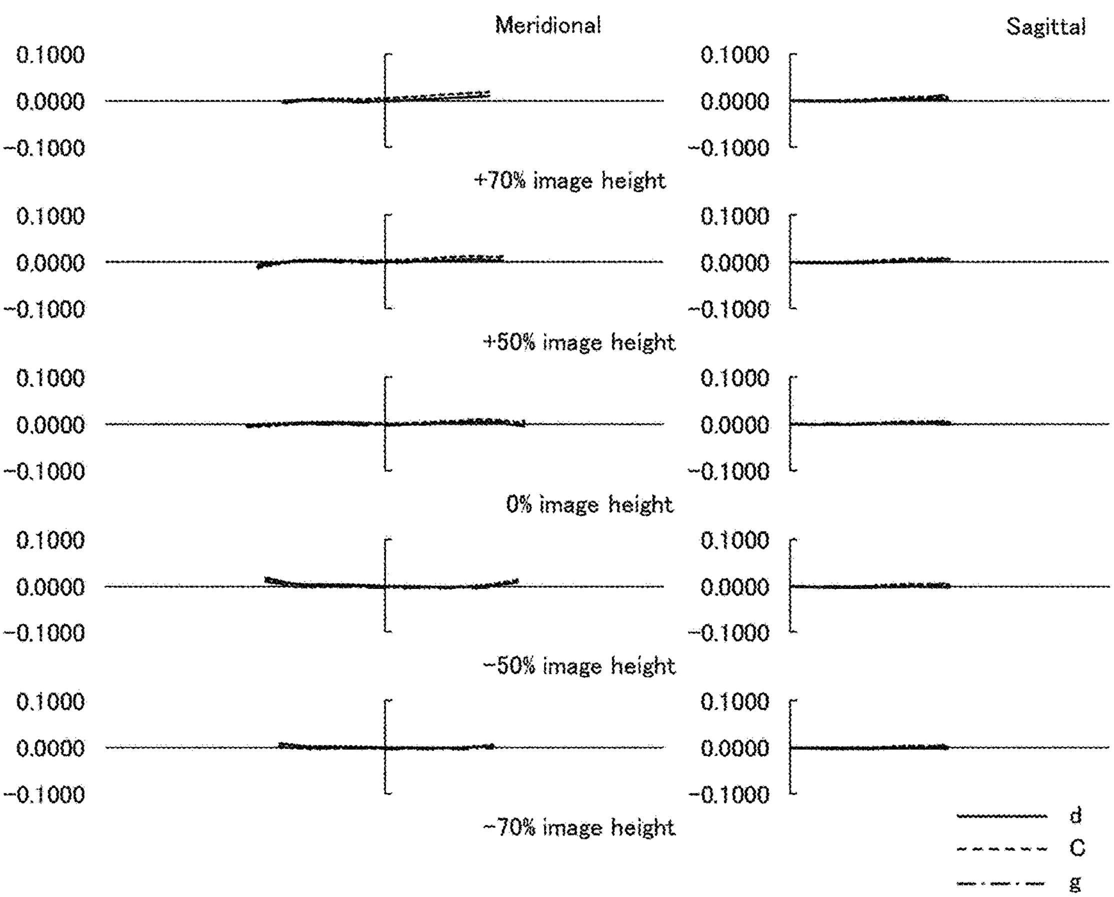
FIG. 89 is a lateral aberration diagram at the wide-angle end when focusing on infinity and compensating for a tilt of 0.4° in Example 6.
Figure 90:
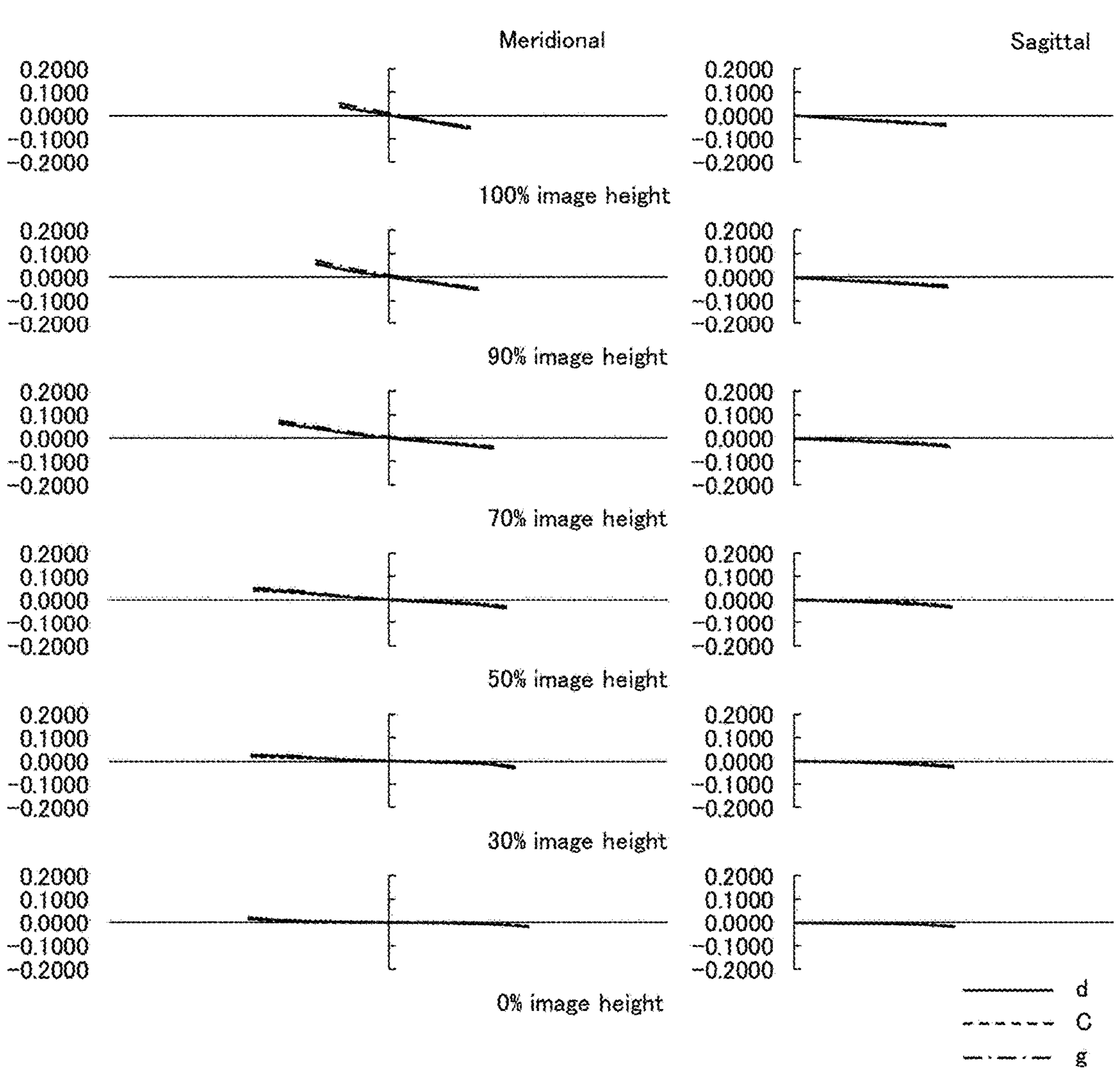
FIG. 90 is a lateral aberration diagram at the wide-angle end at a focusing distance of 1.0 m in Example 6.
Figure 91:
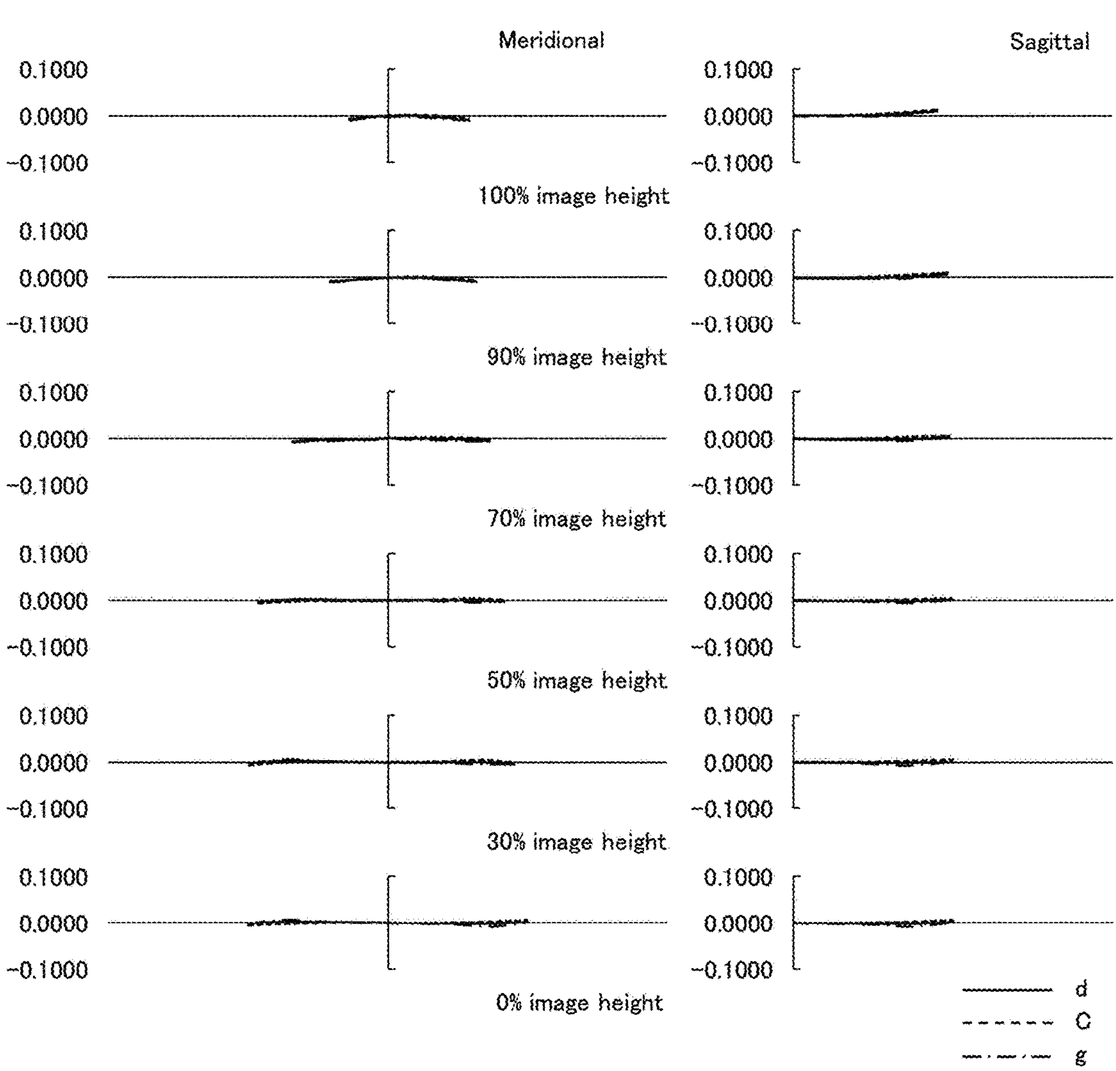
FIG. 91 is a lateral aberration diagram at an intermediate focal length when focusing on infinity in Example 6.
Figure 92:
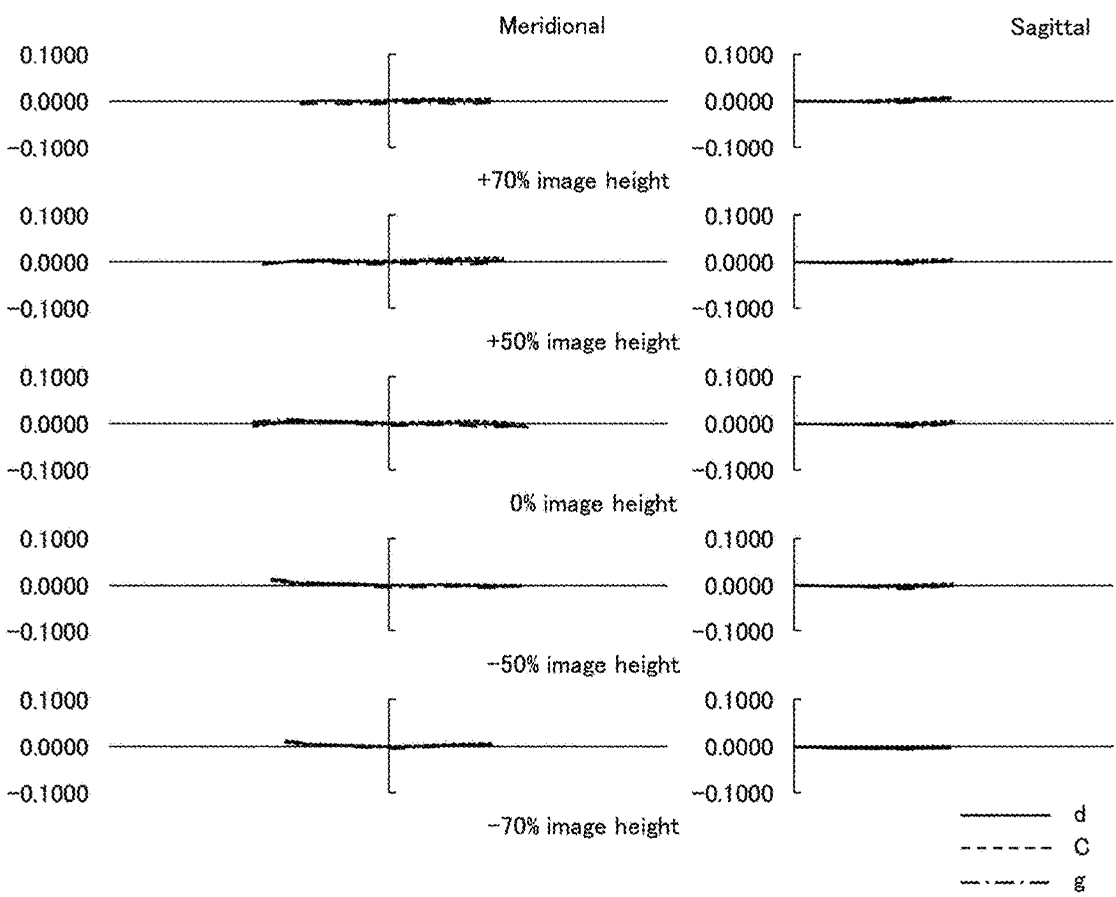
FIG. 92 is a lateral aberration diagram at an intermediate focal length when focusing on infinity and compensating for a tilt of 0.4° in Example 6.
Figure 93:
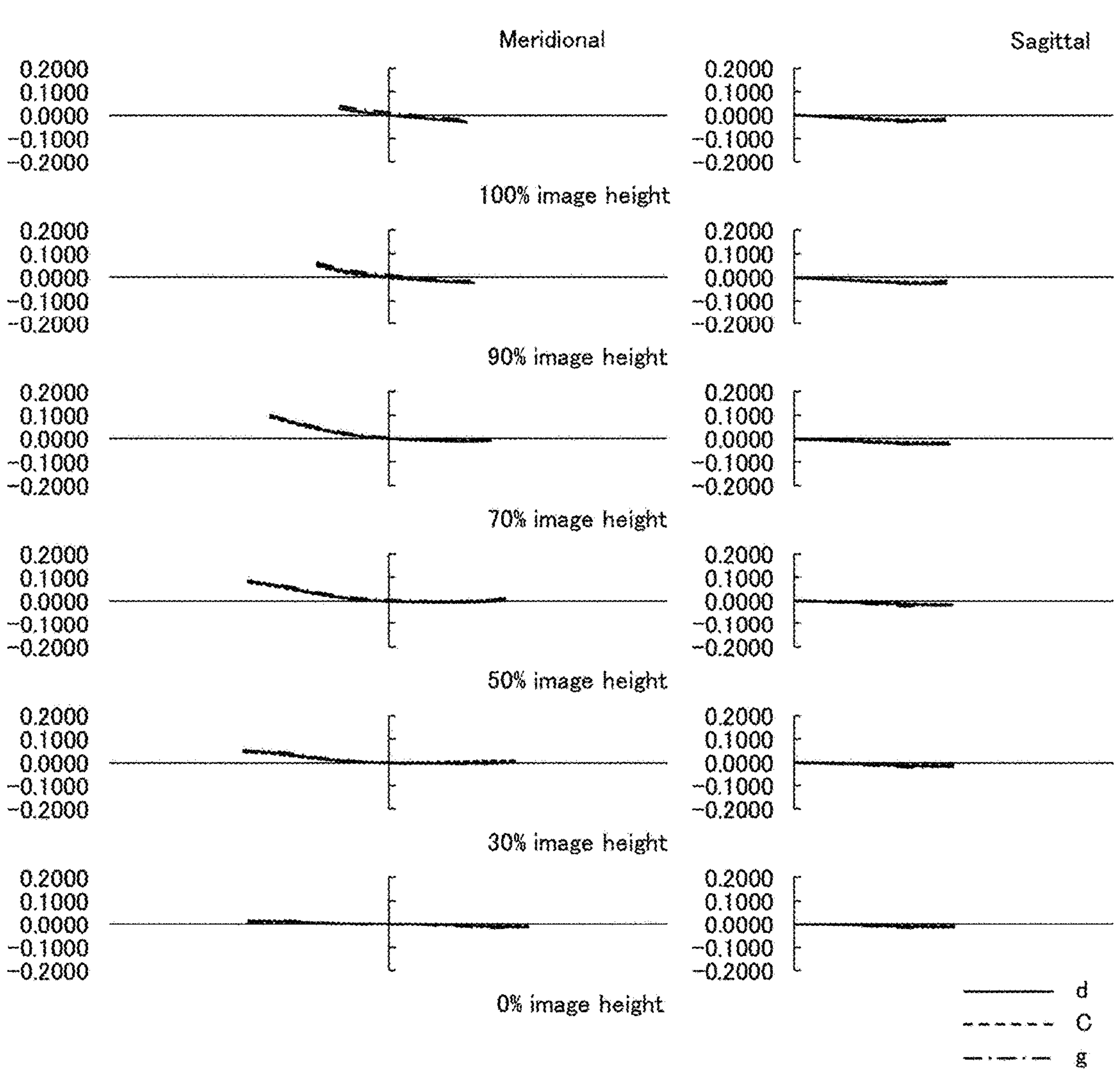
FIG. 93 is a lateral aberration diagram at an intermediate focal length at a focusing distance of 1.0 m in Example 6.
Figure 94:
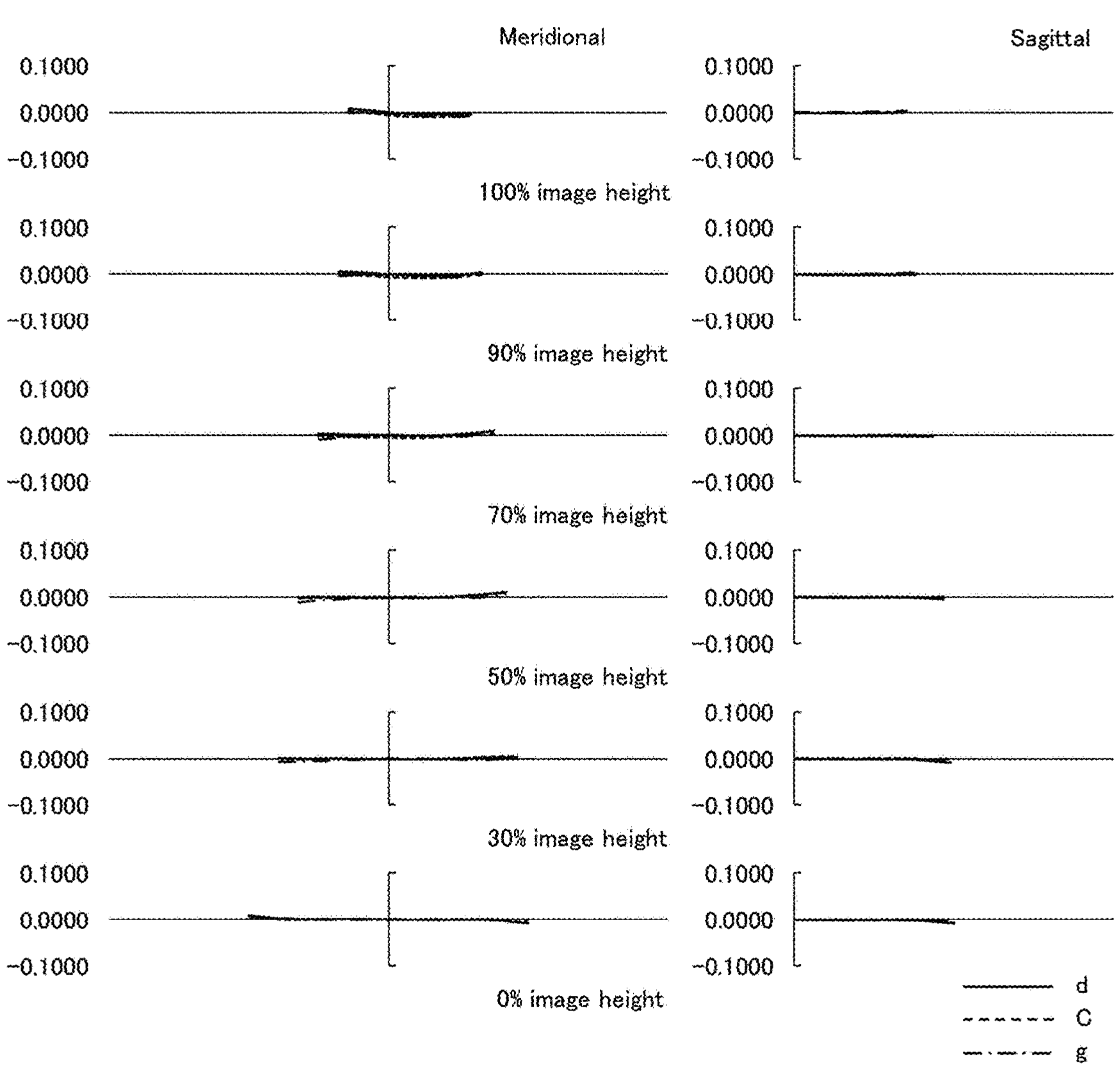
FIG. 94 is a lateral aberration diagram at the telephoto end when focusing on infinity in Example 6.
Figure 95:
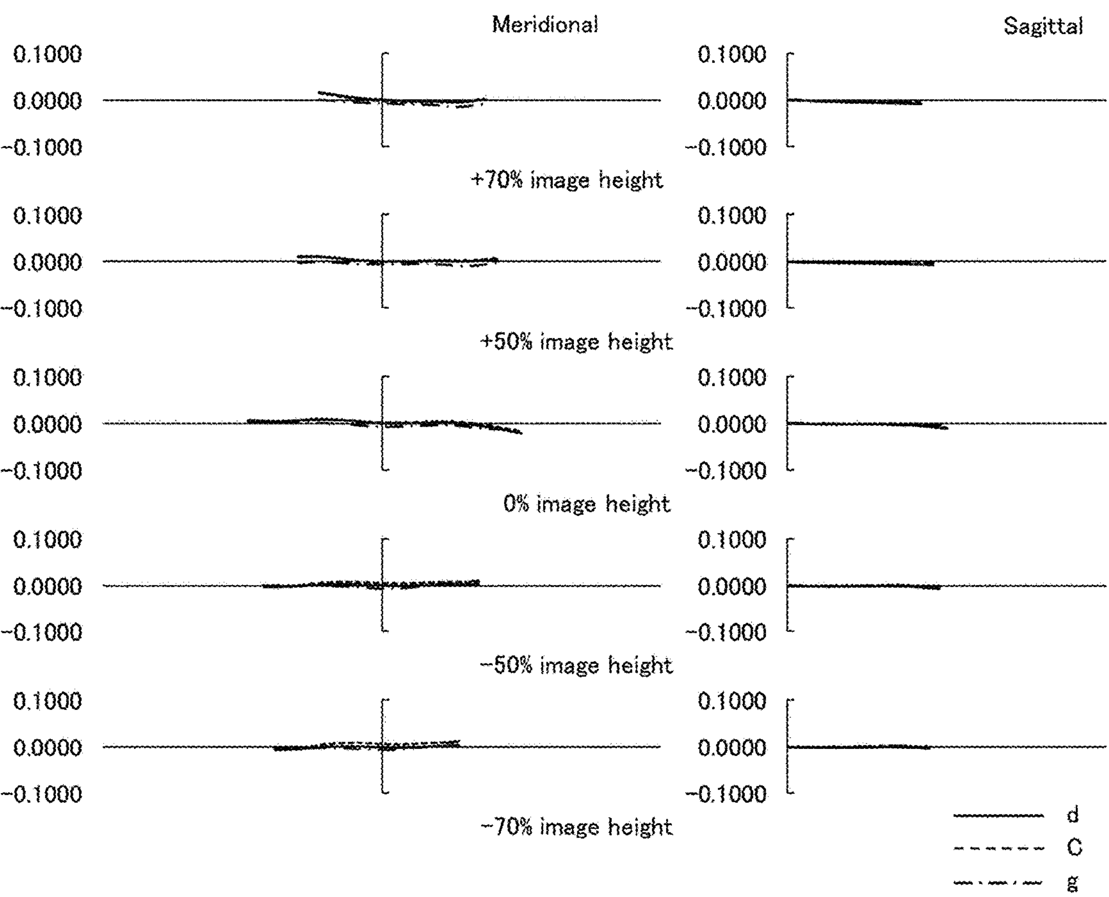
FIG. 95 is a lateral aberration diagram at the telephoto end when focusing on infinity and compensating for a tilt of 0.4° in Example 6.
Figure 96:
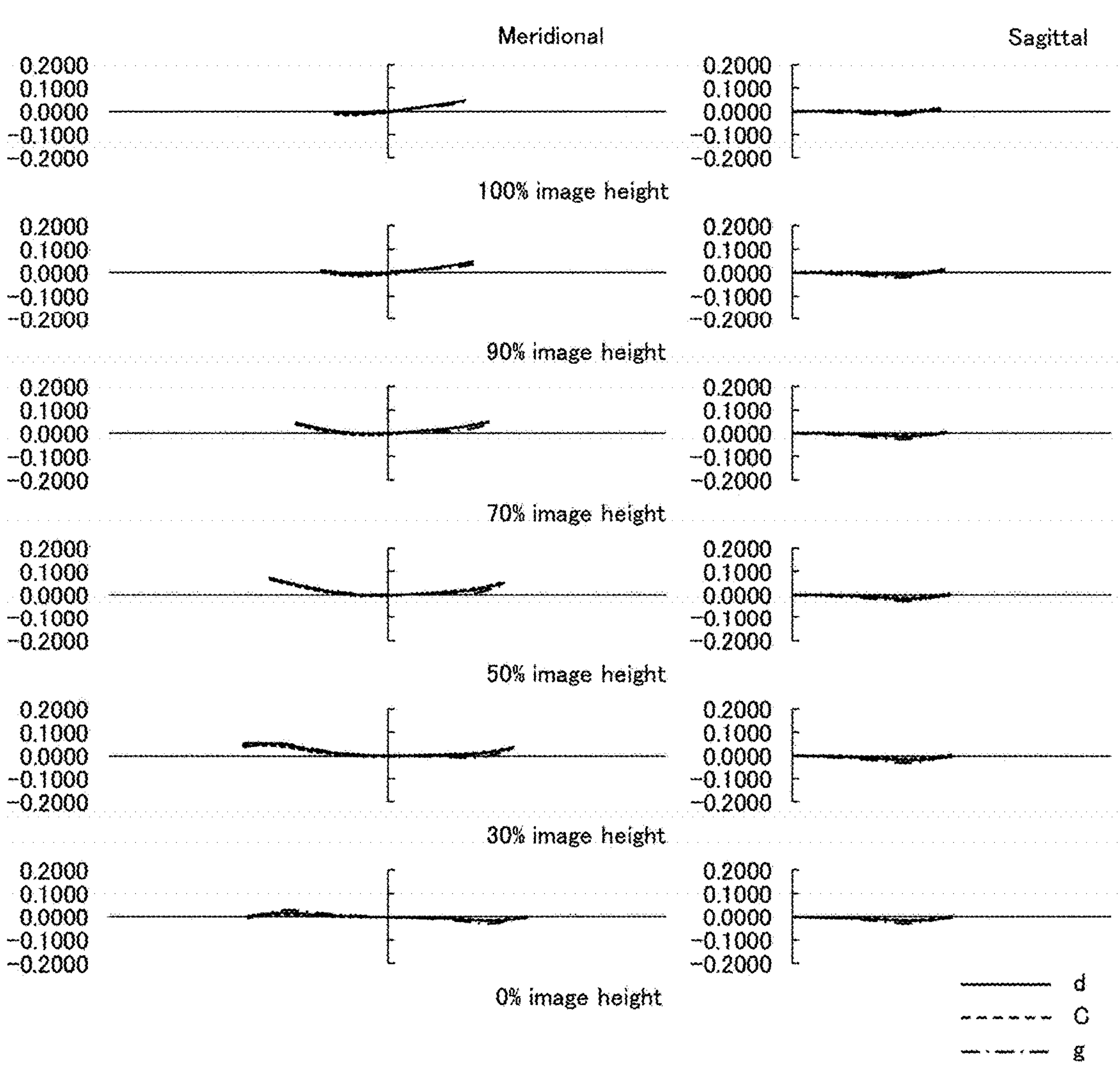
FIG. 96 is a lateral aberration diagram at the telephoto end at a focusing distance of 1.0 m in Example 6.

FIG. 81 is a lens configuration diagram of a large aperture ratio telephoto zoom lens according to Example 6 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a biconvex lens. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a biconvex lens, a cemented lens composed of a convex meniscus lens having the convex surface on the image side and a biconcave lens, a cemented lens composed of a biconvex lens and a biconcave lens, and a biconvex lens. The sixth lens group G6 is configured with a convex meniscus lens having the convex surface on the image side, and a biconcave lens. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 6 are shown below.

Numerical Data in Example 6

Unit: mm

Surface Data

| Surface Number | r | d | nd | vd | PgF |
|---|---|---|---|---|---|
| Object Surface | ∞ | (d0) | | | |
| 1 | 193.5620 | 2.0000 | 1.78590 | 43.94 | 0.5612 |
| 2 | 96.2211 | 8.0485 | 1.43700 | 95.10 | 0.5336 |
| 3 | −1103.5915 | 0.1500 | | | |
| 4 | 92.5814 | 8.1452 | 1.43700 | 95.10 | 0.5336 |
| 5 | −975.4257 | (d5) | | | |
| 6 | 476.2937 | 1.5000 | 1.43700 | 95.10 | 0.5336 |
| 7 | 49.6140 | (d7) | | | |
| 8 | 83.3553 | 1.1000 | 1.55032 | 75.50 | 0.5401 |
| 9 | 57.5641 | 2.5195 | 1.85883 | 30.00 | 0.5979 |
| 10 | 119.3003 | (d10) | | | |
| 11 | 44.2599 | 3.2078 | 1.87070 | 40.73 | 0.5682 |
| 12 | 94.7915 | (d12) | | | |
| 13 (diaphragm) | ∞ | 1.2000 | | | |
| 14* | 75.5964 | 2.6791 | 1.80610 | 40.73 | 0.5694 |
| 15 | 122.9862 | 0.1500 | | | |
| 16 | 58.3560 | 1.0500 | 1.80610 | 33.27 | 0.5884 |
| 17 | 27.5151 | 7.3465 | 1.43700 | 95.10 | 0.5336 |
| 18 | −1325.7642 | 2.2853 | | | |
| 19 | −107.2009 | 2.0897 | 1.80809 | 22.76 | 0.6307 |
| 20 | −60.2746 | 1.6900 | 1.69350 | 53.20 | 0.5467 |
| 21* | 64.1433 | 1.9593 | | | |
| 22 | 39.9365 | 8.0385 | 1.43700 | 95.10 | 0.5336 |
| 23 | −45.7417 | 1.0500 | 1.85451 | 25.15 | 0.6103 |
| 24 | 1027.5050 | 0.2994 | | | |
| 25* | 65.7095 | 6.1479 | 1.76450 | 49.09 | 0.5528 |
| 26* | −54.9509 | (d26) | | | |
| 27 | −263.1360 | 1.9850 | 1.86966 | 20.02 | 0.6435 |
| 28 | −80.2028 | 0.1500 | | | |
| 29 | −4085.0749 | 0.8000 | 1.75500 | 52.32 | 0.5473 |
| 30 | 33.9994 | (d30) | | | |
| 31 | 58.6518 | 6.0514 | 1.65100 | 56.24 | 0.5420 |
| 32 | −68.1234 | (d32) | | | |
| 33 | −64.8750 | 1.0000 | 1.43700 | 95.10 | 0.5336 |
| 34 | 71.6053 | 5.3073 | | | |
| 35 | −41.9427 | 1.0000 | 1.49700 | 81.61 | 0.5389 |
| 36 | −197.9339 | 29.3507 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 4.47665 | −0.42208 |
| A4 | −1.80853E−06 | −2.13531E−06 | −6.67327E−06 | 1.14548E−06 |
| A6 | −3.18689E−10 | 1.68856E−08 | −4.17689E−10 | −2.70809E−09 |
| A8 | −1.10891E−12 | −3.44122E−10 | 9.08677E−12 | 1.92728E−11 |
| A10 | 1.14449E−15 | 4.79633E−12 | −8.02533E−14 | −9.24500E−14 |
| A12 | 0.00000E+00 | −4.19792E−14 | 9.99135E−17 | 1.08250E−16 |
| A14 | 0.00000E+00 | 2.27090E−16 | 0.00000E+00 | 0.00000E+00 |
| A16 | 0.00000E+00 | −7.35855E−19 | 0.00000E+00 | 0.00000E+00 |
| A18 | 0.00000E+00 | 1.30270E−21 | 0.00000E+00 | 0.00000E+00 |
| A20 | 0.00000E+00 | −9.61220E−25 | 0.00000E+00 | 0.00000E+00 |

Various Data

| | | | |
|---|---|---|---|
| Zoom Ratio | 2.69 | | |
| | Wide Angle | Mid Range | Telephoto |
| Focal Length | 72.10 | 118.00 | 193.99 |
| F Number | 2.91 | 2.87 | 2.93 |
| Total Angle of View 2ω | 33.27 | 20.11 | 12.20 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 38.0659 | 71.8375 |
| d7 | 23.7155 | 15.3051 | 6.9195 |
| d10 | 45.5519 | 20.9445 | 1.0000 |
| d12 | 12.2418 | 9.1941 | 3.7523 |
| d26 | 9.0138 | 7.9500 | 3.0000 |
| d30 | 13.5142 | 13.1127 | 20.6898 |
| d32 | 4.1616 | 5.6266 | 3.0000 |
| BF | 1.0000 | 1.0001 | 1.0000 |
| d0 | 777.9999 | 777.9999 | 777.9999 |
| d5 | 2.0000 | 38.0659 | 71.8375 |
| d7 | 23.7155 | 15.3051 | 6.9195 |
| d10 | 45.5519 | 20.9445 | 1.0000 |
| d12 | 12.2418 | 9.1941 | 3.7523 |
| d26 | 10.3449 | 11.5662 | 11.4101 |
| d30 | 11.1047 | 7.0533 | 6.0262 |
| d32 | 5.2404 | 8.0699 | 9.2535 |
| BF | 0.9998 | 1.0000 | 0.9999 |

| Lens Group Data | | |
|---|---|---|
| Lens Group | Starting Surface | Focal Length |
| G1 | 1 | 167.76 |
| G2 | 6 | −126.87 |
| G3 | 8 | −118.17 |
| G4 | 11 | 92.62 |
| G5 | 13 | 65.85 |
| G6 | 27 | −67.60 |
| G7 | 31 | 49.34 |
| G8 | 33 | −43.77 |

Example 7

Figure 97:
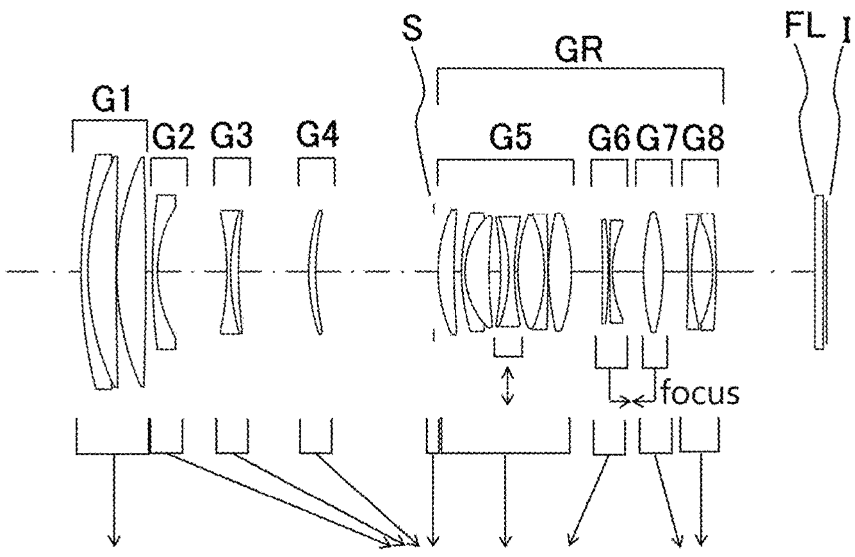
FIG. 97 is a lens configuration diagram according to Example 7 of the present invention.
Figure 98:
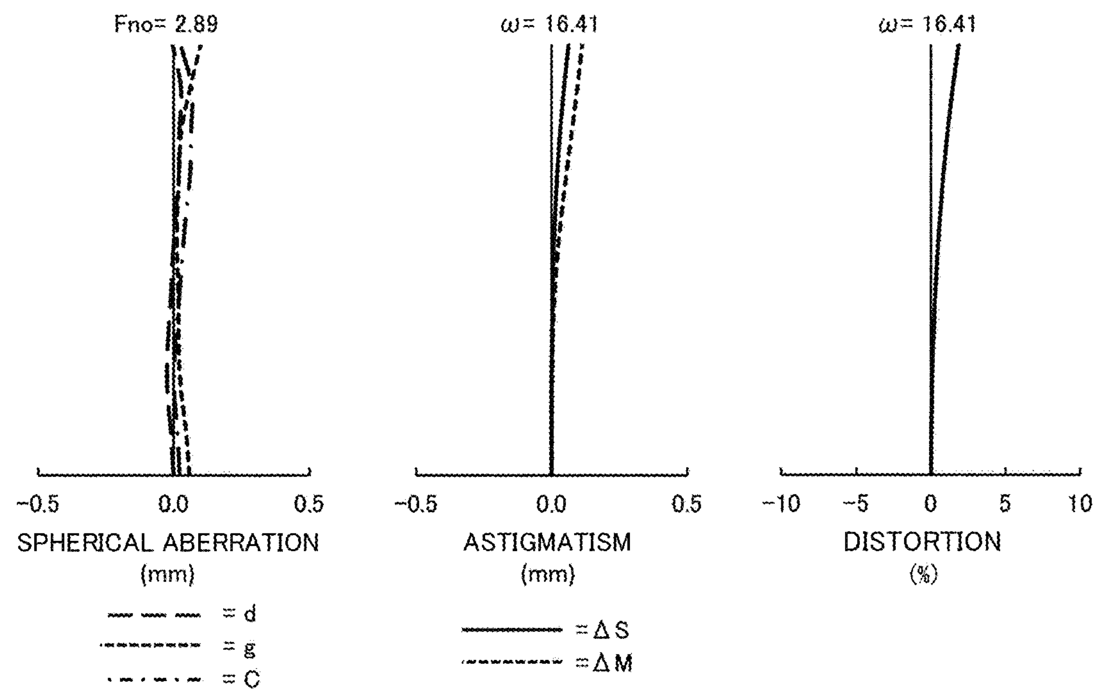
FIG. 98 is a longitudinal aberration diagram at the wide-angle end when focusing on infinity in Example 7.
Figure 99:
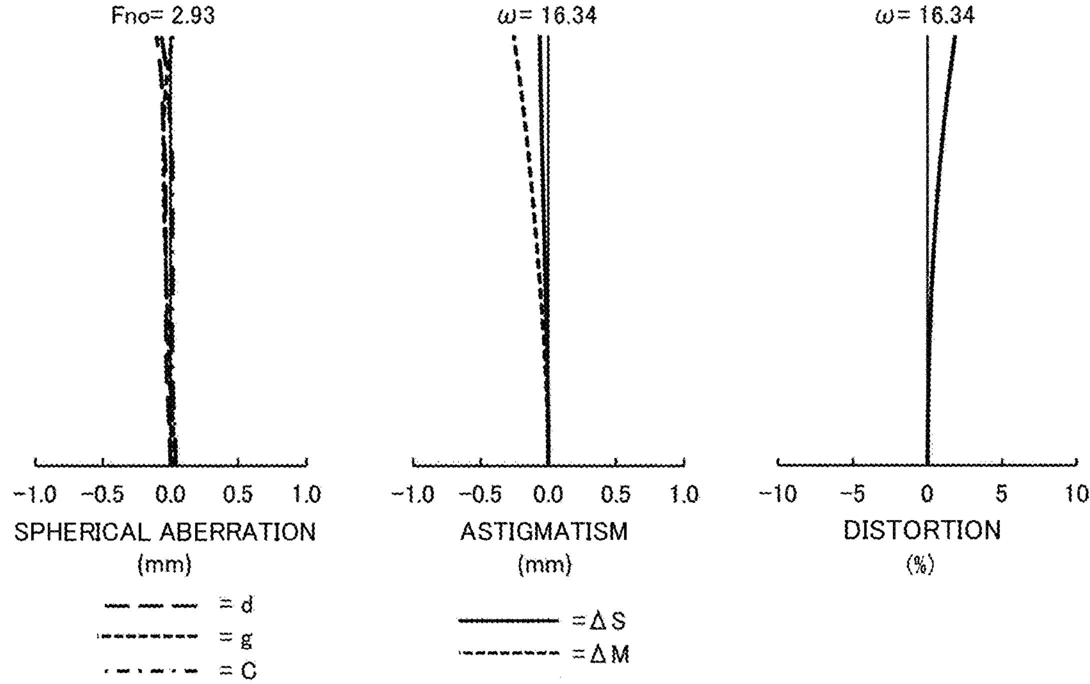
FIG. 99 is a longitudinal aberration diagram at the wide-angle end at a focusing distance of 1.0 m in Example 7.
Figure 100:
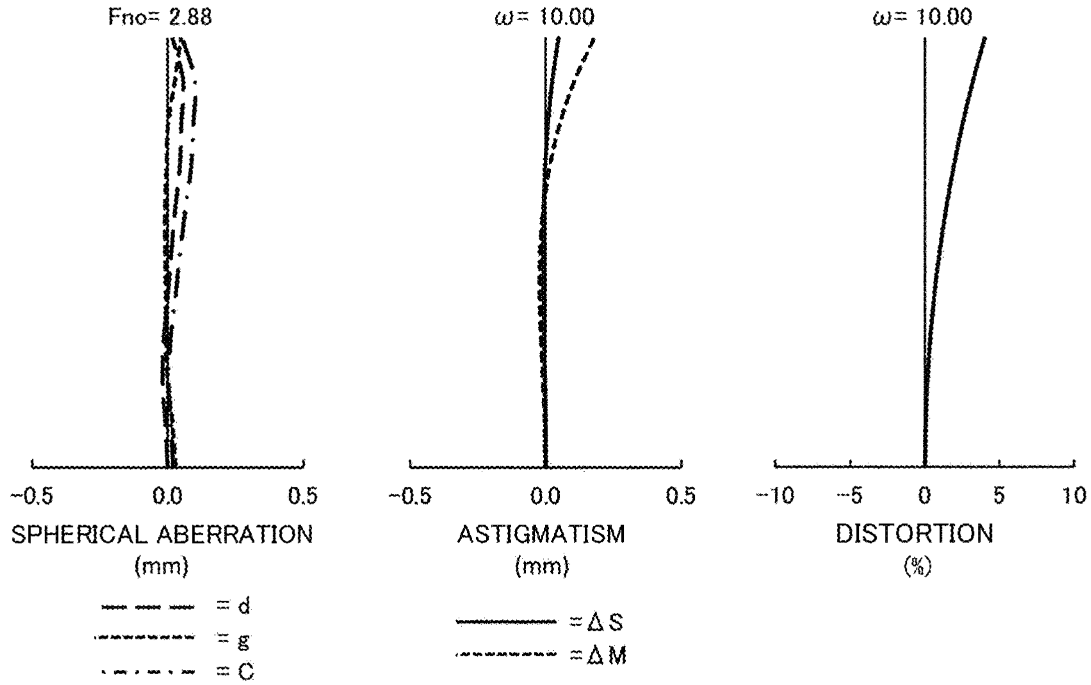
FIG. 100 is a longitudinal aberration diagram at an intermediate focal length when focusing on infinity in Example 7.
Figure 101:
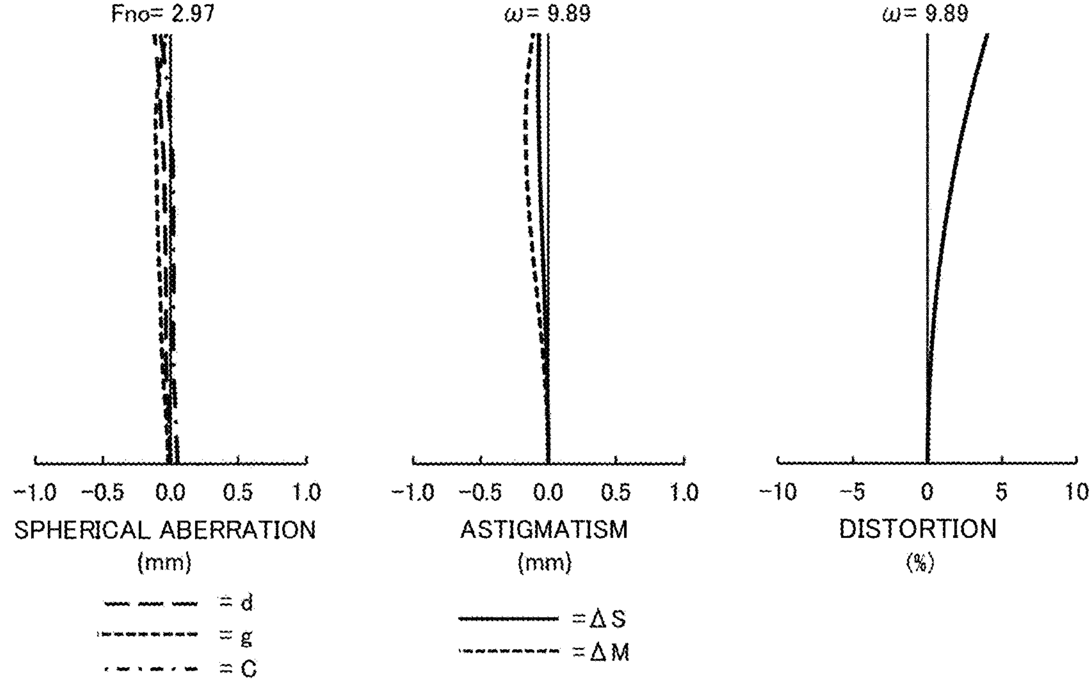
FIG. 101 is a longitudinal aberration diagram at an intermediate focal length at a focusing distance of 1.0 m in Example 7.
Figure 102:
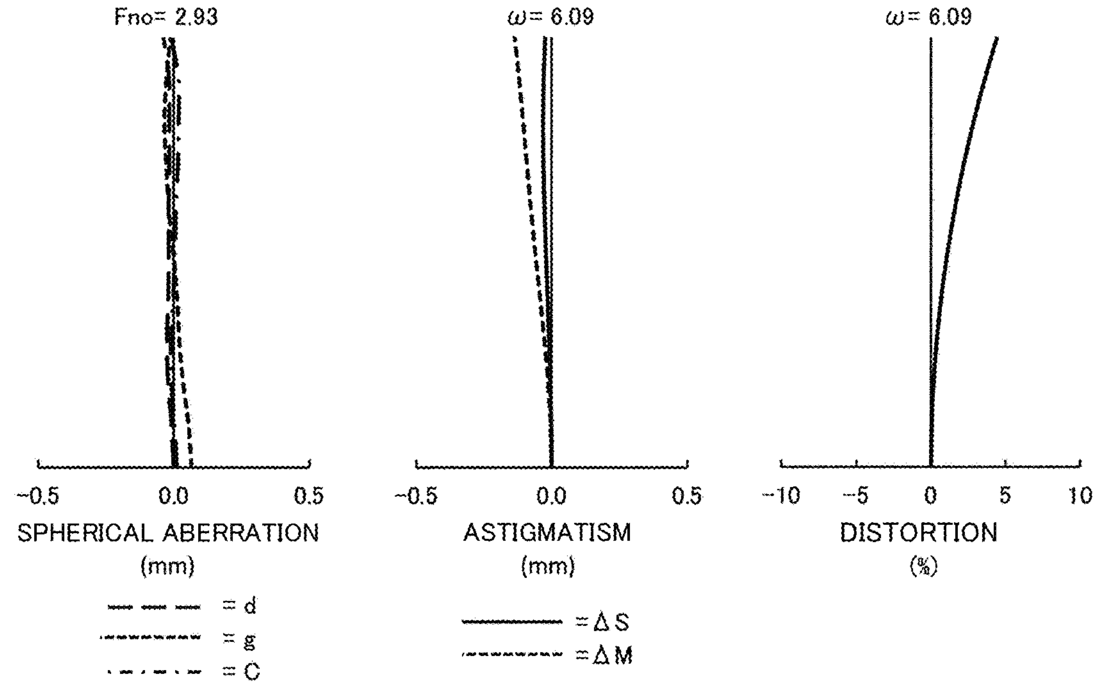
FIG. 102 is a longitudinal aberration diagram at the telephoto end when focusing on infinity in Example 7.
Figure 103:
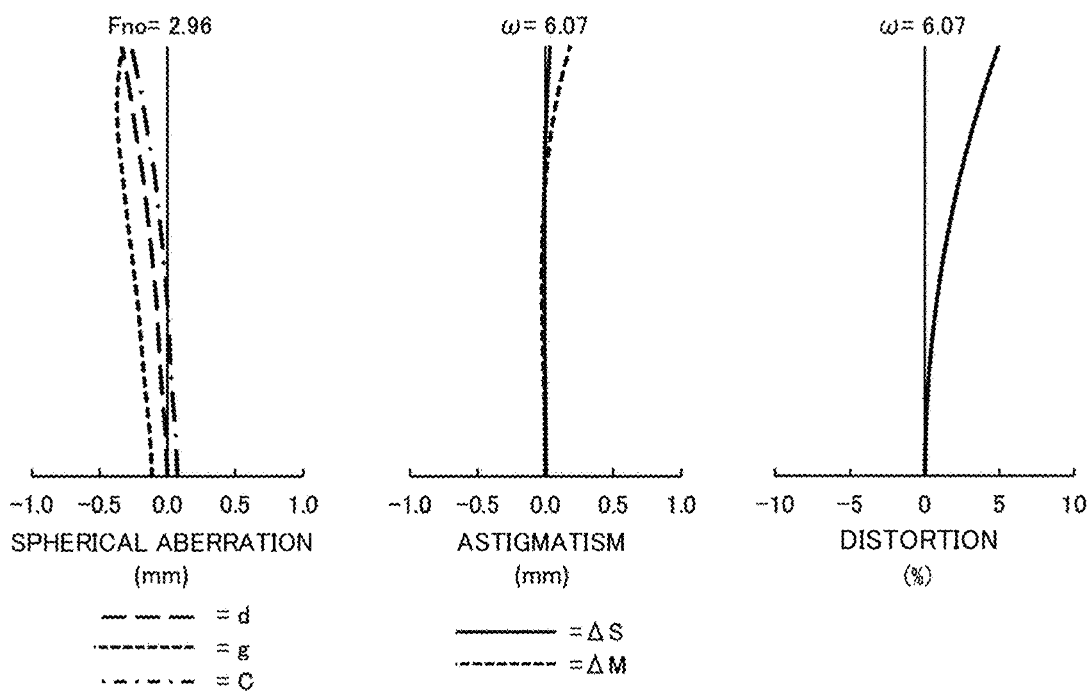
FIG. 103 is a longitudinal aberration diagram at the telephoto end at a focusing distance of 1.0 m in Example 7.
Figure 104:
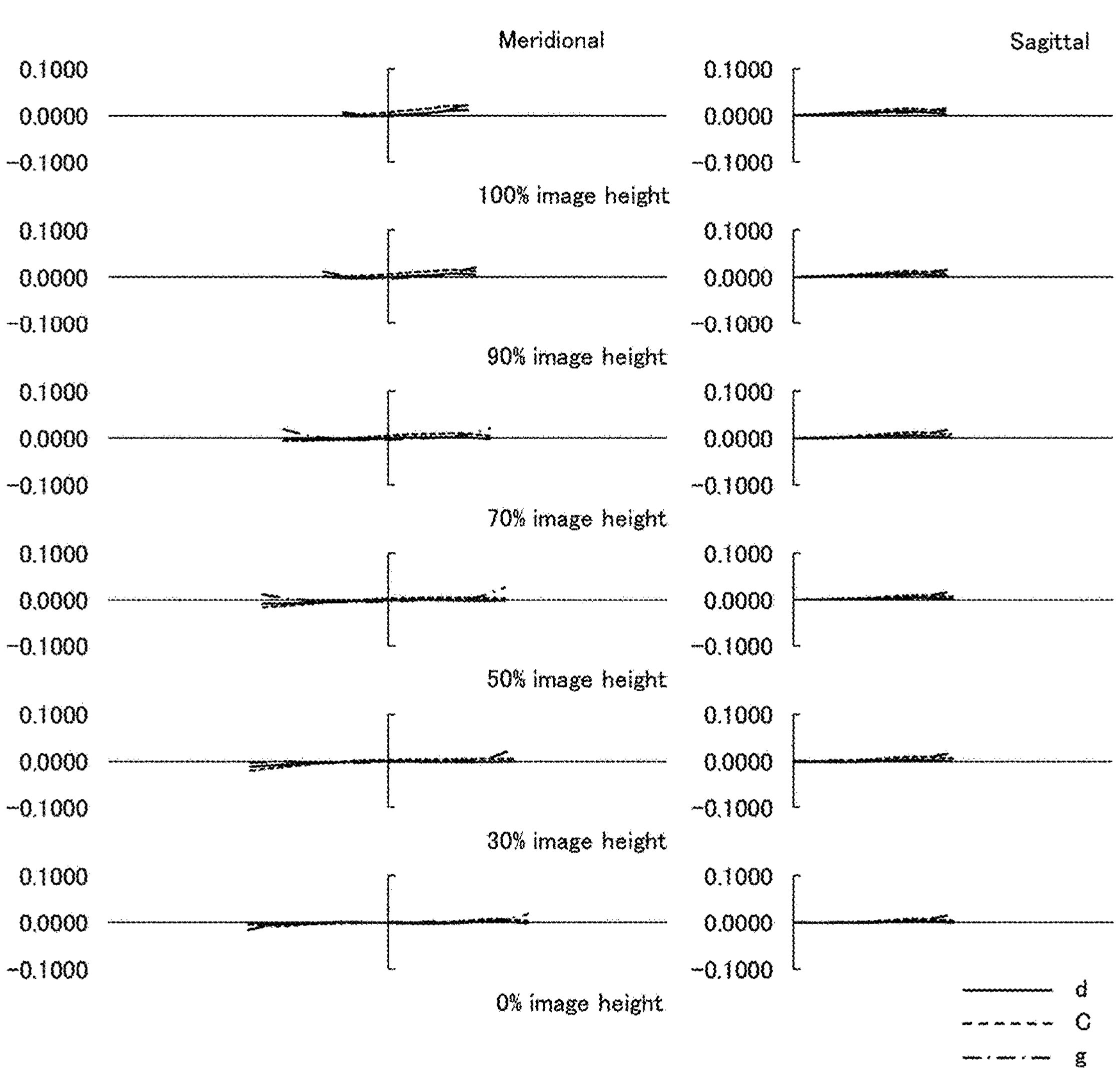
FIG. 104 is a lateral aberration diagram at the wide-angle end when focusing on infinity in Example 7.
Figure 105:
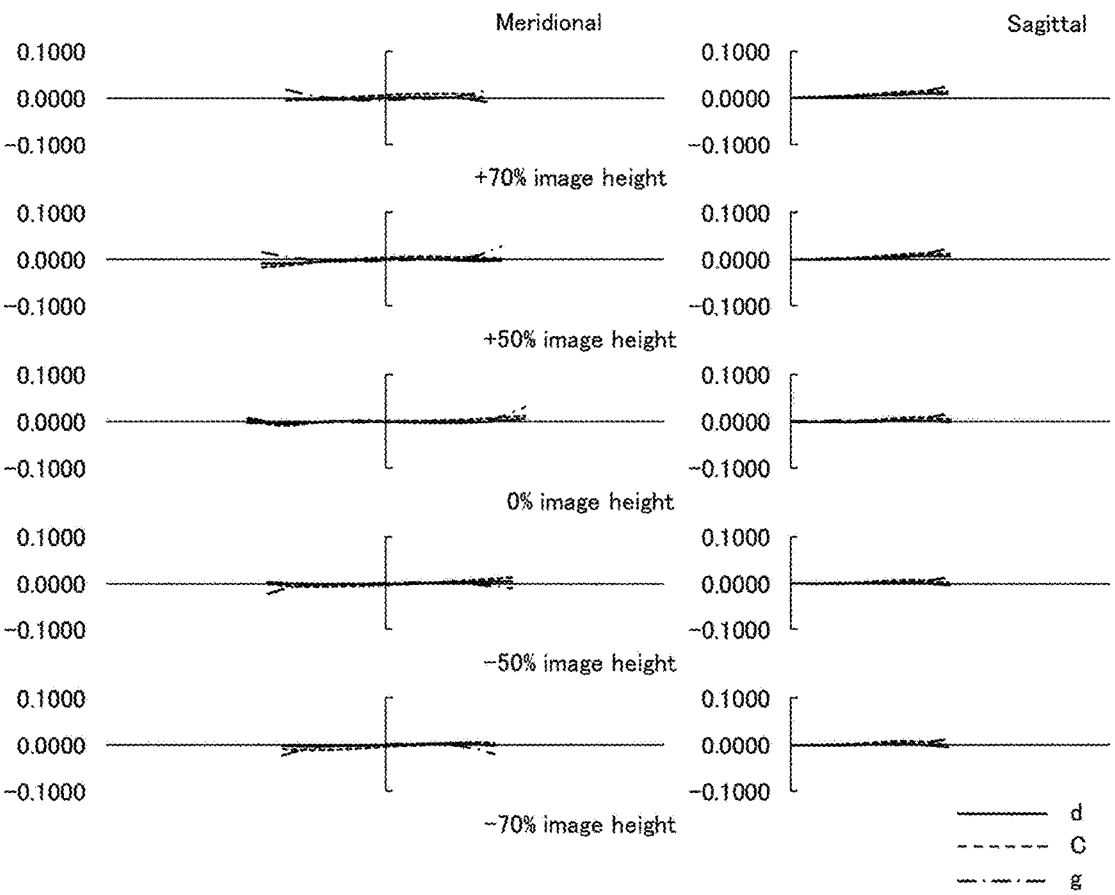
FIG. 105 is a lateral aberration diagram at the wide-angle end when focusing on infinity and compensating for a tilt of 0.4° in Example 7.
Figure 106:
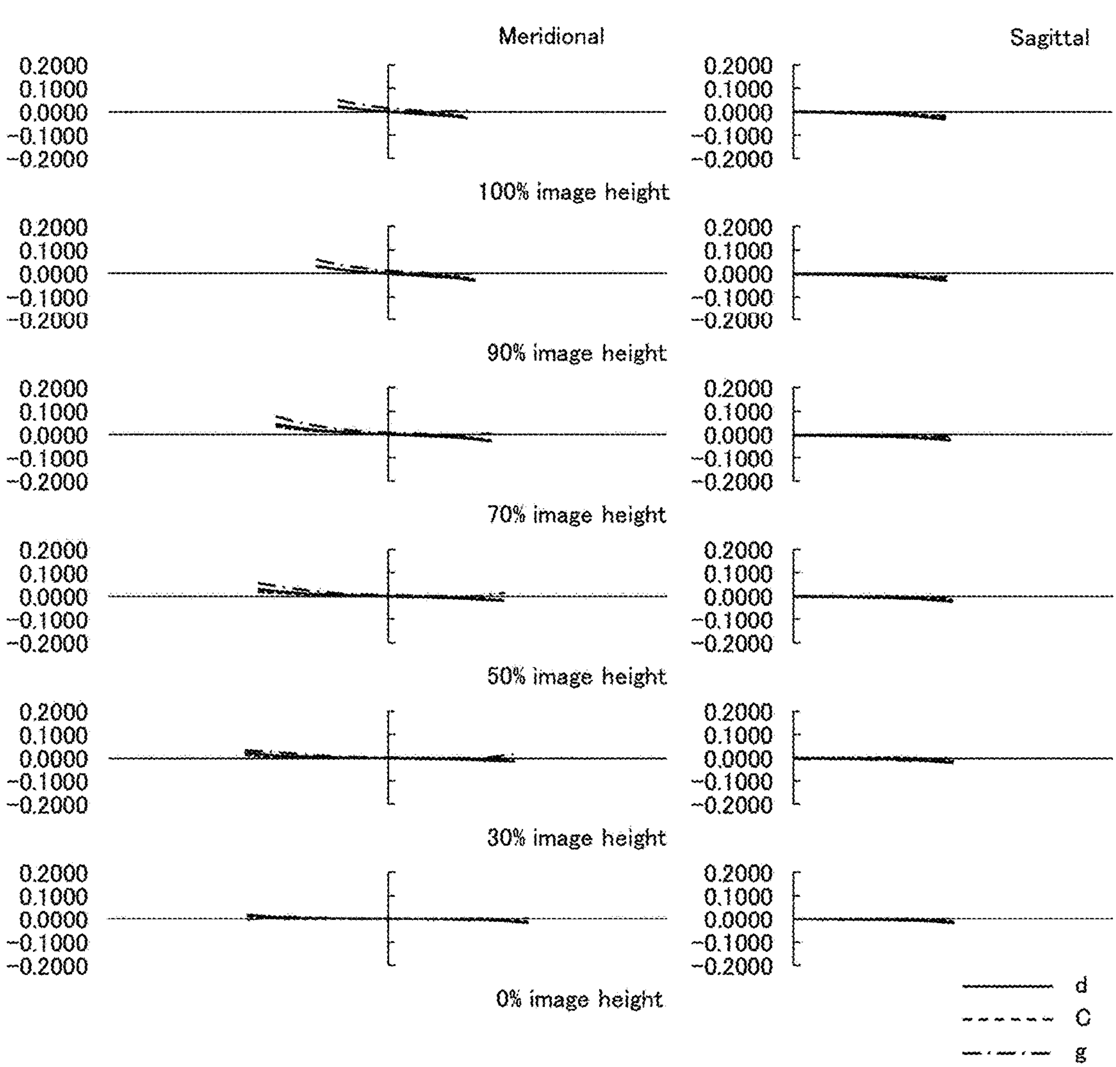
FIG. 106 is a lateral aberration diagram at the wide-angle end at a focusing distance of 1.0 m in Example 7.
Figure 107:
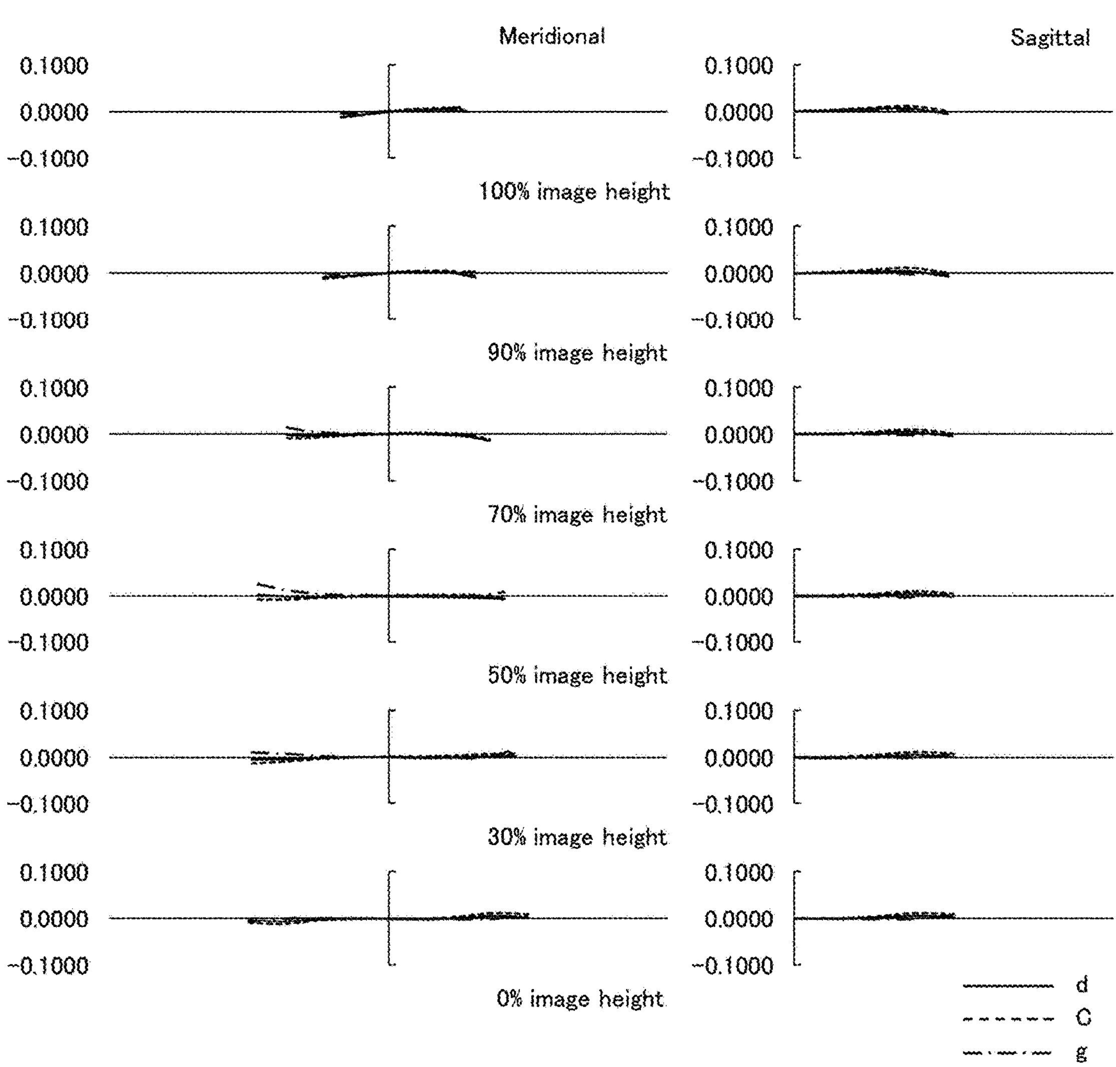
FIG. 107 is a lateral aberration diagram at an intermediate focal length when focusing on infinity in Example 7.
Figure 108:
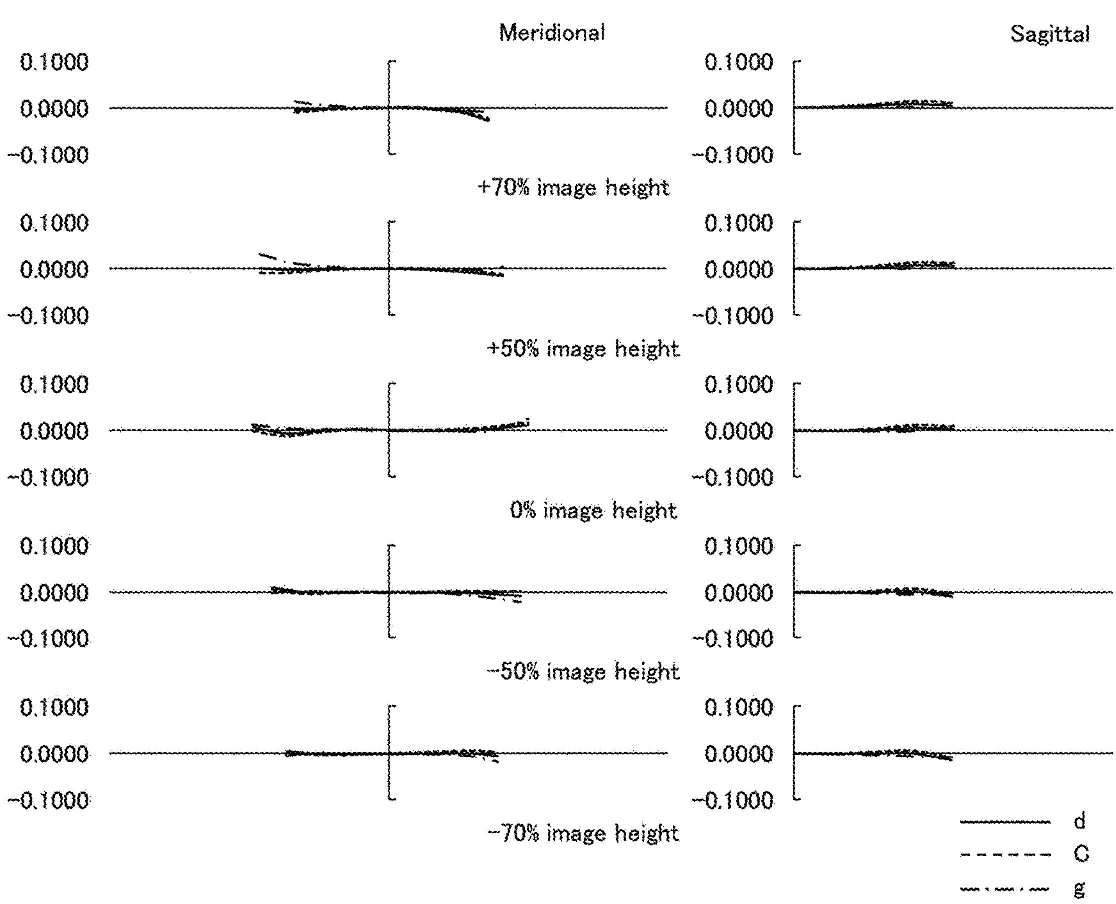
FIG. 108 is a lateral aberration diagram at an intermediate focal length when focusing on infinity and compensating for a tilt of 0.4° in Example 7.
Figure 109:
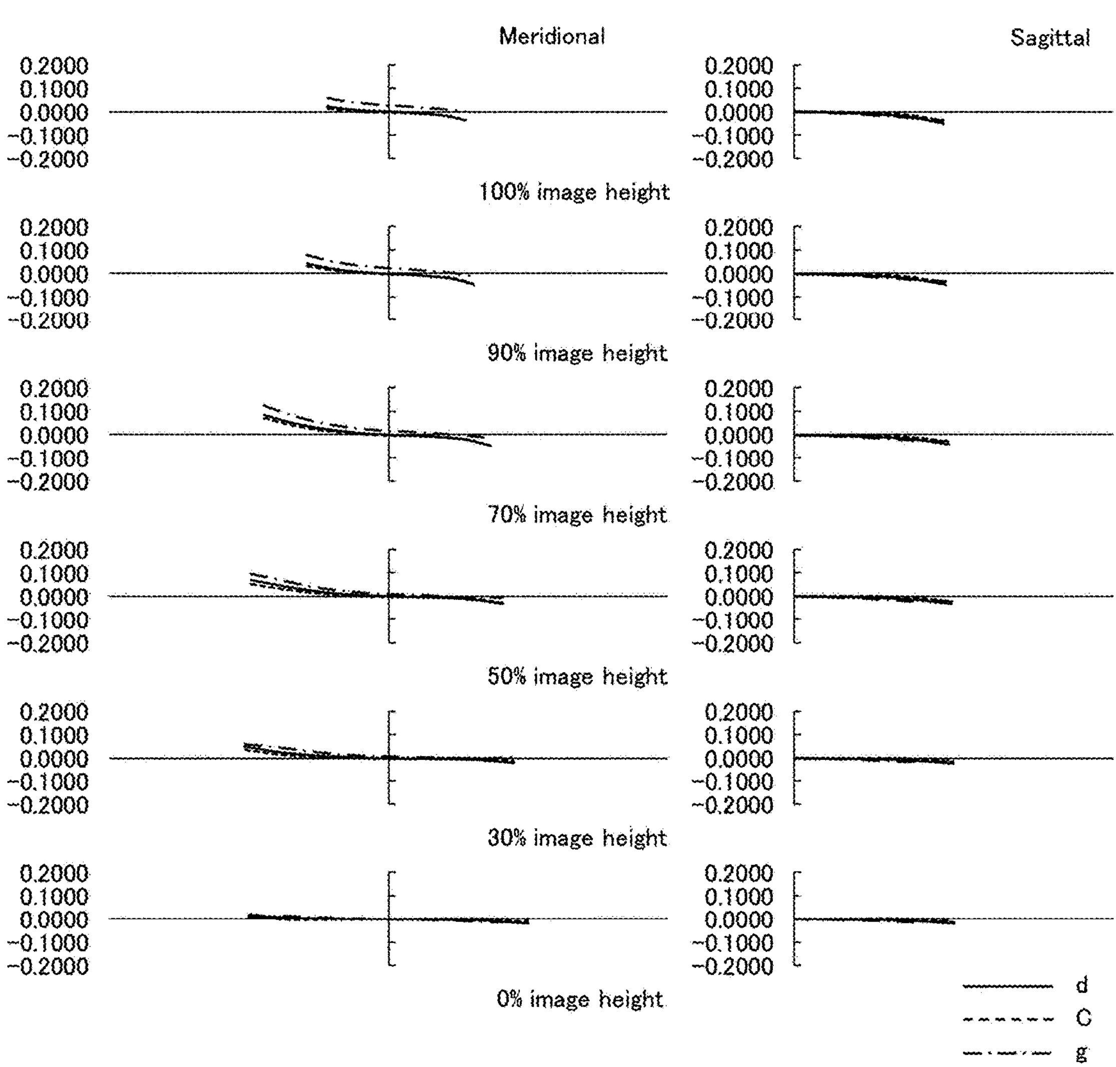
FIG. 109 is a lateral aberration diagram at an intermediate focal length at a focusing distance of 1.0 m in Example 7.
Figure 110:
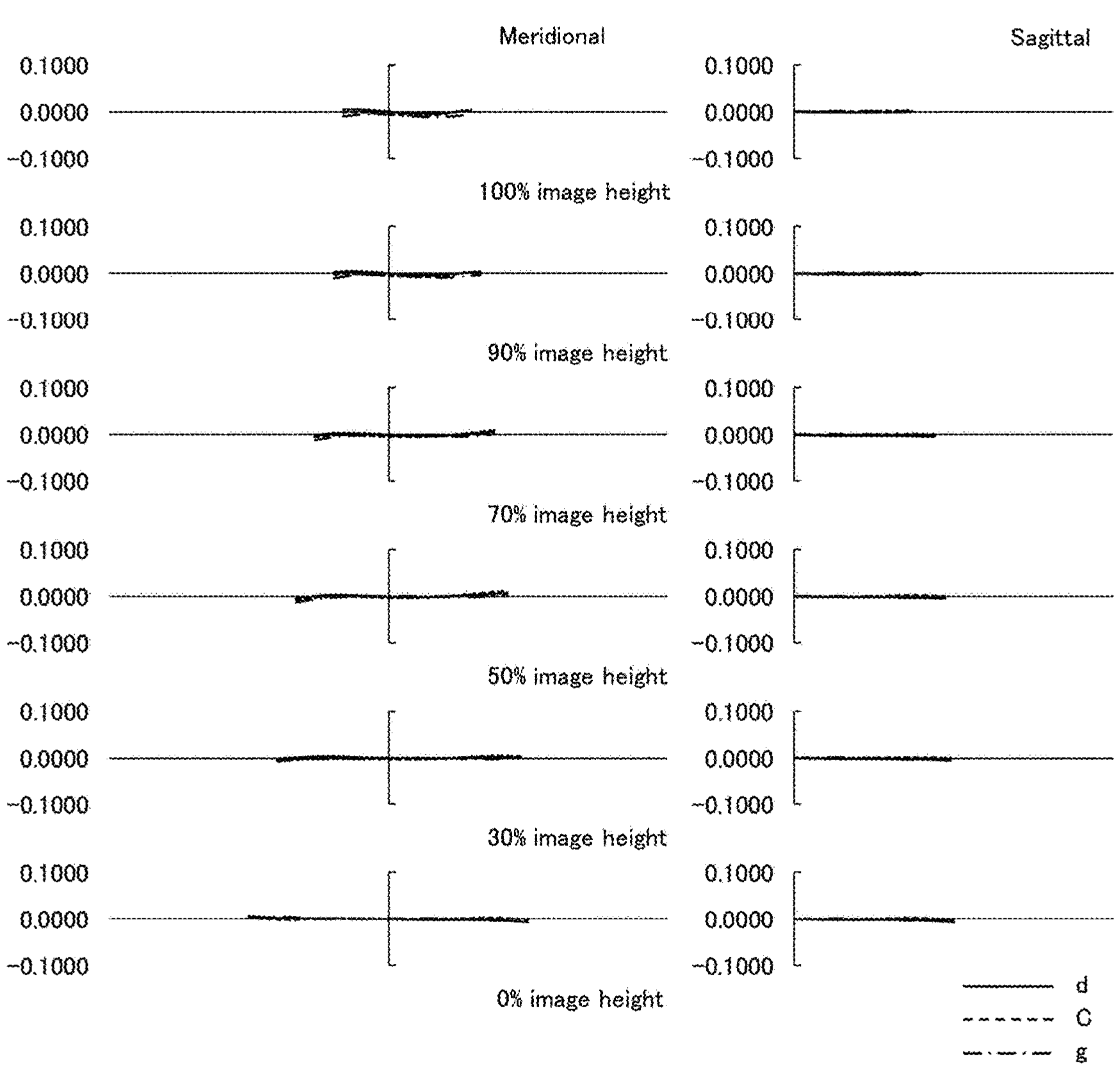
FIG. 110 is a lateral aberration diagram at the telephoto end when focusing on infinity in Example 7.
Figure 111:
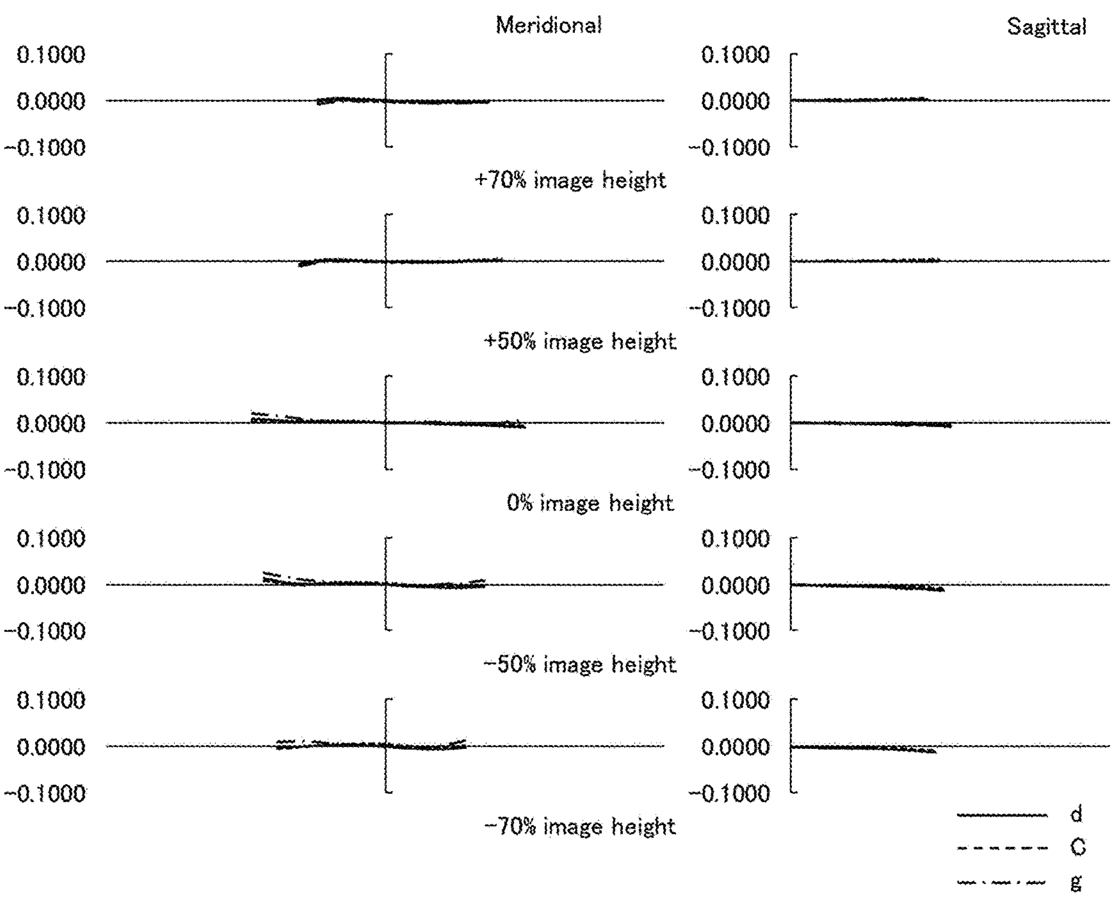
FIG. 111 is a lateral aberration diagram at the telephoto end when focusing on infinity and compensating for a tilt of 0.4° in Example 7.
Figure 112:
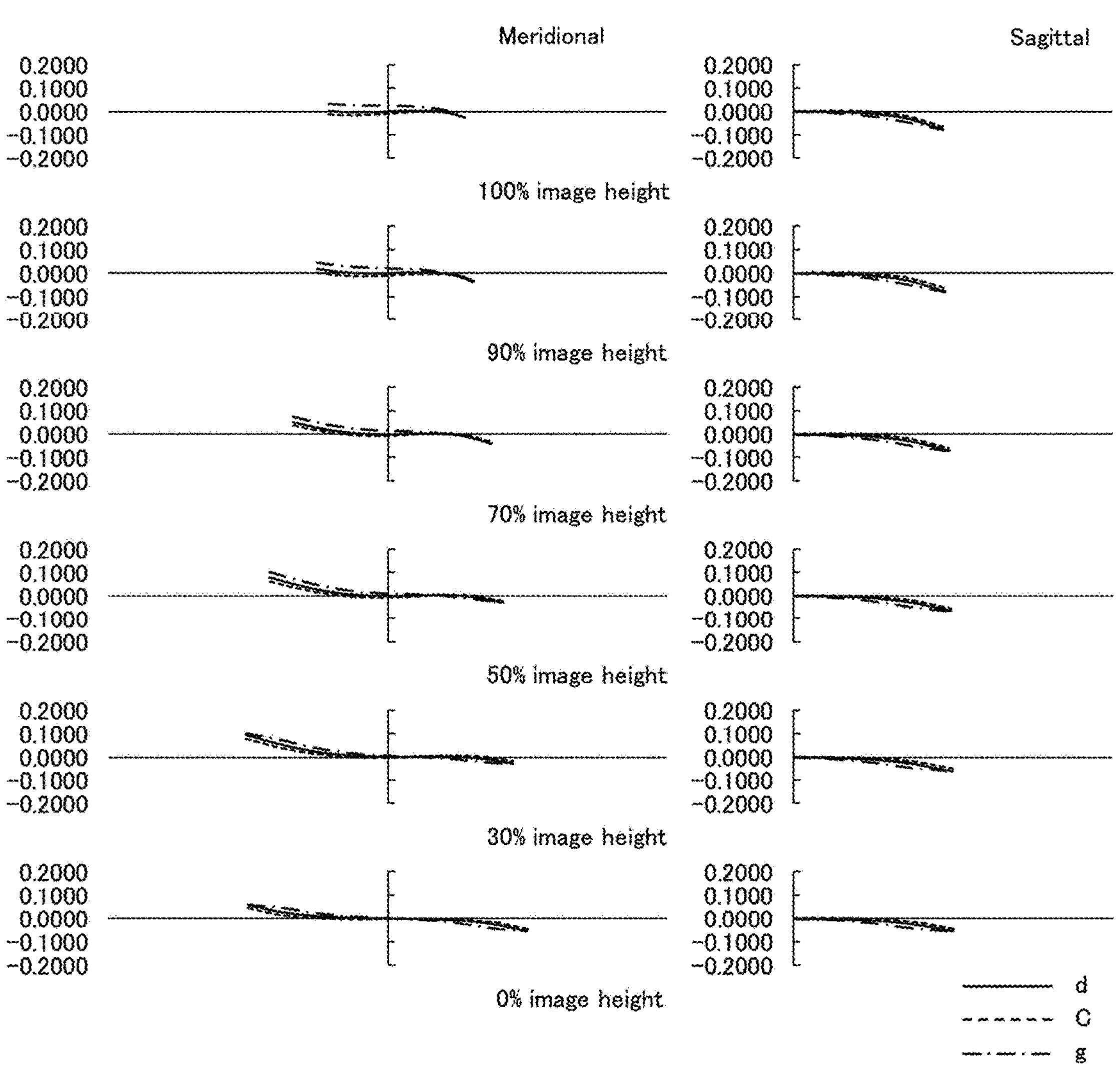
FIG. 112 is a lateral aberration diagram at the telephoto end at a focusing distance of 1.0 m in Example 7.

FIG. 97 is a lens configuration diagram of a large aperture ratio telephoto zoom lens according to Example 7 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves toward the image side, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a convex meniscus lens having the convex surface on the object side, and a biconvex lens. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a convex meniscus lens having the convex surface on the object side, a cemented lens composed of a convex meniscus lens having the convex surface on the image side and a biconcave lens, a cemented lens composed of a biconvex lens and a biconcave lens, and a biconvex lens. The sixth lens group G6 is configured with a convex meniscus lens having the convex surface on the image side, and a concave meniscus lens having the convex surface on the object side. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 7 are shown below.

Numerical Data in Example 7

Unit: mm
Surface Data

| Surface Number | r | d | nd | vd | PgF |
|---|---|---|---|---|---|
| Object Surface | ∞ | (d0) | | | |
| 1 | 141.2907 | 2.0000 | 1.78590 | 43.94 | 0.5612 |
| 2 | 78.5442 | 8.4435 | 1.43700 | 95.10 | 0.5336 |
| 3 | 1360.7267 | 0.1500 | | | |
| 4 | 84.8004 | 8.6277 | 1.43700 | 95.10 | 0.5336 |
| 5 | −1025.9829 | (d5) | | | |
| 6 | 181.1409 | 1.5000 | 1.43700 | 95.10 | 0.5336 |
| 7 | 37.9941 | (d7) | | | |
| 8 | −78.3743 | 1.1000 | 1.55032 | 75.50 | 0.5401 |
| 9 | 66.4524 | 2.3171 | 1.85883 | 30.00 | 0.5979 |
| 10 | 138.0369 | (d10) | | | |
| 11 | 57.8274 | 2.1068 | 1.87070 | 40.73 | 0.5682 |
| 12 | 83.6690 | (d12) | | | |
| 13 (diaphragm) | ∞ | 1.2000 | | | |
| 14* | 43.9500 | 4.7623 | 1.80610 | 40.73 | 0.5694 |
| 15 | 200.8178 | 2.2132 | | | |
| 16 | 58.7301 | 1.0500 | 1.80610 | 33.27 | 0.5884 |
| 17 | 23.5181 | 7.1853 | 1.43700 | 95.10 | 0.5336 |
| 18 | 131.9068 | 3.4301 | | | |
| 19 | −87.9056 | 2.4227 | 1.80809 | 22.76 | 0.6307 |
| 20 | −45.7293 | 1.6900 | 1.69350 | 53.20 | 0.5467 |
| 21* | 69.3280 | 1.0246 | | | |
| 22 | 46.7321 | 7.8989 | 1.43700 | 95.10 | 0.5336 |
| 23 | −41.9129 | 1.0500 | 1.85451 | 25.15 | 0.6103 |
| 24 | −415.3089 | 0.1500 | | | |
| 25* | 62.7044 | 6.8733 | 1.76450 | 49.09 | 0.5528 |
| 26* | −50.4340 | (d26) | | | |
| 27 | −789.9499 | 1.7989 | 1.86966 | 20.02 | 0.6435 |
| 28 | −134.0792 | 0.3883 | | | |
| 29 | 471.8729 | 0.8000 | 1.75500 | 52.32 | 0.5473 |
| 30 | 33.1060 | (d30) | | | |
| 31 | 70.2158 | 5.8642 | 1.65100 | 56.24 | 0.5420 |
| 32 | −68.1983 | (d32) | | | |
| 33 | −335.2804 | 1.0000 | 1.43700 | 95.10 | 0.5336 |
| 34 | 59.3390 | 6.3200 | | | |
| 35 | −36.1086 | 1.0000 | 1.49700 | 81.61 | 0.5389 |
| 36 | −196.0569 | 29.4378 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 4.60672 | −0.09347 |
| A4 | −1.10230E−06 | −1.86856E−06 | −7.38667E−06 | 6.88676E−07 |
| A6 | −9.99562E−10 | 1.51885E−08 | 5.16045E−09 | 2.13286E−09 |
| A8 | −5.53302E−13 | −3.06851E−10 | −4.30823E−11 | −2.54086E−11 |
| A10 | −9.32887E−16 | 4.01960E−12 | 1.16271E−13 | 6.76309E−14 |
| A12 | 0.00000E+00 | −3.36058E−14 | −1.13112E−16 | −4.70648E−17 |
| A14 | 0.00000E+00 | 1.75562E−16 | 0.00000E+00 | 0.00000E+00 |
| A16 | 0.00000E+00 | −5.49616E−19 | 0.00000E+00 | 0.00000E+00 |
| A18 | 0.00000E+00 | 9.36114E−22 | 0.00000E+00 | 0.00000E+00 |
| A20 | 0.00000E+00 | −6.62538E−25 | 0.00000E+00 | 0.00000E+00 |

Various Data

| Zoom Ratio | 2.69 |
|---|---|

| | Wide Angle | Mid Range | Telephoto |
|---|---|---|---|
| Focal Length | 72.10 | 117.98 | 193.99 |
| F Number | 2.89 | 2.88 | 2.93 |
| Total Angle of View 2ω | 2032.81 | 19.99 | 12.18 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 36.0413 | 65.8420 |
| d7 | 20.6835 | 11.6711 | 7.9435 |
| d10 | 20.9485 | 9.3714 | 1.0765 |
| d12 | 35.1953 | 21.7428 | 3.9670 |
| d26 | 9.1811 | 7.9196 | 3.0000 |
| d30 | 9.2674 | 10.7125 | 19.8672 |
| d32 | 7.4198 | 7.2374 | 3.0000 |
| BF | 1.0000 | 0.9994 | 1.0002 |
| d0 | 777.9999 | 777.9997 | 777.9953 |
| d5 | 2.0000 | 36.0413 | 65.8420 |
| d7 | 20.6835 | 11.6711 | 7.9435 |
| d10 | 20.9485 | 9.3714 | 1.0765 |
| d12 | 35.1953 | 21.7428 | 3.9670 |
| d26 | 0.9092 | 12.3995 | 13.3380 |
| d30 | 6.7704 | 4.4532 | 4.7232 |
| d32 | 8.1889 | 9.0178 | 7.8100 |
| BF | 9999 | 0.9988 | 1.0001 |

| Lens Group Data | | |
|---|---|---|
| Lens Group | Starting Surface | Focal Length |
| G1 | 1 | 158.18 |
| G2 | 6 | −110.37 |
| G3 | 8 | −115.91 |
| G4 | 11 | 207.17 |
| G5 | 13 | 52.66 |
| G6 | 27 | −63.62 |
| G7 | 31 | 54.05 |
| G8 | 33 | −48.80 |

Example 8

Figure 113:
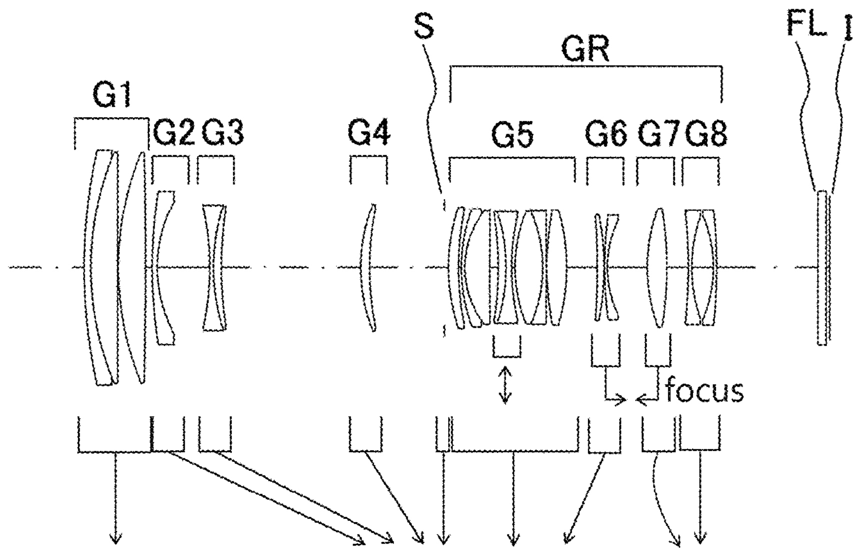
FIG. 113 is a lens configuration diagram according to Example 8 of the present invention.
Figure 114:
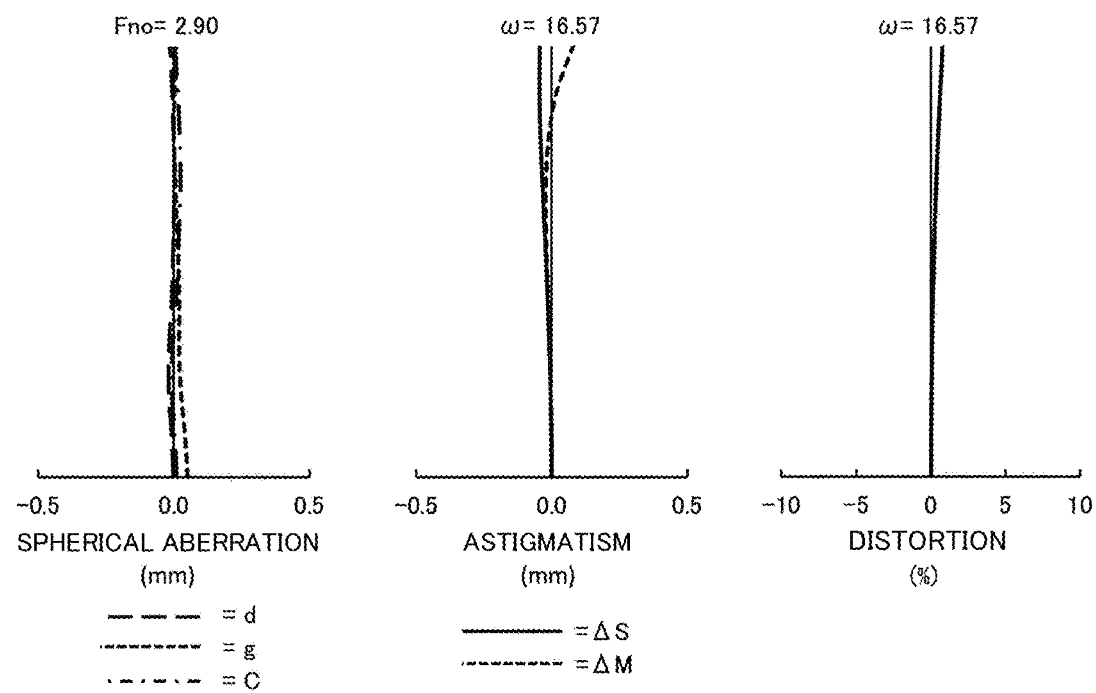
FIG. 114 is a longitudinal aberration diagram at the wide-angle end when focusing on infinity in Example 8.
Figure 115:
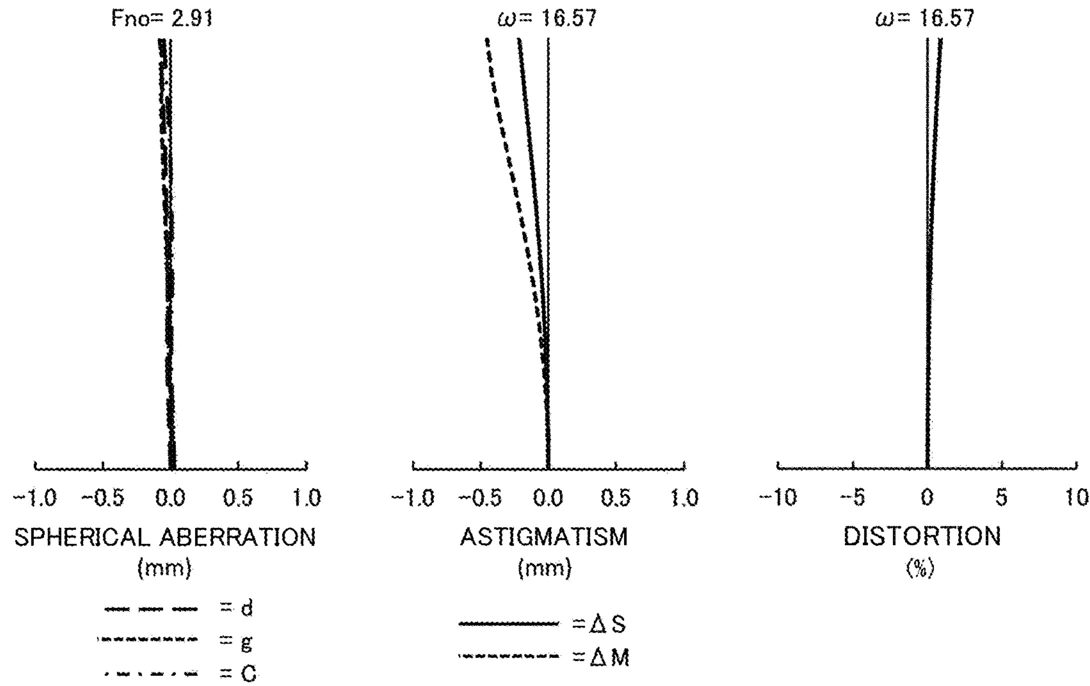
FIG. 115 is a longitudinal aberration diagram at the wide-angle end at a focusing distance of 1.0 m in Example 8.
Figure 116:
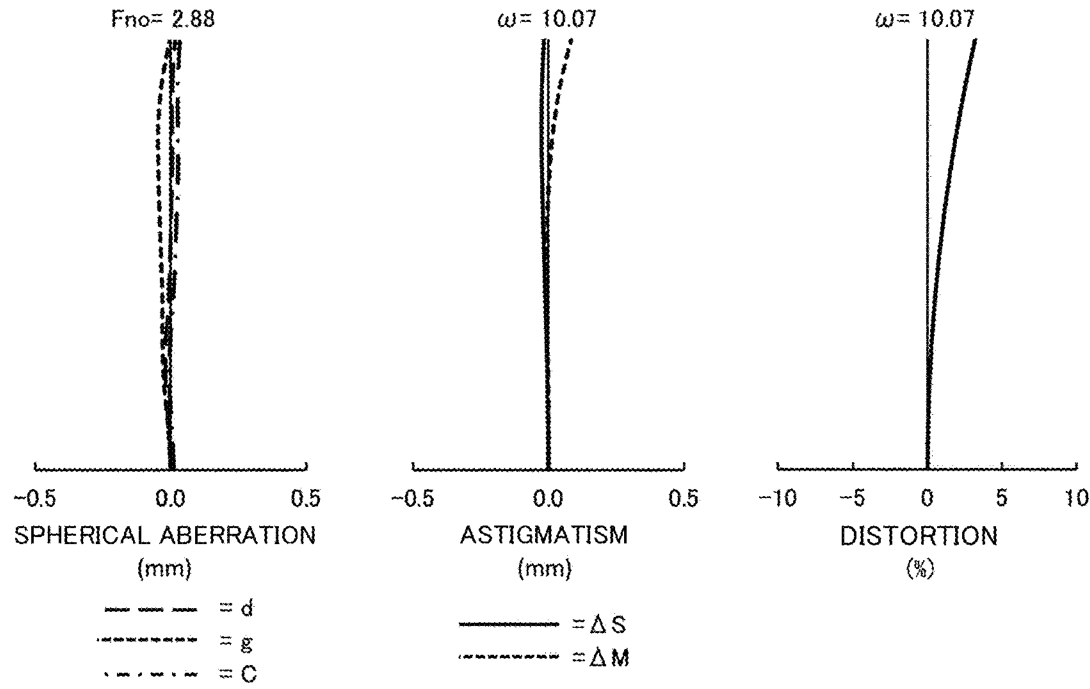
FIG. 116 is a longitudinal aberration diagram at an intermediate focal length when focusing on infinity in Example 8.
Figure 117:
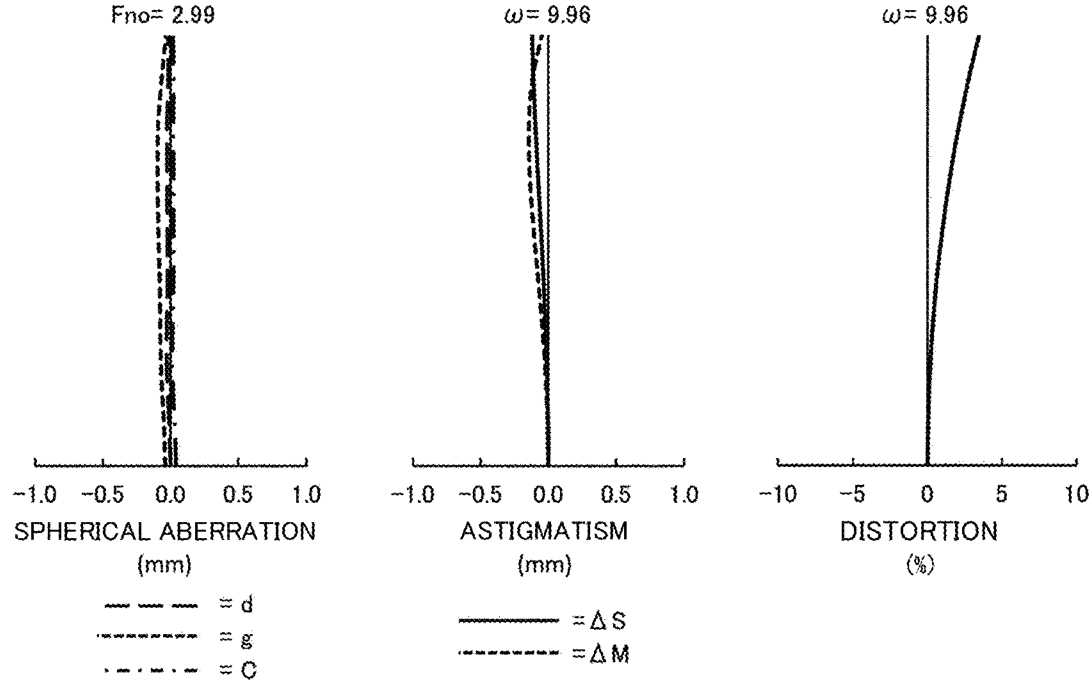
FIG. 117 is a longitudinal aberration diagram at an intermediate focal length at a focusing distance of 1.0 m in Example 8.
Figure 118:
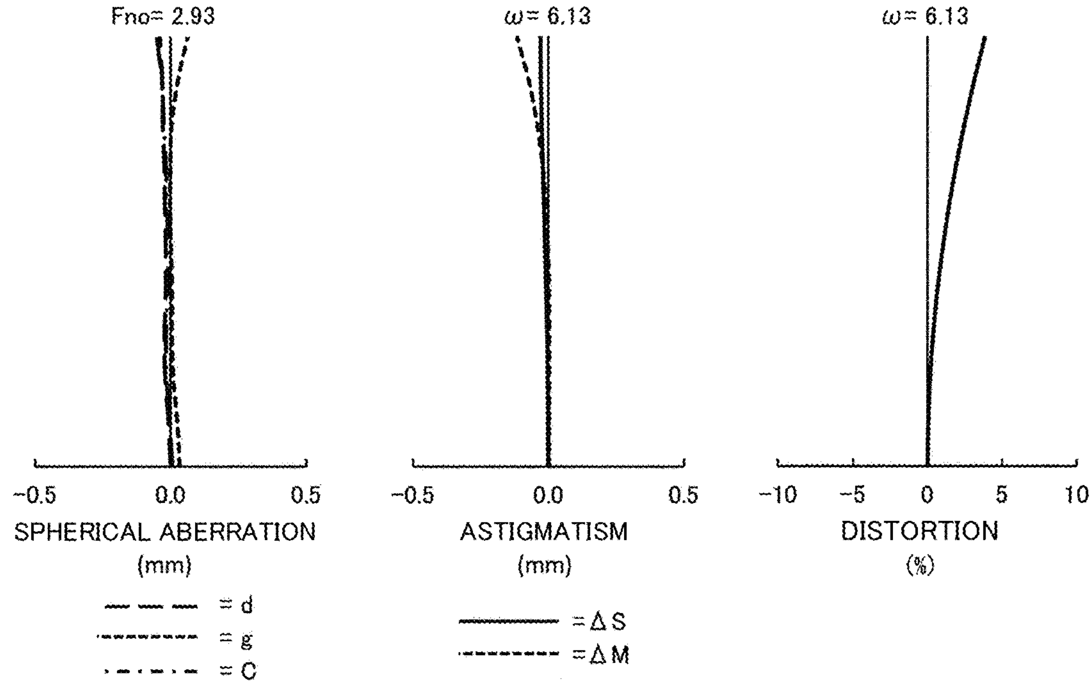
FIG. 118 is a longitudinal aberration diagram at the telephoto end when focusing on infinity in Example 8.
Figure 119:
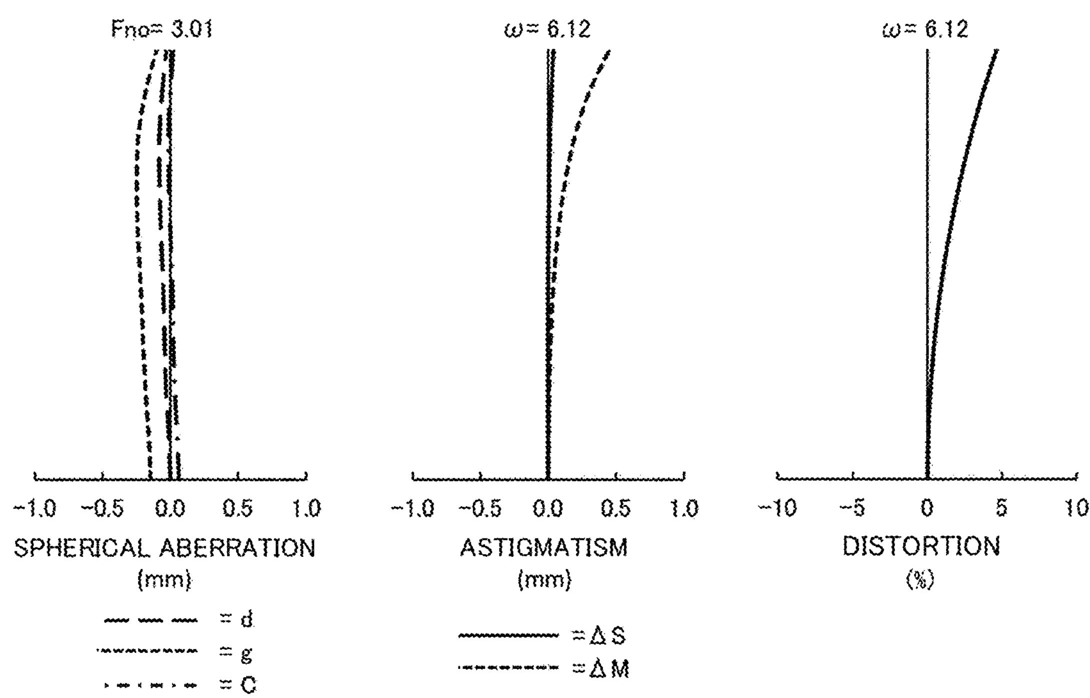
FIG. 119 is a longitudinal aberration diagram at the telephoto end at a focusing distance of 1.0 m in Example 8.
Figure 120:
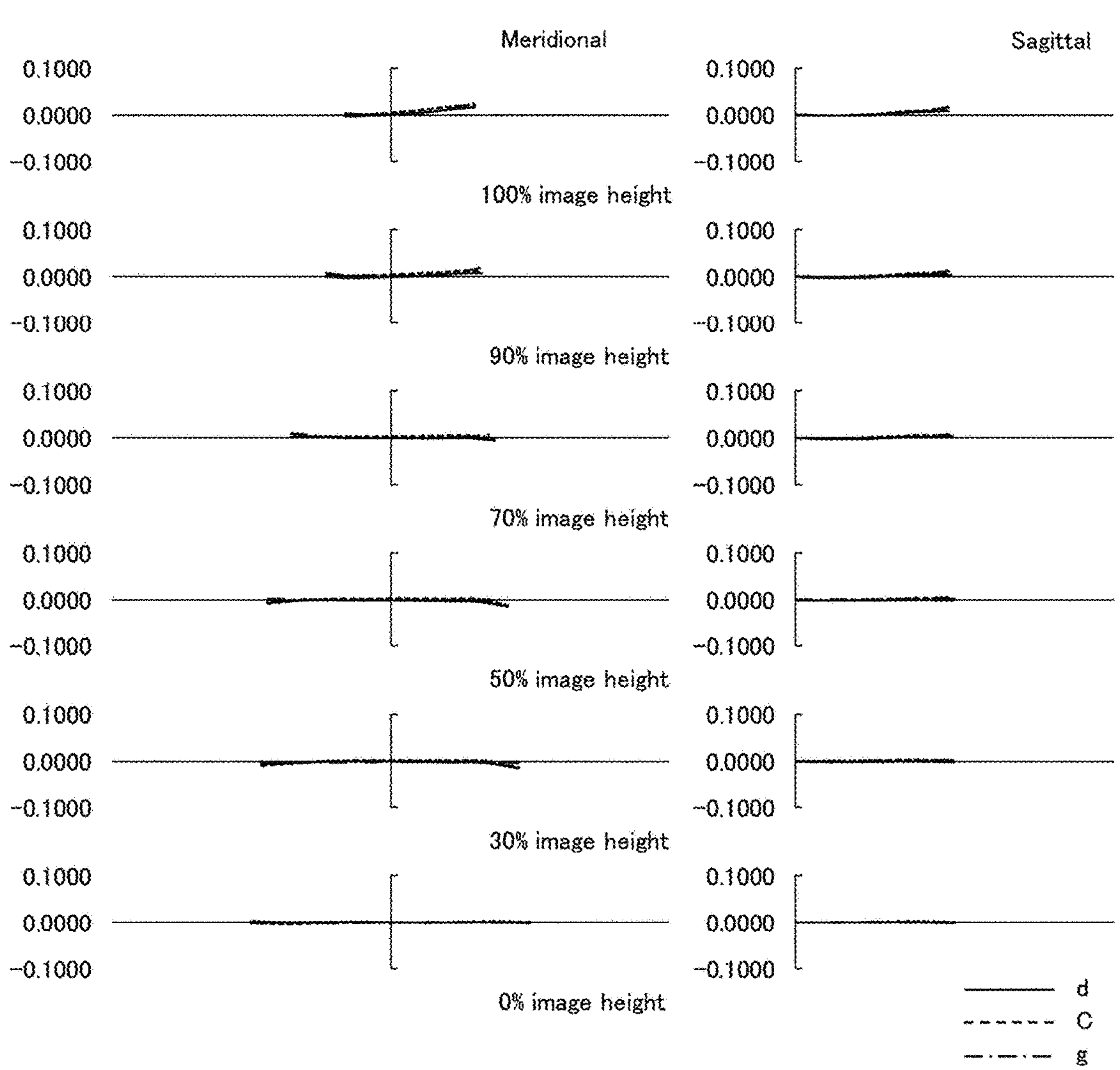
Figure 121:
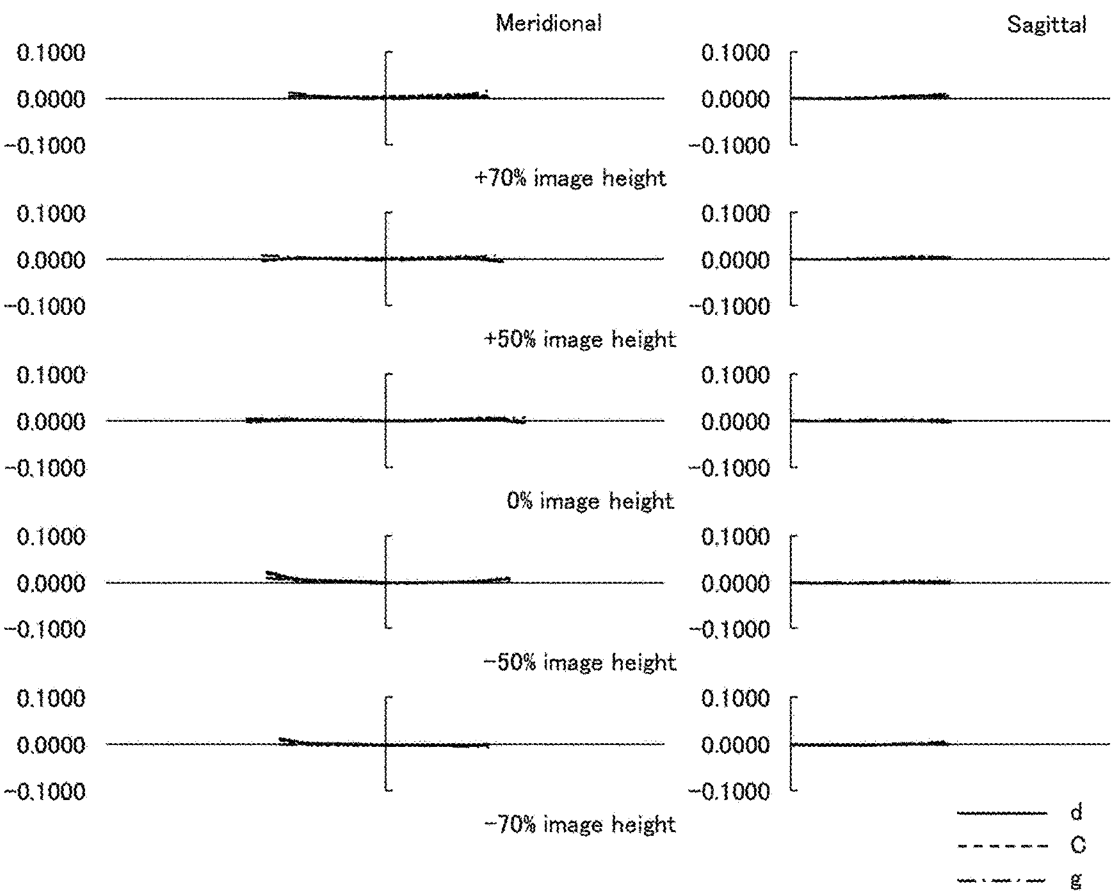
Figure 122:
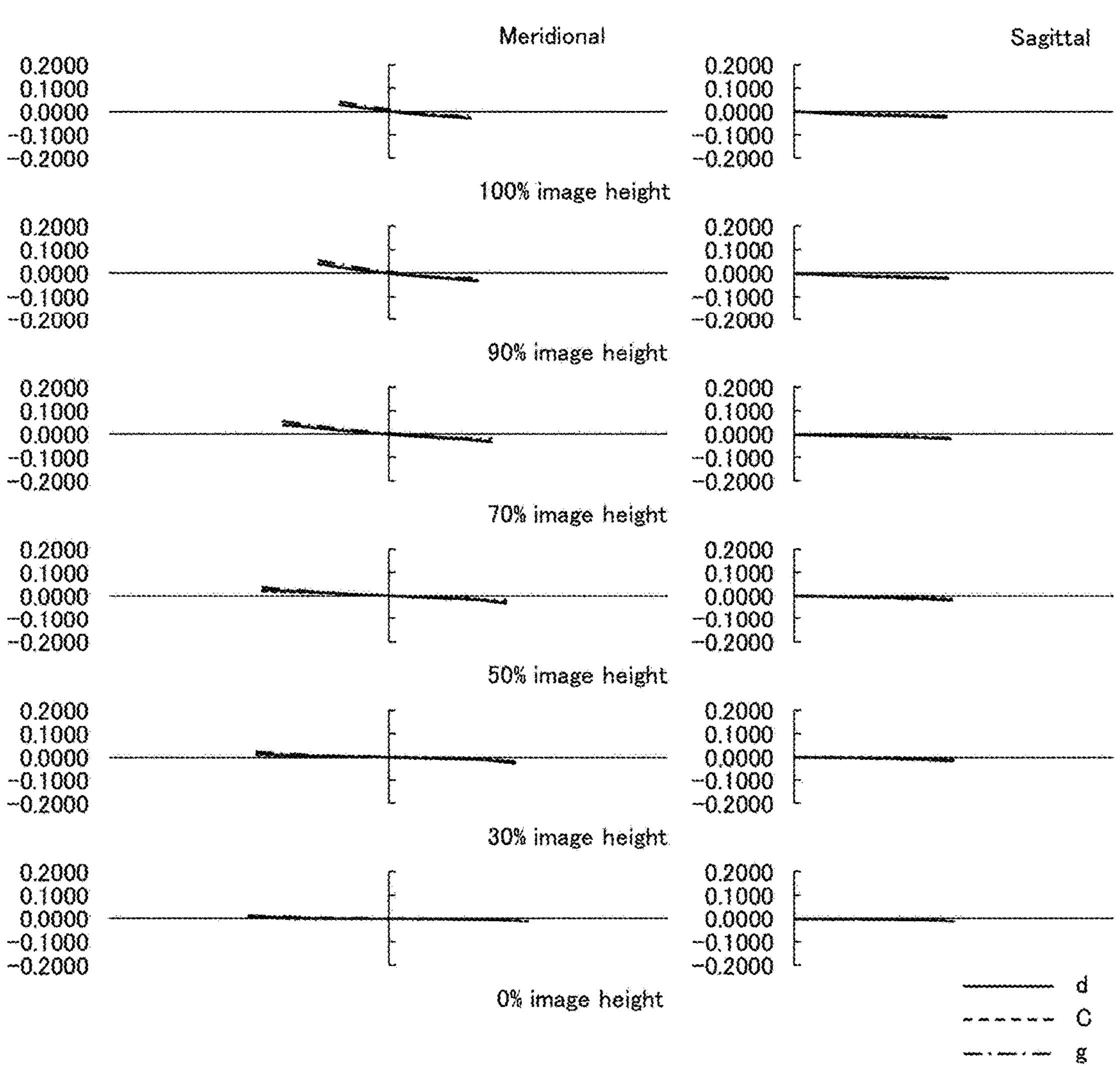
Figure 123:
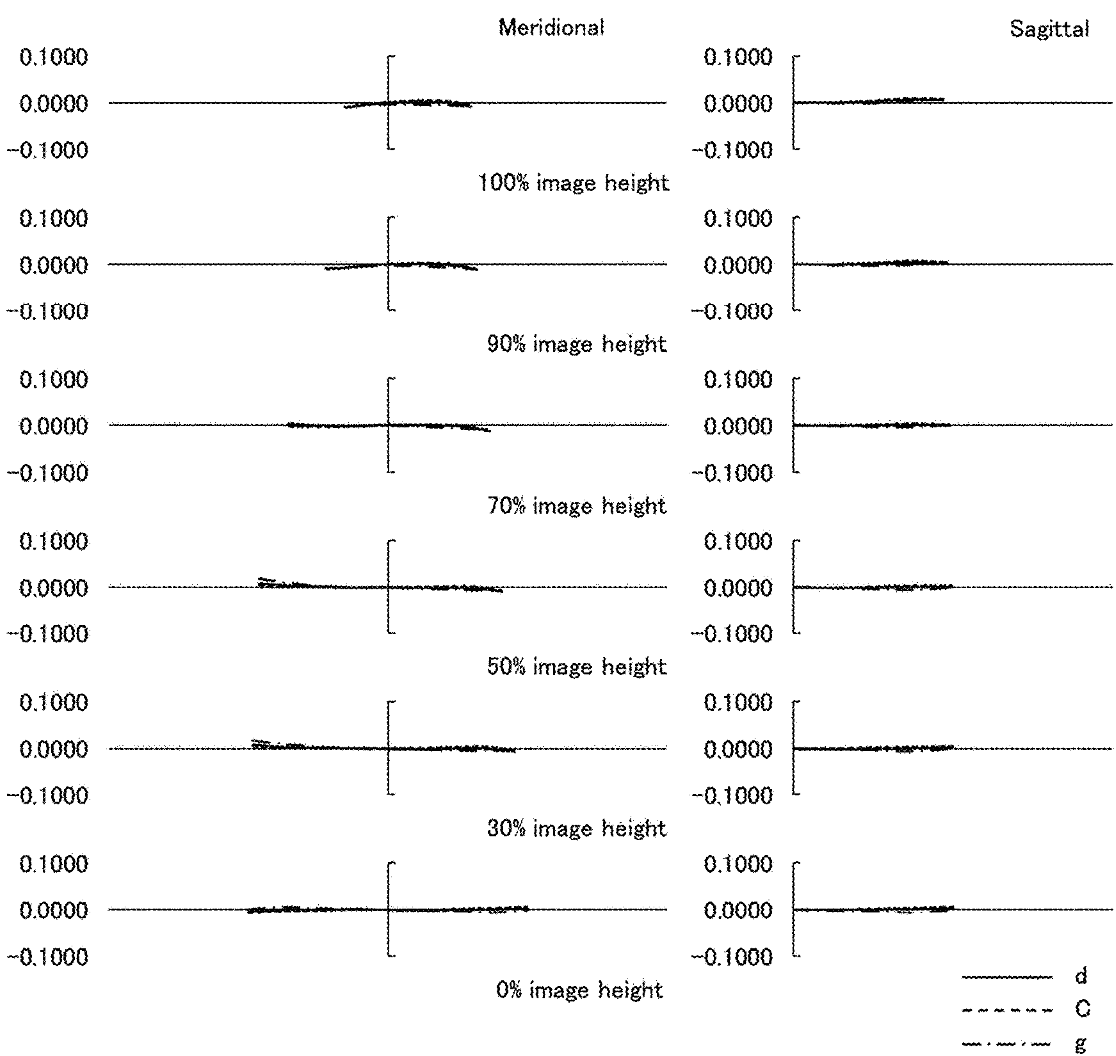
Figure 124:
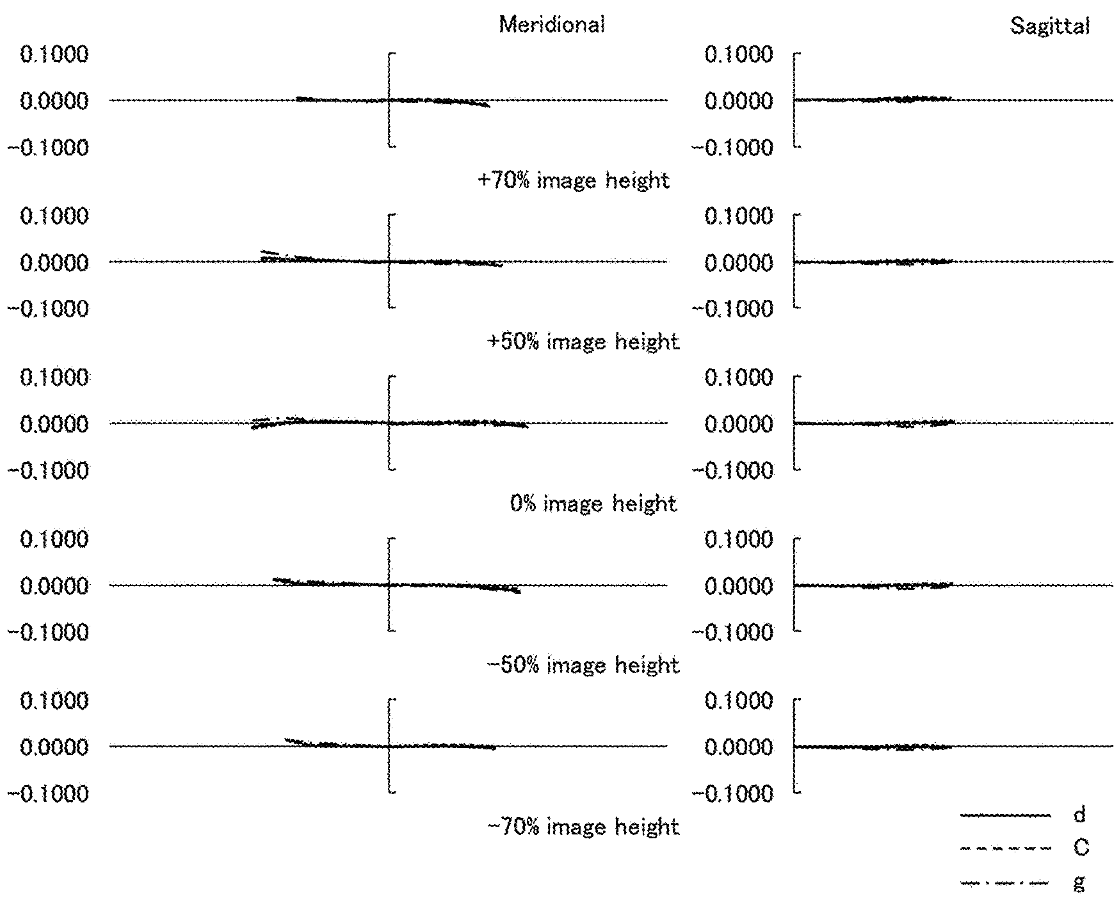
Figure 125:
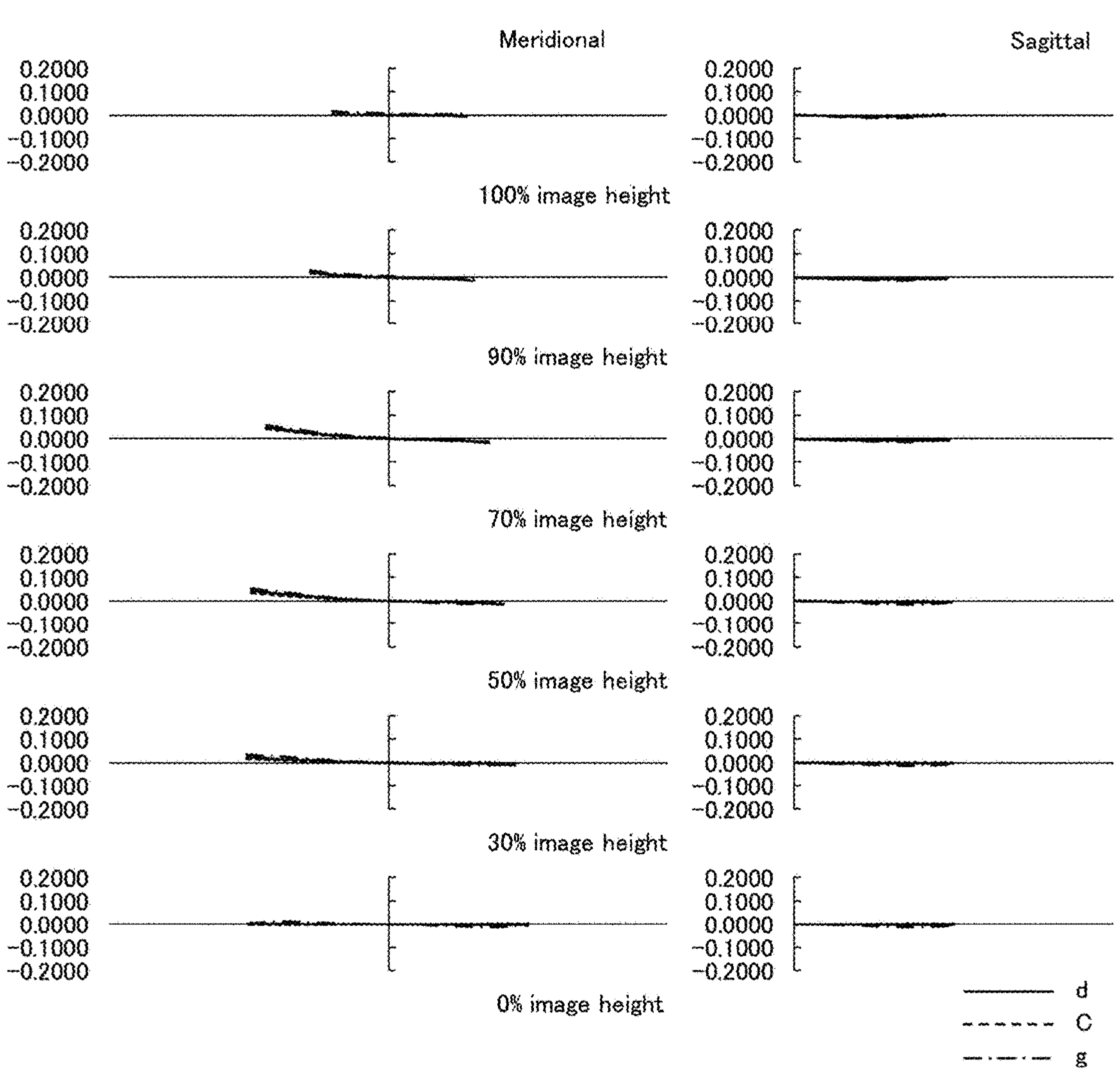
Figure 126:
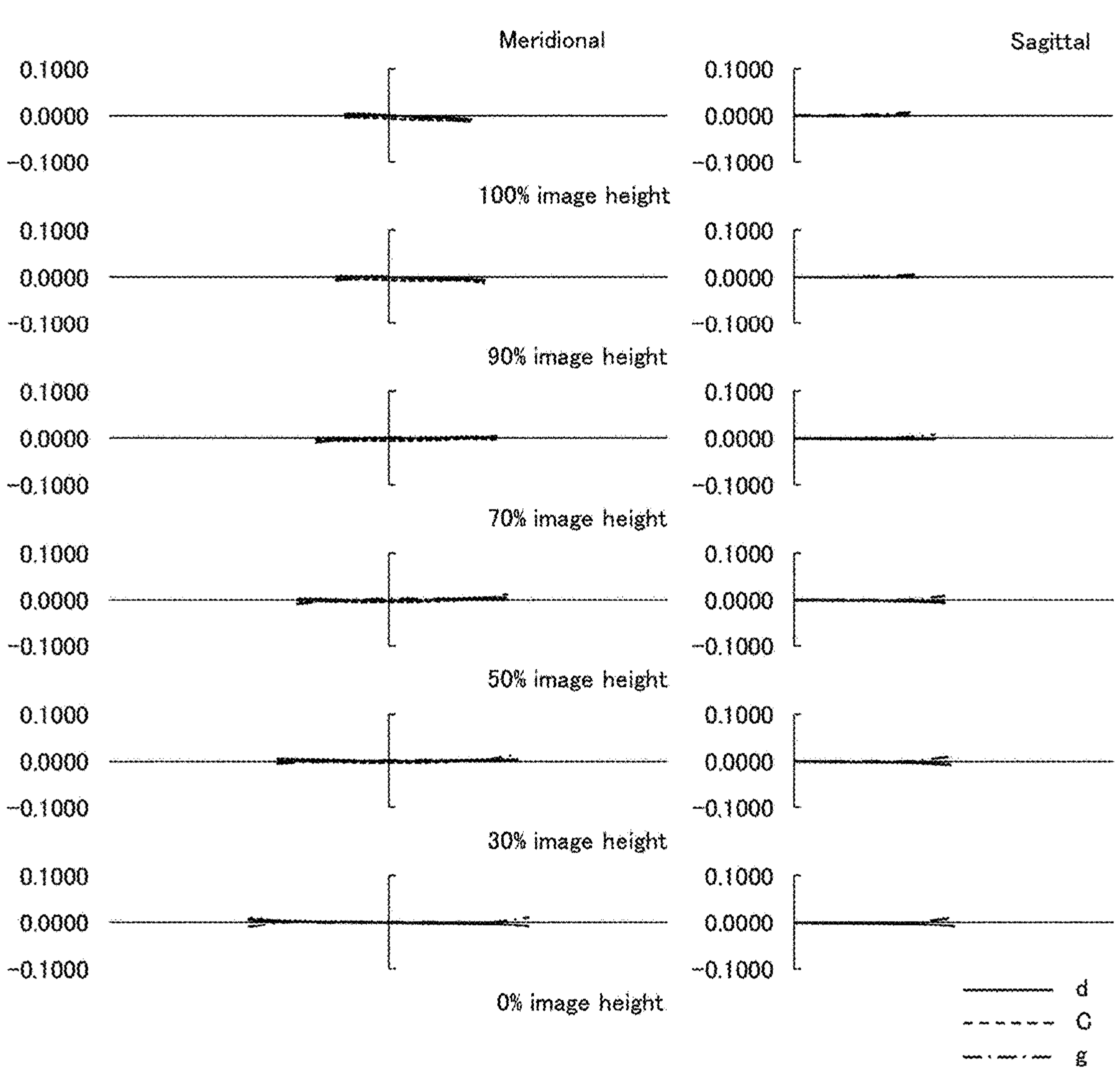
Figure 127:
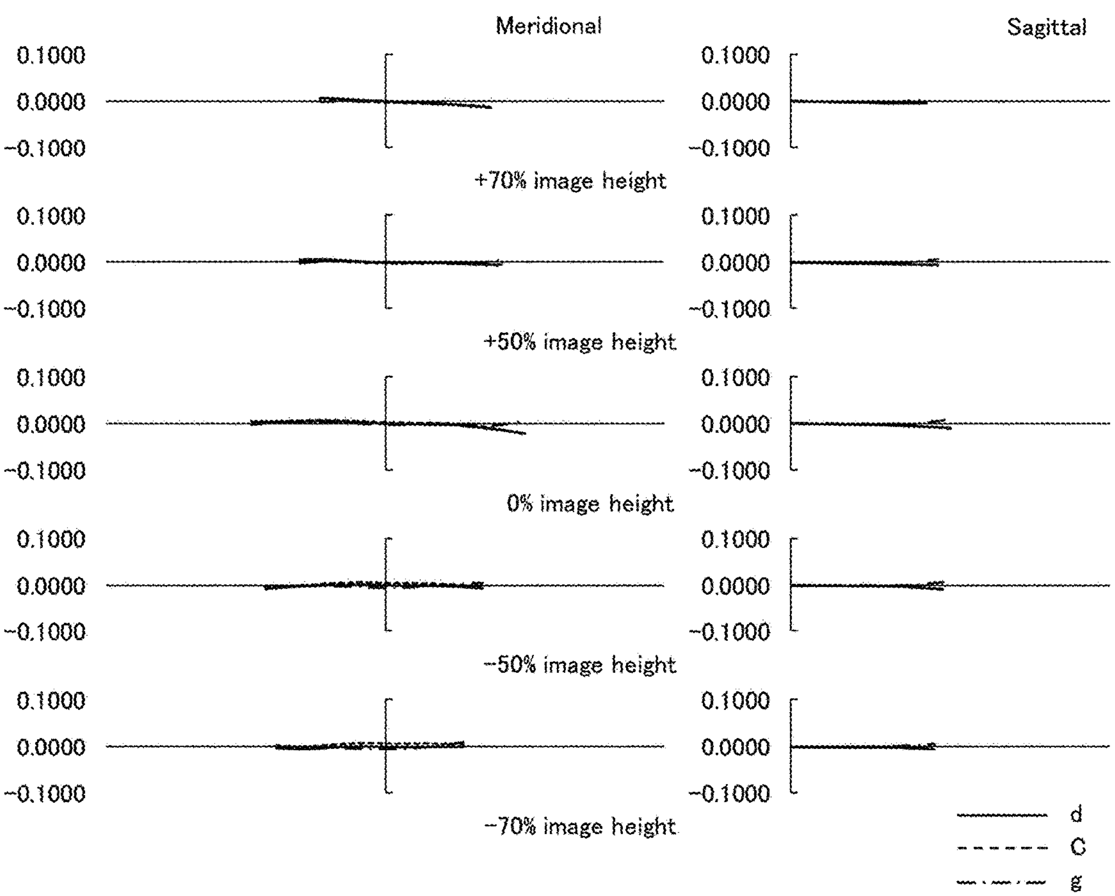
Figure 128:
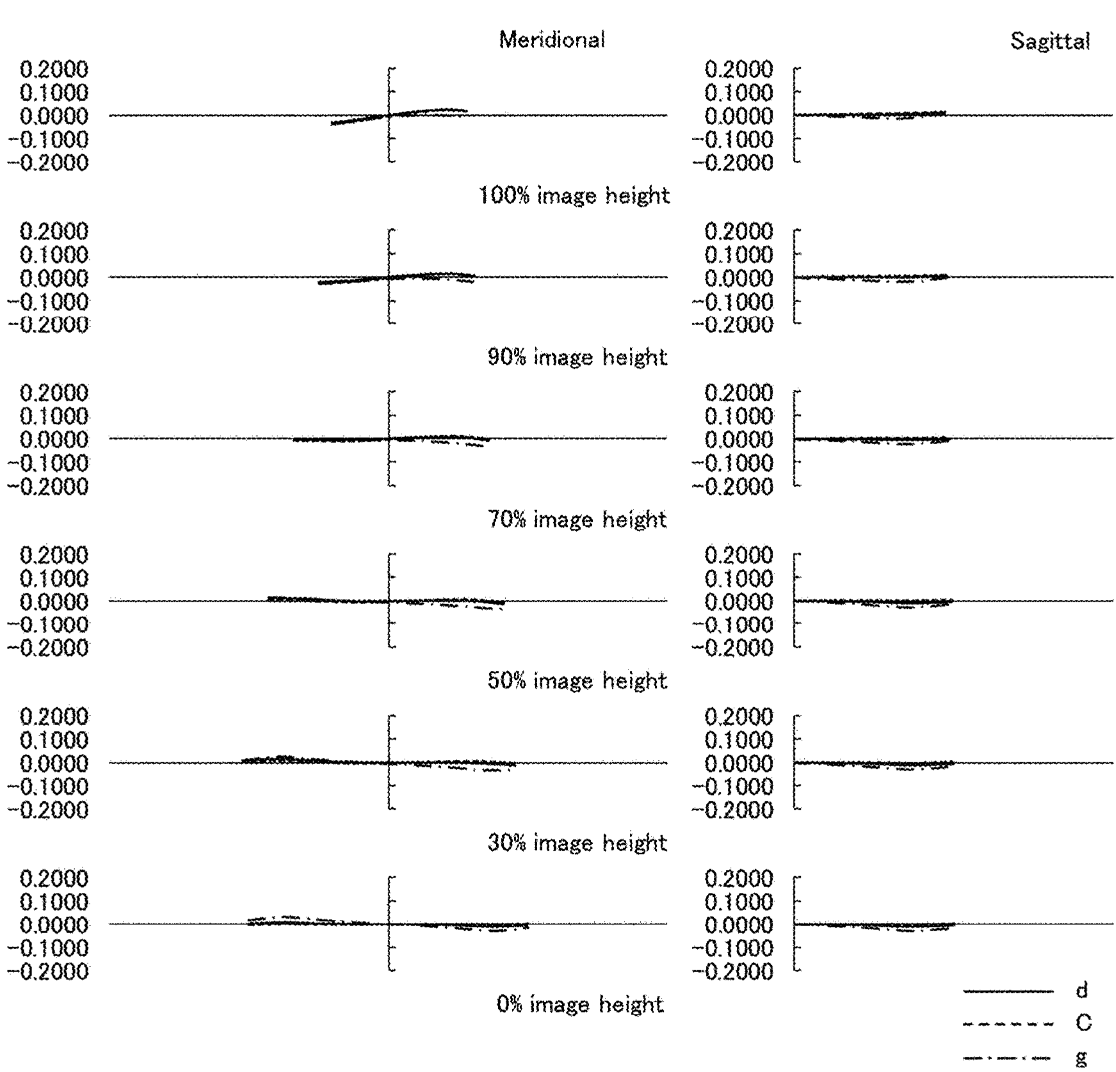

FIG. 113 is a lens configuration diagram of a large aperture ratio telephoto zoom lens according to Example 8 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a biconvex lens. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a convex meniscus lens having the convex surface on the object side, a cemented lens composed of a convex meniscus lens having the convex surface on the image side and a biconcave lens, a cemented lens composed of a biconvex lens and a biconcave lens, and a biconvex lens. The sixth lens group G6 is configured with a convex meniscus lens having the convex surface on the image side, and a concave meniscus lens having the convex surface on the object side. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 8 are shown below.

Numerical Data in Example 8

Unit: mm

Surface Data

| Surface Number | r | d | nd | vd | PgF |
|---|---|---|---|---|---|
| Object Surface | ∞ | (d0) | | | |
| 1 | 161.2612 | 2.0000 | 1.78590 | 43.94 | 0.5612 |
| 2 | 88.8085 | 8.0238 | 1.43700 | 95.10 | 0.5336 |
| 3 | −18769.2950 | 0.1500 | | | |
| 4 | 90.3783 | 8.0957 | 1.43700 | 95.10 | 0.5336 |
| 5 | −1382.9970 | (d5) | | | |
| 6 | 144.5996 | 1.5000 | 1.43700 | 95.10 | 0.5336 |
| 7 | 40.7167 | (d7) | | | |
| 8 | −80.0710 | 1.1000 | 1.55032 | 75.50 | 0.5401 |
| 9 | 59.5137 | 2.3391 | 1.85883 | 30.00 | 0.5979 |
| 10 | 111.7779 | (d10) | | | |
| 11 | 50.2236 | 2.6621 | 1.87070 | 40.73 | 0.5682 |
| 12 | 90.2415 | (d12) | | | |
| 13 (diaphragm) | ∞ | 1.2000 | | | |
| 14* | 54.3696 | 2.9919 | 1.80610 | 40.73 | 0.5694 |
| 15 | 85.9140 | 0.8206 | | | |
| 16 | 50.1227 | 1.0500 | 1.80610 | 33.27 | 0.5884 |
| 17 | 27.3537 | 7.4203 | 1.43700 | 95.10 | 0.5336 |
| 18 | 2122.4422 | 2.5195 | | | |
| 19 | −100.2250 | 2.3021 | 1.80809 | 22.76 | 0.6307 |
| 20 | −53.3746 | 1.6900 | 1.69350 | 53.20 | 0.5467 |
| 21* | 65.5912 | 1.0000 | | | |
| 22 | 44.0378 | 8.2424 | 1.43700 | 95.10 | 0.5336 |
| 23 | −41.2416 | 1.0500 | 1.85451 | 25.15 | 0.6103 |
| 24 | 6098.2869 | 0.1500 | | | |
| 25* | 74.3614 | 5.9569 | 1.76450 | 49.09 | 0.5528 |
| 26* | −59.1317 | (d26) | | | |
| 27 | −211.1878 | 2.0479 | 1.86966 | 20.02 | 0.6435 |
| 28 | −76.8810 | 0.1500 | | | |
| 29 | 116.3444 | 0.8000 | 1.75500 | 52.32 | 0.5473 |
| 30 | 32.4277 | (d30) | | | |
| 31 | 49.8961 | 5.8423 | 1.65100 | 56.24 | 0.5420 |
| 32 | −105.7753 | (d32) | | | |
| 33 | −145.3165 | 1.0000 | 1.43700 | 95.10 | 0.5336 |
| 34 | 45.5620 | 6.4429 | | | |
| 35 | −38.9684 | 1.0000 | 1.49700 | 81.61 | 0.5389 |
| 36 | −150.5758 | 30.1431 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 6.01468 | 0.14258 |
| A4 | −1.28686E−06 | −1.93034E−06 | −6.39459E−06 | 4.38571E−07 |
| A6 | −6.05676E−10 | 1.18261E−08 | 3.05255E−11 | −2.00438E−09 |
| A8 | −1.72136E−12 | −2.32683E−10 | 4.34344E−12 | 9.00048E−12 |
| A10 | 1.07979E−15 | 3.09902E−12 | −3.59040E−14 | −3.37262E−14 |
| A12 | 0.00000E+00 | −2.61886E−14 | 5.26422E−17 | 4.21672E−17 |
| A14 | 0.00000E+00 | 1.38150E−16 | 0.00000E+00 | 0.00000E+00 |
| A16 | 0.00000E+00 | −4.39942E−19 | 0.00000E+00 | 0.00000E+00 |
| A18 | 0.00000E+00 | 7.70257E−22 | 0.00000E+00 | 0.00000E+00 |
| A20 | 0.00000E+00 | −5.65074E−25 | 0.00000E+00 | 0.00000E+00 |

Various Data

| Zoom Ratio | | | 2.69 |
|---|---|---|---|
| | Wide Angle | Mid Range | Telephoto |
| Focal Length | 72.10 | 118.00 | 193.99 |
| F Number | 2.90 | 2.88 | 2.93 |
| Total Angle of View 2ω | 33.14 | 20.14 | 12.25 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 37.5477 | 68.9276 |
| d7 | 15.6405 | 10.2684 | 7.6702 |
| d10 | 41.4870 | 18.2771 | 1.0000 |
| d12 | 22.2966 | 15.3311 | 3.8261 |
| d26 | 9.0992 | 7.6354 | 3.0000 |
| d30 | 11.8887 | 12.2998 | 21.3855 |
| d32 | 6.3974 | 7.4500 | 3.0000 |
| BF | 1.0000 | 1.0000 | 1.0000 |
| d0 | 777.9999 | 777.9998 | 777.9999 |
| d5 | 2.0000 | 37.5477 | 68.9276 |
| d7 | 15.6405 | 10.2684 | 7.6702 |
| d10 | 41.4870 | 18.2771 | 1.0000 |
| d12 | 22.2966 | 15.3311 | 3.8261 |
| d26 | 10.5803 | 11.6764 | 12.0032 |
| d30 | 9.0176 | 4.9995 | 3.9515 |
| d32 | 7.7876 | 10.7094 | 11.4310 |
| BF | 0.9999 | 0.9999 | 0.9998 |

| Lens Group Data | | |
|---|---|---|
| Lens Group | Starting Surface | Focal Length |
| G1 | 1 | 164.65 |
| G2 | 6 | −130.26 |
| G3 | 8 | −106.37 |
| G4 | 11 | 126.17 |
| G5 | 13 | 72.46 |
| G6 | 27 | −105.71 |
| G7 | 31 | 52.86 |
| G8 | 33 | −43.86 |

Example 9

Figure 129:
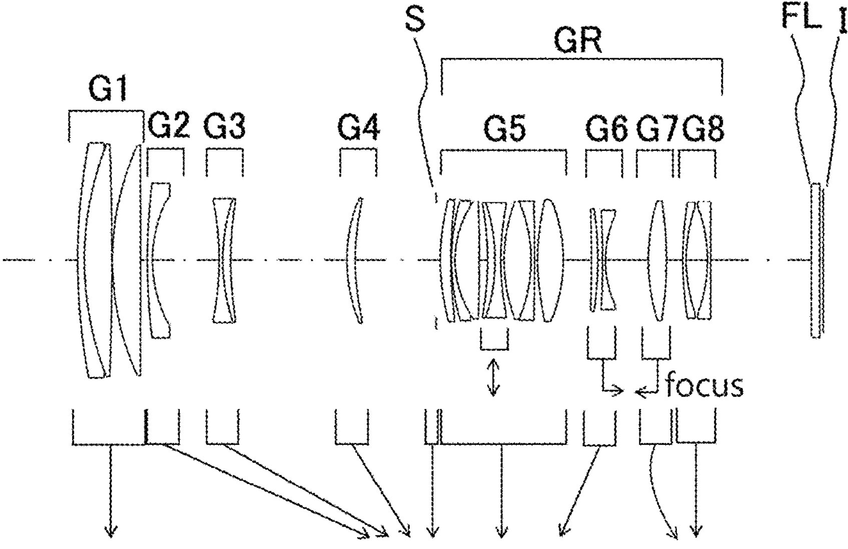
Figure 130:
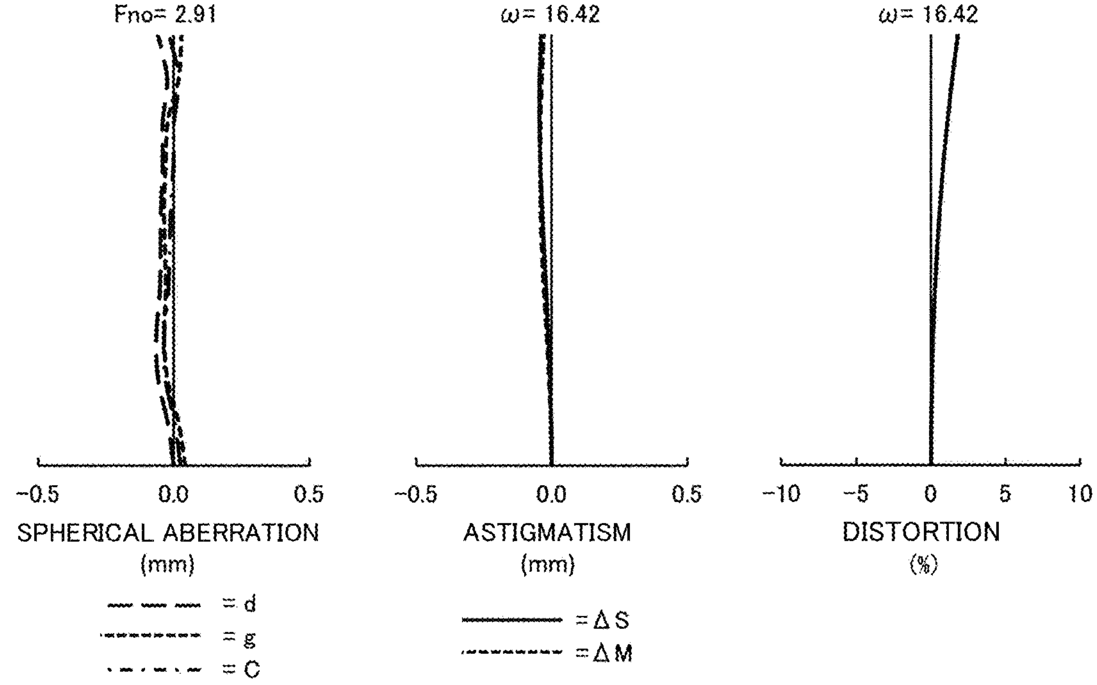
Figure 131:
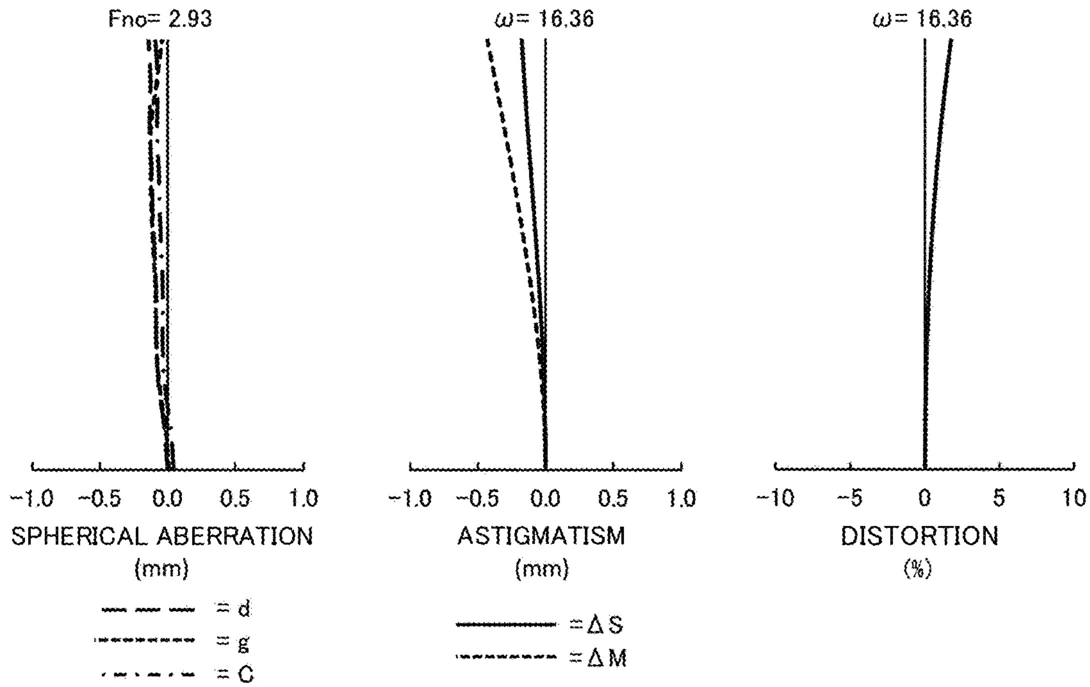

FIG. 129 is a lens configuration diagram of a large aperture ratio telephoto zoom lens according to Example 9 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a biconvex lens. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a biconvex lens, a cemented lens composed of a convex meniscus lens having the convex surface on the image side and a biconcave lens, a cemented lens composed of a biconvex lens and a concave meniscus lens having the convex surface on the image side, and a biconvex lens. The sixth lens group G6 is configured with a convex meniscus lens having the convex surface on the image side, and a biconcave lens. The seventh lens group G7 is configured with a biconvex lens. The eighth lens group G8 is configured with a concave meniscus lens having the convex surface on the object side, and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 9 are shown below.

Numerical Data in Example 9

Unit: mm

Surface Data

| Surface Number | r | d | nd | vd | PgF |
|---|---|---|---|---|---|
| Object Surface | ∞ | (d0) | | | |
| 1 | 187.9800 | 2.0000 | 1.78590 | 43.94 | 0.5612 |
| 2 | 94.6616 | 8.1932 | 1.43700 | 95.10 | 0.5336 |
| 3 | −919.8502 | 0.1500 | | | |
| 4 | 83.2321 | 8.4267 | 1.43700 | 95.10 | 0.5336 |
| 5 | 6249.7235 | (d5) | | | |
| 6 | 194.9554 | 1.5000 | 1.43700 | 95.10 | 0.5336 |
| 7 | 39.8810 | (d7) | | | |
| 8 | −89.0379 | 1.1000 | 1.55032 | 75.50 | 0.5401 |
| 9 | 57.2432 | 2.3365 | 1.85883 | 30.00 | 0.5979 |
| 10 | 106.5123 | (d10) | | | |
| 11 | 47.8952 | 2.4851 | 1.87070 | 40.73 | 0.5682 |
| 12 | 76.7883 | (d12) | | | |
| 13 (diaphragm) | ∞ | 1.2000 | | | |
| 14* | 61.8479 | 3.1839 | 1.80610 | 40.73 | 0.5694 |
| 15 | 137.8128 | 0.1500 | | | |
| 16 | 62.3801 | 1.0500 | 1.80610 | 33.27 | 0.5884 |
| 17 | 30.1993 | 7.2818 | 1.43700 | 95.10 | 0.5336 |
| 18 | −386.7306 | 2.4180 | | | |
| 19 | −89.5339 | 2.2295 | 1.80809 | 22.76 | 0.6307 |
| 20 | −52.4623 | 1.6900 | 1.69350 | 53.20 | 0.5467 |
| 21* | 76.1446 | 1.0000 | | | |
| 22 | 48.4878 | 8.0389 | 1.43700 | 95.10 | 0.5336 |
| 23 | −43.5994 | 1.0500 | 1.85451 | 25.15 | 0.6103 |
| 24 | −571.7137 | 0.9023 | | | |
| 25* | 66.6207 | 7.6445 | 1.76450 | 49.09 | 0.5528 |
| 26* | −44.9262 | (d26) | | | |
| 27 | −341.2854 | 1.8600 | 1.86966 | 20.02 | 0.6435 |
| 28 | −100.1670 | 1.4619 | | | |
| 29 | −215.1811 | 0.8000 | 1.75500 | 52.32 | 0.5473 |
| 30 | 31.8982 | (d30) | | | |
| 31 | 59.9265 | 5.4081 | 1.65100 | 56.24 | 0.5420 |
| 32 | −108.3618 | (d32) | | | |
| 33 | 105.5837 | 1.0000 | 1.43700 | 95.10 | 0.5336 |
| 34 | 47.9091 | 6.3338 | | | |
| 35 | −44.7980 | 1.0000 | 1.49700 | 81.61 | 0.5389 |
| 36 | −15833.3658 | 29.9808 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 4.89993 | −0.23687 |
| A4 | −2.25179E−06 | −2.31244E−06 | −6.50791E−06 | 9.81903E−07 |
| A6 | −1.59938E−09 | 2.54535E−08 | 7.90541E−09 | 4.60125E−09 |
| A8 | −1.75765E−12 | −4.67936E−10 | −6.74929E−11 | −4.80557E−11 |
| A10 | −1.07944E−15 | 5.59227E−12 | 2.22800E−13 | 1.72500E−13 |
| A12 | 0.00000E+00 | −4.27844E−14 | −3.40005E−16 | −2.72466E−16 |
| A14 | 0.00000E+00 | 2.06535E−16 | 0.00000E+00 | 0.00000E+00 |
| A16 | 0.00000E+00 | −6.05297E−19 | 0.00000E+00 | 0.00000E+00 |
| A18 | 0.00000E+00 | 9.78144E−22 | 0.00000E+00 | 0.00000E+00 |
| A20 | 0.00000E+00 | −6.64836E−25 | 0.00000E+00 | 0.00000E+00 |

Various Data

| Zoom Ratio | 2.69 |
|---|---|

| | Wide Angle | Mid Range | Telephoto |
|---|---|---|---|
| Focal Length | 72.10 | 118.01 | 193.99 |
| F Number | 2.91 | 2.89 | 2.92 |
| Total Angle of View 2ω | 32.84 | 19.99 | 12.18 |
| Image Height Y | 21.63 | 21.63 | 21.63 |
| Total Lens Length | 222.00 | 222.00 | 222.00 |

-continued

| Variable Distance Data | | | |
|---|---|---|---|
| | Wide Angle | Mid Range | Telephoto |
| d0 | ∞ | ∞ | ∞ |
| d5 | 2.0000 | 36.4744 | 68.1324 |
| d7 | 19.8455 | 13.2866 | 7.3989 |
| d10 | 34.6173 | 15.4078 | 1.0000 |
| d12 | 24.1171 | 15.4130 | 4.0495 |
| d26 | 8.4098 | 6.7494 | 3.0000 |
| d30 | 12.7819 | 11.8574 | 19.9307 |
| d32 | 4.8535 | 7.4388 | 3.1082 |
| BF | 1.0000 | 0.9995 | 1.0059 |
| d0 | 778.0000 | 777.9983 | 777.9973 |
| d5 | 2.0000 | 36.4744 | 68.1324 |
| d7 | 19.8455 | 13.2866 | 7.3989 |
| d10 | 34.6173 | 15.4078 | 1.0000 |
| d12 | 24.1171 | 15.4130 | 4.0495 |
| d26 | 9.7724 | 10.3944 | 11.5453 |
| d30 | 10.7554 | 6.9578 | 7.5070 |
| d32 | 5.5188 | 8.6971 | 6.9920 |
| BF | 0.9988 | 0.9958 | 1.0028 |

| Lens Group Data | | |
|---|---|---|
| Lens Group | Starting Surface | Focal Length |
| G1 | 1 | 159.74 |
| G2 | 6 | −115.07 |
| G3 | 8 | −112.69 |
| G4 | 11 | 140.56 |
| G5 | 13 | 48.08 |
| G6 | 27 | −48.04 |
| G7 | 31 | 60.03 |
| G8 | 33 | −61.22 |

Example 10

FIG. 145 is a lens configuration diagram of a large aperture ratio telephoto zoom lens according to Example 10 of the present invention.

The zoom lens includes, sequentially from the object side, a first lens group G1 with positive refractive power, a second lens group G2 with negative refractive power, a third lens group G3 with negative refractive power, a fourth lens group G4 with positive refractive power, an aperture diaphragm S, and a subsequent lens group GR composed of a plurality of lens groups. The subsequent lens group GR is configured with a fifth lens group G5 with positive refractive power, a sixth lens group G6 with negative refractive power, a seventh lens group G7 with positive refractive power, and an eighth lens group G8 with negative refractive power.

During zooming from the wide-angle end to the telephoto end, the first lens group G1 is fixed relative to the image surface, and the second, third, and fourth lens groups G2, G3, and G4 move toward the image side. The aperture diaphragm S and the fifth lens group G5 are fixed relative to the image surface, the sixth lens group G6 moves toward the object side, the seventh lens group G7 moves relative to the image surface, and the eighth lens group G8 is fixed relative to the image surface. When focusing from an infinite distance object to a close distance object, the sixth lens group G6 moves toward the image side along the optical axis, while the seventh lens group G7 moves toward the object side along the optical axis.

The first lens group G1 is configured with a cemented lens composed of a concave meniscus lens having the convex surface on the object side and a biconvex lens, and a biconvex lens. The second lens group G2 is configured with a concave meniscus lens having the convex surface on the object side. The third lens group G3 is configured with a cemented lens composed of a biconcave lens and a convex meniscus lens having the convex surface on the object side. The fourth lens group G4 is configured with a convex meniscus lens having the convex surface on the object side.

The fifth lens group G5 is configured with a convex meniscus lens having the convex surface on the object side, a cemented lens composed of a concave meniscus lens having the convex surface on the object side and a convex meniscus lens having the convex surface on the object side, a cemented lens composed of a convex meniscus lens having the convex surface on the image side and a biconcave lens, a cemented lens composed of a biconvex lens and a biconcave lens, and a biconvex lens. The sixth lens group G6 is configured with a convex meniscus lens having the convex surface on the image side, and a concave meniscus lens having the convex surface on the object side. The seventh lens group G7 is configured with a biconvex lens. The eighth lens group G8 is configured with a biconcave lens and a concave meniscus lens having the convex surface on the image side. In this example, the fourth and fifth lenses from the object side in the fifth lens group G5 are moved substantially perpendicularly to the optical axis for the vibration reduction.

Next, the specifications of the large aperture ratio telephoto zoom lens according to Example 10 are shown below.

Numerical Data in Example 10

Unit: mm

Surface Data

| Surface Number | r | d | nd | vd | PgF |
|---|---|---|---|---|---|
| Object Surface | ∞ | (d0) | | | |
| 1 | 181.2942 | 2.0000 | 1.78590 | 43.94 | 0.5612 |
| 2 | 94.9105 | 8.0831 | 1.43700 | 95.10 | 0.5336 |
| 3 | −1233.3435 | 0.1856 | | | |
| 4 | 86.4633 | 8.2236 | 1.43700 | 95.10 | 0.5336 |
| 5 | −3047.0924 | (d5) | | | |
| 6 | 170.8177 | 1.5000 | 1.55032 | 75.50 | 0.5401 |
| 7 | 44.3517 | (d7) | | | |
| 8 | −85.2992 | 1.1000 | 1.59282 | 68.62 | 0.5440 |
| 9 | 77.0039 | 2.2762 | 1.85451 | 25.15 | 0.6103 |
| 10 | 189.2261 | (d10) | | | |
| 11 | 51.3426 | 2.6924 | 1.87070 | 40.73 | 0.5682 |
| 12 | 93.6733 | (d12) | | | |
| 13 (diaphragm) | ∞ | 1.2160 | | | |
| 14* | 52.8112 | 3.7260 | 1.80610 | 40.73 | 0.5694 |
| 15 | 134.4106 | 0.5399 | | | |
| 16 | 63.6669 | 1.0500 | 1.80610 | 33.27 | 0.5884 |
| 17 | 27.1092 | 7.2701 | 1.43700 | 95.10 | 0.5336 |
| 18 | 967.1595 | 2.7806 | | | |
| 19 | −87.5299 | 2.3283 | 1.80809 | 22.76 | 0.6307 |
| 20 | −48.9605 | 1.6900 | 1.69350 | 53.20 | 0.5467 |
| 21* | 73.0784 | 1.2154 | | | |
| 22 | 47.1479 | 8.1226 | 1.43700 | 95.10 | 0.5336 |
| 23 | −39.3162 | 1.0500 | 1.85451 | 25.15 | 0.6103 |
| 24 | −540.9760 | 0.9596 | | | |
| 25* | 71.0632 | 6.6314 | 1.76450 | 49.09 | 0.5528 |
| 26* | −50.1676 | (d26) | | | |
| 27 | −605.2833 | 1.9653 | 1.86966 | 20.02 | 0.6435 |
| 28 | −103.6006 | 0.1500 | | | |
| 29 | 462.1732 | 0.8000 | 1.75500 | 52.32 | 0.5473 |
| 30 | 32.0850 | (d30) | | | |
| 31 | 54.0735 | 5.8120 | 1.65100 | 56.24 | 0.5420 |
| 32 | −91.0799 | (d32) | | | |
| 33 | −572.5013 | 1.0000 | 1.43700 | 95.10 | 0.5336 |
| 34 | 50.3131 | 6.6368 | | | |
| 35 | −34.8919 | 1.0000 | 1.49700 | 81.61 | 0.5389 |
| 36 | −213.8124 | 29.4117 | | | |
| 37 | ∞ | 2.5000 | 1.51680 | 64.20 | 0.5343 |
| 38 | ∞ | (BF) | | | |
| Image Surface | ∞ | | | | |

Aspherical Surface Data

| | Surface 14 | Surface 21 | Surface 25 | Surface 26 |
|---|---|---|---|---|
| K | 0.00000 | 0.00000 | 5.92000 | 0.03905 |
| A4 | −1.66065E−06 | −2.25769E−06 | −6.36733E−06 | 7.31884E−07 |
| A6 | −1.03894E−09 | 2.63370E−08 | 7.66082E−09 | 4.21926E−09 |
| A8 | −1.37293E−12 | −5.10494E−10 | −5.39754E−11 | −3.39511E−11 |
| A10 | 1.54808E−16 | 6.34501E−12 | 1.40567E−13 | 9.08068E−14 |
| A12 | 0.00000E+00 | −5.01020E−14 | −1.65794E−16 | −1.07352E−16 |
| A14 | 0.00000E+00 | 2.47738E−16 | 0.00000E+00 | 0.00000E+00 |
| A16 | 0.00000E+00 | −7.39129E−19 | 0.00000E+00 | 0.00000E+00 |
| A18 | 0.00000E+00 | 1.21174E−21 | 0.00000E+00 | 0.00000E+00 |
| A20 | 0.00000E+00 | −8.34540E−25 | 0.00000E+00 | 0.00000E+00 |

Various Data

Zoom Ratio 2.69

| | Wide Angle | Mid Range | Telephoto |
|---|---|---|---|
| Focal Length | 72.10 | 118.02 | 194.01 |
| F Number | 2.91 | 2.89 | 2.92 |
| Total Angle of View 2ω | 32.88 | 19.99 | 12.18 |
| Image Height Y | 21.63 | 21.63 | 21.63 |
| Total Lens Length | 221.99 | 221.99 | 221.99 |

-continued

| Variable Distance Data | | | |
|---|---|---|---|
| | Wide Angle | Mid Range | Telephoto |
| d0 | ∞ | ∞ | ∞ |
| d5 | 2.0000 | 36.7199 | 69.0419 |
| d7 | 18.2253 | 12.8027 | 7.3188 |
| d10 | 37.6931 | 15.7093 | 1.0012 |
| d12 | 23.4301 | 16.1162 | 3.9829 |
| d26 | 8.8226 | 7.6585 | 3.0000 |
| d30 | 10.8374 | 10.6564 | 19.3271 |
| d32 | 6.0634 | 7.4088 | 3.3991 |
| BF | 0.9999 | 0.9996 | 0.9979 |
| d0 | 778.0116 | 778.0105 | 778.0103 |
| d5 | 2.0000 | 36.7199 | 69.0419 |
| d7 | 18.2253 | 12.8027 | 7.3188 |
| d10 | 37.6931 | 15.7093 | 1.0012 |
| d12 | 23.4301 | 16.1162 | 3.9829 |
| d26 | 10.2594 | 11.4276 | 11.5504 |
| d30 | 8.3898 | 4.5205 | 4.4744 |
| d32 | 7.0745 | 9.7776 | 9.7081 |
| BF | 0.9997 | 0.9990 | 0.9955 |

| Lens Group Data | | |
|---|---|---|
| Lens Group | Starting Surface | Focal Length |
| G1 | 1 | 161.95 |
| G2 | 6 | −109.32 |
| G3 | 8 | −123.57 |
| G4 | 11 | 126.74 |
| G5 | 13 | 58.82 |
| G6 | 27 | −67.36 |
| G7 | 31 | 52.96 |
| G8 | 33 | −45.27 |

Values obtained from the conditional expressions in each of the above examples are shown below.

Values Corresponding to Conditional Expressions

| Conditional Expressions in | EX1 | EX2 | EX3 | EX4 | EX5 |
|---|---|---|---|---|---|
| (1) −1.18 < f2/fT < −0.37 | −0.62 | −0.98 | −0.46 | −0.64 | −0.66 |
| (2) −0.94 < f3/fT < −0.35 | −0.59 | −0.44 | −0.78 | −0.58 | −0.55 |
| (3) 67.00 < νn | 85.30 | 85.30 | 85.30 | 85.30 | 85.30 |
| (4) 0.018 < ΔPgFn | 0.042 | 0.042 | 0.042 | 0.042 | 0.042 |
| (5) *1 | −1.36 | −1.35 | −1.36 | −2.25 | −0.65 |
| (6) −0.420 < βbW < 0.480 | 0.047 | 0.013 | −0.030 | −0.051 | 0.016 |
| (7) −2.40 < ff/fr < −0.64 | −1.32 | −1.29 | −1.33 | −1.18 | −1.17 |
| (8) 0.63 < f1/fT <1.07 | 0.83 | 0.89 | 0.79 | 0.82 | 0.85 |
| **Conditional Expressions in** | **EX6** | **EX7** | **EX8** | **EX9** | **EX10** |
| (1) −1.18 < f2/fT < −0.37 | −0.65 | −0.57 | −0.67 | −0.59 | −0.56 |
| (2) −0.94 < f3/fT < −0.35 | −0.61 | −0.60 | −0.55 | −0.58 | −0.64 |
| (3) 67.00 < νn | 85.30 | 85.30 | 85.30 | 85.30 | 72.06 |
| (4) 0.018 < ΔPgFn | 0.042 | 0.042 | 0.042 | 0.042 | 0.023 |
| (5) *1 | −1.36 | −1.36 | −1.38 | −1.36 | −1.36 |
| (6) −0.420 < βbW < 0.480 | 0.399 | −0.348 | 0.052 | −0.080 | 0.032 |
| (7) −2.40 < ff/fr < −0.64 | −1.37 | −1.18 | −2.00 | −0.80 | −1.27 |
| (8) 0.63 < f1/fT <1.07 | 0.86 | 0.82 | 0.85 | 0.82 | 0.83 |

*1: −2.70 < (1 − βosT) × βRosT < −0.52

Other Embodiments

The techniques disclosed in the Examples are not limited to the description of the embodiment and examples and may be carried out in various other ways. The shapes and numerical values of the parts shown in the above numerical data are all examples for implementing the techniques presented herein, and should not be interpreted as limiting the technical scope of the techniques.

The following configurations can be adopted in the techniques:

Item 1

A large aperture ratio telephoto zoom lens including, sequentially from an object side to an image side: a first lens group G1 with positive refractive power, fixed relative to the image surface during zooming; a second lens group G2 with negative refractive power; a third lens group G3 with negative refractive power; a fourth lens group G4 with positive refractive power; an aperture diaphragm S; and a subsequent lens group GR composed of a plurality of lens groups, distances between adjacent lens groups changing during zooming from a wide-angle end to a telephoto end, the subsequent lens group GR including a focusing lens group that moves during focusing from an infinite distance object to a close distance object, the large aperture ratio telephoto zoom lens satisfying the following conditional expressions:

$$-1.18 < f2/fT < -0.37 \quad (1)$$

$$-0.94 < f3/fT < -0.35, \text{ where} \quad (2)$$

f2 represents a focal length of the second lens group G2, fT represents a focal length of the entire optical system at the telephoto end when focusing on infinity, and f3 represents a focal length of the third lens group G3.

Item 2

A large aperture ratio telephoto zoom lens including, sequentially from an object side to an image side: a first lens group G1 with positive refractive power, fixed relative to an image surface during zooming; a second lens group G2 with negative refractive power; a third lens group G3 with negative refractive power; a fourth lens group G4 with positive refractive power; an aperture diaphragm S that is fixed relative to the image surface during zooming; a fifth lens group G5 with positive refractive power, fixed relative to the image surface during zooming; a sixth lens group G6 with negative refractive power; a seventh lens group G7 with positive refractive power; and an eighth lens group G8 with fixed negative refractive power relative to the image surface during zooming, distances between adjacent lens groups changing during zooming from a wide-angle end to a telephoto end, the large aperture ratio telephoto zoom lens including a focusing lens group that moves during focusing from an infinite distance object to a close distance object closer to the image side than the aperture diaphragm S, the large aperture ratio telephoto zoom lens satisfying the following conditional expressions:

$$-1.18 < f2/fT < -0.37 \quad (1)$$

$$-0.94 < f3/fT < -0.35, \text{ where} \quad (2)$$

f2 represents a focal length of the second lens group G2, fT represents a focal length of the entire optical system at the telephoto end when focusing on infinity, and f3 represents a focal length of the third lens group G3.

Item 3

The large aperture ratio telephoto zoom lens according to Item 2, wherein the fifth lens group G5 includes a vibration reduction lens group with negative refractive power and moving substantially perpendicularly relative to an optical axis for correcting image blur, and wherein the large aperture ratio telephoto zoom lens satisfies the following conditional expression:

$$-2.70 < (1-\beta osT)\times\beta RosT < -0.52, \text{ where} \quad (5)$$

βosT represents a lateral magnification of the vibration reduction lens group at the telephoto end when focusing on infinity, and βRosT represents a lateral magnification of a lens system located closer to the image side than the vibration reduction lens group at the telephoto end when focusing on infinity.

Item 4

The large aperture ratio telephoto zoom lens according to Item 3, wherein the vibration reduction lens group comprises a single positive lens and a single negative lens sequentially from the object side to the image side.

Item 5

The large aperture ratio telephoto zoom lens according to any one of Item 2 to Item 4, wherein the sixth lens group G6 moves toward the image side while the seventh lens group G7 moves toward the object side when focusing from the infinite distance object to the close distance object, and wherein the large aperture ratio telephoto zoom lens satisfies the following conditional expression:

$$-2.40 < ff/fr < -0.64, \text{ where} \quad (7)$$

ff represents a focal length of the sixth lens group G6, and fr represents a focal length of the seventh lens group G7.

Item 6

The large aperture ratio telephoto zoom lens according to any one of Item 2 to Item 5, wherein the sixth lens group G6 includes a single positive lens and a single negative lens sequentially from the object side to the image side, and the seventh lens group G7 comprises a single positive lens.

Item 7

The large aperture ratio telephoto zoom lens according to any one of Item 1 to Item 6, wherein the second lens group G2, the third lens group G3, and the fourth lens group G4 move toward the image side during zooming from the wide-angle end to the telephoto end, and wherein the large aperture ratio telephoto zoom lens satisfies the following conditional expression:

$$-0.420 < \beta bW < 0.480, \text{ where} \quad (6)$$

βbW represents a combined magnification of a lens group located closer to the image side than the aperture diaphragm S at the telephoto end when focusing on infinity.

Item 8

The large aperture ratio telephoto zoom lens according to any one of Item 1 to Item 7, satisfying the following conditional expressions:

$$67.00 < \nu n \quad (3)$$

$$0.018 < \Delta PgFn, \text{ where} \quad (4)$$

νn represents a mean value of the Abbe number of negative lenses used in the second lens group G2 and the third lens group G3, and ΔPgFn represents a mean value of anomalous dispersion of the negative lenses used in the second lens group G2 and the third lens group G3.

Item 9

The large aperture ratio telephoto zoom lens according to any one of Item 1 to Item 8, satisfying the following conditional expression:

$$0.63 < f1/fT < 1.07, \text{ where} \quad (8)$$

f1 represents a focal length of the first lens group G1, and fT represents a focal length of the entire optical system at the telephoto end when focusing on infinity.

Those skilled in the art may conceive of various modifications, combinations, subcombinations, and alterations depending on design and other factors, which are, of course, within the scope of the appended claims and their equivalents.

REFERENCE SIGNS LIST

G1 First lens group
G2 Second lens group
G3 Third lens group
G4 Fourth lens group
G5 Fifth lens group
G6 Sixth lens group G7 Seventh lens group
G8 Eighth lens group
GR Subsequent lens group
S Aperture diaphragm
FL Optical filter
I Image surface

What is claimed is:

1. A large aperture ratio telephoto zoom lens comprising, sequentially from an object side to an image side: a first lens group G1 with positive refractive power, fixed relative to an image surface during zooming; a second lens group G2 with negative refractive power; a third lens G3 group with negative refractive power; a fourth lens group G4 with positive refractive power; an aperture diaphragm S; and a subsequent lens group GR composed of a plurality of lens groups, distances between adjacent lens groups changing during zooming from a wide-angle end to a telephoto end, the subsequent lens group GR including a focusing lens group that moves during focusing from an infinite distance object to a close distance object, the large aperture ratio telephoto zoom lens satisfying following conditional expressions:

$$-1.18 < f2/fT < -0.37 \quad (1)$$

$$-0.94 < f3/fT < -0.35, \text{ where} \quad (2)$$

f2 represents a focal length of the second lens group G2, fT represents a focal length of entire optical system at the telephoto end when focusing on infinity, and f3 represents a focal length of the third lens group G3.

2. The large aperture ratio telephoto zoom lens according to claim 1, satisfying following conditional expressions:

$$67.00 < \nu n \quad (3)$$

$$0.018 < \Delta PgFn, \text{ where} \quad (4)$$

νn represents a mean value of Abbe number of negative lenses used in the second lens group G2 and the third lens group G3, and ΔPgFn represents a mean value of anomalous dispersion of the negative lenses used in the second lens group G2 and the third lens group G3.

3. The large aperture ratio telephoto zoom lens according to claim 1, wherein the second lens group G2, the third lens group G3, and the fourth lens group G4 move toward the image side during zooming from the wide-angle end to the telephoto end, and wherein the large aperture ratio telephoto zoom lens satisfies following conditional expression:

$$-0.420 < \beta bW < 0.480, \text{ where} \quad (6)$$

βbW represents a combined magnification of a lens group located closer to the image side than the aperture diaphragm S at the telephoto end when focusing on infinity.

4. The large aperture ratio telephoto zoom lens according to claim 1, satisfying following conditional expression $$0.63 < f1/fT < 1.07, \text{ where} \quad (8)$$

f1 represents a focal length of the first lens group G1, and fT represents a focal length of the entire optical system at the telephoto end when focusing on infinity.

5. A large aperture ratio telephoto zoom lens comprising, sequentially from an object side to an image side: a first lens group G1 with positive refractive power, fixed relative to an image surface during zooming; a second lens group G2 with negative refractive power; a third lens group G3 with negative refractive power; a fourth lens group G4 with positive refractive power; an aperture diaphragm S that is fixed relative to the image surface during zooming; a fifth lens group G5 with positive refractive power, fixed relative to the image surface during zooming; a sixth lens group G6 with negative refractive power; a seventh lens group G7 with positive refractive power; and an eighth lens group G8 with fixed negative refractive power relative to the image surface during zooming, distances between adjacent lens groups changing during zooming from a wide-angle end to a telephoto end, the large aperture ratio telephoto zoom lens comprising a focusing lens group that moves during focusing from an infinite distance object to a close distance object closer to the image side than the aperture diaphragm S, the large aperture ratio telephoto zoom lens satisfying following conditional expressions:

$$-1.18 < f2/fT < -0.37 \quad (1)$$

$$-0.94 < f3/fT < -0.35, \text{ where} \quad (2)$$

f2 represents a focal length of the second lens group G2, fT represents a focal length of the entire optical system at the telephoto end when focusing on infinity, and f3 represents a focal length of the third lens group G3.

6. The large aperture ratio telephoto zoom lens according to claim 5, satisfying following conditional expressions:

$$67.00 < \nu n \quad (3)$$

$$0.018 < \Delta PgFn, \text{ where} \quad (4)$$

νn represents a mean value of Abbe number of negative lenses used in the second lens group G2 and the third lens group G3, and ΔPgFn represents a mean value of anomalous dispersion of the negative lenses used in the second lens group G2 and the third lens group G3.

7. The large aperture ratio telephoto zoom lens according to claim 5, wherein the fifth lens group G5 includes a vibration reduction lens group with negative refractive power and moving substantially perpendicularly relative to an optical axis for correcting image blur, and wherein the large aperture ratio telephoto zoom lens satisfies following conditional expression:

$$-2.70 < (1 - \beta osT) \times \beta RosT < -0.52, \text{ where} \quad (5)$$

βosT represents a lateral magnification of the vibration reduction lens group at the telephoto end when focusing on infinity, and βRosT represents a lateral magnification of a lens system located closer to the image side than the vibration reduction lens group at the telephoto end when focusing on infinity.

8. The large aperture ratio telephoto zoom lens according to claim 7, wherein the vibration reduction lens group comprises a single positive lens and a single negative lens sequentially from the object side to the image side.

9. The large aperture ratio telephoto zoom lens according to claim 5, wherein the second lens group G2, the third lens group G3, and the fourth lens group G4 move toward the image side during zooming from the wide-angle end to the telephoto end, and wherein the large aperture ratio telephoto zoom lens satisfies following conditional expression:

$$-0.420 < \beta bW < 0.480, \text{ where} \tag{6}$$

βbW represents a combined magnification of a lens group located closer to the image side than the aperture diaphragm S at the telephoto end when focusing on infinity.

10. The large aperture ratio telephoto zoom lens according to claim 5, wherein the sixth lens group G6 moves toward the image side while the seventh lens group G7 moves toward the object side when focusing from the infinite distance object to the close distance object, and wherein the large aperture ratio telephoto zoom lens satisfies following conditional expression:

$$-2.40 < ff/fr < -0.64, \text{ where} \tag{7}$$

ff represents a focal length of the sixth lens group G6, and fr represents a focal length of the seventh lens group G7.

11. The large aperture ratio telephoto zoom lens according to claim 5, wherein the sixth lens group G6 comprises a single positive lens and a single negative lens sequentially from the object side to the image side, and the seventh lens group G7 comprises a single positive lens.

12. The large aperture ratio telephoto zoom lens according to claim 5, satisfying following conditional expression:

$$0.63 < f1/fT < 1.07, \text{ where} \tag{8}$$

f1 represents a focal length of the first lens group G1, and fT represents a focal length of the entire optical system at the telephoto end when focusing on infinity.

13. A large aperture ratio telephoto zoom lens comprising, sequentially from an object side to an image side: a first lens group G1 with positive refractive power, fixed relative to an image surface during zooming; a second lens group G2 with negative refractive power; a third lens group G3 with negative refractive power; a fourth lens group G4 with positive refractive power; an aperture diaphragm S that is fixed relative to the image surface during zooming; a fifth lens group G5 with positive refractive power, fixed relative to the image surface during zooming; a sixth lens group G6 with negative refractive power; a seventh lens group G7 with positive refractive power; and an eighth lens group G8 with fixed negative refractive power relative to the image surface during zooming, the sixth lens group G6 comprising a single positive lens and a single negative lens sequentially from the object side to the image side, the seventh lens group G7 comprising a single positive lens, distances between adjacent lens groups changing during zooming from a wide-angle end to a telephoto end, with the second lens group G2, the third lens group G3, and the fourth lens group G4 moving toward the image side, the sixth lens group G6 moving toward the image side and the seventh lens group G7 moving toward the object side when focusing from an infinite distance object to a close distance object, the fifth lens G5 group including a vibration reduction lens group with negative refractive power and moving substantially perpendicularly relative to an optical axis for correcting image blur, the vibration reduction lens group comprising a single positive lens and a single negative lens sequentially from the object side to the image side, the large aperture ratio telephoto zoom lens satisfying following conditional expressions:

$$-1.18 < f2/fT < -0.37 \tag{1}$$

$$-0.94 < f3/fT < -0.35 \tag{2}$$

$$67.00 < \nu n \tag{3}$$

$$0.018 < \Delta PgFn \tag{4}$$

$$-2.70 < (1-\beta osT)\times\beta RosT < -0.52 \tag{5}$$

$$-0.420 < \beta bW < 0.480 \tag{6}$$

$$-2.40 < ff/fr < -0.64 \tag{7}$$

$$0.63 < f1/fT < 1.07, \text{ where} \tag{8}$$

f2 represents a focal length of the second lens group G2, fT represents a focal length of entire optical system at the telephoto end when focusing on infinity, f3 represents a focal length of the third lens group G3, νn represents a mean value of Abbe number of negative lenses used in the second lens group G2 and the third lens group G3, ΔPgFn represents a mean value of anomalous dispersion of the negative lenses used in the second lens group G2 and the third lens group G3, βosT represents a lateral magnification of the vibration reduction lens group at the telephoto end when focusing on infinity, βRosT represents a lateral magnification of a lens system located closer to the image side than the vibration reduction lens group at the telephoto end when focusing on infinity, βbW represents a combined magnification of a lens group located closer to the image side than the aperture diaphragm S at the telephoto end when focusing on infinity, ff represents a focal length of the sixth lens group G6, fr represents a focal length of the seventh lens group G7, and f1 represents a focal length of the first lens group G8.

* * * * *